US011939641B2

(12) United States Patent
Nakamura et al.

(10) Patent No.: US 11,939,641 B2
(45) **Date of Patent: *Mar. 26, 2024**

(54) GRAIN ORIENTED ELECTRICAL STEEL SHEET

(71) Applicant: NIPPON STEEL CORPORATION, Tokyo (JP)

(72) Inventors: Shuichi Nakamura, Tokyo (JP); Yusuke Kawamura, Tokyo (JP); Shota Morimoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 447 days.

This patent is subject to a terminal disclaimer.

(21) Appl. No.: 17/263,824

(22) PCT Filed: Jul. 31, 2019

(86) PCT No.: PCT/JP2019/030059

§ 371 (c)(1),
(2) Date: Jan. 27, 2021

(87) PCT Pub. No.: WO2020/027215

PCT Pub. Date: Feb. 6, 2020

(65) Prior Publication Data

US 2021/0355557 A1 Nov. 18, 2021

(30) Foreign Application Priority Data

Jul. 31, 2018 (JP) ................................ 2018-143898
Jul. 31, 2018 (JP) ................................ 2018-143900
(Continued)

(51) Int. Cl.
*C21D 9/46* (2006.01)
*C21D 1/76* (2006.01)
(Continued)

(52) U.S. Cl.
CPC ................ *C21D 9/46* (2013.01); *C21D 1/76* (2013.01); *C21D 3/04* (2013.01); *C21D 8/1222* (2013.01);
(Continued)

(58) Field of Classification Search
CPC ....................................................... C21D 9/46
See application file for complete search history.

(56) References Cited

U.S. PATENT DOCUMENTS 4,437,910 A 3/1984 Nozawa et al.
5,718,775 A 2/1998 Komatsubara et al.
(Continued)

FOREIGN PATENT DOCUMENTS

CN 105220071 A 1/2016
CN 107109563 A 8/2017
(Continued)

OTHER PUBLICATIONS

Lyakishev, "Internet Engineering," Encyclopedic Dictionary of Metallurgy, vol. 2, 2000, pp. 231-232.
(Continued)

*Primary Examiner* — Jophy S. Koshy
(74) *Attorney, Agent, or Firm* — Birch, Stewart, Kolasch & Birch, LLP

(57) ABSTRACT

A grain oriented electrical steel sheet includes the texture aligned with Goss orientation. In the grain oriented electrical steel sheet, when $(\alpha_1\ \beta_1\ \gamma_1)$ and $(\alpha_2\ \beta_2\ \gamma_2)$ represent deviation angles of crystal orientations measured at two measurement points which are adjacent on the sheet surface and which have an interval of 1 mm, the boundary condition BA is defined as $[(\alpha_2-\alpha_1)^2+(\beta_2-\beta_1)^2+(\gamma_2-\gamma_1)^2]^{1/2}\geq 0.5°$, and the boundary condition BB is defined as $[(\alpha_2-\alpha_1)^2+(\beta_2-\beta_1)^2+$
(Continued)

$(\gamma_2-\gamma_1)^2]^{1/2} \geq 2.0°$, the boundary which satisfies the boundary condition BA and which does not satisfy the boundary condition BB is included.

36 Claims, 3 Drawing Sheets

(30) Foreign Application Priority Data

Jul. 31, 2018 (JP) ................................ 2018-143901
Jul. 31, 2018 (JP) ................................ 2018-143902
Jul. 31, 2018 (JP) ................................ 2018-143904
Jul. 31, 2018 (JP) ................................ 2018-143905

(51) Int. Cl.
*C21D 3/04* (2006.01)
*C21D 8/12* (2006.01)
*C22C 38/00* (2006.01)
*C22C 38/02* (2006.01)
*C22C 38/12* (2006.01)
*H01F 1/18* (2006.01)

(52) U.S. Cl.
CPC ......... *C21D 8/1233* (2013.01); *C21D 8/1255* (2013.01); *C21D 8/1272* (2013.01); *C21D 8/1283* (2013.01); *C22C 38/004* (2013.01); *C22C 38/02* (2013.01); *C22C 38/12* (2013.01); *H01F 1/18* (2013.01); *C21D 2201/05* (2013.01)

(56) References Cited

U.S. PATENT DOCUMENTS 6,379,810 B1 4/2002 Hiramoto et al.
2009/0173413 A1 7/2009 Ushigami et al.
2013/0160901 A1 6/2013 Omura et al.
2013/0213525 A1 8/2013 Shingaki et al.
2016/0230240 A1 8/2016 Senda et al.
2017/0298467 A1 10/2017 Suehiro et al.
2018/0002773 A1 1/2018 Shingaki et al.
2021/0043345 A1 2/2021 Kataoka et al.
2021/0246524 A1* 8/2021 Nakamura .............. C22C 38/16
2021/0355557 A1 11/2021 Nakamura et al.
2022/0372589 A1 11/2022 Nakamura et al.

FOREIGN PATENT DOCUMENTS

EP 0 577 124 B1 10/2002
JP 52-24116 A 2/1977
JP 57-2839 A 1/1982
JP 61-190017 A 8/1986
JP 2-200732 A 8/1990
JP 2-258923 A 10/1990
JP 2000-277331 A 10/2000
JP 2001-192785 A 7/2001
JP 2001-294996 A 10/2001
JP 3456742 B2 10/2003
JP 3470475 B2 11/2003
JP 2004-60026 A 2/2004
JP 2005-240079 A 9/2005
JP 2005-240102 A 9/2005
JP 2007-314826 A 12/2007
JP 2009-235471 A 10/2009
JP 2012-52229 A 3/2012
JP 2012-77380 A 4/2012
JP 4962512 B2 6/2012
JP 2012-177149 A 9/2012
JP 2001-25415 A 2/2013
JP 2015-206114 A 11/2015
JP 2017-128765 A 7/2017
KR 10-2013-001489 A 2/2013
WO WO-2012032792 A1 * 3/2012 ............... C21D 8/12
WO WO 2015/040799 A1 3/2015
WO WO 2016/056501 A1 4/2016
WO WO 2019/182154 A1 9/2019
WO WO 2020/027215 A1 2/2020
WO WO 2020/027218 A1 2/2020
WO WO 2020/027219 A1 2/2020
WO WO 2021/156960 A1 8/2021
WO WO 2021/156980 A1 8/2021

OTHER PUBLICATIONS

Russian Office Action and Search Report for Russian Application No. 2021101524, dated Jul. 8, 2021, with English translation.
JIS C 2556, 2015, total 25 pages.

* cited by examiner

GRAIN ORIENTED ELECTRICAL STEEL SHEET

TECHNICAL FIELD

The present invention relates to a grain oriented electrical steel sheet.

Priorities are claimed on Japanese Patent Applications: No. 2018-143898, filed on Jul. 31, 2018; No. 2018-143900, filed on Jul. 31, 2018; No. 2018-143901, filed on Jul. 31, 2018; No. 2018-143902, filed on Jul. 31, 2018; No. 2018-143904, filed on Jul. 31, 2018; and No. 2018-143905, filed on Jul. 31, 2018, and the content of which is incorporated herein by reference.

BACKGROUND ART

A grain oriented electrical steel sheet includes 7 mass % or less of Si and has a secondary recrystallized texture which aligns in {110}<001> orientation (Goss orientation). Herein, the {110}<001> orientation represents that {110} plane of crystal is aligned parallel to a rolled surface and <001> axis of crystal is aligned parallel to a rolling direction.

Magnetic characteristics of the grain oriented electrical steel sheet are significantly affected by alignment degree to the {110}<001> orientation. In particular, it is considered that the relationship between the rolling direction of the steel sheet, which is the primal magnetized direction when using the steel sheet, and the <001> direction of crystal, which is the direction of easy magnetization, is important. Thus, in recent years, the practical grain oriented electrical steel sheet is controlled so that an angle formed by the <001> direction of crystal and the rolling direction is within approximately 5°.

It is possible to represent the deviation between the actual crystal orientation of the grain oriented electrical steel sheet and the ideal {110}<001> orientation by three components which are a deviation angle α based on a normal direction Z, a deviation angle β based on a transverse direction C, and a deviation angle γ based on a rolling direction L.

FIG. 1 is a schema illustrating the deviation angle α, the deviation angle β, and the deviation angle γ. As shown in FIG. 1, the deviation angle α is an angle formed by the <001> direction of crystal projected on the rolled surface and the rolling direction L when viewing from the normal direction Z. The deviation angle β is an angle formed by the <001> direction of crystal projected on L cross section (cross section whose normal direction is the transverse direction) and the rolling direction L when viewing from the transverse direction C (width direction of sheet). The deviation angle γ is an angle formed by the <110> direction of crystal projected on C cross section (cross section whose normal direction is the rolling direction) and the normal direction Z when viewing from the rolling direction L.

It is known that, among the deviation angles α, β and γ, the deviation angle β affects magnetostriction. Herein, the magnetostriction is a phenomenon in which a shape of magnetic material changes when magnetic field is applied. Since the magnetostriction causes vibration and noise, it is demanded to reduce the magnetostriction of the grain oriented electrical steel sheet utilized for a core of transformer and the like.

For instance, the patent documents 1 to 3 disclose controlling the deviation angle β. The patent documents 4 and 5 disclose controlling the deviation angle α in addition to the deviation angle β. The patent document 6 discloses a technique for improving the iron loss characteristics by further classifying the alignment degree of crystal orientation using the deviation angle α, the deviation angle β, and the deviation angle γ as indexes.

The patent documents 7 to 9 disclose that not only simply controlling the absolute values and the average values of the deviation angles α, β, and γ but also controlling the fluctuations (deviations) therewith. The patent documents 10 to 12 disclose adding Nb, V, and the like to the grain oriented electrical steel sheet.

In addition to the magnetostriction, the grain oriented electrical steel sheet is demanded to be excellent in magnetic flux density. In the past, it has been proposed to control the grain growth in secondary recrystallization in order to obtain the steel sheet showing high magnetic flux density, as a method and the like. For instance, the patent documents 13 and 14 disclose a method in which the secondary recrystallization is proceeded with giving a thermal gradient to the steel sheet in a tip area of secondary recrystallized grain which is encroaching primary recrystallized grains in final annealing process.

When the secondary recrystallized grain is grown with giving the thermal gradient, the grain growth may be stable, but the grain may be excessively large. When the grain is excessively large, the effect of improving the magnetic flux density may be restricted because of curvature of coil. For instance, the patent document 15 discloses a treatment of suppressing free growth of secondary recrystallized grain which nucleates in an initial stage of secondary recrystallization when the secondary recrystallization is proceeded with giving the thermal gradient (for instance, a treatment to add mechanical strain to edges of width direction of the steel sheet).

RELATED ART DOCUMENTS

Patent Documents

[Patent Document 1] Japanese Unexamined Patent Application, First Publication No. 2001-294996

[Patent Document 2] Japanese Unexamined Patent Application, First Publication No. 2005-240102

[Patent Document 3] Japanese Unexamined Patent Application, First Publication No. 2015-206114

[Patent Document 4] Japanese Unexamined Patent Application, First Publication No. 2004-060026

[Patent Document 5] PCT International Publication No. WO2016/056501

[Patent Document 6] Japanese Unexamined Patent Application, First Publication No. 2007-314826

[Patent Document 7] Japanese Unexamined Patent Application, First Publication No. 2001-192785

[Patent Document 8] Japanese Unexamined Patent Application, First Publication No. 2005-240079

[Patent Document 9] Japanese Unexamined Patent Application, First Publication No. 2012-052229

[Patent Document 10] Japanese Unexamined Patent Application, First Publication No. S52-024116

[Patent Document 11] Japanese Unexamined Patent Application, First Publication No. H02-200732

[Patent Document 12] Japanese Patent (Granted) Publication No. 4962516

[Patent Document 13] Japanese Unexamined Patent Application, First Publication No. S57-002839

[Patent Document 14] Japanese Unexamined Patent Application, First Publication No. S61-190017

[Patent Document 15] Japanese Unexamined Patent Application, First Publication No. H02-258923

SUMMARY OF INVENTION

Technical Problem to be Solved

As a result of investigations by the present inventors, although the conventional techniques disclosed in the patent documents 1 to 9 controls the crystal orientation, it is insufficient to reduce the magnetostriction.

Moreover, since the conventional techniques disclosed in the patent documents 10 to 12 merely contain Nb and V, it is insufficient to reduce the magnetostriction. The conventional techniques disclosed in the patent documents 13 to 15 not only entail productivity problems, but are insufficient in reducing the magnetostriction.

The present invention has been made in consideration of the situations such that it is required to reduce the magnetostriction for the grain oriented electrical steel sheet. An object of the invention is to provide the grain oriented electrical steel sheet in which the magnetostriction is improved. Specifically, the object of the invention is to provide the grain oriented electrical steel sheet in which both of the magnetostriction and the iron loss in middle magnetic field range (especially in magnetic field where excited so as to be approximately 1.7 T) are improved.

Solution to Problem

An aspect of the present invention employs the following.

(1) A grain oriented electrical steel sheet according to an aspect of the present invention includes, 2.0 to 7.0% of Si,
0 to 0.030% of Nb,
0 to 0.030% of V,
0 to 0.030% of Mo,
0 to 0.030% of Ta,
0 to 0.030% of W,
0 to 0.0050% of C,
0 to 1.0% of Mn,
0 to 0.0150% of S,
0 to 0.0150% of Se,
0 to 0.0650% of Al,
0 to 0.0050% of N,
0 to 0.40% of Cu,
0 to 0.010% of Bi,
0 to 0.080% of B,
0 to 0.50% of P,
0 to 0.0150% of Ti,
0 to 0.10% of Sn,
0 to 0.10% of Sb,
0 to 0.30% of Cr,
0 to 1.0% of Ni, and
a balance consisting of Fe and impurities, and
comprising a texture aligned with Goss orientation, characterized in that,
when $\alpha$ is defined as a deviation angle from an ideal Goss orientation based on a rotation axis parallel to a normal direction Z,
$\beta$ is defined as a deviation angle from the ideal Goss orientation based on a rotation axis parallel to a transverse direction C,
$\gamma$ is defined as a deviation angle from the ideal Goss orientation based on a rotation axis parallel to a rolling direction L,
($\alpha_1$ $\beta_1$ $\gamma_1$) and ($\alpha_2$ $\beta_2$ $\gamma_2$) represent deviation angles of crystal orientations measured at two measurement points which are adjacent on a sheet surface and which have an interval of 1 mm,
a boundary condition BA is defined as $[(\alpha_2-\alpha_1)^2+(\beta_2-\beta_1)^2+(\gamma_2-\gamma_1)^2]^{1/2}\geq 0.5°$, and
a boundary condition BB is defined as $[(\alpha_2-\alpha_1)^2+(\beta_2-\beta_1)^2+(\gamma_2-\gamma_1)^2]^{1/2}\geq 2.0°$,
a boundary which satisfies the boundary condition BA and which does not satisfy the boundary condition BB is included.

(2) In the grain oriented electrical steel sheet according to (1),
when a grain size $RA_L$ is defined as an average grain size obtained based on the boundary condition BA in the rolling direction L and
a grain size $RB_L$ is defined as an average grain size obtained based on the boundary condition BB in the rolling direction L,
the grain size $RA_L$ and the grain size $RB_L$ may satisfy $1.15\leq RB_L\div RA_L$.

(3) In the grain oriented electrical steel sheet according to (1) or (2),
when a grain size $RA_C$ is defined as an average grain size obtained based on the boundary condition BA in the transverse direction C and
a grain size $RB_C$ is defined as an average grain size obtained based on the boundary condition BB in the transverse direction C,
the grain size $RA_C$ and the grain size $RB_C$ may satisfy $1.15\leq RB_C\div RA_C$.

(4) In the grain oriented electrical steel sheet according to any one of (1) to (3),
when a grain size $RA_L$ is defined as an average grain size obtained based on the boundary condition BA in the rolling direction L and
a grain size $RA_C$ is defined as an average grain size obtained based on the boundary condition BA in the transverse direction C,
the grain size $RA_L$ and the grain size $RA_C$ may satisfy $1.15\leq RA_C\div RA_L$.

(5) In the grain oriented electrical steel sheet according to any one of (1) to (4),
when a grain size $RB_L$ is defined as an average grain size obtained based on the boundary condition BB in the rolling direction L and
a grain size $RB_C$ is defined as an average grain size obtained based on the boundary condition BB in the transverse direction C,
the grain size $RB_L$ and the grain size $RB_C$ may satisfy $1.50\leq RB_C\div RB_L$.

(6) In the grain oriented electrical steel sheet according to any one of (1) to (5),
when a grain size $RA_L$ is defined as an average grain size obtained based on the boundary condition BA in the rolling direction L,
a grain size $RB_L$ is defined as an average grain size obtained based on the boundary condition BB in the rolling direction L,
a grain size $RA_C$ is defined as an average grain size obtained based on the boundary condition BA in the transverse direction C, and
a grain size $RB_C$ is defined as an average grain size obtained based on the boundary condition BB in the transverse direction C, the grain size $RA_L$, the grain size $RA_C$, the grain size $RB_L$, and the grain size $RB_C$ may satisfy $(RB_C \times RA_L) \div (RB_L \times RA_C) < 1.0$.

(7) In the grain oriented electrical steel sheet according to any one of (1) to (6), when (α β γ) represents a deviation angle of crystal orientation measured at a measurement point on a sheet surface, and $\theta = [\alpha^2 + \beta^2 + \gamma^2]^{1/2}$ is defined as a deviation angle at each measurement point, σ(θ) which is a standard deviation of an absolute value of the deviation angle θ may be 0° to 3.0°.

(8) In the grain oriented electrical steel sheet according to any one of (1) to (7), when a boundary condition BC is defined as $|\alpha_2 - \alpha_1| \geq 0.5°$, a boundary which satisfies the boundary condition BC and which does not satisfy the boundary condition BB may be included.

(9) In the grain oriented electrical steel sheet according to any one of (1) to (8), when a grain size $RC_L$ is defined as an average grain size obtained based on the boundary condition BC in the rolling direction L and a grain size $RB_L$ is defined as an average grain size obtained based on the boundary condition BB in the rolling direction L, the grain size $RC_L$ and the grain size $RB_L$ may satisfy $1.10 \leq RB_L \div RC_L$.

(10) In the grain oriented electrical steel sheet according to any one of (1) to (9), when a grain size $RC_C$ is defined as an average grain size obtained based on the boundary condition BC in the transverse direction C and a grain size $RB_C$ is defined as an average grain size obtained based on the boundary condition BB in the transverse direction C, the grain size $RC_C$ and the grain size $RB_C$ may satisfy $1.10 \leq RB_C \div RC_C$.

(11) In the grain oriented electrical steel sheet according to any one of (1) to (10), when a grain size $RC_L$ is defined as an average grain size obtained based on the boundary condition BC in the rolling direction L and a grain size $RC_C$ is defined as an average grain size obtained based on the boundary condition BC in the transverse direction C, the grain size $RC_L$ and the grain size $RC_C$ may satisfy $1.15 \leq RC_C \div RC_L$.

(12) In the grain oriented electrical steel sheet according to any one of (1) to (11), when a grain size $RC_L$ is defined as an average grain size obtained based on the boundary condition BC in the rolling direction L, a grain size $RB_L$ is defined as an average grain size obtained based on the boundary condition BB in the rolling direction L, a grain size $RC_C$ is defined as an average grain size obtained based on the boundary condition BC in the transverse direction C, and a grain size $RB_C$ is defined as an average grain size obtained based on the boundary condition BB in the transverse direction C, the grain size $RC_L$, the grain size $RC_C$, the grain size $RB_L$, and the grain size $RB_C$ may satisfy $(RB_C \times RC_L) \div (RB_L \times RC_C) < 1.0$.

(13) In the grain oriented electrical steel sheet according to any one of (1) to (12), $\alpha_1$) which is a standard deviation of an absolute value of the deviation angle α may be 0° to 3.50°.

(14) In the grain oriented electrical steel sheet according to any one of (1) to (13), the grain oriented electrical steel sheet may include, as the chemical composition, at least one selected from a group consisting of Nb, V, Mo, Ta, and W, and an amount thereof may be 0.0030 to 0.030 mass % in total.

(15) In the grain oriented electrical steel sheet according to any one of (1) to (14), a magnetic domain may be refined by at least one of applying a local minute strain and forming a local groove.

(16) In the grain oriented electrical steel sheet according to any one of (1) to (15), an intermediate layer may be arranged in contact with the grain oriented electrical steel sheet and an insulation coating may be arranged in contact with the intermediate layer.

(17) In the grain oriented electrical steel sheet according to any one of (1) to (16), the intermediate layer may be a forsterite film with an average thickness of 1 to 3 μm.

(18) In the grain oriented electrical steel sheet according to any one of (1) to (17), the intermediate layer may be an oxide layer with an average thickness of 2 to 500 nm.

Effects of Invention

According to the above aspects of the present invention, it is possible to provide the grain oriented electrical steel sheet in which both of the magnetostriction and the iron loss in middle magnetic field range (especially in magnetic field where excited so as to be approximately 1.7 T) are improved.

DETAILED DESCRIPTION OF PREFERRED EMBODIMENTS

Figure 1:
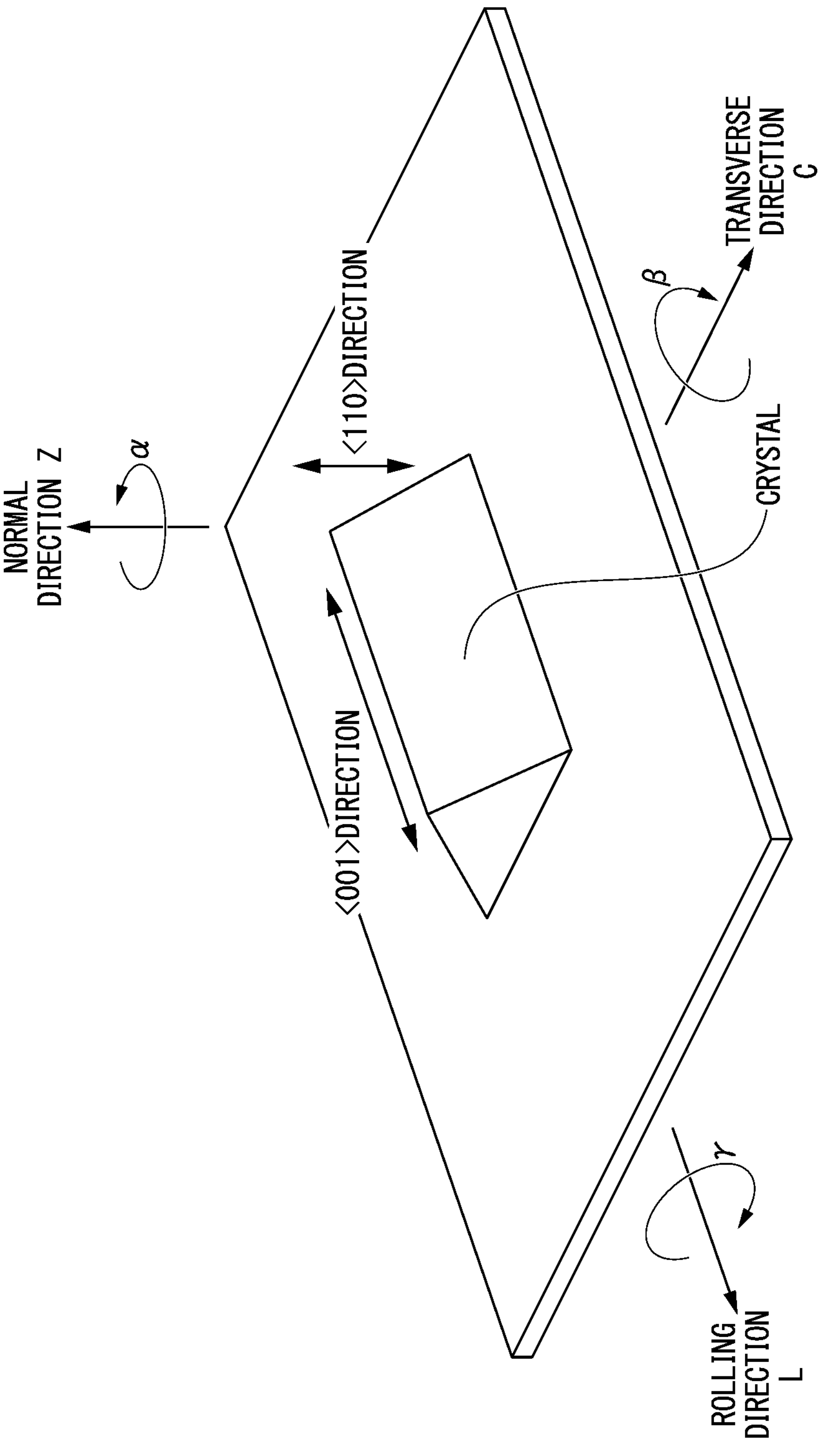
FIG. 1 is a schema illustrating deviation angle α, deviation angle β, and deviation angle γ.

Hereinafter, a preferred embodiment of the present invention is described in detail. However, the present invention is not limited only to the configuration which is disclosed in the present embodiment, and various modifications are possible without departing from the aspect of the present invention. In addition, the limitation range as described below includes a lower limit and an upper limit thereof. However, the value represented by "more than" or "less than" does not include in the limitation range. Unless otherwise noted, "%" of the chemical composition represents "mass %".

There is a limit to reduce both of the iron loss and the magnetostriction only by aligning the crystal orientation close to the ideal {110}<001> orientation (Goss orientation), for instance, only by decreasing the standard deviation of the deviation angle of the crystal orientation close to zero. The present inventors have investigated the reasons. It seems that the correlation between the crystal orientation and the magnetic flux density is also theoretically high. Thus, the present inventors have focused on the deviation of the correlation the iron loss and the magnetostriction with the magnetic flux density $B_8$ in the rolling direction.

As a result of the investigation, in the magnetic field range excited so as to be approximately 1.7 T where the magnetic characteristics are measured in general (hereinafter, it may be simply referred to as "middle magnetic field range"), it has been found that the correlation between the magnetic flux density $B_8$ and the iron loss is relatively high.

As a result of investigating the relation between the magnetic characteristics and the deviation angle of the crystal orientation of the grain oriented electrical steel sheet regarding the above magnetic field range, it has been found that the magnetic flux density $B_8$ is strongly correlated with the deviation angle α and the deviation angle β, specifically, is strongly correlated with $(\alpha^2+\beta^2)^{1/2}$. In other words, it has been found that it is important to decrease both of the deviation angle α and the deviation angle β as the crystal orientation. The above finding supports conventional techniques such that the deviation angle α and the deviation angle β are controlled. In other words, it is possible to reduce the iron loss in middle magnetic field range in addition to increasing the magnetic flux density $B_8$ by controlling the crystal orientation in consideration of the deviation angle α and the deviation angle β.

However, the present inventors have found that the correlation between the magnetic flux density $B_8$ and the magnetostriction may be weak in some materials. The present inventors have investigated the above situation, and as a result, have found that it is possible to evaluate the above behavior by using "the difference between the minimum and the maximum of magnetostriction" which is the amount of magnetic strain at 1.7 T (hereinafter, it may be referred to as "λp-p@1.7 T"). Moreover, the present inventors have thought that it is possible to further improve the magnetostriction in middle magnetic field range by optimally controlling the above behavior.

The present inventors have made a thorough investigation for geometrical factors to preferably control λp-p@1.7 T based on the measurement results of the distributions of the deviation angles α, β, and γ in the grain oriented electrical steel sheet. As a result, it has been found that it is important to control the crystal orientation such as "three-dimensional misorientation" (the angle ϕ. $\phi=[(\alpha_2-\alpha_1)^2+(\beta_2-\beta_1)^2+(\gamma_2-\gamma_1)^2]^{1/2}$) which is the value calculated using the deviation angles α, β, and γ in the grain oriented electrical steel sheet.

The present inventors have attempted that the secondary recrystallized grain is not grown with maintaining the crystal orientation, but is grown with changing the crystal orientation. As a result, the present inventors have found that, in order to improve the magnetostriction and the iron loss in middle magnetic field range, it is advantageous to sufficiently induce orientation changes (subboundaries where the angle 4 is small) which are local and low-angle and which are not conventionally recognized as boundary during the growth of secondary recrystallized grain, and to divide one secondary recrystallized grain into small domains where each crystal orientation is slightly different.

In addition, the present inventors have found that, in order to control the above orientation changes, it is important to consider a factor to easily induce the orientation changes itself and a factor to periodically induce the orientation changes within one grain. In order to easily induce the orientation changes itself, it has been found that starting the secondary recrystallization from lower temperature is effective, for instance, by controlling the grain size of the primary recrystallized grain or by utilizing elements such as Nb. Moreover, it has been found that the orientation changes can be periodically induced up to higher temperature within one grain during the secondary recrystallization by utilizing AlN and the like which are the conventional inhibitor at appropriate temperature and in appropriate atmosphere.

First Embodiment

In the grain oriented electrical steel sheet according to the first embodiment of the present invention, the secondary recrystallized grain is divided into plural domains by the subboundaries where the angle ϕ is small. Specifically, the grain oriented electrical steel sheet according to the present embodiment includes the local and low-angle boundary (subboundary where the angle ϕ is small) which divides the inside of secondary recrystallized grain, in addition to the comparatively high-angle boundary which corresponds to the grain boundary of secondary recrystallized grain.

Specifically, the grain oriented electrical steel sheet according to the present embodiment includes, as a chemical composition, by mass %, 2.0 to 7.0% of Si,
0 to 0.030% of Nb,
0 to 0.030% of V,
0 to 0.030% of Mo,
0 to 0.030% of Ta,
0 to 0.030% of W,
0 to 0.0050% of C,
0 to 1.0% of Mn,
0 to 0.0150% of S,
0 to 0.0150% of Se,
0 to 0.0650% of Al,
0 to 0.0050% of N,
0 to 0.40% of Cu,
0 to 0.010% of Bi,
0 to 0.080% of B,
0 to 0.50% of P,
0 to 0.0150% of Ti,
0 to 0.10% of Sn,
0 to 0.10% of Sb,
0 to 0.30% of Cr,
0 to 1.0% of Ni, and
a balance consisting of Fe and impurities, and
includes a texture aligned with Goss orientation.

When α is defined as a deviation angle from an ideal Goss orientation based on a rotation axis parallel to a normal direction Z, β is defined as a deviation angle from the ideal Goss orientation based on a rotation axis parallel to a transverse direction C (width direction of sheet), γ is defined as a deviation angle from the ideal Goss orientation based on a rotation axis parallel to a rolling direction L, $(\alpha_1\ \beta_1\ \gamma_1)$ and $(\alpha_2\ \beta_2\ \gamma_2)$ represent deviation angles of crystal orientations measured at two measurement points which are adjacent on a sheet surface and which have an interval of 1 mm, a boundary condition BA is defined as $[(\alpha_2-\alpha_1)^2+(\beta_2-\beta_1)^2+(\gamma_2-\gamma_1)^2]^{1/2}\geq 0.5°$, and a boundary condition BB is defined as $[(\alpha_2-\alpha_1)^2+(\beta_2-\beta_1)^2+(\gamma_2-\gamma_1)^2]^{1/2}\geq 2.0°$, the grain oriented electrical steel sheet according to the present embodiment includes a boundary (a boundary dividing an inside of secondary recrystallized grain) which satisfies the boundary condition BA and which does not satisfy the boundary condition BB, in addition to a boundary (a boundary corresponding to the grain boundary of secondary recrystallized grain) which satisfies the boundary condition BB.

The boundary which satisfies the boundary condition BB substantially corresponds to the grain boundary of secondary recrystallized grain which is observed when the conventional grain oriented electrical steel sheet is macro-etched. In addition to the boundary which satisfies the boundary condition BB, the grain oriented electrical steel sheet according to the present embodiment includes, at a relatively high frequency, the boundary which satisfies the boundary condition BA and which does not satisfy the boundary condition BB. The boundary which satisfies the boundary condition BA and which does not satisfy the boundary condition BB corresponds to the local and low-angle boundary which divides the inside of secondary recrystallized grain. Specifically, in the present embodiment, the secondary recrystallized grain becomes the state of being finely divided into the small domains where each crystal orientation is slightly different.

The conventional grain oriented electrical steel sheet may include the secondary recrystallized grain boundary which satisfies the boundary condition BB. Moreover, the conventional grain oriented electrical steel sheet may include the gradual shift of the crystal orientation in the secondary recrystallized grain. However, in the conventional grain oriented electrical steel sheet, since the crystal orientation tends to shift continuously in the secondary recrystallized grain, the shift of the crystal orientation in the conventional grain oriented electrical steel sheet hardly satisfies the boundary condition BA.

For instance, in the conventional grain oriented electrical steel sheet, it may be possible to detect the long range shift of the crystal orientation in the secondary recrystallized grain, but it is hard to detect the short range shift of the crystal orientation in the secondary recrystallized grain (it is hard to satisfy the boundary condition BA), because the local shift is slight. On the other hand, in the grain oriented electrical steel sheet according to the present embodiment, the crystal orientation locally shifts in short range, and thus, the shift thereof can be detected as the boundary. Specifically, the grain oriented electrical steel sheet according to the present embodiment includes, at a relatively high frequency, the shift where the value of $[(\alpha_2-\alpha_1)^2+(\beta_2-\beta_1)^2+(\gamma_2-\gamma_1)^2]^{1/2}$ is 0.5° or more, between the two measurement points which are adjacent in the secondary recrystallized grain and which have the interval of 1 mm.

In the grain oriented electrical steel sheet according to the present embodiment, the boundary which satisfies the boundary condition BA and which does not satisfy the boundary condition BB (the boundary which divides the inside of secondary recrystallized grain) is purposely elaborated by optimally controlling the production conditions as described later. In the grain oriented electrical steel sheet according to the present embodiment, the secondary recrystallized grain becomes the state such that the grain is divided into the small domains by the subboundaries where the angle $\phi$ is small, and thus, both of the magnetostriction and the iron loss in middle magnetic field range are improved.

Hereinafter, the grain oriented electrical steel sheet according to the present embodiment is described in detail.

1. Crystal Orientation

The notation of crystal orientation in the present embodiment is described.

In the present embodiment, the {110}<001> orientation is distinguished into two orientations which are "actual {110}<001> orientation" and "ideal {110}<001> orientation". The above reason is that, in the present embodiment, it is necessary to distinguish between the {110}<001> orientation representing the crystal orientation of the practical steel sheet and the {110}<001> orientation representing the academic crystal orientation.

In general, in the measurement of the crystal orientation of the practical steel sheet after recrystallization, the crystal orientation is determined without strictly distinguishing the misorientation of approximately ±2.5°. In the conventional grain oriented electrical steel sheet, the "{110}<001> orientation" is regarded as the orientation range within approximately ±2.5° centered on the geometrically ideal {110}<001> orientation. On the other hand, in the present embodiment, it is necessary to accurately distinguish the misorientation of ±2.5° or less.

Thus, in the present embodiment, although the simply "{110}<001> orientation (Goss orientation)" is utilized as conventional for expressing the actual orientation of the grain oriented electrical steel sheet, the "ideal {110}<001> orientation (ideal Goss orientation)" is utilized for expressing the geometrically ideal {110}<001> orientation, in order to avoid the confusion with the {110}<001> orientation used in conventional publication.

For instance, in the present embodiment, the explanation such that "the {110}<001> orientation of the grain oriented electrical steel sheet according to the present embodiment is deviated by 2° from the ideal {110}<001> orientation" may be included.

In addition, in the present embodiment, the following five angles $\alpha$, $\beta$, $\gamma$, $\theta$, and $\phi$ are used, which relates to the crystal orientation identified in the grain oriented electrical steel sheet.

Deviation angle $\alpha$: a deviation angle from the ideal {110}<001> orientation around the normal direction Z, which is identified in the grain oriented electrical steel sheet.

Deviation angle $\beta$: a deviation angle from the ideal {110}<001> orientation around the transverse direction C, which is identified in the grain oriented electrical steel sheet.

Deviation angle $\gamma$: a deviation angle from the ideal {110}<001> orientation around the rolling direction L, which is identified in the grain oriented electrical steel sheet.

A schema illustrating the deviation angle $\alpha$, the deviation angle $\beta$, and the deviation angle $\gamma$ is shown in FIG. 1.

Deviation angle $\theta$: a deviation angle from the ideal {110}<001> orientation obtained by $\theta=[\alpha^2+\beta^2+\gamma^2]^{1/2}$ using the above deviation angles $\alpha$, $\beta$, and $\gamma$.

Angle $\phi$: an angle obtained by $\phi=[(\alpha_2-\alpha_1)^2+(\beta_2-\beta_1)^2+(\gamma_2-\gamma_1)^2]^{1/2}$, when ($\alpha_1$ $\beta_1$ $\gamma_1$) and ($\alpha_2$ $\beta_2$ $\gamma_2$) represent the deviation angles of the crystal orientations measured at two measurement points which are adjacent on the rolled surface of the grain oriented electrical steel sheet and which have the interval of 1 mm.

The angle $\phi$ may be referred to as "three-dimensional misorientation".

2. Grain Boundary of Grain Oriented Electrical Steel Sheet

In the grain oriented electrical steel sheet according to the present embodiment, in particular, a local orientation change is utilized in order to control the three-dimensional misorientation (angle $\phi$). Herein, the above local orientation change corresponds to the orientation change which occurs during the growth of secondary recrystallized grain and which is not conventionally recognized as the boundary because the amount of change thereof is slight. Hereinafter, the above orientation change which occurs so as to divide one secondary recrystallized grain into the small domains where each crystal orientation is slightly different may be referred to as "switching".

Moreover, the boundary which divides one secondary recrystallized grain (the boundary which satisfies the boundary condition BA and which does not satisfy the boundary condition BB) may be referred to as "subboundary", and the grain segmented by the boundary including the subboundary may be referred to as "subgrain".

Moreover, hereinafter, the iron loss ($W_{17/50}$) and the magnetostriction (λp−p@1.7 T) in middle magnetic field which are the characteristics related to the present embodiment may be referred to as simply "iron loss" and "magnetostriction" respectively.

It seems that the above switching has the orientation change of approximately 1° (lower than 2°) and occurs during growing the secondary recrystallized grain. Although the details are explained below in connection with the producing method, it is important to grow the secondary recrystallized grain under conditions such that the switching easily occurs. For instance, it is important to initiate the secondary recrystallization from a relatively low temperature by controlling the grain size of the primary recrystallized grain and to maintain the secondary recrystallization up to higher temperature by controlling the type and amount of the inhibitor.

The reason why the control of the angle ϕ influences the magnetic characteristics is not entirely clear, but is presumed as follows.

In general, the magnetization occurs due to the motion of 180° domain wall and the magnetization rotation from the easy magnetized direction. It seems that the domain wall motion and the magnetization rotation are influenced by the continuity of the magnetic domain with the adjoining grain or by the continuity of the magnetized direction, and that the misorientation with the adjoining grain influences the difficulty of the magnetization. In the present embodiment, since the switching is controlled, it seems that the switching (local orientation change) occurs at a relatively high frequency within one secondary recrystallized grain, makes the relative misorientation with the adjoining grain decrease, and thus makes the continuity of the crystal orientation increase in the grain oriented electrical steel sheet as a whole.

In the present embodiment, with respect to the orientation change including the switching, two types of boundary conditions are defined. In the present embodiment, it is important to define the "boundary" with using these boundary conditions.

In the grain oriented electrical steel sheet which is practically produced, the deviation angle between the rolling direction and the <001> direction is controlled to be approximately 5° or less. Also, the above control is conducted in the grain oriented electrical steel sheet according to the present embodiment. Thus, for the definition of the "boundary" of the grain oriented electrical steel sheet, it is not possible to use the general definition of the grain boundary (high angle tilt boundary) which is "a boundary where the misorientation with the adjoining region is 15° or more". For instance, in the conventional grain oriented electrical steel sheet, the grain boundary is revealed by the macro-etching of the steel surface, and the misorientation between both sides of the grain boundary is approximately 2 to 3° in general.

In the present embodiment, as described later, it is necessary to accurately define the boundary between the crystals. Thus, for identifying the boundary, the method which is based on the visual evaluation such as the macro-etching is not adopted.

In the present embodiment, for identifying the boundary, a measurement line including at least 500 measurement points with 1 mm intervals on the rolled surface is arranged, and the crystal orientations are measured. For instance, the crystal orientation may be measured by the X-ray diffraction method (Laue method). The Laue method is the method such that X-ray beam is irradiated the steel sheet with and that the diffraction spots which are transmitted or reflected are analyzed. By analyzing the diffraction spots, it is possible to identify the crystal orientation at the point irradiated with X-ray beam. Moreover, by changing the irradiated point and by analyzing the diffraction spots in plural points, it is possible to obtain the distribution of the crystal orientation based on each irradiated point. The Laue method is the preferred method for identifying the crystal orientation of the metallographic structure in which the grains are coarse.

The measurement points for the crystal orientation may be at least 500 points. It is preferable that the number of measurement points appropriately increases depending on the grain size of the secondary recrystallized grain. For instance, when the number of secondary recrystallized grains included in the measurement line is less than 10 grains in a case where the number of measurement points for identifying the crystal orientation is 500 points, it is preferable to extend the above measurement line by increasing the measurement points with 1 mm intervals so as to include 10 grains or more of the secondary recrystallized grains in the measurement line.

The crystal orientations are identified at each measurement point with 1 mm interval on the rolled surface, and then, the deviation angle α, the deviation angle 3, and the deviation angle γ are identified at each measurement point. Based on the identified deviation angles at each measurement point, it is judged whether or not the boundary is included between two adjacent measurement points. Specifically, it is judged whether or not the two adjacent measurement points satisfy the boundary condition BA and/or the boundary condition BB.

Specifically, when ($\alpha_1$ $\beta_1$ $\gamma_1$) and ($\alpha_2$ $\beta_2$ $\gamma_2$) represent the deviation angles of the crystal orientations measured at two adjacent measurement points, the boundary condition BA is defined as $[(\alpha_2-\alpha_1)^2+(\beta_2-\beta_1)^2+(\gamma_2-\gamma_1)^2]^{1/2}\geq 0.5°$, and the boundary condition BB is defined as $[(\alpha_2-\alpha_1)^2+(\beta_2-\beta_1)^2+(\gamma_2-\gamma_1)^2]^{1/2}\geq 2.0°$. Furthermore, it is judged whether or not the boundary satisfying the boundary condition BA and/or the boundary condition BB is included between two adjacent measurement points.

The boundary which satisfies the boundary condition BB results in the three-dimensional misorientation (the angle ϕ) of 2.0° or more between two points across the boundary, and it can be said that the boundary corresponds to the conventional grain boundary of the secondary recrystallized grain which is revealed by the macro-etching.

In addition to the boundary which satisfies the boundary condition BB, the grain oriented electrical steel sheet according to the present embodiment includes, at a relatively high frequency, the boundary intimately relating to the "switching", specifically the boundary which satisfies the boundary condition BA and which does not satisfy the boundary condition BB. The boundary defined above corresponds to the boundary which divides one secondary recrystallized grain into the small domains where each crystal orientation is slightly different.

The above two types of the boundaries may be determined by using different measurement data. However, in consideration of the complication of measurement and the discrepancy from actual state caused by the different data, it is preferable to determine the above two types of the boundaries by using the deviation angles of the crystal orientations obtained from the same measurement line (at least 500 measurement points with 1 mm intervals on the rolled surface).

The grain oriented electrical steel sheet according to the present embodiment includes, at a relatively high frequency, the boundary which satisfies the boundary condition BA and which does not satisfy the boundary condition BB, in addition to the existence of boundaries which satisfy the boundary condition BB. Thereby, the secondary recrystallized grain becomes the state such that the grain is divided into the small domains where each crystal orientation is slightly different, and thus, both of the magnetostriction and the iron loss in middle magnetic field range are improved.

Moreover, in the present embodiment, the steel sheet only has to include "the boundary which satisfies the boundary condition BA and which does not satisfy the boundary condition BB". However, in practice, in order to improve the magnetostriction and the iron loss, it is preferable to include, at a relatively high frequency, the boundary which satisfies the boundary condition BA and which does not satisfy the boundary condition BB.

Specifically, when the crystal orientations are measured on at least 500 measurement points with 1 mm intervals on the rolled surface, when the deviation angles are identified at each measurement point, and when the boundary conditions are applied to two adjacent measurement points, the "boundary which satisfies the boundary condition BA" may be included at a ratio of 1.15 times or more as compared with the "boundary which satisfies the boundary condition BB". Specifically, when the boundary conditions are applied as explained above, the value of dividing the number of the "boundary which satisfies the boundary condition BA" by the number of the "boundary which satisfies the boundary condition BB" may be 1.15 or more. In the present embodiment, when the above value is 1.15 or more, the grain oriented electrical steel sheet is judged to include "the boundary which satisfies the boundary condition BA and which does not satisfy the boundary condition BB".

The upper limit of the value of dividing the number of the "boundary which satisfies the boundary condition BA" by the number of the "boundary which satisfies the boundary condition BB" is not particularly limited. For instance, the value may be 80 or less, may be 40 or less, or may be 30 or less.

Second Embodiment

Next, a grain oriented electrical steel sheet according to second embodiment of the present invention is described below. In addition, in the following explanation of each embodiment, the differences from the first embodiment are mainly described, and the duplicated explanations of other features which are the same as those in the first embodiment are omitted.

In the grain oriented electrical steel sheet according to the second embodiment of the present invention, a grain size of the subgrain in the rolling direction is smaller than the grain size of the secondary recrystallized grain in the rolling direction. Specifically, the grain oriented electrical steel sheet according to the present embodiment includes the subgrain and the secondary recrystallized grain, and the grain sizes thereof are controlled in the rolling direction.

Specifically, in the grain oriented electrical steel sheet according to the present embodiment, when a grain size $RA_L$ is defined as an average grain size obtained based on the boundary condition BA in the rolling direction L and when a grain size $RB_L$ is defined as an average grain size obtained based on the boundary condition BB in the rolling direction L, the grain size $RA_L$ and the grain size $RB_L$ satisfy $1.15 \leq RB_L \div RA_L$. Moreover, it is preferable that $RB_L \div RA_L \leq 80$.

The above feature represents the state of the existence of the "switching" in the rolling direction. In other words, the above feature represents the situation such that, in the secondary recrystallized grain having the grain boundary satisfying that the angle $\phi$ is 2° or more, the grain having at least one boundary satisfying that the angle $\phi$ is 0.5° or more and that the angle $\phi$ is less than 2° is included at an appropriate frequency along the rolling direction. In the present embodiment, the above switching situation is evaluated and judged by using the grain size $RA_L$ and the grain size $RB_L$ in the rolling direction.

When the grain size $RB_L$ is small, or when the grain size $RA_L$ is large because the grain size $RB_L$ is large but the switching is insufficient, the value of $RB_L/RA_L$ becomes less than 1.15. When the value of $RB_L/RA_L$ becomes less than 1.15, the switching may be insufficient, and the magnetostriction may not be sufficiently improved. The value of $RB_L/RA_L$ is preferably 1.20 or more, is more preferably 1.30 or more, is more preferably 1.50 or more, is further more preferably 2.0 or more, is further more preferably 3.0 or more, and is further more preferably 5.0 or more.

The upper limit of the value of $RB_L/RA_L$ is not particularly limited. When the switching occurs sufficiently and the value of $RB_L/RA_L$ becomes large, the continuity of the crystal orientation increases in the grain oriented electrical steel sheet as a whole, which is preferable for the improvement of the magnetostriction. On the other hand, the switching causes residual lattice defects in the grain. When the switching occurs excessively, it is concerned that the improvement effect on the iron loss may decrease. Thus, the upper limit of the value of $RB_L/RA_L$ may be practically 80. When the iron loss is needed to be considered in particular, the upper limit of the value of $RB_L/RA_L$ is preferably 40, and is more preferably 30.

Herein, when the switching does not occur at all, the boundary which divides one secondary recrystallized grain (the boundary which satisfies the boundary condition BA and which does not satisfy the boundary condition BB) does not exist. In the case, the grain size $RA_L$ is the same as the grain size $RB_L$, and thereby, the value of $RB_L/RA_L$ becomes 1.0.

Herein, in the grain oriented electrical steel sheet according to the present embodiment, a misorientation between two measurement points which are adjacent on the sheet surface and which have the interval of 1 mm is classified into case A to case C shown in Table 1. The above $RB_L$ is determined based on the boundary satisfying the case A shown in Table 1, and the above $RA_L$ is determined based on the boundary satisfying the case A and/or the case B shown in Table 1. For instance, the deviation angles of the crystal orientations are measured on the measurement line including at least 500 measurement points along the rolling direction, and the $RB_L$ is determined as the average length of the line segment between the boundaries satisfying the case A on the measurement line. In the same way, the $RA_L$ is determined as the average length of the line segment between the boundaries satisfying the case A and/or the case B on the measurement line.

TABLE 1

| | CASE A | CASE B | CASE C |
|---|---|---|---|
| BOUNDARY CONDITION BA | 0.5° OR MORE | 0.5° OR MORE | LESS THAN 0.5° |
| BOUNDARY CONDITION BB | 2.0° OR MORE | LESS THAN 2.0° | LESS THAN 2.0° |
| TYPE OF BOUNDARY | "GENERAL GRAIN BOUNDARY OF SECONDARY RECRYSTALLIZED GRAIN WHICH IS CONVENTIONALLY OBSERVED" | "SUBBOUNDARY" | NOT BOUNDARY SPECIFICALLY, NOT ""GENERAL GRAIN BOUNDARY OF SECONDARY RECRYSTALLIZED GRAIN WHICH IS CONVENTIONALLY OBSERVED"" AND NOT ""SUBBOUNDARY"" |

The reason why the control of the value of $RB_L/RA_L$ influences the magnetostriction and the iron loss is not entirely clear, but is presumed as follows. It seems that the switching (local orientation change) occurs within one secondary recrystallized grain and makes the relative misorientation with the adjoining grain decrease (makes the orientation change be gradual near the grain boundary), and thus makes the continuity of the crystal orientation increase in the grain oriented electrical steel sheet as a whole.

Third Embodiment

Next, a grain oriented electrical steel sheet according to third embodiment of the present invention is described below. In the following explanation, the differences from the above embodiments are mainly described, and the duplicated descriptions are omitted.

In the grain oriented electrical steel sheet according to the third embodiment of the present invention, a grain size of the subgrain in the transverse direction is smaller than the grain size of the secondary recrystallized grain in the transverse direction. Specifically, the grain oriented electrical steel sheet according to the present embodiment includes the subgrain and the secondary recrystallized grain, and the grain sizes thereof are controlled in the transverse direction.

Specifically, in the grain oriented electrical steel sheet according to the present embodiment, when a grain size $RA_C$ is defined as an average grain size obtained based on the boundary condition BA in the transverse direction C and a grain size $RB_C$ is defined as an average grain size obtained based on the boundary condition BB in the transverse direction C, the grain size $RA_C$ and the grain size $RB_C$ satisfy $1.15 \leq RB_C \div RA_C$. Moreover, it is preferable that $RB_C \div RA_C \leq 80$.

The above feature represents the state of the existence of the "switching" in the transverse direction. In other words, the above feature represents the situation such that, in the secondary recrystallized grain having the grain boundary satisfying that the angle $\phi$ is 2° or more, the grain having at least one boundary satisfying that the angle $\phi$ is 0.5° or more and that the angle $\phi$ is less than 2° is included at an appropriate frequency along the transverse direction. In the present embodiment, the above switching situation is evaluated and judged by using the grain size $RA_C$ and the grain size $RB_C$ in the transverse direction.

When the grain size $RB_C$ is small, or when the grain size $RA_C$ is large because the grain size $RB_C$ is large but the switching is insufficient, the value of $RB_C/RA_C$ becomes less than 1.15. When the value of $RB_C/RA_C$ becomes less than 1.15, the switching may be insufficient, and the magnetostriction may not be sufficiently improved. The value of $RB_C/RA_C$ is preferably 1.20 or more, is more preferably 1.30 or more, is more preferably 1.50 or more, is further more preferably 2.0 or more, is further more preferably 3.0 or more, and is further more preferably 5.0 or more.

The upper limit of the value of $RB_C/RA_C$ is not particularly limited. When the switching occurs sufficiently and the value of $RB_C/RA_C$ becomes large, the continuity of the crystal orientation increases in the grain oriented electrical steel sheet as a whole, which is preferable for the improvement of the magnetostriction. On the other hand, the switching causes residual lattice defects in the grain. When the switching occurs excessively, it is concerned that the improvement effect on the iron loss may decrease. Thus, the upper limit of the value of $RB_C/RA_C$ may be practically 80. When the iron loss is needed to be considered in particular, the upper limit of the value of $RB_C/RA_C$ is preferably 40, and is more preferably 30.

Herein, when the switching does not occur at all, the boundary which divides one secondary recrystallized grain (the boundary which satisfies the boundary condition BA and which does not satisfy the boundary condition BB) does not exist. In the case, the grain size $RA_C$ is the same as the grain size $RB_C$, and thereby, the value of $RB_C/RA_C$ becomes 1.0.

The above $RB_C$ is determined based on the boundary satisfying the case A shown in Table 1, and the above $RA_C$ is determined based on the boundary satisfying the case A and/or the case B shown in Table 1. For instance, the deviation angles of the crystal orientations are measured on the measurement line including at least 500 measurement points along the transverse direction, and the $RB_C$ is determined as the average length of the line segment between the boundaries satisfying the case A on the measurement line. In the same way, the $RA_C$ is determined as the average length of the line segment between the boundaries satisfying the case A and/or the case B on the measurement line.

The reason why the control of the value of $RB_C/RA_C$ influences the magnetostriction and the iron loss is not entirely clear, but is presumed as follows. It seems that the switching (local orientation change) occurs within one secondary recrystallized grain, makes the relative misorientation with the adjoining grain decrease (makes the orientation change be gradual near the grain boundary), and thus makes the continuity of the crystal orientation increase in the grain oriented electrical steel sheet as a whole.

Fourth Embodiment

Next, a grain oriented electrical steel sheet according to fourth embodiment of the present invention is described below. In the following explanation, the differences from the above embodiments are mainly described, and the duplicated descriptions are omitted.

In the grain oriented electrical steel sheet according to the fourth embodiment of the present invention, the grain size of the subgrain in the rolling direction is smaller than the grain size of the subgrain in the transverse direction. Specifically, the grain oriented electrical steel sheet according to the present embodiment includes the subgrain, and the grain size thereof is controlled in the rolling direction and the transverse direction.

Specifically, in the grain oriented electrical steel sheet according to the present embodiment, when a grain size $RA_L$ is defined as an average grain size obtained based on the boundary condition BA in the rolling direction L and a grain size $RA_C$ is defined as an average grain size obtained based on the boundary condition BA in the transverse direction C, the grain size $RA_L$ and the grain size $RA_C$ satisfy $1.15 \le RA_C \div RA_L$. Moreover, it is preferable that $RA_C \div RA_L \le 10$.

Hereinafter, the shape of the grain may be referred to as "anisotropy (in-plane)" or "oblate (shape)". The above shape of the grain corresponds to the shape when observed from the surface (rolled surface) of the steel sheet. Specifically, the above shape of the grain does not consider the size in the thickness direction (the shape observed in the thickness cross section). Incidentally, in the sheet thickness direction, almost all the grains in the grain oriented electrical steel sheet have the same size as the thickness of the steel sheet. In other words, in the grain oriented electrical steel sheet, one grain usually occupies the thickness of the steel sheet except for a peculiar region such as the vicinity of the grain boundary.

The value of $RA_C/RA_L$ mentioned above represents the state of the existence of the "switching" in the rolling direction and the transverse direction. In other words, the above feature represents the situation such that the frequency of local orientation change which corresponds to the switching varies depending on the in-plane direction of the steel sheet. In the present embodiment, the above switching situation is evaluated and judged by using the grain size $RA_C$ and the grain size $RA_L$ in two directions orthogonal to each other in the plane of the steel sheet.

The state such that the value $RA_C/RA_L$ is more than 1 indicates that the subgrain regulated by the switching has averagely the oblate shape which is elongated to the transverse direction and which is compressed to the rolling direction. Specifically, it is indicated that the shape of the grain regulated by the subboundary is anisotropic.

The reason why the magnetic characteristics are improved by controlling the shape of the subgrain to be anisotropic in plane is not entirely clear, but is presumed as follows. As described above, when the 180° domain wall motion occurs or the magnetization rotation occurs in the magnetization, the "continuity" with the adjoining grain is important. For instance, in a case where one secondary recrystallized grain is divided into the small domains by the switching and where the number of the domains is the same (the area of the domains is the same), the abundance ratio of the boundary (the subboundary) resulted from the switching becomes high when the shape of the small domains is anisotropic rather than isotropic. Specifically, it seems that, by controlling the value of $RA_C/RA_L$, the occurrence frequency of the switching which is the local orientation change increases, and thus, the continuity of the crystal orientation increases in the grain oriented electrical steel sheet as a whole.

It seems that the anisotropy when the switching occurs is caused by the following anisotropy included in the steel sheet before the secondary recrystallization: for instance, the anisotropy of shape of primary recrystallized grains; the anisotropy of distribution (distribution like colony) of crystal orientation of primary recrystallized grains due to the anisotropy of shape of hot-rolled grains; the arrangement of precipitates elongated by hot rolling and precipitates fractured and aligned in the rolling direction; the distribution of precipitates varied by fluctuation of thermal history in width direction and in longitudinal direction of coil; or the anisotropy of distribution of grain size. The details of occurrence mechanism are not clear. However, when the steel sheet during the secondary recrystallization is under the condition with the thermal gradient, the grain growth (dislocation annihilation and boundary formation) is directly anisotropic. Specifically, the thermal gradient in the secondary recrystallization is very effective condition for controlling the anisotropy which is the feature of the present embodiment. The details are explained below in connection with the producing method.

As related to the process for controlling the anisotropy by the thermal gradient during the secondary recrystallization as described above, it is preferable that the direction to elongate the subgrain in the present embodiment is the transverse direction when considering the typical producing method at present. In the case, the grain size $RA_L$ in the rolling direction is smaller than the grain size $RA_C$ in the transverse direction. The relationship between the rolling direction and the transverse direction is explained below in connection with the producing method. Herein, the direction to elongate the subgrain is determined not by the thermal gradient but by the occurrence frequency of the subboundary.

When the grain size $RA_C$ is small, or when the grain size $RA_L$ is large but the grain size $RA_C$ is large, the value of $RA_C/RA_L$ becomes less than 1.15. When the value of $RA_C/RA_L$ becomes less than 1.15, the switching may be insufficient, and the magnetostriction may not be sufficiently improved. The value of $RA_C/RA_L$ is preferably 1.80 or more, and is more preferably 2.10 or more.

The upper limit of the value of $RA_C/RA_L$ is not particularly limited. When the occurrence frequency of the switching and the elongation direction are limited to the specific direction and the value of $RA_C/RA_L$ becomes large, the continuity of the crystal orientation increases in the grain oriented electrical steel sheet as a whole, which is preferable for the improvement of the magnetostriction. On the other hand, the switching causes residual lattice defects in the grain. When the switching occurs excessively, it is concerned that the improvement effect on the iron loss may decrease. Thus, the upper limit of the value of $RA_C/RA_L$ may be practically 10. When the iron loss is needed to be considered in particular, the upper limit of the value of $RA_C/RA_L$ is preferably 6, and is more preferably 4.

In addition to controlling the value of $RA_C/RA_L$, in the grain oriented electrical steel sheet according to the present embodiment, it is preferable that the grain size $RA_L$ and the grain size $RB_L$ satisfy $1.20 \le RB_L \div RA_L$.

The above feature clarifies that the "switching" has occurred. For instance, the grain size $RA_C$ and the grain size $RA_L$ are the grain sizes based on the boundaries where the angle φ is 0.5° or more, between two adjacent measurement points. Even when the "switching" does not occur at all and the angles φ of all boundaries are 2.0° or more, the above value of $RA_C/RA_L$ may be satisfied. Even when the value of $RA_C/RA_L$ is satisfied, when the angles φ of all boundaries are 2.0° or more, the secondary recrystallized grain which is generally recognized only becomes simply the oblate shape, and thus, the above effects of the present embodiment are not favorably obtained. The embodiment is based on including the boundary which satisfies the boundary condition BA and which does not satisfy the boundary condition BB (the boundary which divides the inside of secondary recrystallized grain). Thus, although it is unlikely that the angles φ of all boundaries are 2.0° or more, it is preferable to satisfy the value of $RB_L/RA_L$, in addition to satisfying the value of $RA_C/RA_L$.

In addition to controlling the value of $RB_L/RA_L$ in the rolling direction, in the present embodiment, the grain size $RA_C$ and the grain size $RB_C$ may satisfy $1.20 \le RB_C \div RA_C$ in the transverse direction. By the feature, the continuity of the crystal orientation increases in the grain oriented electrical steel sheet as a whole, which is rather preferable.

Moreover, in the grain oriented electrical steel sheet according to the present embodiment, it is preferable to control the grain size of secondary recrystallized grain in the rolling direction and in the transverse direction.

Specifically, in the grain oriented electrical steel sheet according to the present embodiment, when a grain size $RB_L$ is defined as an average grain size obtained based on the boundary condition BB in the rolling direction L and a grain size $RB_C$ is defined as an average grain size obtained based on the boundary condition BB in the transverse direction C, it is preferable that the grain size $RB_L$ and the grain size $RB_C$ satisfy $1.50 \le RB_C \div RB_L$. Moreover, it is preferable that $RB_C \div RB_L \le 20$.

The above feature is not related to the above "switching" and represents the situation such that the secondary recrystallized grain is elongated in the transverse direction. Thus, the above feature in itself is not particular. However, in the present embodiment, in addition to controlling the value of $RA_C/RA_L$, it is preferable that the value of $RB_C/RB_L$ satisfies the above limitation range.

In the present embodiment, when the value of $RA_C/RA_L$ of the subgrain is controlled in relation to the above switching, the shape of the secondary recrystallized grain tends to be further anisotropic in plane. In other words, in a case where the switching regarding the angle φ is made to induce as in the present embodiment, by controlling the shape of the secondary recrystallized grain to be anisotropic in plane, the shape of the subgrain tends to be anisotropic in plane.

The value of $RB_C/RB_L$ is preferably 1.80 or more, is more preferably 2.00 or more, and is further more preferably 2.50 or more. The upper limit of the value of $RB_C/RB_L$ is not particularly limited.

As a practical method for controlling the value of $RB_C/RB_L$, for instance, it is possible to exemplify a process in which the secondary recrystallized grain is grown under conditions such that the heating is conducted preferentially from a widthwise edge of coil during final annealing, and thereby, the thermal gradient is applied in the width direction of coil (axial direction of coil). Under the above conditions, it is possible to control the grain size of the secondary recrystallized grain in the width direction of coil (for instance, the transverse direction) to be the same as the coil width, while maintaining the grain size of the secondary recrystallized grain in the circumferential direction of coil (for instance, the rolling direction) at approximately 50 mm. For instance, it is possible to occupy the full width of coil having 1000 mm width by one grain. In the case, the upper limit of the value of $RB_C/RB_L$ may be 20.

When the secondary recrystallization is made to progress by a continuous annealing process so as to apply the thermal gradient not in the transverse direction but in the rolling direction, it is possible to control the maximum grain size of the secondary recrystallized grain to be larger without being limited by the coil width. Even in the case, since the grain is appropriately divided by the subboundary resulted from the switching in the present embodiment, it is possible to obtain the above effects of the present embodiment.

In addition, in the grain oriented electrical steel sheet according to the present embodiment, it is preferable that the occurrence frequency of the switching regarding the angle φ is controlled in the rolling direction and in the transverse direction.

Specifically, in the grain oriented electrical steel sheet according to the present embodiment, when a grain size $RA_L$ is defined as an average grain size obtained based on the boundary condition BA in the rolling direction L, when a grain size $RB_L$ is defined as an average grain size obtained based on the boundary condition BB in the rolling direction L, when a grain size $RA_C$ is defined as an average grain size obtained based on the boundary condition BA in the transverse direction C, and when a grain size $RB_C$ is defined as an average grain size obtained based on the boundary condition BB in the transverse direction C, it is preferable that the grain size $RA_L$, the grain size $RA_C$, the grain size $RB_L$, and the grain size $RB_C$ satisfy $(RB_C \times RA_L) \div (RB_L \times RA_C) < 1.0$. The lower limit thereof is not particularly limited. When considering present technology, the grain size $RA_L$, the grain size $RA_C$, the grain size $RB_L$, and the grain size $RB_C$ may satisfy $0.2 < (RB_C \times RA_L) \div (RB_L \times RA_C)$.

The above feature represents the anisotropy in plane concerned with the occurrence frequency of the above "switching". Specifically, the above $(RB_C \times RA_L)/(RB_L \times RA_C)$ is the ratio of "$RB_C/RA_C$:the occurrence frequency of the switching which divides the secondary recrystallized grain in the transverse direction" to "$RB_L/RA_L$: the occurrence frequency of the switching which divides the secondary recrystallized grain in the rolling direction". The state such that the above value is less than 1 indicates that one secondary recrystallized grain is divided into many domains in the rolling direction by the switching (the subboundary).

Considered from a different way, the above $(RB_C \times RA_L)/(RB_L \times RA_C)$ is the ratio of "$RB_C/RB_L$:the oblateness of the secondary recrystallized grain" to "$RA_C/RA_L$:the oblateness of the subgrain". The state such that the above value is less than 1 indicates that the subgrain dividing one secondary recrystallized grain becomes the oblate shape as compared with the secondary recrystallized grain.

Specifically, the subboundary tends to divide the secondary recrystallized grain not in the transverse direction but in the rolling direction. In other words, the subboundary tends to elongate in the direction where the secondary recrystallized grain elongates. From the tendency of the subboundary, it is considered that the switching makes the area occupied by the crystal with specific orientation increase, when the secondary recrystallized grain elongates.

The value of $(RB_C \times RA_L)/(RB_L \times RA_C)$ is preferably 0.9 or less, is more preferably 0.8 or less, and is further more preferably 0.5 or less. As described above, the lower limit of $(RB_C \times RA_L)/(RB_L \times RA_C)$ is not particularly limited, but the value may be more than 0.2 when considering the industrial feasibility.

The above $RB_L$ and $RB_C$ are determined based on the boundary satisfying the case A shown in Table 1, and the above $RA_L$ and $RA_C$ are determined based on the boundary satisfying the case A and/or the case B shown in Table 1. For instance, the deviation angles of the crystal orientations are measured on the measurement line including at least 500 measurement points along the transverse direction, and the $RA_C$ is determined as the average length of the line segment between the boundaries satisfying the case A and/or the case B on the measurement line. In the same way, the grain size $RA_L$, the grain size $RB_L$, and the grain size $RB_C$ may be determined.

Common Technical Features in the First Embodiment to the Fourth Embodiment

Next, common technical features of the grain oriented electrical steel sheets according to the first embodiment to the fourth embodiment are explained below.

In the grain oriented electrical steel sheet according to the first embodiment to the fourth embodiment, it is preferable that $\sigma(\theta)$ which is a standard deviation of an absolute value of the deviation angle $\theta$ is 0° to 3.0°.

In the steel sheet in which the switching explained above occurs sufficiently, the "deviation angle" tends to be controlled to a characteristic range. For instance, in a case where the crystal orientation is gradually changed by the switching regarding the angle $\phi$, it is not an obstacle for the present embodiments that the absolute value of the deviation angle $\theta$ decreases close to zero. Moreover, for instance, in a case where the crystal orientation is gradually changed by the switching regarding the angle $\phi$, it is not an obstacle for the present embodiments that the crystal orientation in itself converges with the specific orientation, and as a result, that the standard deviation of the deviation angle $\theta$ decreases close to zero.

Thus, in the present embodiments, $\sigma(\theta)$ which is the standard deviation of the deviation angle $\theta$ may be 0° to 3.0°.

The $\sigma(\theta)$ which is the standard deviation of the deviation angle $\theta$ may be obtained as follows.

In the grain oriented electrical steel sheet, the alignment degree to the {110}<001> orientation is increased by the secondary recrystallization in which the grains grown to approximately several centimeters are formed. In each embodiment, it is necessary to recognize the fluctuations of the crystal orientation in the above grain oriented electrical steel sheet. Thus, in an area where at least 20 grains or more of the secondary recrystallized grains are included, the crystal orientations are measured on at least 500 measurement points.

In each embodiment, it should not be considered that "one secondary recrystallized grain is regarded as a single crystal, and the secondary recrystallized grain has a strictly uniform crystal orientation". In other words, in each embodiment, the local orientation changes which are not conventionally recognized as boundary are included in one coarse secondary recrystallized grain, and it is necessary to detect the local orientation changes.

Thus, for instance, it is preferable that the measurement points of the crystal orientation are distributed at even intervals in a predetermined area which is arranged so as to be independent of the boundaries of grain (the grain boundaries). Specifically, it is preferable that the measurement points are distributed at even intervals that is vertically and horizontally 5 mm intervals in the area of L mm×M mm (however, L, M>100) where at least 20 grains or more are included on the steel surface, the crystal orientations are measured at each measurement point, and thereby, the data from 500 points or more are obtained. When the measurement point corresponds to the grain boundary or some defect, the data therefrom are not utilized. Moreover, it is needed to widen the above measurement area depending on an area required to determine the magnetic characteristics of the evaluated steel sheet (for instance, in regards to an actual coil, an area for measuring the magnetic characteristics which need to be described in the steel inspection certificate).

Thereafter, the deviation angle $\theta$ is determined in each measurement point, and the $\sigma(\theta)$ which is the standard deviation of the deviation angle $\theta$ is calculated. In the grain oriented electrical steel sheet according to each embodiment, it is preferable that the $\sigma(\theta)$ satisfies the above limitation range.

Herein, in general, it is considered that the standard deviations of the deviation angle $\alpha$ and the deviation angle $\beta$ are factors which need to be decreased in order to improve the magnetic characteristics or the magnetostriction in middle magnetic field at approximately 1.7 T. However, when controlling only the above standard deviations, the obtained characteristics are limited. In each embodiment as described above, by controlling the $\sigma(\theta)$ in addition to the above technical features, the continuity of the crystal orientation is favorably influenced in the grain oriented electrical steel sheet as a whole.

The $\sigma(\theta)$ which is the standard deviation of the deviation angle $\theta$ is preferably 2.70 or less, is more preferably 2.50 or less, is more preferably 2.20 or less, and is further more preferably 1.80 or less. Of course, the standard deviation $\sigma(\theta)$ may be zero.

Fifth Embodiment

Next, a grain oriented electrical steel sheet according to fifth embodiment of the present invention is described below. In the following explanation, the differences from the above embodiments are mainly described, and the duplicated descriptions are omitted.

In the grain oriented electrical steel sheet according to the fifth embodiment of the present invention, in addition to the above features, the secondary recrystallized grain is divided into plural domains where each deviation angle $\alpha$ is slightly different. Specifically, the grain oriented electrical steel sheet according to the present embodiment includes the local and low-angle boundary which is related to the deviation angle $\alpha$ and which divides the inside of secondary recrystallized grain, in addition to the comparatively high-angle boundary which corresponds to the grain boundary of secondary recrystallized grain.

Specifically, in the grain oriented electrical steel sheet according to the present embodiment, in addition to the above features, when a boundary condition BC is defined as $|\alpha_2-\alpha_1| \geq 0.5°$, a boundary which satisfies the boundary condition BC and which does not satisfy the boundary condition BB may be further included.

In the grain oriented electrical steel sheet according to the present embodiment, it is possible to favorably improve the iron loss in high magnetic field range (especially in magnetic field where excited so as to be approximately 1.9 T).

In order to understand the magnetic characteristics in high magnetic field range, the present inventors have investigated the relationship between the deviation angles of crystal orientation and the iron loss when excited at approximately 1.9 T which is higher than 1.7 T where the magnetic characteristics are generally measured. As a result, it has been confirmed that it is important to control the deviation angle α in order to reduce the iron loss in high magnetic field range. The present inventors have initially presumed the reason why the deviation angle α is induced to be as follows.

In the secondary recrystallization of the practical grain oriented electrical steel, the crystal orientation which is preferentially grown is basically the {110}<001> orientation. However, in the secondary recrystallization process which is industrially conducted, the secondary recrystallization proceeds with including the growth of grain having the orientation which slightly rotates in-plane in the steel surface ({110} plane). In other words, in the secondary recrystallization process which is industrially conducted, it is not easy to completely eliminate the nucleation and growth of grain having the deviation angle α. Moreover, if the grain having the above orientation grows to a certain size, the above grain is not eroded by the grain having the ideal {110}<001> orientation, and finally remains in the steel sheet. The above grain does not exactly have the <001> direction in the rolling direction, and is called as "swinging Goss" in general.

The present inventors have attempted that the secondary recrystallized grain is not grown with maintaining the crystal orientation, but is grown with changing the crystal orientation. As a result, the present inventors have found that, in order to reduce the iron loss in high magnetic field range, it is advantageous to sufficiently induce orientation changes which are local and low-angle and which are not conventionally recognized as boundary during the growth of secondary recrystallized grain, and to divide one secondary recrystallized grain into small domains where each deviation angle α is slightly different.

Hereinafter, the boundary considering the misorientation of the deviation angle α (the boundary which satisfies the boundary condition BC) may be referred to as "a subboundary", and the grain segmented by using the α subboundary as the boundary may be referred to as "a subgrain".

Moreover, hereinafter, the iron loss ($W_{19/50}$) in magnetic field where excited so as to be 1.9 T which is the characteristic related to the present embodiment may be referred to as simply "iron loss in high magnetic field".

The reason why the control of the deviation angle α influences the iron loss in high magnetic field is not entirely clear, but is presumed as follows.

In the grain oriented electrical steel sheet where the secondary recrystallization is finished, the crystal orientation is controlled to be the Goss orientation. However, in actuality, the crystal orientations of the grains in contact with a grain boundary are slightly different. Thus, when the grain oriented electrical steel sheet is excited, a special magnetic domain (closure domain) is induced near the grain boundary for adjusting the magnetic domain structure. In the closure domain, the magnetic moments in the magnetic domain are hardly aligned with the direction of the external magnetic field. Thus, the closure domain remains even in high magnetic field range during the magnetization process, and the domain wall motion is suppressed. On the other hand, if it is possible to suppress the formation of the closure domain near the grain boundary, it seems that the magnetization easily proceeds in the entire steel sheet even in the high magnetic field range, and as a result, that the iron loss is improved. Although the closure domain is induced near the grain boundary due to the discontinuity of crystal orientation, in the present embodiment, it seems that the orientation change near the grain boundary becomes gradual due to the relatively gradual orientation change derived from the switching, and as a result, that the formation of the closure domain is suppressed.

In the embodiment, the crystal orientations are identified at each measurement point with 1 mm interval on the rolled surface, and then, the deviation angle α, the deviation angle β, and the deviation angle γ are identified at each measurement point. Based on the identified deviation angles at each measurement point, it is judged whether or not the boundary is included between two adjacent measurement points. Specifically, it is judged whether or not the two adjacent measurement points satisfy the boundary condition BC and/or the boundary condition BB.

Specifically, when ($\alpha_1$ $\beta_1$ $\gamma_1$) and ($\alpha_2$ $\beta_2$ $\gamma_2$) represent the deviation angles of the crystal orientations measured at two adjacent measurement points, the boundary condition BC is defined as $|\alpha_2-\alpha_1|\geq 0.5°$, and the boundary condition BB is defined as $[(\alpha_2-\alpha_1)^2+(\beta_2-\beta_1)^2+(\gamma_2-\gamma_1)^2]^{1/2}\geq 2.0°$. Furthermore, it is judged whether or not the boundary satisfying the boundary condition BC and/or the boundary condition BB is included between two adjacent measurement points.

The grain oriented electrical steel sheet according to the present embodiment includes, at a relatively high frequency, the boundary which satisfies the boundary condition BC and which does not satisfy the boundary condition BB, in addition to the existence of boundaries which satisfy the boundary condition BB. Thereby, the secondary recrystallized grain becomes the state such that the grain is divided into the small domains where each deviation angle α is slightly different, and thus, the iron loss in high magnetic field range is reduced.

Moreover, in the present embodiment, the steel sheet only has to include "the boundary which satisfies the boundary condition BC and which does not satisfy the boundary condition BB". However, in practice, in order to reduce the iron loss in high magnetic field range, it is preferable to include, at a relatively high frequency, the boundary which satisfies the boundary condition BC and which does not satisfy the boundary condition BB.

For instance, in the present embodiment, the secondary recrystallized grain is divided into the small domains where each deviation angle α is slightly different, and thus, it is preferable that the α subboundary is included at a relatively high frequency as compared with the conventional grain boundary of the secondary recrystallized grain.

Specifically, when the crystal orientations are measured on at least 500 measurement points with 1 mm intervals on the rolled surface, when the deviation angles are identified at each measurement point, and when the boundary conditions are applied to two adjacent measurement points, the "boundary which satisfies the boundary condition BC" may be included at a ratio of 1.10 times or more as compared with the "boundary which satisfies the boundary condition BB". Specifically, when the boundary conditions are applied as explained above, the value of dividing the number of the "boundary which satisfies the boundary condition BC" by the number of the "boundary which satisfies the boundary condition BB" may be 1.10 or more. In the present embodiment, when the above value is 1.10 or more, the grain oriented electrical steel sheet is judged to include "the boundary which satisfies the boundary condition BC and which does not satisfy the boundary condition BB".

The upper limit of the value of dividing the number of the "boundary which satisfies the boundary condition BC" by the number of the "boundary which satisfies the boundary condition BB" is not particularly limited. For instance, the value may be 80 or less, may be 40 or less, or may be 30 or less.

Sixth Embodiment

Next, a grain oriented electrical steel sheet according to sixth embodiment of the present invention is described below. In the following explanation, the differences from the above embodiments are mainly described, and the duplicated descriptions are omitted.

In the grain oriented electrical steel sheet according to the sixth embodiment of the present invention, a grain size of the α subgrain in the rolling direction is smaller than the grain size of the secondary recrystallized grain in the rolling direction. Specifically, the grain oriented electrical steel sheet according to the present embodiment includes the α subgrain and the secondary recrystallized grain, and the grain sizes thereof are controlled in the rolling direction.

Specifically, in the grain oriented electrical steel sheet according to the present embodiment, when a grain size $RC_L$ is defined as an average grain size obtained based on the boundary condition BC in the rolling direction L and when a grain size $RB_L$ is defined as an average grain size obtained based on the boundary condition BB in the rolling direction L, the grain size $RC_L$ and the grain size $RB_L$ satisfy $1.10 \leq RB_L \div RC_L$. Moreover, it is preferable that $RB_L \div RC_L \leq 80$.

The above feature represents the state of the existence of the "switching" in the rolling direction. In other words, the above feature represents the situation such that, in the secondary recrystallized grain having the grain boundary satisfying that the angle ϕ is 2° or more, the grain having at least one boundary satisfying that $|\alpha_2-\alpha_1|$ is 0.5° or more and that the angle ϕ is less than 2° is included at an appropriate frequency along the rolling direction. In the present embodiment, the above switching situation is evaluated and judged by using the grain size $RC_L$ and the grain size $RB_L$ in the rolling direction.

When the grain size $RB_L$ is small, or when the grain size $RC_L$ is large because the grain size $RB_L$ is large but the switching is insufficient, the value of $RB_L/RC_L$ becomes less than 1.10. When the value of $RB_L/RC_L$ becomes less than 1.10, the switching may be insufficient, and the iron loss in high magnetic field may not be sufficiently improved. The value of $RB_L/RC_L$ is preferably 1.30 or more, is more preferably 1.50 or more, is further more preferably 2.0 or more, is further more preferably 3.0 or more, and is further more preferably 5.0 or more.

The upper limit of the value of $RB_L/RC_L$ is not particularly limited. When the switching occurs sufficiently and the value of $RB_L/RC_L$ becomes large, the continuity of the crystal orientation increases in the grain oriented electrical steel sheet as a whole, which is preferable for the improvement of the magnetostriction. On the other hand, the switching causes residual lattice defects in the grain. When the switching occurs excessively, it is concerned that the improvement effect on the iron loss may decrease. Thus, the upper limit of the value of $RB_L/RC_L$ may be practically 80. When the iron loss is needed to be considered in particular, the upper limit of the value of $RB_L/RC_L$ is preferably 40, and is more preferably 30.

Herein, there is a case such that the value of $RB_L/RC_L$ becomes less than 1.0. The $RB_L$ is the average grain size in the rolling direction which is defined based on the boundary where the angle ϕ is 2° or more, whereas the $RC_L$ is the average grain size in the rolling direction which is defined based on the boundary where $|\alpha_2-\alpha_1|$ is 0.5° or more. When considering simply, it seems that the boundary where the lower limit of the misorientation is lower is detected more frequently. In other words, it seems that the $RB_L$ is always larger than the $RC_L$ and that the value of $RB_L/RC_L$ is always 1.0 or more.

However, since the $RB_L$ is the grain size which is obtained from the boundary based on the angle ϕ and the $RC_L$ is the grain size which is obtained from the boundary based on the deviation angle α, the $RB_L$ and the $RC_L$ differ in the definition of grain boundaries for obtaining the grain sizes. Thus, the value of $RB_L/RC_L$ may be less than 1.0.

For instance, even when $|\alpha_2-\alpha_1|$ is less than 0.5° (e.g., 0°), as long as the deviation angle β and/or the deviation angle γ are large, the angle ϕ becomes sufficiently large. In other words, there is a case such that the boundary where the boundary condition BC is not satisfied but the boundary condition BB is satisfied exists. When the above boundary increases, the value of the $RB_L$ decreases, and as a result, the value of $RB_L/RC_L$ may be less than 1.0. In the present embodiment, each condition is controlled so that the switching with respect to the deviation angle α occurs more frequently. When the control of the switching is insufficient and the gap from the desired condition of the present embodiment is large, the change with respect to the deviation angle α does not occur, and the value of $RB_L/RC_L$ is less than 1.0. In the present embodiment, as mentioned above, it is necessary to sufficiently increase in the occurrence frequency of the α subboundary and to control the value of $RB_L/RC_L$ to 1.10 or more.

The above $RB_L$ is determined based on the boundary satisfying the case 1 and/or the case 2 shown in Table 2, and the above $RC_L$ is determined based on the boundary satisfying the case 1 and/or the case 3 shown in Table 2. For instance, the deviation angles of the crystal orientations are measured on the measurement line including at least 500 measurement points along the rolling direction, and the $RB_L$ is determined as the average length of the line segment between the boundaries satisfying the case 1 and/or the case 2 on the measurement line. In the same way, the $RC_L$ is determined as the average length of the line segment between the boundaries satisfying the case 1 and/or the case 3 on the measurement line.

TABLE 2

| | CASE 1 | CASE 2 | CASE 3 | CASE 4 |
|---|---|---|---|---|
| BOUNDARY CONDITION BC | 0.5° OR MORE | LESS THAN 0.5° | 0.5° OR MORE | LESS THAN 0.5° |
| BOUNDARY CONDITION BB | 2.0° OR MORE | 2.0° OR MORE | LESS THAN 2.0° | LESS THAN 2.0° |

TABLE 2-continued

| | CASE 1 | CASE 2 | CASE 3 | CASE 4 |
|---|---|---|---|---|
| TYPE OF BOUNDARY | "GENERAL GRAIN BOUNDARY OF SECONDARY RECRYSTALLIZED GRAIN WHICH IS CONVENTIONALLY OBSERVED" AND "α SUBBOUNDARY" | "GENERAL GRAIN BOUNDARY OF SECONDARY RECRYSTALLIZED GRAIN WHICH IS CONVENTIONALLY OBSERVED" | "α SUBBOUNDARY" | NOT BOUNDARY SPECIFICALLY, NOT "GENERAL GRAIN BOUNDARY OF SECONDARY RECRYSTALLIZED GRAIN WHICH IS CONVENTIONALLY OBSERVED" AND NOT "α SUBBOUNDARY" |

The reason why the control of the value of $RB_L/RC_L$ influences the iron loss in high magnetic field is not entirely clear, but is presumed as follows. It seems that the switching (local orientation change) occurs within one secondary recrystallized grain and makes the relative misorientation with the adjoining grain decrease (makes the orientation change be gradual near the grain boundary), and as a result, that the formation of the closure domain is suppressed.

Seventh Embodiment

Next, a grain oriented electrical steel sheet according to seventh embodiment of the present invention is described below. In the following explanation, the differences from the above embodiments are mainly described, and the duplicated descriptions are omitted.

In the grain oriented electrical steel sheet according to the seventh embodiment of the present invention, a grain size of the α subgrain in the transverse direction is smaller than the grain size of the secondary recrystallized grain in the transverse direction. Specifically, the grain oriented electrical steel sheet according to the present embodiment includes the α subgrain and the secondary recrystallized grain, and the grain sizes thereof are controlled in the transverse direction.

Specifically, in the grain oriented electrical steel sheet according to the present embodiment, when a grain size $RC_C$ is defined as an average grain size obtained based on the boundary condition BC in the transverse direction C and a grain size $RB_C$ is defined as an average grain size obtained based on the boundary condition BB in the transverse direction C, the grain size $RC_C$ and the grain size $RB_C$ satisfy $1.10 \leq RB_C \div RC_C$. Moreover, it is preferable that $RB_C \div RC_C \leq 80$.

The above feature represents the state of the existence of the "switching" in the transverse direction. In other words, the above feature represents the situation such that, in the secondary recrystallized grain having the grain boundary satisfying that the angle $\phi$ is 2° or more, the grain having at least one boundary satisfying that $|\alpha_2-\alpha_1|$ is 0.5° or more and that the angle $\phi$ is less than 2° is included at an appropriate frequency along the transverse direction. In the present embodiment, the above switching situation is evaluated and judged by using the grain size $RC_C$ and the grain size $RB_C$ in the transverse direction.

When the grain size $RB_C$ is small, or when the grain size $RC_C$ is large because the grain size $RB_C$ is large but the switching is insufficient, the value of $RB_C/RC_C$ becomes less than 1.10. When the value of $RB_C/RC_C$ becomes less than 1.10, the switching may be insufficient, and the iron loss in high magnetic field may not be sufficiently improved. The value of $RB_C/RC_C$ is preferably 1.30 or more, is more preferably 1.50 or more, is further more preferably 2.0 or more, is further more preferably 3.0 or more, and is further more preferably 5.0 or more.

The upper limit of the value of $RB_C/RC_C$ is not particularly limited. When the switching occurs sufficiently and the value of $RB_C/RC_C$ becomes large, the continuity of the crystal orientation increases in the grain oriented electrical steel sheet as a whole, which is preferable for the improvement of the magnetostriction. On the other hand, the switching causes residual lattice defects in the grain. When the switching occurs excessively, it is concerned that the improvement effect on the iron loss may decrease. Thus, the upper limit of the value of $RB_C/RC_C$ may be practically 80. When the iron loss is needed to be considered in particular, the upper limit of the value of $RB_C/RC_C$ is preferably 40, and is more preferably 30.

Herein, since the $RB_C$ is the grain size which is obtained from the boundary based on the angle $\phi$ and the $RC_C$ is the grain size which is obtained from the boundary based on the deviation angle $\alpha$, the $RB_C$ and the $RC_C$ differ in the definition of grain boundaries for obtaining the grain sizes. Thus, the value of $RB_C/RC_C$ may be less than 1.0.

The above $RB_C$ is determined based on the boundary satisfying the case 1 and/or the case 2 shown in Table 2, and the above $RC_C$ is determined based on the boundary satisfying the case 1 and/or the case 3 shown in Table 2. For instance, the deviation angles of the crystal orientations are measured on the measurement line including at least 500 measurement points along the transverse direction, and the $RB_C$ is determined as the average length of the line segment between the boundaries satisfying the case 1 and/or the case 2 on the measurement line. In the same way, the $RC_C$ is determined as the average length of the line segment between the boundaries satisfying the case 1 and/or the case 3 on the measurement line.

The reason why the control of the value of $RB_C/RC_C$ influences the iron loss in high magnetic field is not entirely clear, but is presumed as follows. It seems that the switching (local orientation change) occurs within one secondary recrystallized grain and makes the relative misorientation with the adjoining grain decrease (makes the orientation change be gradual near the grain boundary), and as a result, that the formation of the closure domain is suppressed.

Eighth Embodiment

Next, a grain oriented electrical steel sheet according to eighth embodiment of the present invention is described below. In the following explanation, the differences from the above embodiments are mainly described, and the duplicated descriptions are omitted.

In the grain oriented electrical steel sheet according to the eighth embodiment of the present invention, the grain size of the α subgrain in the rolling direction is smaller than the grain size of the α subgrain in the transverse direction. Specifically, the grain oriented electrical steel sheet according to the present embodiment includes the α subgrain, and the grain size thereof is controlled in the rolling direction and the transverse direction.

Specifically, in the grain oriented electrical steel sheet according to the present embodiment, when a grain size $RC_L$ is defined as an average grain size obtained based on the boundary condition BC in the rolling direction L and a grain size $RC_C$ is defined as an average grain size obtained based on the boundary condition BC in the transverse direction C, the grain size $RC_L$ and the grain size $RC_C$ satisfy $1.15 \leq RC_C \div RC_L$. Moreover, it is preferable that $RC_C \div RC_L \leq 10$.

The value of $RC_C/RC_L$ mentioned above represents the state of the existence of the "switching" in the rolling direction and the transverse direction. In other words, the above feature represents the situation such that the frequency of local orientation change which corresponds to the switching varies depending on the in-plane direction of the steel sheet. In the present embodiment, the above switching situation is evaluated and judged by using the grain size $RC_C$ and the grain size $RC_L$ in two directions orthogonal to each other in the plane of the steel sheet.

The state such that the value $RC_C/RC_L$ is more than 1 indicates that the α subgrain regulated by the switching has averagely the oblate shape which is elongated to the transverse direction and which is compressed to the rolling direction. Specifically, it is indicated that the shape of the grain regulated by the α subboundary is anisotropic.

The reason why the iron loss in high magnetic field is improved by controlling the shape of the α subgrain to be anisotropic in plane is not entirely clear, but is presumed as follows. As described above, when the 180° domain wall motion occurs or the magnetization rotation occurs in high magnetic field, the "continuity" with the adjoining grain is important. For instance, in a case where one secondary recrystallized grain is divided into the small domains by the switching and where the number of the domains is the same (the area of the domains is the same), the abundance ratio of the boundary (the α subboundary) resulted from the switching becomes high when the shape of the small domains is anisotropic rather than isotropic. Specifically, it seems that, by controlling the value of $RC_C/RC_L$, the occurrence frequency of the switching which is the local orientation change increases, and thus, the continuity of the crystal orientation increases in the grain oriented electrical steel sheet as a whole.

Although it is related to the process for controlling the anisotropy by the thermal gradient during the secondary recrystallization as described above, it is preferable that the direction to elongate the α subgrain in the present embodiment is the transverse direction when considering the typical producing method at present. In the case, the grain size $RC_L$ in the rolling direction is smaller than the grain size $RC_C$ in the transverse direction. The relationship between the rolling direction and the transverse direction is explained below in connection with the producing method. Herein, the direction to elongate the α subgrain is determined not by the thermal gradient but by the occurrence frequency of the α subboundary.

When the grain size $RC_C$ is small, or when the grain size $RC_L$ is large but the grain size $RC_C$ is large, the value of $RC_C/RC_L$ becomes less than 1.15. When the value of $RC_C/RC_L$ becomes less than 1.15, the switching may be insufficient, and the iron loss in high magnetic field may not be sufficiently improved. The value of $RC_C/RC_L$ is preferably 1.80 or more, and is more preferably 2.10 or more.

The upper limit of the value of $RC_C/RC_L$ is not particularly limited. When the occurrence frequency of the switching and the elongation direction are limited to the specific direction and the value of $RC_C/RC_L$ becomes large, the continuity of the crystal orientation increases in the grain oriented electrical steel sheet as a whole, which is preferable for the improvement of the magnetostriction. On the other hand, the switching causes residual lattice defects in the grain. When the switching occurs excessively, it is concerned that the improvement effect on the iron loss may decrease. Thus, the upper limit of the value of $RC_C/RC_L$ may be practically 10. When the iron loss is needed to be considered in particular, the upper limit of the value of $RC_C/RC_L$ is preferably 6, and is more preferably 4.

In addition to controlling the value of $RC_C/RC_L$, in the grain oriented electrical steel sheet according to the present embodiment, as with the sixth embodiment, it is preferable that the grain size $RC_L$ and the grain size $RB_L$ satisfy $1.10 \leq RB_L \div RC_L$.

The above feature clarifies that the "switching" has occurred. For instance, the grain size $RC_C$ and the grain size $RC_L$ are the grain sizes based on the boundaries where $|\alpha_2-\alpha_1|$ is 0.5° or more, between two adjacent measurement points. Even when the "switching" does not occur at all and the angles ϕ of all boundaries are 2.0° or more, the above value of $RC_C/RC_L$ may be satisfied. Even when the value of $RC_C/RC_L$ is satisfied, when the angles ϕ of all boundaries are 2.0° or more, the secondary recrystallized grain which is generally recognized only becomes simply the oblate shape, and thus, the above effects of the present embodiment are not favorably obtained. The embodiment is based on including the boundary which satisfies the boundary condition BC and which does not satisfy the boundary condition BB (the boundary which divides the inside of secondary recrystallized grain). Thus, although it is unlikely that the angles ϕ of all boundaries are 2.0° or more, it is preferable to satisfy the value of $RB_L/RC_L$, in addition to satisfying the value of $RC_C/RC_L$.

In addition to controlling the value of $RB_L/RC_L$ in the rolling direction, in the present embodiment, as with the seventh embodiment, the grain size $RC_C$ and the grain size $RB_C$ may satisfy $1.10 \leq RB_C \div RC_C$ in the transverse direction. By the feature, the continuity of the crystal orientation increases in the grain oriented electrical steel sheet as a whole, which is rather preferable.

Moreover, in the grain oriented electrical steel sheet according to the present embodiment, it is preferable to control the grain size of secondary recrystallized grain in the rolling direction and in the transverse direction.

Specifically, in the grain oriented electrical steel sheet according to the present embodiment, when a grain size $RB_L$ is defined as an average grain size obtained based on the boundary condition BB in the rolling direction L and a grain size $RB_C$ is defined as an average grain size obtained based on the boundary condition BB in the transverse direction C, it is preferable that the grain size $RB_L$ and the grain size $RB_C$ satisfy $1.50 \leq RB_C \div RB_L$. Moreover, it is preferable that $RB_C \div RB_L \leq 20$.

The above feature is not related to the above "switching" and represents the situation such that the secondary recrystallized grain is elongated in the transverse direction. Thus, the above feature in itself is not particular. However, in the present embodiment, in addition to controlling the value of $RC_C/RC_L$, it is preferable that the value of $RB_C/RB_L$ satisfies the above limitation range.

In the present embodiment, when the value of $RC_C/RC_L$ of the α subgrain is controlled in relation to the above switching, the shape of the secondary recrystallized grain tends to be further anisotropic in plane. In other words, in a case where the switching regarding the deviation angle α is made to induce as in the present embodiment, by controlling the shape of the secondary recrystallized grain to be anisotropic in plane, the shape of the α subgrain tends to be anisotropic in plane.

The value of $RB_C/RB_L$ is preferably 1.80 or more, is more preferably 2.00 or more, and is further more preferably 2.50 or more. The upper limit of the value of $RB_C/RB_L$ is not particularly limited.

As a practical method for controlling the value of $RB_C/RB_L$, for instance, it is possible to exemplify a process in which the secondary recrystallized grain is grown under conditions such that the heating is conducted preferentially from a widthwise edge of coil during final annealing, and thereby, the thermal gradient is applied in the width direction of coil (axial direction of coil). Under the above conditions, it is possible to control the grain size of the secondary recrystallized grain in the width direction of coil (for instance, the transverse direction) to be the same as the coil width, while maintaining the grain size of the secondary recrystallized grain in the circumferential direction of coil (for instance, the rolling direction) at approximately 50 mm. For instance, it is possible to occupy the full width of coil having 1000 mm width by one grain. In the case, the upper limit of the value of $RB_C/RB_L$ may be 20.

When the secondary recrystallization is made to progress by a continuous annealing process so as to apply the thermal gradient not in the transverse direction but in the rolling direction, it is possible to control the maximum grain size of the secondary recrystallized grain to be larger without being limited by the coil width. Even in the case, since the grain is appropriately divided by the α subboundary resulted from the switching in the present embodiment, it is possible to obtain the above effects of the present embodiment.

In addition, in the grain oriented electrical steel sheet according to the present embodiment, it is preferable that the occurrence frequency of the switching regarding the deviation angle α is controlled in the rolling direction and in the transverse direction.

Specifically, in the grain oriented electrical steel sheet according to the present embodiment, when a grain size $RC_L$ is defined as an average grain size obtained based on the boundary condition BC in the rolling direction L, when a grain size $RB_L$ is defined as an average grain size obtained based on the boundary condition BB in the rolling direction L, when a grain size $RC_C$ is defined as an average grain size obtained based on the boundary condition BC in the transverse direction C, and when a grain size $RB_C$ is defined as an average grain size obtained based on the boundary condition BB in the transverse direction C, it is preferable that the grain size $RC_L$, the grain size $RC_C$, the grain size $RB_L$, and the grain size $RB_C$ satisfy $(RB_C \times RC_L) \div (RB_L \times RC_C) \leq 1.0$. The lower limit thereof is not particularly limited. When considering present technology, the grain size $RC_L$, the grain size $RC_C$, the grain size $RB_L$, and the grain size $RB_C$ may satisfy $0.2 < (RB_C \times RC_L) \div (RB_L \times RC_C)$.

The above feature represents the anisotropy in plane concerned with the occurrence frequency of the above "switching". Specifically, the above $(RB_C \times RC_L)/(RB_L \times RC_C)$ is the ratio of "$RB_C/RC_C$:the occurrence frequency of the switching which divides the secondary recrystallized grain in the transverse direction" to "$RB_L/RC_L$:the occurrence frequency of the switching which divides the secondary recrystallized grain in the rolling direction". The state such that the above value is less than 1 indicates that one secondary recrystallized grain is divided into many domains in the rolling direction by the switching (the α subboundary).

Considered from a different way, the above $(RB_C \times RC_L)/(RB_L \times RC_C)$ is the ratio of "$RB_C/RB_L$:the oblateness of the secondary recrystallized grain" to "$RC_C/RC_L$:the oblateness of the α subgrain". The state such that the above value is less than 1 indicates that the α subgrain dividing one secondary recrystallized grain becomes the oblate shape as compared with the secondary recrystallized grain.

Specifically, the α subboundary tends to divide the secondary recrystallized grain not in the transverse direction but in the rolling direction. In other words, the α subboundary tends to elongate in the direction where the secondary recrystallized grain elongates. From the tendency of the α subboundary, it is considered that the switching makes the area occupied by the crystal with specific orientation increase, when the secondary recrystallized grain elongates.

The value of $(RB_C \times RC_L)/(RB_L \times RC_C)$ is preferably 0.9 or less, is more preferably 0.8 or less, and is further more preferably 0.5 or less. As described above, the lower limit of $(RB_C \times RC_L)/(RB_L \times RC_C)$ is not particularly limited, but the value may be more than 0.2 when considering the industrial feasibility.

The above $RB_L$ and $RB_C$ are determined based on the boundary satisfying the case 1 and/or the case 2 shown in Table 2, and the above $RC_L$ and $RC_C$ are determined based on the boundary satisfying the case 1 and/or the case 3 shown in Table 2. For instance, the deviation angles of the crystal orientations are measured on the measurement line including at least 500 measurement points along the transverse direction, and the $RC_C$ is determined as the average length of the line segment between the boundaries satisfying the case 1 and/or the case 3 on the measurement line. In the same way, the grain size $RC_L$, the grain size $RB_L$, and the grain size $RB_C$ may be determined.

Common Technical Features in the Fifth Embodiment to the Eighth Embodiment

Next, common technical features of the grain oriented electrical steel sheets according to the fifth embodiment to the eighth embodiment are explained below.

In the grain oriented electrical steel sheet according to the fifth embodiment to the eighth embodiment, it is preferable that $\sigma(|\alpha|)$ which is a standard deviation of an absolute value of the deviation angle α is 0° to 3.50°.

In the steel sheet in which the switching explained above occurs sufficiently, the "deviation angle" tends to be controlled to a characteristic range. For instance, in a case where the crystal orientation is gradually changed by the switching regarding the deviation angle α, it is not an obstacle for the present embodiments that the absolute value of the deviation angle decreases close to zero. Moreover, for instance, in a case where the crystal orientation is gradually changed by the switching regarding the deviation angle α, it is not an obstacle for the present embodiments that the crystal orientation in itself converges with the specific orientation, and as a result, that the standard deviation of the deviation angle decreases close to zero.

Thus, in the present embodiments, $\sigma(|\alpha|)$ which is the standard deviation of the absolute value of the deviation angle α may be 0° to 3.50°.

The $\sigma(|\alpha|)$ which is the standard deviation of the absolute value of the deviation angle $\alpha$ may be obtained in the same way as the above $\sigma(\theta)$. The deviation angle $\alpha$ is determined in each measurement point, and the $\sigma(|\alpha|)$ which is the standard deviation of the absolute value of the deviation angle $\alpha$ is calculated. In the grain oriented electrical steel sheet according to each embodiment, it is preferable that the $\sigma(|\alpha|)$ satisfies the above limitation range.

The $\sigma(|\alpha|)$ which is the standard deviation of the absolute value of the deviation angle $\alpha$ is preferably 3.00 or less, is more preferably 2.50 or less, is more preferably 2.20 or less, and is further more preferably 1.80 or less. Of course, the standard deviation $\sigma(|\alpha|)$ may be zero.

Common Technical Features in Each Embodiment

Next, common technical features of the grain oriented electrical steel sheets according to the above embodiments are explained below.

In the grain oriented electrical steel sheet according to each embodiment of the present invention, when a grain size $RB_L$ is defined as an average grain size obtained based on the boundary condition BB in the rolling direction L and a grain size $RB_C$ is defined as an average grain size obtained based on the boundary condition BB in the transverse direction C, it is preferable that the grain size $RB_L$ and the grain size $RB_C$ are 22 mm or larger.

It seems that the switching occurs caused by the dislocations piled up during the grain growth of the secondary recrystallized grain. Thus, after the switching occurs once and before next switching occurs, it is needed that the secondary recrystallized grain grows to a certain size. When the grain size $RB_L$ and the grain size $RB_C$ are smaller than 15 mm, the switching may be difficult to occur, and it may be difficult to sufficiently improve the magnetostriction by the switching. The grain size $RB_L$ and the grain size $RB_C$ may be 15 mm or larger. The grain size $RB_L$ and the grain size $RB_C$ are preferably 22 mm or larger, are more preferably 30 mm or larger, and are further more preferably 40 mm or larger.

The upper limits of the grain size $RB_L$ and the grain size $RB_C$ are not particularly limited. For instance, in the typical production of the grain oriented electrical steel sheet, the grain having the {110}<001> orientation is formed by the growth in the secondary recrystallization under the condition with the curvature in the rolling direction where the coiled steel sheet is heated after the primary recrystallization. When the grain size $RB_L$ in the rolling direction is excessively large, the deviation angle may increase, and the magnetostriction may increase. Thus, it is preferable to avoid increasing the grain size $RB_L$ without limitation. The upper limit of the grain size $RB_L$ is preferably 400 mm, is more preferably 200 mm, and is further more preferably 100 mm when considering the industrial feasibility.

Moreover, in the typical production of the grain oriented electrical steel sheet, since the grain having the {110}<001> orientation is formed due to the growth in the secondary recrystallization by heating the coiled steel sheet after the primary recrystallization, the secondary recrystallized grain can grow from the coil edge where the temperature rises antecedently toward the coil center where the temperature rises subsequently. In the producing method, when the coil width is 1000 mm for instance, the upper limit of the grain size $RB_C$ may be 500 mm which is approximately half of the coil width. Of course, in each embodiment, it is not excluded that the grain size $RB_C$ is the full width of coil.

In the grain oriented electrical steel sheet according to each embodiment of the present invention, when a grain size $RA_L$ is defined as an average grain size obtained based on the boundary condition BA in the rolling direction L, when a grain size $RA_C$ is defined as an average grain size obtained based on the boundary condition BA in the transverse direction C, when a grain size $RC_L$ is defined as an average grain size obtained based on the boundary condition BC in the rolling direction L, and when a grain size $RC_C$ is defined as an average grain size obtained based on the boundary condition BC in the transverse direction C, it is preferable that the grain size $RA_L$ and the grain size $RC_L$ are 30 mm or smaller, and the grain size $RA_C$ and the grain size $RC_C$ are 400 mm or smaller.

The state such that the grain size $RA_L$ and the grain size $RC_L$ are smaller indicates that the occurrence frequency of the switching in the rolling direction is higher. The grain size $RA_L$ and the grain size $RC_L$ may be 40 mm or smaller. The grain size $RA_L$ and the grain size $RC_L$ are preferably 30 mm or smaller, and are more preferably 20 mm or smaller.

When the grain size $RA_C$ and the grain size $RC_C$ are excessively large without sufficient switching, the magnetostriction may increase. Thus, it is preferable to avoid increasing the grain size $RA_C$ and the grain size $RC_C$ without limitation. The upper limit of the grain size $RA_C$ and the grain size $RC_C$ are preferably 400 mm, is more preferably 200 mm, is more preferably 100 mm, is more preferably 40 mm, and is further more preferably 30 mm when considering the industrial feasibility.

The lower limits of the grain size $RA_L$, the grain size $RC_L$, the grain size $RA_C$, and the grain size $RC_C$ are not particularly limited. In each embodiment, since the interval for measuring the crystal orientation is 1 mm, the lower limits thereof may be 1 mm. However, in each embodiment, even when the grain sizes thereof become smaller than 1 mm by controlling the interval for measuring the crystal orientation to less than 1 mm, the above steel sheet is not excluded. Herein, the switching causes residual lattice defects somewhat. When the switching occurs excessively, it is concerned that the magnetic characteristics are negatively affected. The lower limits of the grain sizes thereof are preferably 5 mm when considering the industrial feasibility.

In the grain oriented electrical steel sheet according to each embodiment, the measurement result of the grain size maximally includes an ambiguity of 2 mm for each grain. Thus, when the grain size is measured (when the crystal orientations are measured on at least 500 measurement points with 1 mm intervals on the rolled surface), it is preferable that the above measurements are conducted under conditions such that the measurement areas are totally 5 areas or more and are the areas which are sufficiently distant from each other in the direction orthogonal to the direction for determining the grain size in plane, specifically, the areas where the different grains can be measured. By calculating the average from all grain sizes obtained by the measurements at 5 areas or more in total, it is possible to reduce the above ambiguity. For instance, the measurements may be conducted at 5 areas or more which are sufficiently distant from each other in the rolling direction for measuring the grain size $RA_C$, the grain size $RC_C$, and the grain size $RB_C$ and at 5 areas or more which are sufficiently distant from each other in the transverse direction for measuring the grain size $RA_L$, the grain size $RC_L$, and the grain size $RB_L$, and then, the average grain size may be determined from the orientation measurements whose measurement points of 2500 or more in total.

The grain oriented electrical steel sheet according to the above embodiments may have an intermediate layer and an insulation coating on the steel sheet. The crystal orientation, the boundary, the average grain size, and the like may be determined based on the steel sheet without the coating and the like. In other words, in a case where the grain oriented electrical steel sheet as the measurement specimen has the coating and the like on the surface thereon, the crystal orientation and the like may be measured after removing the coating and the like.

For instance, in order to remove the insulation coating, the grain oriented electrical steel sheet with the coating may be immersed in hot alkaline solution. Specifically, it is possible to remove the insulating coating from the grain oriented electrical steel sheet by immersing the steel sheet in sodium hydroxide aqueous solution which includes 30 to 50 mass % of NaOH and 50 to 70 mass % of $H_2O$ at 80 to 90° C. for 5 to 10 minutes, washing it with water, and then, drying it. Moreover, the immersing time in sodium hydroxide aqueous solution may be adjusted depending on the thickness of insulating coating.

Moreover, for instance, in order to remove the intermediate layer, the grain oriented electrical steel sheet in which the insulation coating is removed may be immersed in hot hydrochloric acid. Specifically, it is possible to remove the intermediate layer by previously investigating the preferred concentration of hydrochloric acid for removing the intermediate layer to be dissolved, immersing the steel sheet in the hydrochloric acid with the above concentration such as 30 to 40 mass % of HCl at 80 to 90° C. for 1 to 5 minutes, washing it with water, and then, drying it. In general, layer and coating are removed by selectively using the solution, for instance, the alkaline solution is used for removing the insulation coating, and the hydrochloric acid is used for removing the intermediate layer.

Next, the chemical composition of the grain oriented electrical steel sheet according to each embodiment is explained. The grain oriented electrical steel sheet according to each embodiment includes, as the chemical composition, base elements, optional elements as necessary, and a balance consisting of Fe and impurities.

The grain oriented electrical steel sheet according to each embodiment includes 2.00 to 7.00% of Si (silicon) in mass percentage as the base elements (main alloying elements).

The Si content is preferably 2.0 to 7.0% in order to control the crystal orientation to align in the {110}<001> orientation.

In each embodiment, the grain oriented electrical steel sheet may include the impurities as the chemical composition. The impurities correspond to elements which are contaminated during industrial production of steel from ores and scrap that are used as a raw material of steel, or from environment of a production process. For instance, an upper limit of the impurities may be 5% in total.

Moreover, in each embodiment, the grain oriented electrical steel sheet may include the optional elements in addition to the base elements and the impurities. For instance, as substitution for a part of Fe which is the balance, the grain oriented electrical steel sheet may include the optional elements such as Nb, V, Mo, Ta, W, C, Mn, S, Se, Al, N, Cu, Bi, B, P, Ti, Sn, Sb, Cr, or Ni. The optional elements may be included as necessary. Thus, a lower limit of the respective optional elements does not need to be limited, and the lower limit may be 0%. Moreover, even if the optional elements may be included as impurities, the above mentioned effects are not affected.

0 to 0.030% of Nb (niobium)
0 to 0.030% of V (vanadium)
0 to 0.030% of Mo (molybdenum)
0 to 0.030% of Ta (tantalum)
0 to 0.030% of W (tungsten)

Nb, V, Mo, Ta, and W can be utilized as an element having the effects characteristically in each embodiment. In the following description, at least one element selected from the group consisting of Nb, V, Mo, Ta, and W may be referred to as "Nb group element" as a whole.

The Nb group element favorably influences the occurrence of the switching which is characteristic in the grain oriented electrical steel sheet according to each embodiment. Herein, it is in the production process that the Nb group element influences the occurrence of the switching. Thus, the Nb group element does not need to be included in the final product which is the grain oriented electrical steel sheet according to each embodiment. For instance, the Nb group element may tend to be released outside the system by the purification during the final annealing described later. In other words, even when the Nb group element is included in the slab and makes the occurrence frequency of the switching increase in the production process, the Nb group element may be released outside the system by the purification annealing. As mentioned above, the Nb group element may not be detected as the chemical composition of the final product.

Thus, in each embodiment, with respect to an amount of the Nb group element as the chemical composition of the grain oriented electrical steel sheet which is the final product, only upper limit thereof is regulated. The upper limit of the Nb group element may be 0.030% respectively. On the other hand, as mentioned above, even when the Nb group element is utilized in the production process, the amount of the Nb group element may be zero as the final product. Thus, a lower limit of the Nb group element is not particularly limited. The lower limit of the Nb group element may be zero respectively.

In each embodiment of the present invention, it is preferable that the grain oriented electrical steel sheet includes, as the chemical composition, at least one selected from a group consisting of Nb, V, Mo, Ta, and W and that the amount thereof is 0.0030 to 0.030 mass % in total.

It is unlikely that the amount of the Nb group element increases during the production. Thus, when the Nb group element is detected as the chemical composition of the final product, the above situation implies that the switching is controlled by the Nb group element in the production process. In order to favorably control the switching in the production process, the total amount of the Nb group element in the final product is preferably 0.0030% or more, and is more preferably 0.0050% or more. On the other hand, when the total amount of the Nb group element in the final product is more than 0.030%, the occurrence frequency of the switching is maintained, but the magnetic characteristics may deteriorate. Thus, the total amount of the Nb group element in the final product is preferably 0.030% or less. The features of the Nb group element are explained later in connection with the producing method.

0 to 0.0050% of C (carbon)
0 to 1.0% of Mn (manganese)
0 to 0.0150% of S (sulfur)
0 to 0.0150% of Se (selenium)
0 to 0.0650% of Al (acid-soluble aluminum)
0 to 0.0050% of N (nitrogen)
0 to 0.40% of Cu (copper)
0 to 0.010% of Bi (bismuth)
0 to 0.080% of B (boron)

0 to 0.50% of P (phosphorus)
0 to 0.0150% of Ti (titanium)
0 to 0.10% of Sn (tin)
0 to 0.10% of Sb (antimony)
0 to 0.30% of Cr (chrome)
0 to 1.0% of Ni (nickel)

The optional elements may be included as necessary. Thus, a lower limit of the respective optional elements does not need to be limited, and the lower limit may be 0%. The total amount of S and Se is preferably 0 to 0.0150%. The total of S and Se indicates that at least one of S and Se is included, and the amount thereof corresponds to the above total amount.

In the grain oriented electrical steel sheet, the chemical composition changes relatively drastically (the amount of alloying element decreases) through the decarburization annealing and through the purification annealing during secondary recrystallization. Depending on the element, the amount of the element may decreases through the purification annealing to an undetectable level (1 ppm or less) using the typical analysis method. The above mentioned chemical composition of the grain oriented electrical steel sheet according to each embodiment is the chemical composition as the final product. In general, the chemical composition of the final product is different from the chemical composition of the slab as the starting material.

The chemical composition of the grain oriented electrical steel sheet according to each embodiment may be measured by typical analytical methods for the steel. For instance, the chemical composition of the grain oriented electrical steel sheet may be measured by using ICP-AES (Inductively Coupled Plasma-Atomic Emission Spectrometer: inductively coupled plasma emission spectroscopy spectrometry). Specifically, it is possible to obtain the chemical composition by conducting the measurement by Shimadzu ICPS-8100 and the like (measurement device) under the condition based on calibration curve prepared in advance using samples with 35 mm square taken from the grain oriented electrical steel sheet. In addition, C and S may be measured by the infrared absorption method after combustion, and N may be measured by the thermal conductometric method after fusion in a current of inert gas.

The above chemical composition is the composition of grain oriented electrical steel sheet. When the grain oriented electrical steel sheet used as the measurement sample has the insulating coating and the like on the surface thereof, the chemical composition is measured after removing the coating and the like by the above methods.

The grain oriented electrical steel sheet according to each embodiment has the feature such that the secondary recrystallized grain is divided into the small domains where each deviation angle is slightly different, and by the feature, the magnetostriction and the iron loss in middle magnetic field range are reduced. Thus, in the grain oriented electrical steel sheet according to each embodiment, a layering structure on the steel sheet, a treatment for refining the magnetic domain, and the like are not particularly limited. In each embodiment, an optional coating may be formed on the steel sheet according to the purpose, and a magnetic domain refining treatment may be applied according to the necessity.

In the grain oriented electrical steel sheet according to each embodiment of the present invention, the intermediate layer may be arranged in contact with the grain oriented electrical steel sheet and the insulation coating may be arranged in contact with the intermediate layer.

Figure 2:
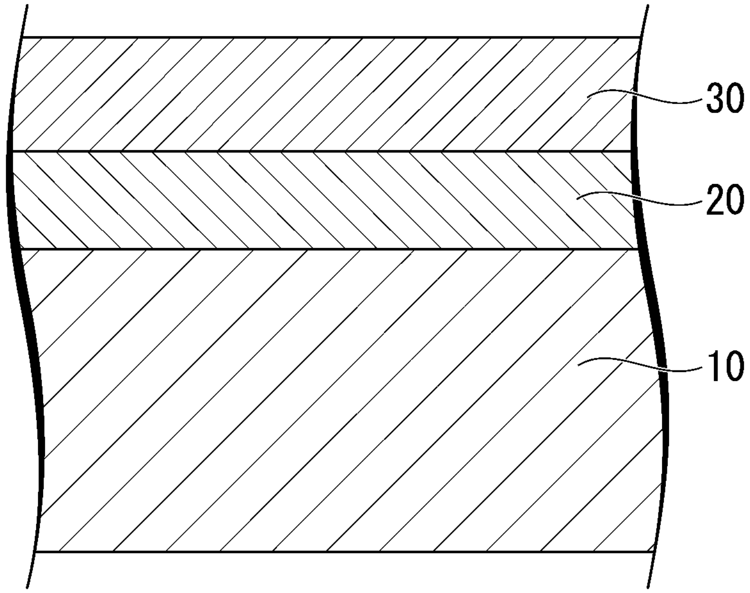
FIG. 2 is a cross-sectional illustration of a grain oriented electrical steel sheet according to an embodiment of the present invention.

FIG. 2 is a cross-sectional illustration of the grain oriented electrical steel sheet according to the preferred embodiment of the present invention. As shown in FIG. 2, when viewing the cross section whose cutting direction is parallel to thickness direction, the grain oriented electrical steel sheet 10 (silicon steel sheet) according to the present embodiment may have the intermediate layer 20 which is arranged in contact with the grain oriented electrical steel sheet 10 (silicon steel sheet) and the insulation coating 30 which is arranged in contact with the intermediate layer 20.

For instance, the above intermediate layer may be a layer mainly including oxides, a layer mainly including carbides, a layer mainly including nitrides, a layer mainly including borides, a layer mainly including silicides, a layer mainly including phosphides, a layer mainly including sulfides, a layer mainly including intermetallic compounds, and the like. There intermediate layers may be formed by a heat treatment in an atmosphere where the redox properties are controlled, a chemical vapor deposition (CVD), a physical vapor deposition (PVD), and the like.

In the grain oriented electrical steel sheet according to each embodiment of the present invention, the intermediate layer may be a forsterite film with an average thickness of 1 to 3 μm. Herein, the forsterite film corresponds to a layer mainly including $Mg_2SiO_4$. An interface between the forsterite film and the grain oriented electrical steel sheet becomes the interface such that the forsterite film intrudes the steel sheet when viewing the above cross section.

In the grain oriented electrical steel sheet according to each embodiment of the present invention, the intermediate layer may be an oxide layer with an average thickness of 2 to 500 nm. Herein, the oxide layer corresponds to a layer mainly including $SiO_2$. An interface between the oxide layer and the grain oriented electrical steel sheet becomes the smooth interface when viewing the above cross section.

In addition, the above insulation coating may be an insulation coating which mainly includes phosphate and colloidal silica and whose average thickness is 0.1 to 10 μm, an insulation coating which mainly includes alumina sol and boric acid and whose average thickness is 0.5 to 8 μm, and the like.

In the grain oriented electrical steel sheet according to each embodiment of the present invention, the magnetic domain may be refined by at least one of applying a local minute strain and forming a local groove. The local minute strain or the local groove may be applied or formed by laser, plasma, mechanical methods, etching, or other methods. For instance, the local minute strain or the local groove may be applied or formed lineally or punctiformly so as to extend in the direction intersecting the rolling direction on the rolled surface of steel sheet and so as to have the interval of 4 to 10 mm in the rolling direction.

(Method for Producing the Grain Oriented Electrical Steel Sheet)

Next, a method for producing the grain oriented electrical steel sheet according to an embodiment of the present invention is described.

Figure 3:
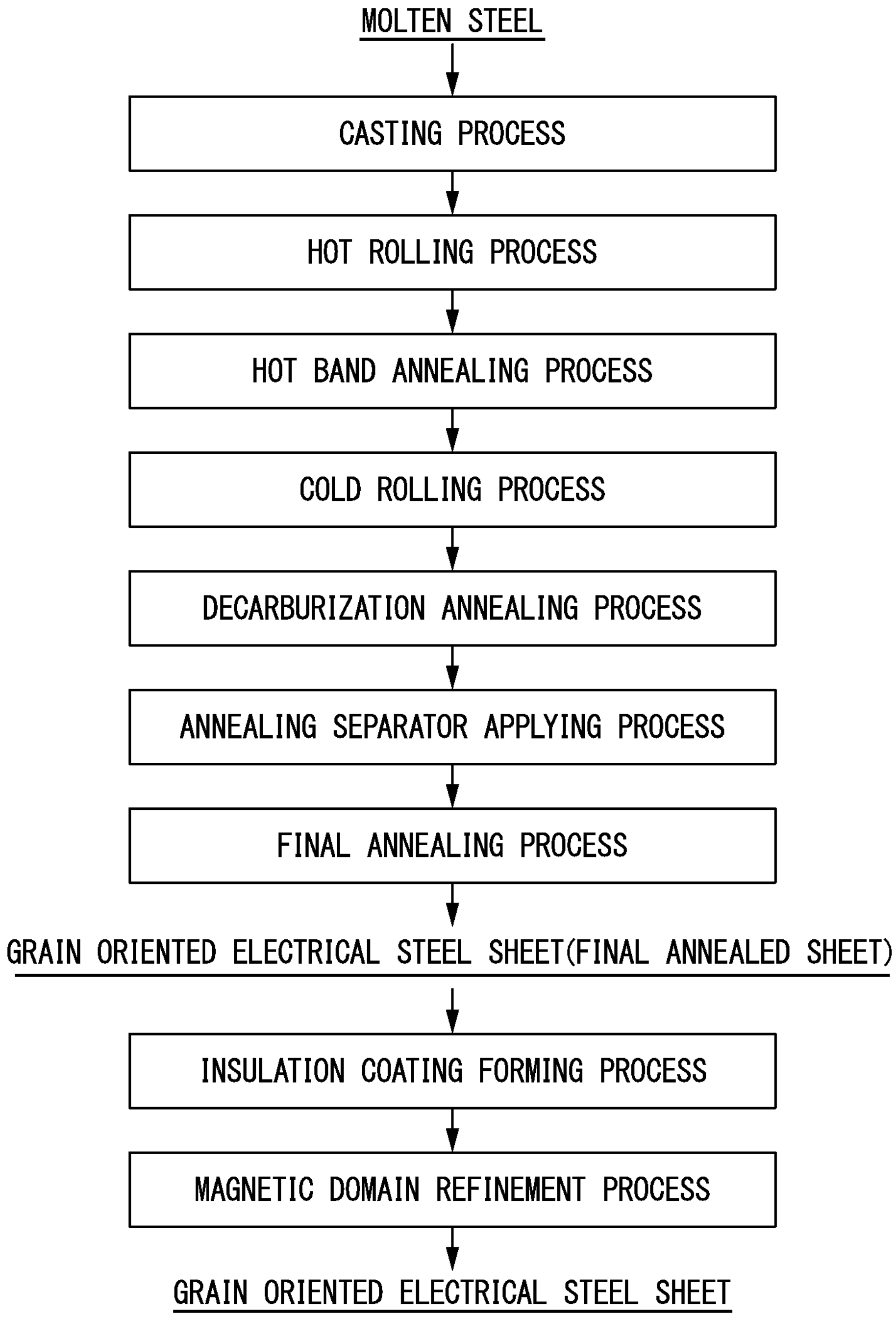
FIG. 3 is a flow chart illustrating a method for producing a grain oriented electrical steel sheet according to an embodiment of the present invention.

FIG. 3 is a flow chart illustrating the method for producing the grain oriented electrical steel sheet according to the present embodiment of the present invention. As shown in FIG. 3, the method for producing the grain oriented electrical steel sheet (silicon steel sheet) according to the present embodiment includes a casting process, a hot rolling process, a hot band annealing process, a cold rolling process, a decarburization annealing process, an annealing separator applying process, and a final annealing process. In addition, as necessary, a nitridation may be conducted at appropriate timing from the decarburization annealing process to the final annealing process, and an insulation coating forming process may be conducted after the final annealing process.

Specifically, the method for producing the grain oriented electrical steel sheet (silicon steel sheet) may be as follows.

In the casting process, a slab is cast so that the slab includes, as the chemical composition, by mass %, 2.0 to 7.0% of Si, 0 to 0.030% of Nb, 0 to 0.030% of V, 0 to 0.030% of Mo, 0 to 0.030% of Ta, 0 to 0.030% of W, 0 to 0.0850% of C, 0 to 1.0% of Mn, 0 to 0.0350% of S, 0 to 0.0350% of Se, 0 to 0.0650% of Al, 0 to 0.0120% of N, 0 to 0.40% of Cu, 0 to 0.010% of Bi, 0 to 0.080% of B, 0 to 0.50% of P, 0 to 0.0150% of Ti, 0 to 0.10% of Sn, 0 to 0.10% of Sb, 0 to 0.30% of Cr, 0 to 1.0% of Ni, and a balance consisting of Fe and impurities.

In the decarburization annealing process, a grain size of primary recrystallized grain is controlled to 24 μm or smaller.

In the final annealing process, when a total amount of Nb, V, Mo, Ta, and W in the chemical composition of the slab is 0.0030 to 0.030%, in a heating stage, at least one of: $PH_2O/PH_2$ in 700 to 800° C. to be 0.030 to 5.0; $PH_2O/PH_2$ in 900 to 950° C. to be 0.010 to 0.20; $PH_2O/PH_2$ in 950 to 1000° C. to be 0.0050 to 0.10; or $PH_2O/PH_2$ in 1000 to 1050° C. to be 0.0010 to 0.050 is controlled, or when a total amount of Nb, V, Mo, Ta, and W in the chemical composition of the slab is not 0.0030 to 0.030%, in a heating stage, at least one of: $PH_2O/PH_2$ in 700 to 800° C. is controlled to be 0.030 to 5.0 and $PH_2O/PH_2$ in 900 to 950° C. to be 0.010 to 0.20; $PH_2O/PH_2$ in 950 to 1000° C. is controlled to be 0.0050 to 0.10; or $PH_2O/PH_2$ in 1000 to 1050° C. to be 0.0010 to 0.050 is controlled.

The above $PH_2O/PH_2$ is called oxidation degree, and is a ratio of vapor partial pressure $PH_2O$ to hydrogen partial pressure $PH_2$ in atmosphere gas.

The "switching" according to the present embodiment is controlled mainly by a factor to easily induce the orientation changes (switching) itself and a factor to periodically induce the orientation changes (switching) within one secondary recrystallized grain.

In order to easily induce the switching itself, it is effective to make the secondary recrystallization start from lower temperature. For instance, by controlling the grain size of the primary recrystallized grain or by utilizing the Nb group element, it is possible to control starting the secondary recrystallization to be lower temperature.

In order to periodically induce the switching within one secondary recrystallized grain, it is effective to make the secondary recrystallized grain grow continuously from lower temperature to higher temperature. For instance, by utilizing AlN and the like which are the conventional inhibitor at appropriate temperature and in appropriate atmosphere, it is possible to make the secondary recrystallized grain nucleate at lower temperature, to make the inhibitor ability maintain continuously up to higher temperature, and to periodically induce the switching up to higher temperature within one secondary recrystallized grain.

In other words, in order to favorably induce the switching, it is effective to suppress the nucleation of the secondary recrystallized grain at higher temperature and to make the secondary recrystallized grain nucleated at lower temperature preferentially grow up to higher temperature.

In addition to the above two factors according to the present embodiment, in order to control the shape of the subgrain to be anisotropic in plane, it is possible to employ a process for making the secondary recrystallized grain grow anisotropically as the secondary recrystallization process which is a downstream process.

In order to control the switching which is the feature of the present embodiment, the above factors are important. In regards to the production conditions except the above, it is possible to apply a conventional known method for producing the grain oriented electrical steel sheet. For instance, the conventional known method may be a producing method utilizing MnS and AlN as inhibitor which are formed by high temperature slab heating, a producing method utilizing AlN as inhibitor which is formed by low temperature slab heating and subsequent nitridation, and the like. For the switching which is the feature of the present embodiment, any producing method may be applied. The embodiment is not limited to a specific producing method. Hereinafter, the method for controlling the switching by the producing method applied the nitridation is explained for instance.

(Casting Process)

In the casting process, a slab is made. For instance, a method for making the slab is as follow. A molten steel is made (a steel is melted). The slab is made by using the molten steel. The slab may be made by continuous casting. An ingot may be made by using the molten steel, and then, the slab may be made by blooming the ingot. A thickness of the slab is not particularly limited. The thickness of the slab may be 150 to 350 mm for instance. The thickness of the slab is preferably 220 to 280 mm. The slab with the thickness of 10 to 70 mm which is a so-called thin slab may be used. When using the thin slab, it is possible to omit a rough rolling before final rolling in the hot rolling process.

As the chemical composition of the slab, it is possible to employ a chemical composition of a slab used for producing a general grain oriented electrical steel sheet. For instance, the chemical composition of the slab may include the following elements.

0 to 0.0850% of C

Carbon (C) is an element effective in controlling the primary recrystallized structure in the production process. However, when the C content in the final product is excessive, the magnetic characteristics are negatively affected. Thus, the C content in the slab may be 0 to 0.0850%. The upper limit of the C content is preferably 0.0750%. C is decarburized and purified in the decarburization annealing process and the final annealing process as mentioned below, and then, the C content becomes 0.0050% or less after the final annealing process. When C is included, the lower limit of the C content may be more than 0%, and may be 0.0010% from the productivity standpoint in the industrial production.

2.0 to 7.0% of Si

Silicon (Si) is an element which increases the electric resistance of the grain oriented electrical steel sheet and thereby decreases the iron loss. When the Si content is less than 2.0%, an austenite transformation occurs during the final annealing and the crystal orientation of the grain oriented electrical steel sheet is impaired. On the other hand, when the Si content is more than 7.0%, the cold workability deteriorates and the cracks tend to occur during cold rolling. The lower limit of the Si content is preferably 2.50%, and is more preferably 3.0%. The upper limit of the Si content is preferably 4.50%, and is more preferably 4.0%.

0 to 1.0% of Mn

Manganese (Mn) forms MnS and/or MnSe by bonding to S and/or Se, which act as the inhibitor. The Mn content may be 0 to 1.0%. When Mn is included and the Mn content is 0.05 to 1.0%, the secondary recrystallization becomes stable, which is preferable. In the present embodiment, the nitride of the Nb group element can bear a part of the function of the inhibitor. In the case, the inhibitor intensity as MnS and/or MnSe in general is controlled weakly. Thus, the upper limit of the Mn content is preferably 0.50%, and is more preferably 0.20%.

0 to 0.0350% of S 0 to 0.0350% of Se

Sulfur (S) and Selenium (Se) form MnS and/or MnSe by bonding to Mn, which act as the inhibitor. The S content may be 0 to 0.0350%, and the Se content may be 0 to 0.0350%. When at least one of S and Se is included, and when the total amount of S and Se is 0.0030 to 0.0350%, the secondary recrystallization becomes stable, which is preferable. In the present embodiment, the nitride of the Nb group element can bear a part of the function of the inhibitor. In the case, the inhibitor intensity as MnS and/or MnSe in general is controlled weakly. Thus, the upper limit of the total amount of S and Se is preferably 0.0250%, and is more preferably 0.010%. When S and/or Se remain in the steel after the final annealing, the compound is formed, and thereby, the iron loss is deteriorated. Thus, it is preferable to reduce S and Se as much as possible by the purification during the final annealing.

Herein, "the total amount of S and Se is 0.0030 to 0.0350%" indicates that only one of S or Se is included as the chemical composition in the slab and the amount thereof is 0.0030 to 0.0350% or that both of S and Se are included in the slab and the total amount thereof is 0.0030 to 0.0350%.

0 to 0.0650% of Al

Aluminum (Al) forms (Al, Si)N by bonding to N, which acts as the inhibitor. The Al content may be 0 to 0.0650%. When Al is included and the Al content is 0.010 to 0.065%, the inhibitor AlN formed by the nitridation mentioned below expands the temperature range of the secondary recrystallization, and the secondary recrystallization becomes stable especially in higher temperature range, which is preferable. The lower limit of the Al content is preferably 0.020%, and is more preferably 0.0250%. The upper limit of the Al content is preferably 0.040%, and is more preferably 0.030% from the stability standpoint in the secondary recrystallization.

0 to 0.0120% of N

Nitrogen (N) bonds to Al and acts as the inhibitor. The N content may be 0 to 0.0120%. The lower limit thereof may be 0% because it is possible to include N by the nitridation in midstream of the production process. When N is included and the N content is more than 0.0120%, the blister which is a kind of defect tends to be formed in the steel sheet. The upper limit of the N content is preferably 0.010%, and is more preferably 0.0090%. N is purified in the final annealing process, and then, the N content becomes 0.0050% or less after the final annealing process.

0 to 0.030% of Nb 0 to 0.030% of V 0 to 0.030% of Mo 0 to 0.030% of Ta 0 to 0.030% of W

Nb, V, Mo, Ta, and W are the Nb group element. The Nb content may be 0 to 0.030%, the V content may be 0 to 0.030%, the Mo content may be 0 to 0.030%, the Ta content may be 0 to 0.030%, and the W content may be 0 to 0.030%.

Moreover, it is preferable that the slab includes, as the Nb group element, at least one selected from a group consisting of Nb, V, Mo, Ta, and W and that the amount thereof is 0.0030 to 0.030 mass % in total.

When utilizing the Nb group element for controlling the switching, and when the total amount of the Nb group element in the slab is 0.030% or less (preferably 0.0030% or more and 0.030% or less), the secondary recrystallization starts at appropriate timing. Moreover, the orientation of the formed secondary recrystallized grain becomes very favorable, the switching which is the feature of the present embodiment tends to be occur in the subsequent growing stage, and the microstructure is finally controlled to be favorable for the magnetization characteristics.

By including the Nb group element, the grain size of the primary recrystallized grain after the decarburization annealing becomes fine as compared with not including the Nb group element. It seems that the refinement of the primary recrystallized grain is resulted from the pinning effect of the precipitates such as carbides, carbonitrides, and nitrides, the drug effect of the solid-soluted elements, and the like. In particular, the above effect is preferably obtained by including Nb and Ta.

By the refinement of the grain size of the primary recrystallized grain due to the Nb group element, the driving force of the secondary recrystallization increases, and then, the secondary recrystallization starts from lower temperature as compared with the conventional techniques. In addition, since the precipitates derived from the Nb group element solutes at relatively lower temperature as compared with the conventional inhibitors such as AlN, the secondary recrystallization starts from lower temperature in the heating stage of the final annealing as compared with the conventional techniques. The secondary recrystallization starts from lower temperature, and thereby, the switching which is the feature of the present embodiment tends to be occur. The mechanism thereof is described below.

In a case where the precipitates derived from the Nb group element are utilized as the inhibitor for the secondary recrystallization, since the carbides and carbonitrides of the Nb group element become unstable in the temperature range lower than the temperature range where the secondary recrystallization can occur, it seems that the effect of controlling the starting temperature of the secondary recrystallization to be lower temperature is small. Thus, in order to favorably control the starting temperature of the secondary recrystallization to be lower temperature, it is preferable that the nitrides of the Nb group element which are stable up to the temperature range where the secondary recrystallization can occur are utilized.

By concurrently utilizing the precipitates (preferably nitrides) derived from the Nb group element controlling the starting temperature of the secondary recrystallization to be lower temperature and the conventional inhibitors such as AlN, (Al, Si)N, and the like which are stable up to higher temperature even after starting the secondary recrystallization, it is possible to expand the temperature range where the grain having the {110}<001> orientation which is the secondary recrystallized grain is preferentially grown. Thus, the switching is induced in the wide temperature range from lower temperature to higher temperature, and thus, the orientation selectivity functions in the wide temperature range. As a results, it is possible to increase the existence frequency of the subboundary in the final product, and thus, to effectively increase the alignment degree to the {110}<001> orientation of the secondary recrystallized grains included in the grain oriented electrical steel sheet.

Herein, in a case where the primary recrystallized grain is intended to be refined by the pinning effect of the carbides, the carbonitrides, and the like of the Nb group element, it is preferable to control the C content of the slab to be 50 ppm or more at casting. However, since the nitrides are preferred as the inhibitor for the secondary recrystallization as compared with the carbides and the carbonitrides, it is preferable that the carbides and the carbonitrides of the Nb group element are sufficiently soluted in the steel after finishing the primary recrystallization by reducing the C content to 30 ppm or less, preferably 20 ppm or less, and more preferably 10 ppm or less through the decarburization annealing. In a case where most of the Nb group element is solid-soluted by the decarburization annealing, it is possible to control the nitrides (the inhibitor) of the Nb group element to be the morphology favorable for the present embodiment (the morphology facilitating the secondary recrystallization) in the subsequent nitridation.

The total amount of the Nb group element is preferably 0.0040% or more, and more preferably 0.0050% or more. The total amount of the Nb group element is preferably 0.020% or less, and more preferably 0.010% or less.

In the chemical composition of the slab, a balance consists of Fe and impurities. The above impurities correspond to elements which are contaminated from the raw materials or from the production environment, when industrially producing the slab. Moreover, the above impurities indicate elements which do not substantially affect the effects of the present embodiment.

In addition to solving production problems, in consideration of the influence on the magnetic characteristics and the improvement of the inhibitors function by forming compounds, the slab may include the known optional elements as substitution for a part of Fe. For instance, the optional elements may be the following elements.

0 to 0.40% of Cu
0 to 0.010% of Bi
0 to 0.080% of B
0 to 0.50% of P
0 to 0.0150% of Ti
0 to 0.10% of Sn
0 to 0.10% of Sb
0 to 0.30% of Cr
0 to 1.0% of Ni

The optional elements may be included as necessary. Thus, a lower limit of the respective optional elements does not need to be limited, and the lower limit may be 0%.

(Hot Rolling Process)

In the hot rolling process, the slab is heated to a predetermined temperature (for instance, 1100 to 1400° C.), and then, is subjected to hot rolling in order to obtain a hot rolled steel sheet. In the hot rolling process, for instance, the silicon steel material (slab) after the casting process is heated, is rough-rolled, and then, is final-rolled in order to obtain the hot rolled steel sheet with a predetermined thickness, e.g. 1.8 to 3.5 mm. After finishing the final rolling, the hot rolled steel sheet is coiled at a predetermined temperature.

Since the inhibitor intensity as MnS is not necessarily needed, it is preferable that the slab heating temperature is 1100 to 1280° C. from the productivity standpoint.

Herein, in the hot rolling process, by applying the thermal gradient within the above range along the width direction or the longitudinal direction of steel strip, it is possible to make the crystal structure, the crystal orientation, or the precipitates have the non-uniformity depending on the position in plane of the steel sheet. Thereby, it is possible to make the secondary recrystallized grain grow anisotropically in the secondary recrystallization process which is the downstream process, and possible to favorably control the shape of the subgrain important for the present embodiment to be anisotropic in plane. For instance, by applying the thermal gradient along the transverse direction during the slab heating, it is possible to refine the precipitates in the higher temperature area, possible to enhance the inhibitor ability in the higher temperature area, and thereby, possible to induce the preferential grain growth from the lower temperature area toward the higher temperature area during the secondary recrystallization.

(Hot Band Annealing Process)

In the hot band annealing process, the hot rolled steel sheet after the hot rolling process is annealed under predetermined conditions (for instance, 750 to 1200° C. for 30 seconds to 10 minutes) in order to obtain a hot band annealed sheet.

Herein, in the hot band annealing process, by applying the thermal gradient within the above range along the width direction or the longitudinal direction of steel strip, it is possible to make the crystal structure, the crystal orientation, or the precipitates have the non-uniformity depending on the position in plane of the steel sheet. Thereby, it is possible to make the secondary recrystallized grain grow anisotropically in the secondary recrystallization process which is the downstream process, and possible to favorably control the shape of the subgrain important for the present embodiment to be anisotropic in plane. For instance, by applying the thermal gradient along the transverse direction during the hot band annealing, it is possible to refine the precipitates in the higher temperature area, possible to enhance the inhibitor ability in the higher temperature area, and thereby, possible to induce the preferential grain growth from the lower temperature area toward the higher temperature area during the secondary recrystallization.

(Cold Rolling Process)

In the cold rolling process, the hot band annealed sheet after the hot band annealing process is cold-rolled once or is cold-rolled plural times (two times or more) with an annealing (intermediate annealing) (for instance, 80 to 95% of total cold reduction) in order to obtain a cold rolled steel sheet with a thickness, e.g. 0.10 to 0.50 mm.

(Decarburization Annealing Process)

In the decarburization annealing process, the cold rolled steel sheet after the cold rolling process is subjected to the decarburization annealing (for instance, 700 to 900° C. for 1 to 3 minutes) in order to obtain a decarburization annealed steel sheet which is primary-recrystallized. By conducting the decarburization annealing for the cold rolled steel sheet, C included in the cold rolled steel sheet is removed. In order to remove “C” included in the cold rolled steel sheet, it is preferable that the decarburization annealing is conducted in moist atmosphere.

In the method for producing the grain oriented electrical steel sheet according to the present embodiment, it is preferable to control a grain size of primary recrystallized grain of the decarburization annealed steel sheet to 24 μm or smaller. By refining the grain size of primary recrystallized grain, it is possible to favorably control the starting temperature of the secondary recrystallization to be lower temperature.

For instance, by controlling the conditions in the hot rolling or the hot band annealing, or by controlling the temperature for decarburization annealing to be lower temperature as necessary, it is possible to decrease the grain size of primary recrystallized grain. In addition, by the pinning effect of the carbides, the carbonitrides, and the like of the Nb group element which is included in the slab, it is possible to decrease the grain size of primary recrystallized grain.

Herein, since the amount of oxidation caused by the decarburization annealing and the state of surface oxidized layer affect the formation of the intermediate layer (glass film), the conditions may be appropriately adjusted using the conventional technique in order to obtain the effects of the present embodiment.

Although the Nb group element may be included as the elements which facilitate the switching, the Nb group element is included at present process in the state such as the carbides, the carbonitrides, the solid-soluted elements, and the like, and influences the refinement of the grain size of primary recrystallized grain. The grain size of primary recrystallized grain is preferably 23 μm or smaller, more preferably 20 μm or smaller, and further more preferably 18 μm or smaller. The grain size of primary recrystallized grain may be 8 μm or larger, and may be 12 μm or larger.

Herein, in the decarburization annealing process, by applying the thermal gradient within the above range or by applying the difference in the decarburization behavior along the width direction or the longitudinal direction of steel strip, it is possible to make the crystal structure, the crystal orientation, or the precipitates have the non-uniformity depending on the position in plane of the steel sheet. Thereby, it is possible to make the secondary recrystallized grain grow anisotropically in the secondary recrystallization process which is the downstream process, and possible to favorably control the shape of the subgrain important for the present embodiment to be anisotropic in plane. For instance, by applying the thermal gradient along the transverse direction during the slab heating, it is possible to refine the grain size of primary recrystallized grain in the lower temperature area, possible to increase the driving force of the secondary recrystallization, possible to antecedently start the secondary recrystallization in the lower temperature area, and thereby, possible to induce the preferential grain growth from the lower temperature area toward the higher temperature area during the secondary recrystallization.

(Nitridation)

The nitridation is conducted in order to control the inhibitor intensity for the secondary recrystallization. In the nitridation, the nitrogen content of the steel sheet may be made increase to 40 to 300 ppm at appropriate timing from starting the decarburization annealing to starting the secondary recrystallization in the final annealing. For instance, the nitridation may be a treatment of annealing the steel sheet in an atmosphere containing a gas having a nitriding ability such as ammonia, a treatment of final-annealing the decarburization annealed steel sheet being applied an annealing separator containing a powder having a nitriding ability such as MnN, and the like.

When the slab includes the Nb group element within the above range, the nitrides of the Nb group element formed by the nitridation act as an inhibitor whose ability inhibiting the grain growth disappears at relatively lower temperature, and thus, the secondary recrystallization starts from lower temperature as compared with the conventional techniques. It seems that the nitrides are effective in selecting the nucleation of the secondary recrystallized grain, and thereby, achieve high magnetic flux density. In addition, AlN is formed by the nitridation, and the AlN acts as an inhibitor whose ability inhibiting the grain growth maintains up to relatively higher temperature. In order to obtain these effects, the nitrogen content after the nitridation is preferably 130 to 250 ppm, and is more preferably 150 to 200 ppm.

Herein, in the nitridation, by applying the difference in the nitrogen content within the above range along the width direction or the longitudinal direction of steel strip, it is possible to make the inhibitor intensity have the non-uniformity depending on the position in plane of the steel sheet. Thereby, it is possible to make the secondary recrystallized grain grow anisotropically in the secondary recrystallization process which is the downstream process, and possible to favorably control the shape of the subgrain important for the present embodiment to be anisotropic in plane. For instance, by applying the difference in the nitrogen content along the transverse direction, it is possible to enhance the inhibitor ability in highly nitrided area, and thereby, possible to induce the preferential grain growth from lowly nitrided area toward highly nitrided area during the secondary recrystallization.

(Annealing Separator Applying Process)

In the annealing separator applying process, the decarburization annealed steel sheet is applied an annealing separator to. For instance, as the annealing separator, it is possible to use an annealing separator mainly including MgO, an annealing separator mainly including alumina, and the like.

Herein, when the annealing separator mainly including MgO is used, the forsterite film (the layer mainly including $Mg_2SiO_4$) tends to be formed as the intermediate layer during the final annealing. When the annealing separator mainly including alumina is used, the oxide layer (the layer mainly including $SiO_2$) tends to be formed as the intermediate layer during the final annealing. These intermediate layers may be removed according to the necessity.

The decarburization annealed steel sheet after applying the annealing separator is coiled and is final-annealed in the subsequent final annealing process.

(Final Annealing Process)

In the final annealing process, the decarburization annealed steel sheet after applying the annealing separator is final-annealed so that the secondary recrystallization occurs. In the process, the secondary recrystallization proceeds under conditions such that the grain growth of the primary recrystallized grain is suppressed by the inhibitor. Thereby, the grain having the {110}<001> orientation is preferentially grown, and the magnetic flux density is drastically improved.

The final annealing is important for controlling the switching which is the feature of the present embodiment. In the present embodiment, the angle $\phi$ is controlled based on the following four conditions (A) to (C-2) in the final annealing.

Herein, in the explanation of the final annealing process, "the total amount of the Nb group element" represents the total amount of the Nb group element included in the steel sheet just before the final annealing (the decarburization annealed steel sheet). Specifically, the chemical composition of the steel sheet just before the final annealing influences the conditions of the final annealing, and the chemical composition after the final annealing or after the purification annealing (for instance, the chemical composition of the grain oriented electrical steel sheet (final annealed sheet)) is unrelated.

(A) In the heating stage of the final annealing, when PA is defined as $PH_2O/PH_2$ regarding the atmosphere in the temperature range of 700 to 800° C., PA: 0.030 to 5.0.

(B) In the heating stage of the final annealing, when PB is defined as $PH_2O/PH_2$ regarding the atmosphere in the temperature range of 900 to 950° C., PB: 0.010 to 0.20.

(C-1) In the heating stage of the final annealing, when PC1 is defined as $PH_2O/PH_2$ regarding the atmosphere in the temperature range of 950 to 1000° C., PC1: 0.0050 to 0.10.

(C-2) In the heating stage of the final annealing, when PC2 is defined as $PH_2O/PH_2$ regarding the atmosphere in the temperature range of 1000 to 1050° C., PC2: 0.0010 to 0.050.

Herein, when the total amount of the Nb group element is 0.0030 to 0.030%, at least one of the conditions (A) to (C-2) may be satisfied.

When the total amount of the Nb group element is not 0.0030 to 0.030%, the conditions (A) may be satisfied, and at least one of the conditions (A) and (B) to (C-2) may be satisfied.

In regard to the conditions (A) to (C-2), when the Nb group element within the above range is included, due to the effect of suppressing the recovery and the recrystallization which is derived from the Nb group element, the two factors of "starting the secondary recrystallization from lower temperature" and "maintaining the secondary recrystallization up to higher temperature" are potent enough. As a result, the controlling conditions for obtaining the effects of the present embodiment are relaxed.

The PA is preferably 0.10 or more and is more preferably 0.30 or more. The PA is preferably 1.0 or less and is more preferably 0.60 or less.

The PB is preferably 0.020 or more and is more preferably 0.040 or more. The PB is preferably 0.10 or less and is more preferably 0.070 or less.

The PC1 is preferably 0.010 or more and is more preferably 0.020 or more. The PC1 is preferably 0.070 or less and is more preferably 0.050 or less.

The PC2 is preferably 0.002 or more and is more preferably 0.0050 or more. The PC2 is preferably 0.030 or less and is more preferably 0.020 or less.

The details of occurrence mechanism of the switching are not clear at present. However, as a result of observing the secondary recrystallization behavior and of considering the production conditions for favorably controlling the switching, it seems that the two factors of "starting the secondary recrystallization from lower temperature" and "maintaining the secondary recrystallization up to higher temperature" are important.

Limitation reasons of the above (A) to (C-2) are explained based on the above two factors. In the following description, the mechanism includes a presumption.

The condition (A) is the condition for the temperature range which is sufficiently lower that the temperature where the secondary recrystallization occurs. The condition (A) does not directly influence the phenomena recognized as the secondary recrystallization. However, the above temperature range corresponds to the temperature where the surface of the steel sheet is oxidized by the water which is brought in from the annealing separator applied to the surface of the steel sheet. In other words, the above temperature range influences the formation of the primary layer (intermediate layer). The condition (A) is important for controlling the formation of the primary layer, and thereby, enabling the subsequent "maintaining the secondary recrystallization up to higher temperature". By controlling the atmosphere in the above temperature range to be the above condition, the primary layer becomes dense, and thus, acts as the barrier to prevent the constituent elements (for instance, Al, N, and the like) of the inhibitor from being released outside the system in the stage where the secondary recrystallization occurs. Thereby, it is possible to maintain the secondary recrystallization up to higher temperature, and possible to sufficiently induce the switching.

The condition (B) is the condition for the temperature range which corresponds to the nucleation stage of the recrystallization nuclei in the secondary recrystallization. By controlling the atmosphere in the above temperature range to be the above condition, the secondary recrystallized grain grows with being rate-limited by the dissolution of the inhibitor in the stage of the grain growth. In seems that the condition (B) promotes the dissolution of the inhibitor near the surface of the steel sheet in particular and influences increasing the secondary recrystallization nuclei. For instance, it is known that the primary recrystallized grains having the preferred crystal orientation for secondary recrystallization are sufficiently included near the surface of the steel sheet. In the present embodiment, by decreasing the inhibitor intensity only near the surface of the steel sheet in the lower temperature range of 900 to 950° C., it seems that the following secondary recrystallization is made to antecedently start (in the lower temperature) during the heating stage. Moreover, in the above case, since the secondary recrystallized grains are sufficiently formed, it seems that the switching frequency increases in an initial stage of the grain growth of secondary recrystallized grain.

The conditions (C-1) and (C-2) are the conditions for the temperature range where the secondary recrystallization starts and the grain grows. The conditions (C-1) and (C-2) influence the control of the inhibitor intensity in the stage where the secondary recrystallized grain grows. By controlling the atmosphere in the above temperature range to be the above conditions, the secondary recrystallized grain grows with being rate-limited by the dissolution of the inhibitor in each temperature range. Although the details are described later, by the conditions, dislocations are efficiently piled up in front of the grain boundary which is located toward the direction growing the secondary recrystallized grain. Thereby, it is possible to increase the occurrence frequency of the switching, and possible to maintain the occurrence of the switching. As explained above, the temperature range is divided into two range as the conditions (C-1) and (C-2) in order to control the atmosphere, because the appropriate atmosphere differs depending on the temperature range.

In the producing method according to the present embodiment, when the Nb group element is utilized, it is possible to obtain the grain oriented electrical steel sheet satisfying the conditions with respect to the switching according to the present embodiment, in so far as at least one of the conditions (A) to (C-2) is satisfied. In other words, by controlling so as to increase the switching frequency in the initial stage of secondary recrystallization, the secondary recrystallized grain is grown with conserving the misorientation derived from the switching, the effect is maintained till the final stage, and finally, the switching frequency increases. Alternatively, even when the switching does not occur sufficiently in the initial stage of secondary recrystallization, it is possible to finally increase the switching frequency by making the sufficient dislocations pile up toward the direction growing the grain in the growing stage of secondary recrystallization and thereby making the switching newly occur. Needless to explain, it is preferable to satisfy all conditions (A) to (C-2) even when the Nb group element is utilized. In other word, it is optimal to increase the switching frequency in the initial stage of secondary recrystallization and to newly induce the switching even in the middle and final stages of secondary recrystallization.

Based on the method for producing the grain oriented electrical steel sheet according to the present embodiment mentioned above, the secondary recrystallized grain may be controlled to be the state of being finely divided into the small domains where each crystal orientation is slightly different. Specifically, based on the above method, the boundary which satisfies the boundary condition BA and which does not satisfy the boundary condition BB, in addition to the boundary which satisfies the boundary condition BB, may be elaborated in the grain oriented electrical steel sheet as described in the first embodiment.

Next, preferred production conditions for the producing method according to the present embodiment are described.

In the producing method according to the present embodiment, in the final annealing process, when the total amount of Nb, V, Mo, Ta, and W in the chemical composition of the slab is not 0.0030 to 0.030%, in the heating stage, a holding time in 1000 to 1050° C. is preferably 200 to 1500 minutes.

In the same way, in the producing method according to the present embodiment, in the final annealing process, when the total amount of Nb, V, Mo, Ta, and W in the chemical composition of the slab is 0.0030 to 0.030%, in the heating stage, a holding time in 1000 to 1050° C. is preferably 100 to 1500 minutes.

Hereinafter, the above production condition is referred to as the condition (E-1).

(E-1) In the heating stage of the final annealing, TE1 is defined as a holding time (total detention time) in the temperature range of 1000 to 1050° C.

When the total amount of the Nb group element is 0.0030 to 0.030%,

TE1: 100 minutes or longer.

When the total amount of the Nb group element is not the above range,

TE1: 200 minutes or longer.

When the total amount of the Nb group element is 0.0030 to 0.030%, the TE1 is preferably 150 minutes or longer, and more preferably 300 minutes or longer. The TE1 is preferably 1500 minutes or shorter, and more preferably 900 minutes or shorter. When the total amount of the Nb group element is not the above range, the TE1 is preferably 300 minutes or longer, and more preferably 600 minutes or longer. The TE1 is preferably 1500 minutes or shorter, and more preferably 900 minutes or shorter.

The condition (E-1) is a factor for controlling the elongation direction of the subboundary in the plane of the steel sheet where the switching occurs. By sufficiently conducting the holding in 1000 to 1050° C., it is possible to increase the switching frequency in the rolling direction. It seems that the morphology (for instance, array and shape) of the precipitates including the inhibitor in the steel is changed during the holding in the above temperature range, and thereby, the switching frequency increases in the rolling direction.

Since the steel sheet being subjected to the final annealing has been hot-rolled and cold-rolled, the array and shape of the precipitates (in particular, MnS) in the steel show anisotropic in the plane of the steel sheet, and may tend to be uneven in the rolling direction. The details are not clear, but it seems that the holding in the above temperature range changes the unevenness in the rolling direction as to the morphology of the above precipitates, and influences the direction in which the subboundary tends to be elongate in the plane of the steel sheet during the growth of the secondary recrystallized grain. Specifically, when the steel sheet is held at relatively higher temperature such as 1000 to 1050° C., the above unevenness in the rolling direction disappears. Thereby, the tendency such that the subboundary elongates in the rolling direction decreases, and the tendency such that the subboundary elongates in the transverse direction increases. As a result, it seems that the frequency of the subboundary detected in the rolling direction increases.

Herein, when the total amount of the Nb group element is 0.0030 to 0.030%, the existence frequency of the subboundary in itself is high, and thus, it is possible to obtain the effects of the present embodiment even when the holding time of the condition (E-1) is insufficient.

By the producing method including the above condition (E-1), it is possible to control the grain size of the subgrain in the rolling direction to be smaller than the grain size of the secondary recrystallized grain in the rolling direction. Specifically, by simultaneously controlling the above condition (E-1), it is possible to control the grain size $RA_L$ and the grain size $RB_L$ to satisfy $1.15 \leq RB_L \div RA_L$ in the grain oriented electrical steel sheet as described in the second embodiment.

Moreover, in the producing method according to the present embodiment, in the final annealing process, when the total amount of Nb, V, Mo, Ta, and W in the chemical composition of the slab is not 0.0030 to 0.030%, in the heating stage, a holding time in 950 to 1000° C. is preferably 200 to 1500 minutes.

In the same way, in the producing method according to the present embodiment, in the final annealing process, when the total amount of Nb, V, Mo, Ta, and W in the chemical composition of the slab is 0.0030 to 0.030%, in the heating stage, a holding time in 950 to 1000° C. is preferably 100 to 1500 minutes.

Hereinafter, the above production condition is referred to as the condition (E-2).

(E-2) In the heating stage of the final annealing, TE2 is defined as a holding time (total detention time) in the temperature range of 950 to 1000° C.

When the total amount of the Nb group element is 0.0030 to 0.030%,

TE2: 100 minutes or longer.

When the total amount of the Nb group element is not the above range,

TE2: 200 minutes or longer.

When the total amount of the Nb group element is 0.0030 to 0.030%, the TE2 is preferably 150 minutes or longer, and more preferably 300 minutes or longer. The TE2 is preferably 1500 minutes or shorter, and more preferably 900 minutes or shorter.

When the total amount of the Nb group element is not the above range, the TE2 is preferably 300 minutes or longer, and more preferably 600 minutes or longer. The TE2 is preferably 1500 minutes or shorter, and more preferably 900 minutes or shorter.

The condition (E-2) is a factor for controlling the elongation direction of the subboundary in the plane of the steel sheet where the switching occurs. By sufficiently conducting the holding in 950 to 1000° C., it is possible to increase the switching frequency in the transverse direction. It seems that the morphology (for instance, array and shape) of the precipitates including the inhibitor in the steel is changed during the holding in the above temperature range, and thereby, the switching frequency increases in the transverse direction.

Since the steel sheet being subjected to the final annealing has been hot-rolled and cold-rolled, the array and shape of the precipitates (in particular, MnS) in the steel show anisotropic in the plane of the steel sheet, and may tend to be uneven in the rolling direction. The details are not clear, but it seems that the holding in the above temperature range changes the unevenness in the rolling direction as to the morphology of the above precipitates, and influences the direction in which the subboundary tends to be elongate in the plane of the steel sheet during the growth of the secondary recrystallized grain. Specifically, when the steel sheet is held at relatively lower temperature such as 950 to 1000° C., the unevenness in the rolling direction as to the morphology of the precipitates in the steel develops. Thereby, the tendency such that the subboundary elongates in the transverse direction decreases, and the tendency such that the subboundary elongates in the rolling direction increases. As a result, it seems that the frequency of the subboundary detected in the transverse direction increases.

Herein, when the total amount of the Nb group element is 0.0030 to 0.030%, the existence frequency of the subboundary in itself is high, and thus, it is possible to obtain the effects of the present embodiment even when the holding time of the condition (E-2) is insufficient.

By the producing method including the above condition (E-2), it is possible to control the grain size of the subgrain in the transverse direction to be smaller than the grain size of the secondary recrystallized grain in the transverse direction. Specifically, by simultaneously controlling the above condition (E-2), it is possible to control the grain size $RA_C$ and the grain size $RB_C$ to satisfy $1.15 \le RB_C \div RA_C$ in the grain oriented electrical steel sheet as described in the third embodiment.

Moreover, in the producing method according to the present embodiment, in the heating stage of the final annealing, it is preferable that the secondary recrystallization is proceeded with giving the thermal gradient of more than 0.5° C./cm in a border area between primary recrystallized area and secondary recrystallized area in the steel sheet. For instance, it is preferable to give the above thermal gradient to the steel sheet in which the secondary recrystallized grain grows in progress in the temperature range of 800 to 1150° C. in the heating stage of the final annealing.

Moreover, it is preferable that the direction to give the above thermal gradient is the transverse direction C.

The final annealing process can be effectively utilized as a process for controlling the shape of the subgrain to be anisotropic in plane. For instance, when the coiled steel sheet is heated after placing in a box type annealing furnace, the position and arrangement of the heating device and the temperature distribution in the annealing furnace may be controlled so as to make the outside and inside of the coil have a sufficient temperature difference. Alternatively, the temperature distribution may be purposely applied to the coil being subjected to the annealing by actively heating only part of the coil with arranging induction heating, high frequency heating, electric heating, and the like.

The method of giving the thermal gradient is not particularly limited, and a known method may be applied. By giving the thermal gradient to the steel sheet, the secondary recrystallized grain having the ideal orientation is nucleated from the area where the secondary recrystallization is likely to start antecedently in the coil, and the secondary recrystallized grain grows anisotropically due to the thermal gradient. For instance, it is possible to grow the secondary recrystallized grain throughout the entire coil. Thus, it is possible to favorably control the anisotropy in plane as to the shape of the subgrain.

In a case where the coiled steel sheet is heated, the coil edge tends to be antecedently heated. Thus, it is preferable that the secondary recrystallized grain is grown by giving the thermal gradient from a widthwise edge (edge in the transverse direction of the steel sheet) toward the other edge.

When considering that the desired magnetic characteristics are obtained by controlling to the Goss orientation, and when considering the industrial productivity, the secondary recrystallized grain may be grown with giving the thermal gradient of more than 0.5° C./cm (preferably, 0.7° C./cm or more) in the final annealing. It is preferable that the direction to give the above thermal gradient is the transverse direction C. The upper limit of the thermal gradient is not particularly limited, but it is preferable that the secondary recrystallized grain is continuously grown under the condition such that the thermal gradient is maintained. When considering the heat conduction of the steel sheet and the growth rate of the secondary recrystallized grain, the upper limit of the thermal gradient may be 10° C./cm for instance in so far as the general producing method.

By the producing method including the above condition regarding the thermal gradient, it is possible to control the grain size of the subgrain in the rolling direction to be smaller than the grain size of the subgrain in the transverse direction. Specifically, by simultaneously controlling the above condition regarding the thermal gradient, it is possible to control the grain size $RA_L$ and the grain size $RA_C$ to satisfy $1.15 \le RA_C \div RA_L$ in the grain oriented electrical steel sheet as described in the fourth embodiment.

In addition, in the method for producing the grain oriented electrical steel sheet according to the present embodiment, the deviation angle α may be controlled by favorably controlling the following conditions in the final annealing.

(A') In the heating stage of the final annealing, when PA' is defined as $PH_2O/PH_2$ regarding the atmosphere in the temperature range of 700 to 800° C., PA': 0.10 to 1.0.

(B') In the heating stage of the final annealing, when PB' is defined as $PH_2O/PH_2$ regarding the atmosphere in the temperature range of 900 to 950° C., PB': 0.020 to 0.10.

(D) In the heating stage of the final annealing, when TD is defined as a holding time in the temperature range of 850 to 950° C., TD: 120 to 600 minutes.

Herein, when the total amount of the Nb group element is 0.0030 to 0.030%, at least one of the conditions (A') and (B') may be satisfied, and the conditions (D) may be satisfied.

When the total amount of the Nb group element is not 0.0030 to 0.030%, the three conditions (A'), (B'), and (D) may be satisfied.

In regard to the conditions (A') and (B'), when the Nb group element within the above range is included, due to the effect of suppressing the recovery and the recrystallization which is derived from the Nb group element, the two factors of "starting the secondary recrystallization from lower temperature" and "maintaining the secondary recrystallization up to higher temperature" are potent enough. As a result, the controlling conditions for obtaining the effects of the present embodiment are relaxed.

The PA' is preferably 0.30 or more, and is preferably 0.60 or less.

The PB' is preferably 0.040 or more, and is preferably 0.070 or less.

The TD is preferably 180 minutes or longer, and is more preferably 240 or longer. The TD is preferably 480 minutes or shorter, and is more preferably 360 or shorter.

Limitation reasons of the above (A'), (B'), and (D) are explained. In the following description, the mechanism includes a presumption.

The condition (A') is the condition for the temperature range which is sufficiently lower that the temperature where the secondary recrystallization occurs. The condition (A') does not directly influence the phenomena recognized as the secondary recrystallization. However, the above temperature range corresponds to the temperature where the surface of the steel sheet is oxidized by the water which is brought in from the annealing separator applied to the surface of the steel sheet. In other words, the above temperature range influences the formation of the primary layer (intermediate layer). The condition (A') is important for controlling the formation of the primary layer, and thereby, enabling the subsequent "maintaining the secondary recrystallization up to higher temperature". By controlling the atmosphere in the above temperature range to be the above condition, the primary layer becomes dense, and thus, acts as the barrier to prevent the constituent elements (for instance, Al, N, and the like) of the inhibitor from being released outside the system in the stage where the secondary recrystallization occurs. Thereby, it is possible to maintain the secondary recrystallization up to higher temperature, and possible to sufficiently induce the switching.

The condition (B') is the condition for the temperature range which corresponds to the nucleation stage of the recrystallization nuclei in the secondary recrystallization. By controlling the atmosphere in the above temperature range to be the above condition, the secondary recrystallized grain grows with being rate-limited by the dissolution of the inhibitor in the stage of the grain growth. In seems that the condition (B') promotes the dissolution of the inhibitor near the surface of the steel sheet in particular and influences increasing the secondary recrystallization nuclei. For instance, it is known that the primary recrystallized grains having the preferred crystal orientation for secondary recrystallization are sufficiently included near the surface of the steel sheet. In the present embodiment, by decreasing the inhibitor intensity only near the surface of the steel sheet in the lower temperature range of 900 to 950° C., it seems that the following secondary recrystallization is made to antecedently start (in the lower temperature) during the heating stage. Moreover, in the above case, since the secondary recrystallized grains are sufficiently formed, it seems that the switching frequency increases in an initial stage of the grain growth of secondary recrystallized grain.

The temperature range of the condition (D) overlaps that of the condition (B'). The condition (D) is the condition for the temperature range which corresponds to the nucleating stage in the secondary recrystallization.

The hold in the temperature range is important for the favorable occurrence of the secondary recrystallization. However, when the holding time is excessive, the primary recrystallized grain tends to be grow. For instance, when the grain size of the primary recrystallized grain becomes excessively large, the dislocations tend not to be piled up (the dislocations are hardly piled up in front of the grain boundary which is located toward the direction growing the secondary recrystallized grain), and thus, the driving force of inducing the switching becomes insufficient. When the holding time in the above temperature range is controlled to 600 minutes or shorter, it is possible to initiate the secondary recrystallization under conditions such that the primary recrystallized grains are still fine. Thus, it is possible to increase the selectivity of the specific deviation angle.

In the present embodiment, the starting temperature of the secondary recrystallization is controlling to be lower temperature by refining the primary recrystallized grain or by utilizing the Nb group element, and thereby, the switching regarding the deviation angle α is sufficiently induced and maintained.

In the producing method according to the present embodiment, when the Nb group element is utilized, it is possible to obtain the grain oriented electrical steel sheet satisfying the conditions with respect to the switching according to the present embodiment, in so far as at least one of the conditions (A') and (B') is selectively satisfied without satisfying both. In other words, by controlling so as to increase the switching frequency as to the specific deviation angle (in a case of the present embodiment, the deviation angle α) in the initial stage of secondary recrystallization, the secondary recrystallized grain is grown with conserving the misorientation derived from the switching, the effect is maintained till the final stage, and finally, the switching frequency increases. Moreover, when the above effect is maintained till the final stage and the switching newly occurs, the switching with large orientation change regarding the deviation angle α occurs. As a result, the switching frequency regarding the deviation angle α increases finally. Needless to explain, it is optimal to satisfy both conditions (A') and (B') even when the Nb group element is utilized.

Based on the method for producing the grain oriented electrical steel sheet according to the present embodiment mentioned above, the secondary recrystallized grain may be controlled to be the state of being finely divided into the small domains where each deviation angle α is slightly different. Specifically, based on the above method, the boundary which satisfies the boundary condition BC and which does not satisfy the boundary condition BB, in addition to the boundary which satisfies the boundary condition BB, may be elaborated in the grain oriented electrical steel sheet as described in the fifth embodiment.

Next, production conditions for favorably controlling the deviation angle α are described.

As the production conditions for controlling the deviation angle α, in the final annealing process, when the total amount of Nb, V, Mo, Ta, and W in the chemical composition of the slab is not 0.0030 to 0.030%, in the heating stage, a holding time in 1000 to 1050° C. is preferably 300 to 1500 minutes.

In the same way, as the production conditions for controlling the deviation angle α, in the final annealing process, when the total amount of Nb, V, Mo, Ta, and W in the chemical composition of the slab is 0.0030 to 0.030%, in the heating stage, a holding time in 1000 to 1050° C. is preferably 150 to 900 minutes.

Hereinafter, the above production condition is referred to as the condition (E-1').

(E-1') In the heating stage of the final annealing, TE1' is defined as a holding time (total detention time) in the temperature range of 1000 to 1050° C.

When the total amount of the Nb group element is 0.0030 to 0.030%,

TE1': 150 minutes or longer.

When the total amount of the Nb group element is not the above range,

TE1': 300 minutes or longer.

When the total amount of the Nb group element is 0.0030 to 0.030%, the TE1' is preferably 200 minutes or longer, and more preferably 300 minutes or longer. The TE1' is preferably 900 minutes or shorter, and more preferably 600 minutes or shorter. When the total amount of the Nb group element is not the above range, the TE1' is preferably 360 minutes or longer, and more preferably 600 minutes or longer. The TE1' is preferably 1500 minutes or shorter, and more preferably 900 minutes or shorter.

The condition (E-1') is a factor for controlling the elongation direction of the α subboundary in the plane of the steel sheet where the switching occurs. By sufficiently conducting the holding in 1000 to 1050° C., it is possible to increase the switching frequency in the rolling direction. It seems that the morphology (for instance, array and shape) of the precipitates including the inhibitor in the steel is changed during the holding in the above temperature range, and thereby, the switching frequency increases in the rolling direction.

Since the steel sheet being subjected to the final annealing has been hot-rolled and cold-rolled, the array and shape of the precipitates (in particular, MnS) in the steel show anisotropic in the plane of the steel sheet, and may tend to be uneven in the rolling direction. The details are not clear, but it seems that the holding in the above temperature range changes the unevenness in the rolling direction as to the morphology of the above precipitates, and influences the direction in which the α subboundary tends to be elongate in the plane of the steel sheet during the growth of the secondary recrystallized grain. Specifically, when the steel sheet is held at relatively higher temperature such as 1000 to 1050° C., the unevenness in the rolling direction as to the morphology of the precipitates in the steel disappears. Thereby, the tendency such that the α subboundary elongates in the rolling direction decreases, and the tendency such that the α subboundary elongates in the transverse direction increases. As a result, it seems that the frequency of the α subboundary detected in the rolling direction increases.

Herein, when the total amount of the Nb group element is 0.0030 to 0.030%, the existence frequency of the α subboundary in itself is high, and thus, it is possible to obtain the effects of the present embodiment even when the holding time of the condition (E-1') is insufficient.

By the producing method including the above condition (E-1'), it is possible to control the grain size of the α subgrain in the rolling direction to be smaller than the grain size of the secondary recrystallized grain in the rolling direction. Specifically, by simultaneously controlling the above condition (E-1'), it is possible to control the grain size $RC_L$ and the grain size $RB_L$ to satisfy $1.10 \leq RB_L \div RC_L$ in the grain oriented electrical steel sheet as described in the sixth embodiment.

Moreover, as the production conditions for controlling the deviation angle α, in the final annealing process, when the total amount of Nb, V, Mo, Ta, and W in the chemical composition of the slab is not 0.0030 to 0.030%, in the heating stage, a holding time in 950 to 1000° C. is preferably 300 to 1500 minutes.

In the same way, as the production conditions for controlling the deviation angle α, in the final annealing process, when the total amount of Nb, V, Mo, Ta, and W in the chemical composition of the slab is 0.0030 to 0.030%, in the heating stage, a holding time in 950 to 1000° C. is preferably 150 to 900 minutes.

Hereinafter, the above production condition is referred to as the condition (E-2').

(E-2') In the heating stage of the final annealing, TE2' is defined as a holding time (total detention time) in the temperature range of 950 to 1000° C.

When the total amount of the Nb group element is 0.0030 to 0.030%,

TE2': 150 minutes or longer.

When the total amount of the Nb group element is not the above range,

TE2': 300 minutes or longer.

When the total amount of the Nb group element is 0.0030 to 0.030%, the TE2' is preferably 200 minutes or longer, and more preferably 300 minutes or longer. The TE2' is preferably 900 minutes or shorter, and more preferably 600 minutes or shorter.

When the total amount of the Nb group element is not the above range, the TE2' is preferably 360 minutes or longer, and more preferably 600 minutes or longer. The TE2' is preferably 1500 minutes or shorter, and more preferably 900 minutes or shorter.

The condition (E-2') is a factor for controlling the elongation direction of the α subboundary in the plane of the steel sheet where the switching occurs. By sufficiently conducting the holding in 950 to 1000° C., it is possible to increase the switching frequency in the transverse direction. It seems that the morphology (for instance, array and shape) of the precipitates including the inhibitor in the steel is changed during the holding in the above temperature range, and thereby, the switching frequency increases in the transverse direction.

Since the steel sheet being subjected to the final annealing has been hot-rolled and cold-rolled, the array and shape of the precipitates (in particular, MnS) in the steel show anisotropic in the plane of the steel sheet, and may tend to be uneven in the rolling direction. The details are not clear, but it seems that the holding in the above temperature range changes the unevenness in the rolling direction as to the morphology of the above precipitates, and influences the direction in which the α subboundary tends to be elongate in the plane of the steel sheet during the growth of the secondary recrystallized grain. Specifically, when the steel sheet is held at relatively lower temperature such as 950 to 1000° C., the unevenness in the rolling direction as to the morphology of the precipitates in the steel develops. Thereby, the tendency such that the α subboundary elongates in the transverse direction decreases, and the tendency such that the α subboundary elongates in the rolling direction increases. As a result, it seems that the frequency of the α subboundary detected in the transverse direction increases.

Herein, when the total amount of the Nb group element is 0.0030 to 0.030%, the existence frequency of the α subboundary in itself is high, and thus, it is possible to obtain the effects of the present embodiment even when the holding time of the condition (E-2') is insufficient.

By the producing method including the above condition (E-2'), it is possible to control the grain size of the α subgrain in the transverse direction to be smaller than the grain size of the secondary recrystallized grain in the transverse direction. Specifically, by simultaneously controlling the above condition (E-2'), it is possible to control the grain size $RC_C$ and the grain size $RB_C$ to satisfy $1.10 \leq RB_C \div RC_C$ in the grain oriented electrical steel sheet as described in the seventh embodiment.

Moreover, as the production conditions for controlling the deviation angle α, in the heating stage of the final annealing, it is preferable that the secondary recrystallization is proceeded with giving the thermal gradient of more than 0.5° C./cm in a border area between primary recrystallized area and secondary recrystallized area in the steel sheet. For instance, it is preferable to give the above thermal gradient to the steel sheet in which the secondary recrystallized grain grows in progress in the temperature range of 800 to 1150° C. in the heating stage of the final annealing.

Moreover, it is preferable that the direction to give the above thermal gradient is the transverse direction C.

The final annealing process can be effectively utilized as a process for controlling the shape of the α subgrain to be anisotropic in plane. For instance, when the coiled steel sheet is heated after placing in a box type annealing furnace, the position and arrangement of the heating device and the temperature distribution in the annealing furnace may be controlled so as to make the outside and inside of the coil have a sufficient temperature difference. Alternatively, the temperature distribution may be purposely applied to the coil being subjected to the annealing by actively heating only part of the coil with arranging induction heating, high frequency heating, electric heating, and the like.

The method of giving the thermal gradient is not particularly limited, and a known method may be applied. By giving the thermal gradient to the steel sheet, the secondary recrystallized grain having the ideal orientation is nucleated from the area where the secondary recrystallization is likely to start antecedently in the coil, and the secondary recrystallized grain grows anisotropically due to the thermal gradient. For instance, it is possible to grow the secondary recrystallized grain throughout the entire coil. Thus, it is possible to favorably control the anisotropy in plane as to the shape of the α subgrain.

In a case where the coiled steel sheet is heated, the coil edge tends to be antecedently heated. Thus, it is preferable that the secondary recrystallized grain is grown by giving the thermal gradient from a widthwise edge (edge in the transverse direction of the steel sheet) toward the other edge.

When considering that the desired magnetic characteristics are obtained by controlling to the Goss orientation, and when considering the industrial productivity, the secondary recrystallized grain may be grown with giving the thermal gradient of more than 0.5° C./cm (preferably, 0.7° C./cm or more) in the final annealing. It is preferable that the direction to give the above thermal gradient is the transverse direction C. The upper limit of the thermal gradient is not particularly limited, but it is preferable that the secondary recrystallized grain is continuously grown under the condition such that the thermal gradient is maintained. When considering the heat conduction of the steel sheet and the growth rate of the secondary recrystallized grain, the upper limit of the thermal gradient may be 10° C./cm for instance in so far as the general producing method.

By the producing method including the above condition regarding the thermal gradient, it is possible to control the grain size of the α subgrain in the rolling direction to be smaller than the grain size of the α subgrain in the transverse direction. Specifically, by simultaneously controlling the above condition regarding the thermal gradient, it is possible to control the grain size $RC_L$ and the grain size $RC_C$ to satisfy $1.15 \leq RC_C \div RC_L$ in the grain oriented electrical steel sheet as described in the eighth embodiment.

Next, common preferred production conditions for the producing method according to the present embodiment are described.

In the producing method according to the present embodiment, in the heating stage of the final annealing, a holding time in 1050 to 1100° C. is preferably 300 to 1200 minutes.

Hereinafter, the above production condition is referred to as the condition (F).

(F) In the heating stage of the final annealing, when TF is defined as a holding time in the temperature range of 1050 to 1100° C., TF: 300 to 1200 minutes.

In a case where the secondary recrystallization is not finished at 1050° C. in the heating stage of the final annealing, by decreasing the heating rate in 1050 to 1100° C., specifically by controlling the TF to be 300 to 1200 minutes, the secondary recrystallization maintains up to higher temperature, and thus, the magnetic flux density is favorably improved. For instance, the TF is preferably 400 minutes or longer, and is preferably 700 minutes or shorter. On the other hand, in a case where the secondary recrystallization is finished at 1050° C. in the heating stage of the final annealing, it is not needed to control the condition (F). For instance, when the secondary recrystallization is finished at 1050° C. in the heating stage, the heating rate may be increased as compared with the conventional techniques in the temperature range of 1050° C. or higher. Thereby, it is possible to shorten the time for the final annealing, and possible to reduce the production cost.

In the producing method according to the present embodiment, in the final annealing process, the four conditions (A) to (C-2) are basically controlled as described above, and as required, the condition (A'), the condition (B'), the condition (D), the condition (E-1), the condition (E-1'), the condition (E-2), the condition (E-2'), and/or the condition of the thermal gradient may be combined. For instance, the plural conditions selected from the above conditions may be combined. Moreover, the condition (F) may be combined as required.

The method for producing the grain oriented electrical steel sheet according to the present embodiment includes the processes as described above. The producing method according to the present embodiment may further include, as necessary, insulation coating forming process after the final annealing process.

(Insulation Coating Forming Process)

In the insulation coating forming process, the insulation coating is formed on the grain oriented electrical steel sheet (final annealed sheet) after the final annealing process. The insulation coating which mainly includes phosphate and colloidal silica, the insulation coating which mainly includes alumina sol and boric acid, and the like may be formed on the steel sheet after the final annealing.

For instance, a coating solution including phosphoric acid or phosphate, chromic anhydride or chromate, and colloidal silica is applied to the steel sheet after the final annealing, and is baked (for instance, 350 to 1150° C. for 5 to 300 seconds) to form the insulation coating. When the insulation coating is formed, the oxidation degree and the dew point of the atmosphere may be controlled as necessary.

Alternatively, a coating solution including alumina sol and boric acid is applied to the steel sheet after the final annealing, and is baked (for instance, 750 to 1350° C. for 10 to 100 seconds) to form the insulation coating. When the insulation coating is formed, the oxidation degree and the dew point of the atmosphere may be controlled as necessary.

The producing method according to the present embodiment may further include, as necessary, a magnetic domain refinement process.

(Magnetic Domain Refinement Process)

In the magnetic domain refinement process, the magnetic domain is refined for the grain oriented electrical steel sheet. For instance, the local minute strain may be applied or the local grooves may be formed by a known method such as laser, plasma, mechanical methods, etching, and the like for the grain oriented electrical steel sheet. The above magnetic domain refining treatment does not deteriorate the effects of the present embodiment.

Herein, the local minute strain and the local grooves mentioned above become an irregular point when measuring the crystal orientation and the grain size defined in the present embodiment. Thus, when the crystal orientation is measured, it is preferable to make the measurement points not overlap the local minute strain and the local grooves. Moreover, when the grain size is calculated, the local minute strain and the local grooves are not recognized as the boundary.

(Mechanism of Occurrence of Switching)

The switching specified in the present embodiment occurs during the grain growth of the secondary recrystallized grain. The phenomenon is influenced by various control conditions such as the chemical composition of material (slab), the elaboration of inhibitor until the grain growth of secondary recrystallized grain, and the control of the grain size of primary recrystallized grain. Thus, in order to control the switching, it is necessary to control not only one condition but plural conditions comprehensively and inseparably.

It seems that the switching occurs due to the boundary energy and the surface energy between the adjacent grains.

In regard to the above boundary energy, when the two grains with the misorientation are adjacent, the boundary energy increases. Thus, in the grain growth of the secondary recrystallized grain, it seems that the switching occurs so as to decrease the boundary energy, specifically, so as to be close to a specific same direction.

Moreover, in regard to the above surface energy, even when the orientation deviates slightly from the {110} plane which has high crystal symmetry, the surface energy increases. Thus, in the grain growth of the secondary recrystallized grain, it seems that the switching occurs so as to decrease the surface energy, specifically, so as to decrease the deviation angle by being close to the orientation of the {110} plane.

However, in the general situation, these energies do not give the driving force that induces the orientation changes, and thus, that the switching does not occur in the grain growth of the secondary recrystallized grain. In the general situation, the secondary recrystallized grain grows with maintaining the misorientation or the deviation angle. For instance, in a case where the secondary recrystallized grain grows in the general situation, the switching is not induced, and the deviation angle corresponds to an angle derived from the unevenness of the orientation at nucleating the secondary recrystallized grain. In addition, the $\sigma(\theta)$ which is the final standard deviation of the deviation angle $\theta$ also corresponds to the value derived from the unevenness of the orientation at nucleating the secondary recrystallized grain. In other words, the deviation angle hardly changes in the growing stage of the secondary recrystallized grain.

On the other hand, as the grain oriented electrical steel sheet according to the present embodiment, in a case where the secondary recrystallization is made to start from lower temperature and where the grain growth of secondary recrystallized grain is made to maintain up to higher temperature for a long time, the switching is sufficiently induced. The above reason is not entirely clear, but it seems that the above reason is related to the dislocations at relatively high densities which remain in the tip area of the growing secondary recrystallized grain, that is, in the area adjoining the primary recrystallized grain, in order to cancel the geometrical misorientation during the grain growth of the secondary recrystallized grain. It seems that the above residual dislocations correspond to the switching and the subboundary which are the features of the present embodiment.

In the present embodiment, since the secondary recrystallization starts from lower temperature as compared with the conventional techniques, the annihilation of the dislocations delays, the dislocations gather and pile up in front of the grain boundary which is located toward the direction growing the secondary recrystallized grain, and then, the dislocation density increases. Thus, the atom tends to be rearranged in the tip area of the growing secondary recrystallized grain, and as a result, it seems that the switching occurs so as to decrease the misorientation with the adjoining secondary recrystallized grain, that is, to decrease the boundary energy or the surface energy.

The switching occurs with leaving the subboundary having the specific orientation relationship in the secondary recrystallized grain.

Herein, in a case where another secondary recrystallized grain nucleates and the growing secondary recrystallized grain reaches the nucleated secondary recrystallized grain before the switching occurs, the grain growth terminates, and thereafter, the switching itself does not occur. Thus, in the present embodiment, it is advantageous to control the nucleation frequency of new secondary recrystallized grain to decrease in the growing stage of secondary recrystallized grain, and advantageous to control the grain growth to be the state such that only already-existing secondary recrystallized grain keeps growing. In the present embodiment, it is preferable to concurrently utilize the inhibitor which controls the starting temperature of the secondary recrystallization to be lower temperature and the inhibitor which are stable up to relatively higher temperature.

EXAMPLES

Hereinafter, the effects of an aspect of the present invention are described in detail with reference to the following examples. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention.

Example 1

Using slabs with chemical composition shown in Table A1 as materials, grain oriented electrical steel sheets (silicon steel sheets) with chemical composition shown in Table A2 were produced. The chemical compositions were measured by the above-mentioned methods. In Table A1 and Table A2, "–" indicates that the control and production conscious of content did not perform and thus the content was not measured. Moreover, in Table A1 and Table A2, the value with "<" indicates that, although the control and production conscious of content performed and the content was measured, the measured value with sufficient reliability as the content was not obtained (the measurement result was less than detection limit).

TABLE A1

| STEEL | CHEMICAL COMPOSITION OF SLAB(STEEL PIECE)(UNIT: mass %, BALANCE CONSISTING OF Fe AND IMPURITIES) | | | | | | | | | | | | |
|---|---|---|---|---|---|---|---|---|---|---|---|---|---|
| TYPE | C | Si | Mn | S | Al | N | Cu | Bi | Nb | V | Mo | Ta | W |
| A1 | 0.070 | 3.26 | 0.07 | 0.025 | 0.026 | 0.008 | 0.07 | — | — | — | — | — | — |
| A2 | 0.070 | 3.26 | 0.07 | 0.0.25 | 0.026 | 0.008 | 0.07 | — | 0.007 | — | — | — | — |
| B1 | 0.070 | 3.26 | 0.07 | 0.025 | 0.025 | 0.008 | 0.07 | 0.002 | — | — | — | — | — |
| B2 | 0.070 | 3.26 | 0.07 | 0.025 | 0.025 | 0.008 | 0.07 | 0.002 | 0.007 | — | — | — | — |
| C1 | 0.060 | 3.35 | 0.10 | 0.006 | 0.026 | 0.008 | 0.02 | — | — | — | — | — | — |
| C2 | 0.060 | 3.35 | 0.10 | 0.006 | 0.026 | 0.008 | 0.02 | — | 0.001 | — | — | — | — |
| C3 | 0.060 | 3.35 | 0.10 | 0.006 | 0.026 | 0.008 | 0.02 | — | 0.003 | — | — | — | — |
| C4 | 0.060 | 3.35 | 0.10 | 0.006 | 0.026 | 0.008 | 0.02 | — | 0.005 | — | — | — | — |
| C5 | 0.060 | 3.35 | 0.10 | 0.006 | 0.026 | 0.008 | 0.02 | — | 0.01 | — | — | — | — |
| C6 | 0.060 | 3.35 | 0.10 | 0.006 | 0.026 | 0.008 | 0.02 | — | 0.02 | — | — | — | — |
| C7 | 0.060 | 3.35 | 0.10 | 0.006 | 0.026 | 0.008 | 0.02 | — | 0.03 | — | — | — | — |
| C8 | 0.060 | 3.35 | 0.10 | 0.006 | 0.026 | 0.008 | 0.02 | — | 0.05 | — | — | — | — |
| D1 | 0.060 | 3.45 | 0.10 | 0.006 | 0.028 | 0.008 | 0.20 | — | 0.002 | — | — | — | — |
| D2 | 0.060 | 3.45 | 0.10 | 0.006 | 0.028 | 0.008 | 0.20 | — | 0.007 | — | — | — | — |
| E | 0.060 | 3.45 | 0.10 | 0.006 | 0.027 | 0.008 | 0.20 | — | — | 0.007 | — | — | — |
| F | 0.060 | 3.45 | 0.10 | 0.006 | 0.027 | 0.008 | 0.20 | — | — | — | 0.020 | — | — |
| G | 0.060 | 3.45 | 0.10 | 0.006 | 0.027 | 0.008 | 0.20 | — | 0.005 | — | — | 0.003 | — |
| H | 0.060 | 3.45 | 0..0 | 0.006 | 0.027 | 0.008 | 0.20 | — | — | — | — | 0.010 | — |
| I | 0.060 | 3.45 | 0.10 | 0.006 | 0.027 | 0.008 | 0.20 | — | — | — | — | — | 0.010 |
| J | 0.060 | 3.45 | 0.10 | 0.006 | 0.027 | 0.008 | 0.20 | — | 0.004 | — | 0.010 | — | — |
| K | 0.060 | 3.45 | 0.10 | 0.006 | 0.027 | 0.008 | 0.20 | — | 0.005 | 0.003 | — | 0.003 | — |

TABLE A2

| STEEL | CHEMICAL COMPOSITION OF GRAIN ORIENTED ELECTRICAL STEEL SHEET(UNIT:mass %, BALANCE CONSISTING OF Fe AND IMPURITIES) | | | | | | | | | | | | |
|---|---|---|---|---|---|---|---|---|---|---|---|---|---|
| TYPE | C | Si | Mn | S | Al | N | Cu | Bi | Nb | V | Mo | Te | W |
| A1 | 0.001 | 3.15 | 0.07 | <0.002 | <0.004 | <0.002 | 0.07 | — | — | — | — | — | — |
| A2 | 0.001 | 3.15 | 0.07 | <0.002 | <0.004 | <0.002 | 0.07 | — | 0.005 | — | — | — | — |
| B1 | 0.001 | 3.15 | 0.07 | <0.002 | <0.004 | <0.002 | 0.07 | <0.001 | — | — | — | — | — |
| B2 | 0.001 | 3.15 | 0.07 | <0.002 | <0.004 | <0.002 | 0.07 | <0.001 | 0.005 | — | — | — | — |
| C1 | 0.001 | 3.30 | 0.10 | <0.002 | <0.004 | <0.002 | 0.02 | — | — | — | — | — | — |
| C2 | 0.001 | 3.30 | 0.10 | <0.002 | <0.004 | <0.002 | 0.02 | — | 0.001 | — | — | — | — |
| C3 | 0.001 | 3.30 | 0.10 | <0.002 | <0.004 | <0.002 | 0.02 | — | 0.003 | — | — | — | — |
| C4 | 0.001 | 3.30 | 0.10 | <0.002 | <0.004 | <0.002 | 0,02 | — | 0.003 | — | — | — | — |
| C5 | 0.001 | 3.30 | 0.10 | <0.002 | <0.004 | <0.002 | 0.02 | — | 0.007 | — | — | — | — |
| C6 | 0.002 | 3.30 | 0.10 | <0.002 | <0.004 | <0.002 | 0.02 | — | 0.013 | — | — | — | — |
| C7 | 0.004 | 3.30 | 0.10 | <0.002 | <0.004 | <0.002 | 0.02 | — | 0.028 | — | — | — | — |
| C8 | 0.006 | 3.30 | 0.10 | <0.002 | <0.004 | <0.002 | 0.02 | — | 0.048 | — | — | — | — |
| D1 | 0.001 | 3.34 | 0.10 | <0.002 | <0.004 | <0.002 | 0.20 | — | 0.002 | — | — | — | — |
| D2 | 0.001 | 3.34 | 0.10 | <0.002 | <0.004 | <0.002 | 0.20 | — | 0.006 | — | — | — | — |
| E | 0.001 | 3.30 | 0.10 | <0.002 | <0.004 | <0.002 | 0.02 | — | — | 0.006 | — | — | — |
| F | 0.001 | 3.24 | 0.10 | <0.002 | <0.004 | <0.002 | 0.02 | — | — | — | 0.020 | — | — |
| G | 0.001 | 3.34 | 0.10 | <0.002 | <0.004 | <0.002 | 0.20 | — | 0.004 | — | — | 0.001 | — |
| H | 0.001 | 3.34 | 0.10 | <0.002 | <0.004 | <0.002 | 0.02 | — | — | — | — | 0.010 | — |
| I | 0.001 | 3.34 | 0.10 | <0.002 | <0.004 | <0.002 | 0.02 | — | — | — | — | — | 0.010 |
| J | 0.001 | 3.34 | 0.10 | <0.002 | <0.004 | <0.002 | 0.20 | — | 0.003 | 0.001 | 0.003 | — | — |
| K | 0.001 | 3.34 | 0.10 | <0.002 | <0.004 | <0.002 | 0.20 | — | 0.003 | 0.001 | — | 0.002 | — |

The grain oriented electrical steel sheets were produced under production conditions shown in Table A3 to Table A7. Specifically, after casting the slabs, hot rolling, hot band annealing, cold rolling, and decarburization annealing were conducted. For some steel sheets after decarburization annealing, nitridation was conducted in mixed atmosphere of hydrogen, nitrogen, and ammonia.

Annealing separator which mainly included MgO was applied to the steel sheets, and then final annealing was conducted. In final stage of the final annealing, the steel sheets were held at 1200° C. for 20 hours in hydrogen atmosphere (purification annealing), and then were naturally cooled.

TABLE A3

| No. | STEEL TYPE | PRODUCTION CONDITIONS HOT ROLLING HEATING TEMPERATURE ° C. | HOT ROLLING TEMPERATURE OF FINAL ROLLING ° C. | HOT ROLLING COILING TEMPERATURE ° C. | SHEET THICKNESS nm | HOT BAND ANNEALING TEMPERATURE ° C. | HOT BAND ANNEALING TIME SECOND | COLD ROLLING SHEET THICKNESS mm | COLD ROLLING REDUCTION OF COLD ROLLING % | DECARBURIZATION ANNEALING GRAIN SIZE OF PRIMARY RECRYSTALLIZED GRAIN µm | NITROGEN CONTENT AFTER NITRIDATION ppm |
|---|---|---|---|---|---|---|---|---|---|---|---|
| 1001 | C1 | 1150 | 900 | 550 | 2.8 | 1100 | 180 | 0.26 | 90.7 | 22 | 220 |
| 1002 | C1 | 1150 | 900 | 550 | 2.8 | 1100 | 180 | 0.26 | 90.7 | 22 | 250 |
| 1003 | C1 | 1150 | 900 | 550 | 2.8 | 1100 | 180 | 0.26 | 90.7 | 22 | 300 |
| 1004 | C1 | 1150 | 900 | 550 | 2.8 | 1100 | 180 | 0.26 | 90.7 | 22 | 160 |
| 1005 | C1 | 1150 | 900 | 350 | 2.8 | 1100 | 180 | 0.26 | 90.7 | 22 | 220 |
| 1006 | C1 | 1150 | 900 | 350 | 2.8 | 1100 | 180 | 0.26 | 90.7 | 22 | 220 |
| 1007 | C1 | 1150 | 900 | 550 | 2.8 | 1100 | 180 | 0.26 | 90.7 | 22 | 220 |
| 1008 | C1 | 1150 | 900 | 550 | 2.8 | 1100 | 180 | 0.26 | 90.7 | 22 | 220 |
| 1009 | C1 | 1150 | 900 | 550 | 2.8 | 1100 | 180 | 0.26 | 90.7 | 22 | 220 |
| 1010 | C1 | 1150 | 900 | 550 | 2.8 | 1100 | 180 | 0.26 | 90.7 | 22 | 160 |
| 1011 | C1 | 1150 | 000 | 550 | 2.8 | 1100 | 180 | 0.26 | 907 | 22 | 220 |
| 1012 | C1 | 1150 | 000 | 550 | 2.8 | 1100 | 180 | 0.26 | 90.7 | 22 | 220 |
| 1013 | C1 | 1150 | 900 | 550 | 2.8 | 1100 | 180 | 026 | 90.7 | 22 | 220 |
| 1014 | C1 | 1150 | 900 | 550 | 2.8 | 1100 | 180 | 0.26 | 90.7 | 22 | 220 |
| 1015 | C1 | 1150 | 900 | 550 | 2.8 | 1100 | 180 | 0.26 | 90.7 | 22 | 220 |
| 1016 | C1 | 1150 | 900 | 550 | 2.8 | 1100 | 180 | 0.26 | 90.7 | 22 | 220 |
| 1017 | C1 | 1150 | 900 | 550 | 2.8 | 1100 | 180 | 0.26 | 90.7 | 22 | 220 |
| 1018 | C1 | 1150 | 900 | 550 | 2.8 | 1100 | 180 | 0.26 | 90.7 | 22 | 220 |
| 1019 | C1 | 1150 | 900 | 550 | 2.8 | 1100 | 180 | 0.26 | 90.7 | 22 | 220 |
| 1020 | C1 | 1150 | 900 | 550 | 2.8 | 1100 | 180 | 0.26 | 90.7 | 22 | 220 |

| No. | STEEL TYPE | PRODUCTION CONDITIONS FINAL ANNEALING PA | PB | PC1 | PC2 | TE1 MINUTE | TF MINUTE |
|---|---|---|---|---|---|---|---|
| 1001 | C1 | 0.020 | 0.005 | 0.003 | 0.0007 | 150 | 300 |
| 1002 | C1 | 0.050 | 0.010 | 0.003 | 0.0007 | 150 | 300 |
| 1003 | C1 | 0.050 | 0.010 | 0.003 | 0.0007 | 150 | 300 |
| 1004 | C1 | 0.050 | 0.010 | 0.003 | 0.0007 | 150 | 300 |
| 1005 | C1 | 0.050 | 0.010 | 0.003 | 0.0007 | 150 | 300 |
| 1006 | C1 | 0.050 | 0.005 | 0.003 | 0.0007 | 210 | 300 |
| 1007 | C1 | 0.020 | 0.020 | 0.020 | 0.01000 | 210 | 300 |
| 1008 | C1 | 0.100 | 0.005 | 0.005 | 0.0007 | 150 | 300 |
| 1009 | C1 | 0.050 | 0.005 | 0.005 | 0.0007 | 210 | 300 |
| 1010 | C1 | 0.050 | 0.010 | 0.003 | 0.0007 | 210 | 300 |
| 1011 | C1 | 0.050 | 0.005 | 0.003 | 0.0007 | 210 | 300 |
| 1012 | C1 | 0.050 | 0.010 | 0.003 | 0.0007 | 150 | 300 |
| 1013 | C1 | 0.020 | 0.010 | 0.003 | 0.0007 | 210 | 300 |
| 1014 | C1 | 0.030 | 0.010 | 0.003 | 0.0007 | 210 | 300 |
| 1015 | C1 | 0.050 | 0.010 | 0.003 | 0.0007 | 210 | 300 |
| 1016 | C1 | 0.050 | 0.005 | 0.005 | 0.0007 | 210 | 300 |
| 1017 | C1 | 0.050 | 0.005 | 0.003 | 0.001 | 210 | 300 |
| 1018 | C1 | 0.050 | 0.010 | 0.010 | 0.0007 | 210 | 300 |
| 1019 | C1 | 0.050 | 0.005 | 0.003 | 0.001 | 210 | 300 |
| 1020 | C1 | 0.050 | 0.005 | 0.003 | 0.003 | 210 | 300 |

TABLE A4

| | | PRODUCTION CONDITIONS | | | | | | | | | |
|---|---|---|---|---|---|---|---|---|---|---|---|
| | | HOT ROLLING | | | | HOT BAND ANNEALING | | COLD ROLLING | | DECARBURIZATION ANNEALING | |
| No. | STEEL TYPE | HEATING TEMPERATURE ° C. | TEMPERATURE OF FINAL ROLLING ° C. | COILING TEMPERATURE ° C. | SHEET THICKNESS nm | TEMPERATURE ° C. | TIME SECOND | SHEET THICKNESS mm | REDUCTION OF COLD ROLLING % | GRAIN SIZE OF PRIMARY RECRYSTALLIZED GRAIN μm | NITROGEN CONTENT AFTER NITRIDATION ppm |
| 1021 | C1 | 1150 | 900 | 550 | 2.8 | 1100 | 180 | 0.26 | 90.7 | 22 | 220 |
| 1022 | C1 | 1150 | 900 | 550 | 2.8 | 1100 | 180 | 0.26 | 90.7 | 22 | 300 |
| 1023 | C1 | 1150 | 900 | 550 | 2.8 | 1100 | 180 | 0.25 | 90.7 | 22 | 300 |
| 1024 | D1 | 1150 | 900 | 550 | 2.8 | 1100 | 180 | 0.26 | 90.7 | 23 | 220 |
| 1025 | D1 | 1150 | 900 | 550 | 2.8 | 1100 | 180 | 0.26 | 90.7 | 23 | 220 |
| 1026 | D1 | 1150 | 900 | 550 | 2.8 | 1100 | 180 | 0.26 | 90.7 | 23 | 220 |
| 1027 | D1 | 1150 | 900 | 550 | 2.8 | 1100 | 180 | 0.25 | 90.7 | 23 | 220 |
| 1028 | D1 | 1150 | 900 | 550 | 2.8 | 1100 | 180 | 0.26 | 90.7 | 23 | 220 |
| 1029 | D1 | 1150 | 900 | 550 | 2.8 | 1100 | 180 | 0.26 | 90.7 | 23 | 220 |
| 1030 | D1 | 1150 | 900 | 550 | 2.8 | 1100 | 180 | 0.26 | 90.7 | 23 | 220 |
| 1031 | D1 | 1150 | 900 | 550 | 2.8 | 1100 | 180 | 0.26 | 90.7 | 23 | 220 |
| 1032 | D1 | 1150 | 900 | 550 | 2.8 | 1100 | 180 | 0.26 | 90.7 | 23 | 220 |
| 1033 | D1 | 1150 | 900 | 550 | 2.8 | 1100 | 180 | 0.26 | 90.7 | 23 | 220 |
| 1034 | D1 | 1150 | 900 | 550 | 2.8 | 1100 | 180 | 0.26 | 90.7 | 23 | 220 |
| 1035 | D2 | 1150 | 900 | 550 | 2.8 | 1100 | 180 | 0.26 | 90.7 | 17 | 220 |
| 1036 | D2 | 1150 | 900 | 550 | 2.8 | 1100 | 180 | 0.26 | 90.7 | 17 | 220 |
| 1037 | D2 | 1150 | 900 | 550 | 2.8 | 1100 | 180 | 0.26 | 90.7 | 17 | 220 |
| 1038 | D2 | 1150 | 900 | 550 | 2.8 | 1100 | 180 | 0.26 | 90.7 | 17 | 220 |
| 1039 | D2 | 1150 | 900 | 550 | 2.8 | 1100 | 180 | 0.26 | 90.7 | 17 | 220 |
| 1040 | D2 | 1150 | 900 | 550 | 2.8 | 1100 | 180 | 0.26 | 90.7 | 17 | 220 |

| | | PRODUCTION CONDITIONS FINAL ANNEALING | | | | | |
|---|---|---|---|---|---|---|---|
| No. | STEEL TYPE | PA | PB | PC1 | PC2 | TE1 MINUTE | TF MINUTE |
| 1021 | C1 | 0.050 | 0.010 | 0.010 | 0.010 | 210 | 300 |
| 1022 | C1 | 0.050 | 0.010 | 0.003 | 0.0007 | 150 | 600 |
| 1023 | C1 | 0.050 | 0.010 | 0.003 | 0.0007 | 210 | 600 |
| 1024 | D1 | 0.020 | 0.010 | 0.003 | 0.0007 | 210 | 300 |
| 1025 | D1 | 0.050 | 0.010 | 0.003 | 0.0007 | 210 | 300 |
| 1026 | D1 | 0.200 | 0.010 | 0.003 | 0.0007 | 210 | 800 |
| 1027 | D1 | 0.300 | 0.010 | 0.003 | 0.0007 | 210 | 300 |
| 1028 | D1 | 0.400 | 0.010 | 0.003 | 0.0007 | 300 | 300 |
| 1029 | D1 | 0.400 | 0.010 | 0.000 | 0.0007 | 750 | 300 |
| 1030 | D1 | 0.400 | 0.010 | 0.003 | 0.0007 | 1500 | 300 |
| 1031 | D1 | 0.600 | 0.010 | 0.003 | 0.0007 | 300 | 300 |
| 1032 | D1 | 1.000 | 0.010 | 0.003 | 0.0007 | 210 | 300 |
| 1033 | D1 | 5.000 | 0.010 | 0.003 | 0.0007 | 210 | 300 |
| 1034 | D1 | 10.000 | 0.010 | 0.003 | 0.0007 | 210 | 300 |
| 1035 | D2 | 0.020 | 0.005 | 0.003 | 0.0007 | 150 | 300 |
| 1036 | D2 | 0.030 | 0.005 | 0.003 | 0.0007 | 150 | 300 |
| 1037 | D2 | 0.030 | 0.010 | 0.003 | 0.0007 | 150 | 300 |
| 1038 | D2 | 0.300 | 0.040 | 0.003 | 0.0007 | 150 | 300 |
| 1039 | D2 | 0.300 | 0.040 | 0.003 | 0.0007 | 300 | 300 |
| 1040 | D2 | 0.300 | 0.040 | 0.003 | 0.0007 | 600 | 300 |

TABLE A5

| No. | STEEL TYPE | PRODUCTION CONDITIONS HOT ROLLING HEATING TEMPERATURE ° C. | HOT ROLLING TEMPERATURE OF FINAL ROLLING ° C. | HOT ROLLING COILING TEMPERATURE ° C. | SHEET THICKNESS mm | HOT BAND ANNEALING TEMPERATURE °C. | HOT BAND ANNEALING TIME SECOND | COLD ROLLING SHEET THICKNESS mm | COLD ROLLING REDUCTION OF COLD ROLLING % | DECARBURIZATION ANNEALING GRAIN SIZE OF PRIMARY RECRYSTALLIZED GRAIN μm | DECARBURIZATION ANNEALING NITROGEN CONTENT AFTER NITRIDATION ppm |
|---|---|---|---|---|---|---|---|---|---|---|---|
| 1041 | D2 | 1150 | 900 | 550 | 2.8 | 1100 | 180 | 0.26 | 90.7 | 17 | 190 |
| 1042 | D2 | 1150 | 900 | 550 | 2.8 | 1100 | 180 | 0.26 | 90.7 | 17 | 160 |
| 1043 | D2 | 1150 | 900 | 550 | 2.8 | 1100 | 180 | 0.26 | 90.7 | 17 | 220 |
| 1044 | D2 | 1150 | 900 | 550 | 2.8 | 1100 | 180 | 0.26 | 90.7 | 17 | 220 |
| 1045 | D2 | 1150 | 900 | 550 | 2.8 | 1100 | 180 | 0.26 | 90.7 | 17 | 180 |
| 1046 | D2 | 1150 | 900 | 550 | 2.8 | 1100 | 180 | 0.26 | 90.7 | 17 | 180 |
| 1047 | D2 | 1150 | 900 | 550 | 2.8 | 1100 | 180 | 0.26 | 90.7 | 17 | 210 |
| 1048 | C1 | 1150 | 900 | 550 | 2.8 | 1100 | 180 | 0.26 | 90.7 | 23 | 210 |
| 1049 | C2 | 1150 | 900 | 550 | 2.8 | 1100 | 180 | 0.26 | 90.7 | 24 | 210 |
| 1050 | C3 | 1150 | 900 | 550 | 2.8 | 1100 | 180 | 0.26 | 90.7 | 20 | 210 |
| 1051 | C4 | 1150 | 900 | 550 | 2.8 | 1100 | 180 | 0.26 | 90.7 | 17 | 210 |
| 1052 | C5 | 1150 | 900 | 550 | 2.8 | 1100 | 180 | 0.20 | 90.7 | 16 | 210 |
| 1053 | C6 | 1150 | 900 | 550 | 2.8 | 1100 | 180 | 0.26 | 90.7 | 15 | 210 |
| 1054 | C7 | 1150 | 900 | 550 | 2.8 | 1100 | 180 | 0.26 | 90.7 | 13 | 210 |
| 1055 | C8 | 1150 | 900 | 550 | 2.8 | 1100 | 180 | 0.26 | 90.7 | 12 | 210 |
| 1056 | D1 | 1150 | 900 | 550 | 2.8 | 1100 | 180 | 0.26 | 90.7 | 24 | 220 |
| 1057 | D2 | 1150 | 900 | 550 | 2.8 | 1100 | 180 | 0.26 | 90.7 | 17 | 220 |
| 1058 | E | 1150 | 900 | 550 | 2.8 | 1100 | 180 | 0.26 | 90.7 | 22 | 220 |
| 1059 | F | 1150 | 900 | 550 | 2.8 | 1100 | 180 | 0.26 | 90.7 | 19 | 220 |
| 1060 | G | 1150 | 900 | 550 | 2.8 | 1100 | 180 | 0.26 | 90.7 | 15 | 220 |

| No. | STEEL TYPE | PRODUCTION CONDITIONS FINAL ANNEALING PA | PB | PC1 | PC2 | TE1 MINUTE | TF MINUTE |
|---|---|---|---|---|---|---|---|
| 1041 | D2 | 0.300 | 0.040 | 0.003 | 0.0007 | 600 | 300 |
| 1042 | D2 | 0.300 | 0.040 | 0.003 | 0.0007 | 600 | 300 |
| 1043 | D2 | 0.300 | 0.030 | 0.003 | 0.0007 | 300 | 300 |
| 1044 | D2 | 0.200 | 0.030 | 0.003 | 0.0007 | 600 | 300 |
| 1045 | D2 | 0.400 | 0.040 | 0.003 | 0.0007 | 600 | 300 |
| 1046 | D2 | 0.500 | 0.050 | 0.003 | 0.0007 | 600 | 300 |
| 1047 | D2 | 1.000 | 0.010 | 0.005 | 0.001 | 150 | 300 |
| 1048 | C1 | 0.200 | 0.005 | 0.005 | 0.0007 | 150 | 300 |
| 1049 | C2 | 0.200 | 0.005 | 0.005 | 0.0007 | 150 | 300 |
| 1050 | C3 | 0.200 | 0.005 | 0.005 | 0.0007 | 150 | 300 |
| 1051 | C4 | 0.200 | 0.005 | 0.005 | 0.0007 | 150 | 300 |
| 1052 | C5 | 0.200 | 0.000 | 0.005 | 0.0007 | 150 | 300 |
| 1053 | C6 | 0.200 | 0.005 | 0.005 | 0.0007 | 150 | 300 |
| 1054 | C7 | 0.200 | 0005 | 0.005 | 0.0007 | 150 | 300 |
| 1055 | C8 | 0.200 | 0.005 | 0.005 | 0.0007 | 150 | 300 |
| 1056 | D1 | 0.030 | 0.005 | 0.003 | 0.003 | 150 | 300 |
| 1057 | D2 | 0.030 | 0.005 | 0.003 | 0.003 | 150 | 300 |
| 1058 | E | 0.030 | 0.005 | 0.003 | 0.003 | 150 | 300 |
| 1059 | F | 0.030 | 0.005 | 0.003 | 0.003 | 150 | 300 |
| 1060 | G | 0.030 | 0.005 | 0.003 | 0.003 | 150 | 300 |

TABLE A6

| No. | STEEL TYPE | PRODUCTION CONDITIONS: HOT ROLLING: HEATING TEMPERATURE ° C. | HOT ROLLING: TEMPERATURE OF FINAL ROLLING ° C. | HOT ROLLING: COILING TEMPERATURE ° C. | SHEET THICKNESS mm | HOT BAND ANNEALING: TEMPERATURE ° C. | HOT BAND ANNEALING: TIME SECOND | COLD ROLLING: SHEET THICKNESS mm | COLD ROLLING: REDUCTION OF COLD ROLLING % | DECARBURIZATION ANNEALING: GRAIN SIZE OF PRIMARY RECRYSTALLIZED GRAIN μm | DECARBURIZATION ANNEALING: NITROGEN CONTENT AFTER NITRIDATION ppm |
|---|---|---|---|---|---|---|---|---|---|---|---|
| 1061 | H | 1150 | 900 | 550 | 2.8 | 1100 | 180 | 0.26 | 90.7 | 15 | 220 |
| 1062 | I | 1150 | 900 | 550 | 2.8 | 1100 | 180 | 0.26 | 90.7 | 23 | 220 |
| 1063 | J | 1150 | 900 | 550 | 2.8 | 1100 | 180 | 0.26 | 90.7 | 17 | 220 |
| 1064 | K | 1150 | 900 | 550 | 2.8 | 1100 | 180 | 0.26 | 90.7 | 15 | 220 |
| 1065 | A1 | 1400 | 1100 | 500 | 2.6 | 1100 | 180 | 0.26 | 90.0 | 9 | — |
| 1066 | A1 | 1400 | 1100 | 500 | 2.6 | 1100 | 180 | 0.26 | 90.0 | 9 | — |
| 1067 | A1 | 1400 | 1100 | 500 | 2.6 | 1100 | 180 | 0.26 | 90.0 | 9 | — |
| 1068 | A1 | 1400 | 1100 | 500 | 2.6 | 1100 | 180 | 0.26 | 90.0 | 9 | — |
| 1069 | A1 | 1400 | 1100 | 500 | 2.6 | 1100 | 180 | 0.26 | 90.0 | 9 | — |
| 1070 | A1 | 1400 | 1110 | 500 | 2.6 | 1100 | 180 | 0.26 | 90.0 | 9 | — |
| 1071 | A1 | 1400 | 1100 | 500 | 2.6 | 1100 | 180 | 0.26 | 90.0 | 9 | — |
| 1072 | A1 | 1400 | 1100 | 500 | 2.6 | 1100 | 180 | 0 26 | 90.0 | 9 | — |
| 1073 | A1 | 1400 | 1100 | 500 | 2.6 | 1100 | 180 | 0.26 | 90.0 | 9 | — |
| 1074 | A2 | 1400 | 1100 | 500 | 2.6 | 1100 | 180 | 0.26 | 90.0 | 7 | — |
| 1075 | A2 | 1400 | 1100 | 500 | 2.6 | 1100 | 180 | 0.26 | 90.0 | 7 | — |
| 1076 | A2 | 1400 | 1100 | 500 | 2.6 | 1100 | 180 | 0.26 | 90.0 | 7 | — |
| 1077 | A2 | 1400 | 1100 | 500 | 2.6 | 1100 | 180 | 0.26 | 90.0 | 7 | — |
| 1078 | A2 | 1400 | 1100 | 500 | 2.6 | 1100 | 180 | 0.26 | 90.0 | 7 | — |
| 1079 | A2 | 1400 | 1100 | 500 | 2.6 | 1100 | 180 | 0.26 | 90.0 | 7 | — |
| 1080 | A2 | 1400 | 1100 | 500 | 2.6 | 1100 | 180 | 0.26 | 90.0 | 7 | — |

| No. | STEEL TYPE | PRODUCTION CONDITIONS FINAL ANNEALING: PA | PB | PC1 | PC2 | TE1 MINUTE | TF MINUTE |
|---|---|---|---|---|---|---|---|
| 1061 | H | 0.030 | 0.006 | 0.003 | 0.003 | 150 | 300 |
| 1062 | I | 0.030 | 0.005 | 0.003 | 0.003 | 150 | 300 |
| 1063 | J | 0.030 | 0.005 | 0.003 | 0.003 | 150 | 300 |
| 1064 | K | 0.030 | 0.005 | 0.003 | 0.003 | 150 | 300 |
| 1065 | A1 | 0.050 | 0.010 | 0.003 | 0.0007 | 150 | 300 |
| 1066 | A1 | 0.050 | 0.018 | 0.003 | 0.0007 | 150 | 300 |
| 1067 | A1 | 0.050 | 0.025 | 0.015 | 0.003 | 150 | 300 |
| 1068 | A1 | 0.400 | 0.005 | 0.003 | 0.0007 | 300 | 300 |
| 1069 | A1 | 0.400 | 0.018 | 0.003 | 0.0007 | 300 | 300 |
| 1070 | A1 | 0.050 | 0.018 | 0.003 | 0.0007 | 600 | 300 |
| 1071 | A1 | 0.050 | 0.025 | 0.015 | 0.003 | 300 | 300 |
| 1072 | A1 | 0.050 | 0.025 | 0.015 | 0.003 | 600 | 300 |
| 1073 | A1 | 0.050 | 0.025 | 0.015 | 0.003 | 900 | 300 |
| 1074 | A2 | 0.050 | 0.010 | 0.003 | 0.0007 | 150 | 300 |
| 1075 | A2 | 0.050 | 0.018 | 0.003 | 0.0007 | 150 | 300 |
| 1076 | A2 | 0.050 | 0.025 | 0.015 | 0.003 | 150 | 300 |
| 1077 | A2 | 0.400 | 0.005 | 0.003 | 0.0007 | 300 | 300 |
| 1078 | A2 | 0.400 | 0.018 | 0.003 | 0.0007 | 300 | 300 |
| 1079 | A2 | 0.050 | 0.018 | 0.003 | 0.0007 | 600 | 300 |
| 1080 | A2 | 0.050 | 0.025 | 0.015 | 0.003 | 300 | 300 |

TABLE A7

| No. | STEEL TYPE | PRODUCTION CONDITIONS: HOT ROLLING: HEATING TEMPERATURE ° C. | HOT ROLLING: TEMPERATURE OF FINAL ROLLING ° C. | HOT ROLLING: COILING TEMPERATURE ° C. | SHEET THICKNESS mm | HOT BAND ANNEALING: TEMPERATURE ° C. | HOT BAND ANNEALING: TIME SECOND | COLD ROLLING: SHEET THICKNESS mm | COLD ROLLING: REDUCTION OF COLD ROLLING % | DECARBURIZATION ANNEALING: GRAIN SIZE OF PRIMARY RECRYSTALLIZED GRAIN μm | NITROGEN CONTENT AFTER NITRIDATION ppm |
|---|---|---|---|---|---|---|---|---|---|---|---|
| 1081 | A2 | 1400 | 1100 | 500 | 2.6 | 1100 | 180 | 0.26 | 90.0 | 7 | — |
| 1082 | A2 | 1400 | 1100 | 500 | 2.6 | 1100 | 180 | 0.26 | 90.0 | 7 | — |
| 1083 | B1 | 1350 | 1100 | 500 | 2.6 | 1100 | 180 | 0.26 | 90.0 | 10 | — |
| 1084 | B1 | 1350 | 1100 | 500 | 2.6 | 1100 | 180 | 0.26 | 90.0 | 10 | — |
| 1085 | B1 | 1350 | 1100 | 500 | 2.6 | 1100 | 180 | 0.26 | 90.0 | 10 | — |
| 1086 | B1 | 1350 | 1100 | 500 | 2.6 | 1100 | 180 | 0.26 | 90.0 | 10 | — |
| 1087 | B1 | 1350 | 1100 | 500 | 2.6 | 1100 | 180 | 0.26 | 90.0 | 10 | — |
| 1088 | B1 | 1350 | 1100 | 500 | 2.6 | 1100 | 180 | 0.26 | 90.0 | 10 | — |
| 1089 | B1 | 1350 | 1100 | 500 | 2.6 | 1100 | 180 | 0.26 | 90.0 | 10 | — |
| 1090 | B1 | 1350 | 1100 | 500 | 2.6 | 1100 | 180 | 0.26 | 90.0 | 10 | — |
| 1091 | B1 | 1350 | 1100 | 500 | 2.6 | 1100 | 180 | 0.26 | 90.0 | 10 | — |
| 1092 | B1 | 1350 | 1100 | 500 | 2.6 | 1100 | 180 | 0.26 | 90.0 | 10 | — |
| 1093 | B2 | 1350 | 1100 | 500 | 2.6 | 1100 | 180 | 0.26 | 90.0 | 8 | — |
| 1094 | B2 | 1350 | 1100 | 500 | 2.6 | 1100 | 180 | 0.26 | 90.0 | 8 | — |
| 1095 | B2 | 1350 | 1100 | 500 | 2.6 | 1100 | 180 | 0.26 | 90.0 | 8 | — |
| 1096 | B2 | 1350 | 1100 | 500 | 2.6 | 1100 | 180 | 0.26 | 90.0 | 8 | — |
| 1097 | B2 | 1350 | 1100 | 500 | 2.6 | 1100 | 180 | 0.26 | 90.0 | 8 | — |
| 1098 | B2 | 1350 | 1100 | 500 | 2.6 | 1100 | 180 | 0.26 | 90.0 | 8 | — |
| 1099 | B2 | 1350 | 1100 | 500 | 2.6 | 1100 | 180 | 0.26 | 90.0 | 8 | — |
| 1100 | B2 | 1350 | 1100 | 500 | 2.6 | 1100 | 180 | 0.26 | 90.0 | 8 | — |

| No. | PRODUCTION CONDITIONS FINAL ANNEALING: PA | PB | PC1 | PC2 | TE1 MINUTE | TF MINUTE |
|---|---|---|---|---|---|---|
| 1081 | 0.050 | 0.025 | 0.015 | 0.003 | 600 | 300 |
| 1082 | 0.050 | 0.025 | 0.015 | 0.003 | 900 | 300 |
| 1083 | 0.100 | 0.010 | 0.010 | 0.003 | 300 | 300 |
| 1084 | 0.100 | 0.010 | 0.010 | 0.005 | 600 | 300 |
| 1085 | 2.000 | 0.010 | 0.010 | 0.005 | 900 | 300 |
| 1086 | 2.000 | 0.010 | 0.010 | 0.003 | 300 | 300 |
| 1087 | 0.400 | 0.040 | 0.040 | 0.003 | 900 | 300 |
| 1088 | 0.010 | 0.025 | 0.015 | 0.003 | 900 | 300 |
| 1089 | 2.000 | 0.025 | 0.015 | 0.003 | 90 | 300 |
| 1090 | 2.000 | 0.250 | 0.150 | 0.075 | 900 | 300 |
| 1091 | 0.020 | 0.010 | 0.003 | 0.0007 | 150 | 300 |
| 1092 | 6.000 | 0.010 | 0.003 | 0.0007 | 150 | 300 |
| 1093 | 0.100 | 0.010 | 0.010 | 0.003 | 300 | 300 |
| 1094 | 0.100 | 0.010 | 0.010 | 0.005 | 600 | 300 |
| 1095 | 2.000 | 0.010 | 0.010 | 0.005 | 300 | 300 |
| 1096 | 2.000 | 0.010 | 0.010 | 0.003 | 300 | 300 |
| 1097 | 0.400 | 0.040 | 0.040 | 0.003 | 900 | 300 |
| 1098 | 0.010 | 0.025 | 0.015 | 0.003 | 900 | 300 |
| 1099 | 2.000 | 0.025 | 0.015 | 0.003 | 90 | 300 |
| 1100 | 2.000 | 0.250 | 0.150 | 0.075 | 900 | 300 |

Coating solution for forming the insulation coating which mainly included phosphate and colloidal silica and which included chromium was applied on primary layer (intermediate layer) formed on the surface of produced grain oriented electrical steel sheets (final annealed sheets). The above steel sheets were heated and held in atmosphere of 75 volume % hydrogen and 25 volume % nitrogen, were cooled, and thereby the insulation coating was formed.

The produced grain oriented electrical steel sheets had the intermediate layer which was arranged in contact with the grain oriented electrical steel sheet (silicon steel sheet) and the insulation coating which was arranged in contact with the intermediate layer, when viewing the cross section whose cutting direction is parallel to thickness direction. The intermediate layer was forsterite film whose average thickness was 2 μm, and the insulation coating was the coating which mainly included phosphate and colloidal silica and whose average thickness was 1 μm.

Various characteristics of the obtained grain oriented electrical steel sheet were evaluated. The evaluation results are shown in Table A8 to Table A12.

(1) Crystal Orientation of Grain Oriented Electrical Steel Sheet

Crystal orientation of grain oriented electrical steel sheet was measured by the above-mentioned method. Deviation angle was identified from the crystal orientation at each measurement point, and the boundary between two adjacent measurement points was identified based on the above deviation angles. When the boundary condition is evaluated by using two measurement points whose interval is 1 mm and when the value obtained by dividing "the number of boundaries satisfying the boundary condition BA" by "the number of boundaries satisfying the boundary condition BB" is 1.15 or more, the steel sheet is judged to include "the boundary which satisfies the boundary condition BA and which does not satisfy the boundary condition BB", and the steel sheet is represented such that "switching boundary" exists in the Tables. Here, "the number of boundaries satisfying the boundary condition BA" corresponds to the boundary of the case A and/or the case B in Table 1 as shown above, and "the number of boundaries satisfying the boundary condition BB" corresponds to the boundary of the case A. The average grain size was calculated based on the above identified boundaries. Moreover, σ(θ) which was a standard deviation of an absolute value of the deviation angle θ was measured by the above-mentioned method.

(2) Magnetic Characteristics of Grain Oriented Electrical Steel

Magnetic characteristics of the grain oriented electrical steel were measured based on the single sheet tester (SST) method regulated by JIS C 2556: 2015.

As the magnetic characteristics, the iron loss $W_{17/50}$ (W/kg) which was defined as the power loss per unit weight (1 kg) of the steel sheet was measured under the conditions of 50 Hz of AC frequency and 1.7 T of excited magnetic flux density. Moreover, the magnetic flux density $B_8$ (T) in the rolling direction of the steel sheet was measured under the condition such that the steel sheet was excited at 800 A/m.

In addition, as the magnetic characteristics, the magnetostriction λp−p@1.7 T generated in the steel sheet was measured under the conditions of 50 Hz of AC frequency and 1.7 T of excited magnetic flux density. Specifically, using the maximum length $L_{max}$ and the minimum length $L_{min}$ of the test piece (steel sheet) under the above excitation condition and using the length $L_0$ of the test piece under 0T of the magnetic flux density, the magnetostriction λp−p@1.7 T was calculated based on λp−p@1.7 T=$(L_{max}-L_{min})\div L_0$.

TABLE A8

| | | PRODUCTION RESULTS | | | | | EVALUATION RESULTS MAGNETIC CHARACTERISTICS | | | | |
|---|---|---|---|---|---|---|---|---|---|---|---|
| No. | STEEL TYPE | BONDARY EXISTENCE OF SWITCHING BOUNDARY EXISTENCE NONE | AVERAGE GRAIN SIZE $RB_L$/$RA_L$ | $RB_L$ mm | $RA_L$ mm | DEVIATION ANGLE σ(θ) | B8 T | λp−p @ 1.7T | Δλp−p | W17/50 W/kg | NOTE |
| 1001 | C1 | NONE | 1.03 | 23.7 | 22.8 | 3.29 | 1.913 | 0.687 | 0.005 | 0.890 | COMPARATIVE EXAMPLE |
| 1002 | C1 | NONE | 1.04 | 28.9 | 27.9 | 2.96 | 1.924 | 0.646 | 0.027 | 0.868 | COMPARATIVE EXAMPLE |
| 1003 | C1 | NONE | 1.04 | 34.9 | 33.6 | 2.69 | 1.930 | 0.600 | 0.019 | 0.852 | COMPARATIVE EXAMPLE |
| 1004 | C1 | NONE | 1.02 | 19.9 | 19.4 | 3.49 | 1.905 | 0.728 | 0.001 | 0.902 | COMPARATIVE EXAMPLE |
| 1005 | C1 | NONE | 1.02 | 24.7 | 24.2 | 3.20 | 1.917 | 0.676 | 0.016 | 0.880 | COMPARATIVE EXAMPLE |
| 1006 | C1 | NONE | 1.04 | 24.5 | 23.6 | 3.17 | 1.916 | 0.675 | 0.010 | 0.882 | COMPARATIVE EXAMPLE |
| 1007 | C1 | NONE | 1.09 | 25.6 | 23.5 | 2.98 | 1.922 | 0.648 | 0.021 | 0.871 | COMPARATIVE EXAMPLE |
| 1008 | C1 | NONE | 1.03 | 27.4 | 26.6 | 3.36 | 1.918 | 0.645 | −0.005 | 0.875 | COMPARATIVE EXAMPLE |
| 1009 | C1 | EXISTENCE | 1.16 | 23.4 | 20.2 | 3.08 | 1.920 | 0.601 | −0.038 | 0.873 | INVENTIVE EXAMPLE |
| 1010 | C1 | EXISTENCE | 1.17 | 19.7 | 16.8 | 3.40 | 1.910 | 0.645 | −0.050 | 0.895 | INVENTIVE EXAMPLE |
| 1011 | C1 | NONE | 1.02 | 24.6 | 24.2 | 3.16 | 1.915 | 0.676 | 0.005 | 0.883 | COMPARATIVE EXAMPLE |
| 1012 | C1 | NONE | 1.02 | 24.3 | 23.9 | 3.19 | 1.915 | 0.677 | 0.006 | 0.883 | COMPARATIVE EXAMPLE |
| 1013 | C1 | NONE | 1.06 | 24.3 | 22.9 | 3.14 | 1.916 | 0.671 | 0.005 | 0.880 | COMPARATIVE EXAMPLE |
| 1014 | C1 | EXISTENCE | 1.16 | 23.5 | 20.3 | 3.05 | 1.920 | 0.589 | −0.048 | 0.874 | INVENTIVE EXAMPLE |
| 1015 | C1 | EXISTENCE | 1.16 | 24.5 | 21.1 | 3.05 | 1.919 | 0.603 | −0.041 | 0.874 | INVENTIVE EXAMPLE |
| 1016 | C1 | EXISTENCE | 1.16 | 23.4 | 20.1 | 3.06 | 1.918 | 0.606 | −0.044 | 0.875 | INVENTIVE EXAMPLE |
| 1017 | C1 | EXISTENCE | 1.16 | 23.4 | 20.2 | 3.03 | 1.920 | 0.595 | −0.043 | 0.875 | INVENTIVE EXAMPLE |
| 1018 | C1 | EXISTENCE | 1.23 | 24.1 | 19.5 | 2.95 | 1.923 | 0.577 | −0.046 | 0.857 | INVENTIVE EXAMPLE |
| 1019 | C1 | EXISTENCE | 1.18 | 24.0 | 20.3 | 3.05 | 1.920 | 0.590 | −0.051 | 0.875 | INVENTIVE EXAMPLE |
| 1020 | C1 | EXISTENCE | 1.24 | 25.2 | 20.4 | 2.92 | 1.922 | 0.579 | −0.050 | 0.867 | INVENTIVE EXAMPLE |

TABLE A9

| | | PRODUCTION RESULTS | | | | | EVALUATION RESULTS MAGNETIC CHARACTERISTICS | | | | |
|---|---|---|---|---|---|---|---|---|---|---|---|
| No. | STEEL TYPE | BONDARY EXISTENCE OF SWITCHING BOUNDARY EXISTENCE NONE | AVERAGE GRAIN SIZE $RB_L$/$RA_L$ | $RB_L$ mm | $RA_L$ mm | DEVIATION ANGLE σ(θ) | B8 T | λp−p @ 1.7T | Δλp−p | W17/50 W/kg | NOTE |
| 1021 | C1 | EXISTENCE | 1.26 | 24.5 | 19.4 | 2.87 | 1.926 | 0.579 | −0.0234 | 0.861 | INVENTIVE EXAMPLE |
| 1022 | C1 | NONE | 1.02 | 34.0 | 33.4 | 2.66 | 1.941 | 0.551 | 0.031 | 0.852 | COMPARATIVE EXAMPLE |
| 1023 | C1 | EXISTENCE | 1.18 | 33.1 | 28.1 | 2.55 | 1.944 | 0.436 | −0.065 | 0.844 | INVENTIVE EXAMPLE |

TABLE A9-continued

| No. | STEEL TYPE | PRODUCTION RESULTS BONDARY EXISTENCE OF SWITCHING BOUNDARY EXISTENCE NONE | AVERAGE GRAIN SIZE $RB_L/RA_L$ | $RB_L$ mm | $RA_L$ mm | DEVIATION ANGLE σ(θ) | EVALUATION RESULTS MAGNETIC CHARACTERISTICS B8 T | λp-p @ 1.7T | Δλp-p | W17/50 W/kg | NOTE |
|---|---|---|---|---|---|---|---|---|---|---|---|
| 1024 | D1 | NONE | 1.07 | 25.4 | 23.7 | 3.14 | 1.911 | 0.679 | −0.014 | 0.860 | COMPARATIVE EXAMPLE |
| 1025 | D1 | EXISTENCE | 1.18 | 24.4 | 20.7 | 3.04 | 1.915 | 0.613 | −0.056 | 0.854 | INVENTIVE EXAMPLE |
| 1026 | D1 | EXISTENCE | 1.21 | 25.5 | 21.1 | 2.95 | 1.917 | 0.594 | −0.065 | 0.847 | INVENTIVE EXAMPLE |
| 1027 | D1 | EXISTENCE | 1.25 | 25.6 | 20.5 | 2.88 | 1.921 | 0.585 | −0.048 | 0.842 | INVENTIVE EXAMPLE |
| 1028 | D1 | EXISTENCE | 1.36 | 26.0 | 19.2 | 2.76 | 1.925 | 0.567 | −0.045 | 0.834 | INVENTIVE EXAMPLE |
| 1029 | D1 | EXISTENCE | 1.41 | 26.2 | 18.5 | 2.65 | 1.927 | 0.552 | −0.045 | 0.831 | INVENTIVE EXAMPLE |
| 1030 | D1 | EXISTENCE | 1.36 | 26.0 | 19.1 | 2.73 | 1.924 | 0.565 | −0.050 | 0.835 | INVENTIVE EXAMPLE |
| 1031 | D1 | EXISTENCE | 1.35 | 25.5 | 18.8 | 2.75 | 1.925 | 0.552 | −0.061 | 0.834 | INVENTIVE EXAMPLE |
| 1032 | D1 | EXISTENCE | 1.24 | 23.3 | 18.8 | 2.96 | 1.918 | 0.592 | −0.060 | 0.847 | INVENTIVE EXAMPLE |
| 1033 | D1 | EXISTENCE | 1.29 | 22.0 | 17.0 | 3.04 | 1.915 | 0.601 | −0.066 | 0.853 | INVENTIVE EXAMPLE |
| 1034 | D1 | NONE | 1.09 | 17.9 | 16.4 | 3.17 | 1.912 | 0.686 | 0.002 | 0.861 | COMPARATIVE EXAMPLE |
| 1035 | D2 | NONE | 1.14 | 21.8 | 19.2 | 4.92 | 1.932 | 0.598 | 0.027 | 0.848 | COMPARATIVE EXAMPLE |
| 1036 | D2 | NONE | 1.13 | 24.7 | 21.8 | 4.28 | 1.942 | 0.520 | 0.003 | 0.835 | COMPARATIVE EXAMPLE |
| 1037 | D2 | EXISTENCE | 1.66 | 25.7 | 15.5 | 4.24 | 1.943 | 0.434 | −0.072 | 0.835 | INVENTIVE EXAMPLE |
| 1038 | D2 | EXISTENCE | 1.70 | 25.9 | 15.3 | 2.98 | 1.955 | 0.372 | −0.066 | 0.811 | INVENTIVE EXAMPLE |
| 1039 | D2 | EXISTENCE | 2.06 | 25.9 | 12.5 | 2.26 | 1.961 | 0.322 | −0.084 | 0.794 | INVENTIVE EXAMPLE |
| 1040 | D2 | EXISTENCE | 2.16 | 24.9 | 11.5 | 1.94 | 1.964 | 0.310 | −0.078 | 0.790 | INVENTIVE EXAMPLE |

TABLE A10

| No. | STEEL TYPE | PRODUCTION RESULTS BONDARY EXISTENCE OF SWITCHING BOUNDARY EXISTENCE NONE | AVERAGE GRAIN SIZE $RB_L/RA_L$ | $RB_L$ mm | $RA_L$ mm | DEVIATION ANGLE σ(θ) | EVALUATION RESULTS MAGNETIC CHARACTERISTICS B8 T | λp-p @ 1.7T | Δλp-p | W17/50 W/kg | NOTE |
|---|---|---|---|---|---|---|---|---|---|---|---|
| 1041 | D2 | EXISTENCE | 2.19 | 25.1 | 11.5 | 2.50 | 1.959 | 0.346 | −0.071 | 0.800 | INVENTIVE EXAMPLE |
| 1042 | D2 | EXISTENCE | 2.17 | 25.0 | 11.5 | 2.97 | 1.955 | 0.359 | −0.077 | 0.811 | INVENTIVE EXAMPLE |
| 1043 | D2 | EXISTENCE | 1.97 | 25.1 | 12.7 | 2.51 | 1.959 | 0.336 | −0.079 | 0.802 | INVENTIVE EXAMPLE |
| 1044 | D2 | EXISTENCE | 1.97 | 26.2 | 13.3 | 2.51 | 1.960 | 0.339 | −0.068 | 0.802 | INVENTIVE EXAMPLE |
| 1045 | D2 | EXISTENCE | 2.19 | 26.5 | 12.1 | 2.46 | 1.961 | 0.324 | −0.083 | 0.800 | INVENTIVE EXAMPLE |
| 1046 | D2 | EXISTENCE | 2.17 | 26.9 | 12.4 | 2.49 | 1.959 | 0.347 | −0.070 | 0.800 | INVENTIVE EXAMPLE |
| 1047 | D2 | EXISTENCE | 1.69 | 25.6 | 15.2 | 3.51 | 1.950 | 0.375 | −0.092 | 0.819 | INVENTIVE EXAMPLE |
| 1048 | C1 | NONE | 1.04 | 14.9 | 14.4 | 3.06 | 1.918 | 0.667 | 0.012 | 0.875 | COMPARATIVE EXAMPLE |
| 1049 | C2 | NONE | 1.04 | 16.1 | 15.5 | 3.06 | 1.919 | 0.683 | 0.018 | 0.877 | COMPARATIVE EXAMPLE |
| 1050 | C3 | EXISTENCE | 1.43 | 25.1 | 17.6 | 4.75 | 1.929 | 0.543 | −0.045 | 0.839 | INVENTIVE EXAMPLE |
| 1051 | C4 | EXISTENCE | 1.65 | 25.6 | 15.5 | 3.74 | 1.945 | 0.406 | −0.089 | 0.813 | INVENTIVE EXAMPLE |
| 1052 | C5 | EXISTENCE | 1.67 | 25.3 | 15.1 | 3.72 | 1.945 | 0.408 | −0.086 | 0.816 | INVENTIVE EXAMPLE |
| 1053 | C6 | EXISTENCE | 1.66 | 25.9 | 15.6 | 3.73 | 1.944 | 0.387 | −0.110 | 0.815 | INVENTIVE EXAMPLE |
| 1054 | C7 | EXISTENCE | 1.44 | 25.4 | 17.6 | 4.74 | 1.930 | 0.553 | −0.029 | 0.850 | INVENTIVE EXAMPLE |
| 1055 | C8 | NONE | 1.04 | 15.2 | 14.6 | 3.08 | 1.926 | 0.585 | −0.0227 | 0.886 | COMPARATIVE EXAMPLE |
| 1056 | D1 | NONE | 1.04 | 15.2 | 14.6 | 3.07 | 1.917 | 0.668 | 0.013 | 0.885 | COMPARATIVE EXAMPLE |
| 1057 | D2 | EXISTENCE | 1.65 | 24.1 | 14.7 | 3.73 | 1.947 | 0.398 | −0.086 | 0.834 | INVENTIVE EXAMPLE |
| 1058 | E | EXISTENCE | 1.42 | 24.0 | 16.9 | 4.17 | 1.924 | 0.588 | −0.029 | 0.854 | INVENTIVE EXAMPLE |
| 1059 | F | EXISTENCE | 1.64 | 14.9 | 14.9 | 3.73 | 1.941 | 0.482 | −0.030 | 0.835 | INVENTIVE EXAMPLE |
| 1060 | G | EXISTENCE | 1.65 | 24.0 | 14.5 | 3.75 | 1.946 | 0.408 | −0.082 | 0.833 | INVENTIVE EXAMPLE |

TABLE A11

| | | PRODUCTION RESULTS | | | | | EVALUATION RESULTS | | | | |
|---|---|---|---|---|---|---|---|---|---|---|---|
| | | BONDARY EXISTENCE OF SWITCHING BOUNDARY | AVERAGE GRAIN SIZE | | | DEVIATION | MAGNETIC CHARACTERISTICS | | | | |
| No. | STEEL TYPE | EXISTENCE NONE | $RB_L$/ $RA_L$ | $RB_L$ mm | $RA_L$ mm | ANGLE σ(θ) | B8 T | λp-p @ 1.7T | Δλp-p | W17/50 W/kg | NOTE |
| 1061 | H | EXISTENCE | 1.66 | 25.9 | 15.6 | 3.75 | 1.947 | 0.393 | −0.090 | 0.833 | INVENTIVE EXAMPLE |
| 1062 | I | EXISTENCE | 1.41 | 24.2 | 17.2 | 4.75 | 1.920 | 0.612 | −0.031 | 0.854 | INVENTIVE EXAMPLE |
| 1063 | J | EXISTENCE | 1.65 | 24.8 | 15.0 | 3.73 | 1.948 | 0.408 | −0.068 | 0.836 | INVENTIVE EXAMPLE |
| 1064 | K | EXISTENCE | 1.65 | 25.2 | 15.3 | 3.76 | 1.947 | 0.409 | −0.077 | 0.835 | INVENTIVE EXAMPLE |
| 1065 | A1 | NONE | 1.02 | 13.6 | 13.3 | 2.94 | 1.926 | 0.595 | −0.012 | 0.878 | COMPARATIVE EXAMPLE |
| 1066 | A1 | NONE | 1.02 | 14.0 | 13.8 | 2.94 | 1.925 | 0.608 | −0.002 | 0.878 | COMPARATIVE EXAMPLE |
| 1067 | A1 | NONE | 1.04 | 14.4 | 13.8 | 2.87 | 1.927 | 0.579 | −0.018 | 0.871 | COMPARATIVE EXAMPLE |
| 1068 | A1 | NONE | 1.07 | 17.3 | 16.1 | 2.69 | 1.934 | 0.560 | 0.000 | 0.862 | COMPARATIVE EXAMPLE |
| 1069 | A1 | EXISTENCE | 1.35 | 39.3 | 29.0 | 2.51 | 1.938 | 0.452 | −0.085 | 0.852 | INVENTIVE EXAMPLE |
| 1070 | A1 | EXISTENCE | 1.27 | 33.7 | 25.4 | 2.63 | 1.935 | 0.489 | −0.064 | 0.858 | INVENTIVE EXAMPLE |
| 1071 | A1 | EXISTENCE | 1.33 | 37.0 | 27.9 | 2.60 | 1.938 | 0.478 | −0.061 | 0.857 | INVENTIVE EXAMPLE |
| 1072 | A1 | EXISTENCE | 1.37 | 40.5 | 29.6 | 2.52 | 1.940 | 0.468 | −0.058 | 0.851 | INVENTIVE EXAMPLE |
| 1073 | A1 | EXISTENCE | 1.38 | 40.7 | 29.6 | 2.53 | 1.939 | 0.461 | −0.067 | 0.850 | INVENTIVE EXAMPLE |
| 1074 | A2 | EXISTENCE | 1.64 | 25.7 | 15.7 | 3.32 | 1.951 | 0.378 | −0.082 | 0.827 | INVENTIVE EXAMPLE |
| 1075 | A2 | EXISTENCE | 1.66 | 25.4 | 15.3 | 3.34 | 1.951 | 0.387 | −0.074 | 0.828 | INVENTIVE EXAMPLE |
| 1076 | A2 | EXISTENCE | 1.65 | 25.3 | 15.3 | 3.01 | 1.953 | 0.373 | −0.076 | 0.820 | INVENTIVE EXAMPLE |
| 1077 | A2 | NONE | 1.07 | 25.9 | 24.1 | 2.50 | 1.959 | 0.431 | 0.013 | 0.811 | COMPARATIVE EXAMPLE |
| 1078 | A2 | EXISTENCE | 1.86 | 25.0 | 14.0 | 2.15 | 1.953 | 0.332 | −0.059 | 0.802 | INVENTIVE EXAMPLE |
| 1079 | A2 | EXISTENCE | 1.80 | 26.1 | 14.5 | 2.48 | 1.959 | 0.340 | −0.074 | 0.811 | INVENTIVE EXAMPLE |
| 1080 | A2 | EXISTENCE | 1.84 | 24.8 | 13.4 | 2.38 | 1.960 | 0.334 | −0.075 | 0.808 | INVENTIVE EXAMPLE |

TABLE A12

| | | PRODUCTION RESULTS | | | | | EVALUATION RESULTS | | | | |
|---|---|---|---|---|---|---|---|---|---|---|---|
| | | BONDARY EXISTENCE OF SWITCHING BOUNDARY | AVERAGE GRAIN SIZE | | | DEVIATION | MAGNETIC CHARACTERISTICS | | | | |
| No. | STEEL TYPE | EXISTENCE NONE | $RB_L$/ $RA_L$ | $RB_L$ mm | $RA_L$ mm | ANGLE σ(θ) | B8 T | λp-p @ 1.7T | Δλp-p | W17/50 W/kg | NOTE |
| 1081 | A2 | EXISTENCE | 1.88 | 24.9 | 13.3 | 2.11 | 1.962 | 0.327 | −0.071 | 0.803 | INVENTIVE EXAMPLE |
| 1082 | A2 | EXISTENCE | 1.89 | 25.1 | 13.3 | 2.15 | 1.964 | 0.308 | −0.081 | 0.802 | INVENTIVE EXAMPLE |
| 1083 | B1 | EXISTENCE | 1.42 | 42.3 | 29.8 | 2.46 | 1.939 | 0.460 | −0.071 | 0.849 | INVENTIVE EXAMPLE |
| 1084 | B1 | EXISTENCE | 1.60 | 55.9 | 35.0 | 2.28 | 1.946 | 0.433 | −0.057 | 0.836 | INVENTIVE EXAMPLE |
| 1085 | B1 | EXISTENCE | 1.45 | 47.6 | 32.9 | 2.38 | 1.943 | 0.442 | −0.063 | 0.845 | INVENTIVE EXAMPLE |
| 1086 | B1 | EXISTENCE | 1.36 | 41.8 | 30.4 | 2.46 | 1.939 | 0.447 | −0.085 | 0.848 | INVENTIVE EXAMPLE |
| 1087 | B1 | EXISTENCE | 1.70 | 65.6 | 38.6 | 2.22 | 1.948 | 0.423 | −0.057 | 0.831 | INVENTIVE EXAMPLE |
| 1088 | B1 | NONE | 1.13 | 23.1 | 20.4 | 2.63 | 1.934 | 0.562 | 0.005 | 0.859 | COMPARATIVE EXAMPLE |
| 1089 | B1 | NONE | 1.11 | 20.9 | 16.9 | 2.73 | 1.932 | 0.581 | 0.010 | 0.863 | COMPARATIVE EXAMPLE |
| 1090 | B1 | NONE | 1.14 | 23.5 | 20.6 | 2.64 | 1.935 | 0.549 | −0.002 | 0.859 | COMPARATIVE EXAMPLE |
| 1091 | B1 | NONE | 1.02 | 14.2 | 13.9 | 3.04 | 1.925 | 0.606 | −0.008 | 0.882 | COMPARATIVE EXAMPLE |
| 1092 | B1 | NONE | 1.14 | 22.8 | 20.0 | 2.95 | 1.925 | 0.610 | 0.001 | 0.880 | COMPARATIVE EXAMPLE |
| 1093 | B2 | EXISTENCE | 1.91 | 24.9 | 13.0 | 2.06 | 1.963 | 0.318 | −0.075 | 0.802 | INVENTIVE EXAMPLE |
| 1094 | B2 | EXISTENCE | 2.07 | 26.2 | 12.7 | 1.49 | 1.969 | 0.294 | −0.065 | 0.791 | INVENTIVE EXAMPLE |
| 1095 | B2 | EXISTENCE | 1.96 | 25.9 | 13.2 | 1.79 | 1.966 | 0.314 | −0.064 | 0.797 | INVENTIVE EXAMPLE |
| 1096 | B2 | EXISTENCE | 1.89 | 25.2 | 13.3 | 2.07 | 1.963 | 0.312 | −0.084 | 0.800 | INVENTIVE EXAMPLE |
| 1097 | B2 | EXISTENCE | 2.20 | 26.3 | 12.0 | 1.26 | 1.972 | 0.283 | −0.060 | 0.785 | INVENTIVE EXAMPLE |
| 1098 | B2 | NONE | 1.13 | 26.1 | 23.2 | 2.45 | 1.959 | 0.414 | −0.001 | 0.810 | COMPARATIVE EXAMPLE |
| 1099 | B2 | NONE | 1.10 | 24.5 | 22.2 | 2.65 | 1.958 | 0.425 | 0.003 | 0.814 | COMPARATIVE EXAMPLE |
| 1100 | B2 | NONE | 1.14 | 25.5 | 22.4 | 2.43 | 1.959 | 0.406 | −0.010 | 0.809 | COMPARATIVE EXAMPLE |

The characteristics of grain oriented electrical steel sheet significantly vary depending on the chemical composition and the producing method. Thus, it is necessary to compare and analyze the evaluation results of characteristics within steel sheets whose chemical compositions and producing methods are appropriately classified. Hereinafter, the evaluation results of characteristics are explained by classifying the grain oriented electrical steels under some features in regard to the chemical compositions and the producing methods.

Herein, in the Example 1, although the technical effects are explained by the magnetostriction (λp−p@1.7 T), it is difficult to understand the superiority or inferiority of the effect even when the value of the magnetostriction is simply compared. For instance, the magnetostriction has a relatively strong correlation with the magnetic flux density, and tends to decrease with an increase in the magnetic flux density. Thus, even when the value of the magnetostriction is low, when the magnetic flux density of the test piece is sufficiently high, it is difficult to judge whether the magnetostriction is improved or not. In other words, it is needed to judge the improvement of the magnetostriction with considering the correlation with the magnetic flux density. In the Example, as an index for evaluating the magnetostriction, the following Δλp−p is used.

$$\Delta\lambda p\text{-}p=\lambda p\text{-}p@1.7T-(11.68-5.75\times B_8)$$

The "11.68−5.75×$B_8$" corresponds to "value of λp−p@1.7 T estimated from $B_8$". The "value of λp−p@1.7 T estimated from $B_8$" is based on the values of λp−p@1.7 T and $B_8$ of the comparative examples in the present Example. Moreover, for the "value of λp−p@1.7 T estimated from $B_8$", the relationship of λp−p@1.7 T=a−b×$B_8$ has been assumed, and the coefficients a and b have been determined by the multiple regression analysis. For instance, when the $B_8$ of the test piece is 1.9 T, it is possible to estimate that λp−p@1.7 T be approximately 0.755 (=11.68−5.75×1.9).

The examples shown in Tables A1 to A12 are the test results of the steel sheets under specific conditions regarding the chemical composition and production conditions. Thus, the coefficients of the above "11.68−5.75×$B_8$" have no particular physical meaning and are merely empirical constants applicable under the conditions of the Example. Thus, the present invention is not limited to the above index. In a case of the Example, the correlation between $B_8$ and λp−p@1.7 T is relatively high. Thus, the effect of the present invention is judged by using Δλp−p which is the index for evaluating the magnetostriction as described above.

In the Example, when Δλp−p was −0.0230 or less (when the value varied toward negative from −0.0230 which is the standard), the magnetostriction characteristic was judged to be acceptable.

Examples Produced by Low Temperature Slab Heating Process

Nos. 1001 to 1064 were examples produced by a process in which slab heating temperature was decreased, nitridation was conducted after primary recrystallization, and thereby main inhibitor for secondary recrystallization was formed.

Examples of Nos. 1001 to 1023

Nos. 1001 to 1023 were examples in which the steel type without Nb was used and the conditions of PA, PB, PC1, PC2, and TE1 were mainly changed during final annealing.

In Nos. 1001 to 1023, the inventive examples included the boundary which satisfied the boundary condition BA and which did not satisfy the boundary condition BB, and thus these examples exhibited excellent magnetostriction. Moreover, the inventive examples exhibited an acceptable iron loss. On the other hand, although the comparative examples had the crystal orientation which was slightly and continuously shifted in the secondary recrystallized grains, the comparative examples did not sufficiently include the boundary which satisfies the boundary condition BA and which does not satisfy the boundary condition BB, and thus these examples did not exhibit preferred magnetostriction.

Here, No. 1003 was the comparative example in which the inhibitor intensity was increased by controlling the N content after nitridation to be 300 ppm. In general, although increasing the nitrogen content by nitridation causes a decrease in productivity, increasing the nitrogen content by nitridation results in an increase in the inhibitor intensity, and thereby $B_8$ increases. In No. 1003, $B_8$ increased. However, in No. 1003, the conditions in final annealing were not preferable, and thus Δλp−p was insufficient. In other words, in No. 1003, the switching did not occur during final annealing, and as a result, the magnetostriction was not improved. On the other hand, No. 1010 was the inventive example in which the N content after nitridation was controlled to be 160 ppm. In No. 1010, Δλp−p became a preferred low value. In other words, in No. 1010, the switching occurred during final annealing, and as a result, the magnetostriction was improved.

Nos. 1022 and 1023 were examples in which the secondary recrystallization was maintained up to higher temperature by increasing TF. In Nos. 1022 and 1023, Bs increased. However, in No. 1022 among the above, the conditions in final annealing were not preferable, and thus the magnetostriction was not improved as with No. 1003. On the other hand, in No. 1023, in addition to high value of Bs, the conditions in final annealing were preferable, and thus Δλp−p became a preferred low value.

Examples of Nos. 1024 to 1034

Nos. 1024 to 1034 were examples in which the steel type including 0.002% of Nb was used and the conditions of PA and TE1 were mainly changed during final annealing.

In Nos. 1024 to 1034, the inventive examples included the boundary which satisfied the boundary condition BA and which did not satisfy the boundary condition BB, and thus these examples exhibited excellent magnetostriction. Moreover, the inventive examples exhibited an acceptable iron loss. On the other hand, although the comparative examples had the crystal orientation which was slightly and continuously shifted in the secondary recrystallized grains, the comparative examples did not sufficiently include the boundary which satisfies the boundary condition BA and which does not satisfy the boundary condition BB, and thus these examples did not exhibit preferred magnetostriction.

Examples of Nos. 1035 to 1047

Nos. 1035 to 1047 were examples in which the steel type including 0.006% of Nb was used.

In Nos. 1035 to 1047, the inventive examples included the boundary which satisfied the boundary condition BA and which did not satisfy the boundary condition BB, and thus these examples exhibited excellent magnetostriction. Moreover, the inventive examples exhibited an acceptable iron loss. On the other hand, although the comparative examples had the crystal orientation which was slightly and continuously shifted in the secondary recrystallized grains, the comparative examples did not sufficiently include the boundary which satisfies the boundary condition BA and which does not satisfy the boundary condition BB, and thus these examples did not exhibit preferred magnetostriction.

Nos. 1035 to 1047 exhibited a preferred low value regarding $\Delta\lambda p-p$ as compared with Nos. 1001 to 1034 in which the Nb content is low.

Examples of Nos. 1048 to 1055

Nos. 1048 to 1055 were examples in which TE1 was controlled to be a short time of less than 200 minutes and the influence of Nb content was particularly confirmed.

In Nos. 1048 to 1055, the inventive examples included the boundary which satisfied the boundary condition BA and which did not satisfy the boundary condition BB, and thus these examples exhibited excellent magnetostriction. Moreover, the inventive examples exhibited an acceptable iron loss. On the other hand, although the comparative examples had the crystal orientation which was slightly and continuously shifted in the secondary recrystallized grains, the comparative examples did not sufficiently include the boundary which satisfies the boundary condition BA and which does not satisfy the boundary condition BB, and thus these examples did not exhibit preferred magnetostriction.

As shown in Nos. 1048 to 1055, when Nb was favorably included, the switching occurred during final annealing, and thus the magnetostriction was improved even when TE1 was the short time.

Examples of Nos. 1056 to 1064

Nos. 1056 to 1064 were examples in which TE1 was controlled to be the short time of less than 200 minutes and the influence of the amount of Nb group element was confirmed.

In Nos. 1056 to 1064, the inventive examples included the boundary which satisfied the boundary condition BA and which did not satisfy the boundary condition BB, and thus these examples exhibited excellent magnetostriction. Moreover, the inventive examples exhibited an acceptable iron loss. On the other hand, although the comparative examples had the crystal orientation which was slightly and continuously shifted in the secondary recrystallized grains, the comparative examples did not sufficiently include the boundary which satisfies the boundary condition BA and which does not satisfy the boundary condition BB, and thus these examples did not exhibit preferred magnetostriction.

As shown in Nos. 1056 to 1064, when the Nb group element except for Nb was favorably included, the switching occurred during final annealing, and thus the magnetostriction was improved even when TE1 was the short time.

Examples Produced by High Temperature Slab Heating Process

Nos. 1065 to 1100 were examples produced by a process in which slab heating temperature was increased, MnS was sufficiently soluted during slab heating and was reprecipitated during post process, and the reprecipited MnS was utilized as main inhibitor.

In Nos. 1065 to 1100, the inventive examples included the boundary which satisfied the boundary condition BA and which did not satisfy the boundary condition BB, and thus these examples exhibited excellent magnetostriction. Moreover, the inventive examples exhibited an acceptable iron loss. On the other hand, although the comparative examples had the crystal orientation which was slightly and continuously shifted in the secondary recrystallized grains, the comparative examples did not sufficiently include the boundary which satisfies the boundary condition BA and which does not satisfy the boundary condition BB, and thus these examples did not exhibit preferred magnetostriction.

Nos. 1083 to 1100 in the above Nos. 1065 to 1100 were examples in which Bi was included in the slab and thus $B_8$ increased.

As shown in Nos. 1065 to 1100, as long as the conditions in final annealing were appropriately controlled, the switching occurred during final annealing, and thus the magnetostriction was improved even by the high temperature slab heating process. Moreover, as with the low temperature slab heating process, when the slab including Nb was used and the conditions in final annealing were controlled, the magnetostriction was favorably improved by the high temperature slab heating process.

Example 2

Using slabs with chemical composition shown in Table B1 as materials, grain oriented electrical steel sheets with chemical composition shown in Table B2 were produced. The methods for measuring the chemical composition and the notation in the tables are the same as in the above Example 1.

TABLE B1

| STEEL | CHEMICAL COMPOSITION OF SLAB(STEEL PIECE) (UNIT: mass %, BALANCE CONSISTING OF Fe AND IMPURITIES) | | | | | | | | | | | | |
|---|---|---|---|---|---|---|---|---|---|---|---|---|---|
| TYPE | C | Si | Mn | S | Al | N | Cu | Bi | Nb | V | Mo | Ta | W |
| A1 | 0.070 | 3.26 | 0.07 | 0.025 | 0.026 | 0.008 | 0.07 | — | 0.001 | — | — | — | — |
| A2 | 0.070 | 3.26 | 0.07 | 0.025 | 0.026 | 0.008 | 0.07 | — | 0.005 | — | — | — | — |
| B1 | 0.070 | 3.26 | 0.07 | 0.025 | 0.025 | 0.008 | 0.07 | 0.002 | — | — | — | — | — |
| B2 | 0.070 | 3.26 | 0.07 | 0.025 | 0.025 | 0.008 | 0.07 | 0.002 | 0.008 | — | — | — | — |
| C1 | 0.060 | 3.35 | 0.10 | 0.006 | 0.026 | 0.008 | 0.20 | — | — | — | | | |
| C2 | 0.060 | 3.35 | 0.10 | 0.006 | 0.026 | 0.008 | 0.20 | — | 0.002 | — | — | — | — |
| C3 | 0.060 | 3.35 | 0.10 | 0.006 | 0.026 | 0.008 | 0.20 | — | 0.003 | — | — | — | — |
| C4 | 0.060 | 3.35 | 0.10 | 0.006 | 0.026 | 0.008 | 0.20 | — | 0.005 | — | | | |
| C5 | 0.060 | 3.35 | 0.10 | 0.006 | 0.026 | 0.008 | 0.20 | — | 0.010 | — | — | — | — |
| C6 | 0.060 | 3.35 | 0.10 | 0.006 | 0.026 | 0.008 | 0.20 | — | 0.020 | — | — | — | — |
| C7 | 0.060 | 3.35 | 0.10 | 0.006 | 0.026 | 0.008 | 0.20 | — | 0.030 | — | | | |
| C8 | 0.060 | 3.35 | 0.10 | 0.006 | 0.026 | 0.008 | 0.20 | — | 0.050 | — | — | — | — |
| D1 | 0.060 | 3.45 | 0.10 | 0.006 | 0.028 | 0.008 | <0.03 | — | 0.001 | — | — | — | — |
| D2 | 0.060 | 3.45 | 0.10 | 0.006 | 0.028 | 0.008 | <0.03 | — | 0.009 | — | — | — | — |

TABLE B1-continued

| STEEL TYPE | CHEMICAL COMPOSITION OF SLAB(STEEL PIECE) (UNIT: mass %, BALANCE CONSISTING OF Fe AND IMPURITIES) C | Si | Mn | S | Al | N | Cu | Bi | Nb | V | Mo | Ta | W |
|---|---|---|---|---|---|---|---|---|---|---|---|---|---|
| E | 0.060 | 3.45 | 0.10 | 0,006 | 0.027 | 0.008 | <0.03 | — | — | 0.007 | — | — | — |
| F | 0.060 | 3.45 | 0.10 | 0.006 | 0.027 | 0.008 | <0.03 | — | — | — | 0.015 | — | — |
| G | 0.060 | 3.45 | 0.10 | 0.006 | 0.027 | 0.008 | <0.03 | — | 0.005 | — | — | 0.005 | — |
| H | 0.060 | 3.45 | 0.10 | 0.006 | 0.027 | 0.008 | <0.03 | — | — | — | — | 0.007 | — |
| I | 0.060 | 3.45 | 0.10 | 0.006 | 0.027 | 0.008 | <0.03 | — | — | — | — | — | 0.015 |
| J | 0.060 | 3.45 | 0.10 | 0.006 | 0.027 | 0.008 | <0.03 | — | 0.010 | — | 0.010 | — | — |
| K | 0.060 | 3.45 | 0.10 | 0.006 | 0.027 | 0.008 | <0.03 | — | 0.002 | 0.004 | — | 0.004 | — |

TABLE B2

| STEEL TYPE | CHEMICAL COMPOSITION OF GRAIN ORIENTED ELECTRICALY STEEL SHEET (UNIT: mass %, BALANCE CONSISTING OF Fe AND IMPURITIES) C | Si | Mn | S | Al | N | Cu | Bi | Nb | V | Mo | Ta | W |
|---|---|---|---|---|---|---|---|---|---|---|---|---|---|
| A1 | 0.001 | 3.15 | 0.07 | <0.002 | <0.004 | <0.002 | 0.07 | — | — | — | — | — | — |
| A2 | 0.001 | 3.15 | 0.07 | <0.002 | <0.004 | <0.002 | 0.07 | — | 0.004 | — | — | — | — |
| B1 | 0.001 | 3.15 | 0.07 | <0.002 | <0.004 | <0.002 | 0.07 | <0.001 | — | — | — | — | — |
| B2 | 0.001 | 3.15 | 0.07 | <0.002 | <0.004 | <0.002 | 0.07 | <0.001 | 0.006 | — | — | — | — |
| C1 | 0.001 | 3.30 | 0.10 | <0.002 | <0.004 | <0.002 | 0.20 | — | — | — | — | — | — |
| C2 | 0.001 | 3.30 | 0.10 | <0.002 | <0.004 | <0.002 | 0.20 | — | 0.001 | — | — | — | — |
| C3 | 0.001 | 3.30 | 0.10 | <0.002 | <0.004 | <0.002 | 0.20 | — | 0.003 | — | — | — | — |
| C4 | 0.001 | 3.30 | 0.10 | <0.002 | <0.004 | <0.002 | 0.20 | — | 0.003 | — | — | — | — |
| C5 | 0.001 | 3.30 | 0.10 | <0.002 | <0.004 | <0.002 | 0.20 | — | 0.007 | — | — | — | — |
| C6 | 0.002 | 3.30 | 0.10 | <0.002 | <0.004 | <0.002 | 0.20 | — | 0.018 | — | — | — | — |
| C7 | 0.004 | 3.30 | 0.10 | <0.002 | <0.004 | <0.002 | 0.20 | — | 0.028 | — | — | — | — |
| C8 | 0.006 | 3.30 | 0.10 | <0.002 | <0.004 | <0.002 | 0.20 | — | 0.048 | — | — | — | — |
| D1 | 0.001 | 3.34 | 0.10 | <0.002 | <0.004 | <0.002 | <0.03 | — | 0.001 | — | — | — | — |
| D2 | 0.001 | 3.34 | 0.10 | <0.002 | <0.004 | <0.002 | <0.03 | — | 0.007 | — | — | — | — |
| E | 0.001 | 3.30 | 0.10 | <0.002 | <0.004 | <0.002 | <0.03 | — | — | 0.006 | — | — | — |
| F | 0.001 | 3.34 | 0.10 | <0.002 | <0.004 | <0.002 | <0.03 | — | — | — | 0.015 | — | — |
| G | 0.001 | 3.34 | 0.10 | <0.002 | <0.004 | <0.002 | <0.03 | — | 0.004 | — | — | 0.005 | — |
| H | 0.001 | 3.34 | 0.10 | <0.002 | <0.004 | <0.002 | <0.03 | — | — | — | — | 0.010 | — |
| I | 0.001 | 3.34 | 0.10 | <0.002 | <0.004 | <0.002 | <0.03 | — | — | — | — | — | 0.015 |
| J | 0.001 | 3.34 | 0.10 | <0.002 | <0.004 | <0.002 | <0.03 | — | 0.008 | — | 0.008 | — | — |
| K | 0.001 | 3.34 | 0.10 | <0.002 | <0.004 | <0.002 | <0.03 | — | 0.001 | 0.003 | — | 0.003 | — |

The grain oriented electrical steel sheets were produced under production conditions shown in Table B3 to Table B7. The production conditions other than those shown in the tables were the same as those in the above Example 1.

TABLE B3

| | | PRODUCTION CONDITIONS | | | | | | | | | |
|---|---|---|---|---|---|---|---|---|---|---|---|
| | | HOT ROLLING | | | | HOT BAND ANNEALING | | COLD ROLLING | | DECARBURIZATION ANNEALING | |
| No. | STEEL TYPE | HEATING TEMPERATURE ° C. | TEMPERATURE OF FINAL ROLLING ° C. | COILING TEMPERATURE ° C. | SHEET THICKNESS mm | TEMPERATURE ° C. | TIME SECOND | SHEET THICKNESS mm | REDUCTION OF COLD ROLLING % | GRAIN SIZE OF PRIMARY RECRYSTALLIZED GRAIN µm | NITROGEN CONTENT AFTER NITRIDATION ppm |
| 2001 | C1 | 1150 | 900 | 550 | 2.8 | 1100 | 180 | 0.26 | 90.7 | 23 | 220 |
| 2002 | C1 | 1150 | 900 | 550 | 2.8 | 1100 | 180 | 0.26 | 90.7 | 23 | 250 |
| 2003 | C1 | 1150 | 900 | 550 | 2.8 | 1100 | 180 | 0.26 | 90.7 | 23 | 300 |
| 2004 | C1 | 1150 | 900 | 550 | 2.8 | 1100 | 180 | 0.26 | 90.7 | 23 | 160 |
| 2005 | C1 | 1150 | 900 | 550 | 2.8 | 1100 | 180 | 0.26 | 90.7 | 23 | 220 |
| 2006 | C1 | 1150 | 900 | 550 | 2.8 | 1100 | 180 | 0.26 | 90.7 | 23 | 220 |
| 2007 | C1 | 1150 | 900 | 550 | 2.8 | 1100 | 180 | 0.26 | 90.7 | 23 | 220 |
| 2008 | C1 | 1150 | 900 | 550 | 2.8 | 1100 | 180 | 0.26 | 90.7 | 23 | 220 |
| 2009 | C1 | 1150 | 900 | 550 | 2.8 | 1100 | 180 | 0.26 | 90.7 | 23 | 220 |
| 2010 | C1 | 1150 | 900 | 550 | 2.8 | 1100 | 180 | 0.26 | 90.7 | 23 | 180 |

TABLE B3-continued

| | | | | | | | | | | | |
|---|---|---|---|---|---|---|---|---|---|---|---|
| 2011 | C1 | 1150 | 900 | 550 | 2.8 | 1100 | 180 | 0.26 | 90.7 | 23 | 220 |
| 2012 | C1 | 1150 | 900 | 550 | 2.8 | 1100 | 180 | 0.26 | 90.7 | 23 | 220 |
| 2013 | C1 | 1150 | 900 | 550 | 2.8 | 1100 | 180 | 0.26 | 90.7 | 23 | 220 |
| 2014 | C1 | 1150 | 900 | 550 | 2.8 | 1100 | 180 | 0.26 | 90.7 | 23 | 220 |
| 2015 | C1 | 1150 | 900 | 550 | 2.8 | 1100 | 180 | 0.26 | 90.7 | 23 | 220 |
| 2016 | C1 | 1150 | 900 | 550 | 2.8 | 1100 | 180 | 0.26 | 90.7 | 23 | 220 |
| 2017 | C1 | 1150 | 900 | 550 | 2.8 | 1100 | 180 | 0.26 | 90.7 | 23 | 220 |
| 2018 | C1 | 1150 | 900 | 550 | 2.8 | 1100 | 180 | 0.26 | 90.7 | 23 | 220 |
| 2019 | C1 | 1150 | 900 | 550 | 2.8 | 1100 | 180 | 0.26 | 90.7 | 23 | 220 |
| 2020 | C1 | 1150 | 900 | 550 | 2.8 | 1100 | 180 | 0.26 | 90.7 | 23 | 220 |

| | | PRODUCTION CONDITIONS FINAL ANNEALING | | | | | |
|---|---|---|---|---|---|---|---|
| No. | STEEL TYPE | PA | PB | PC1 | PC2 | TE1 MINUTE | TF MINUTE |
| 2001 | C1 | 0.020 | 0.007 | 0.003 | 0.0007 | 150 | 300 |
| 2002 | C1 | 0.070 | 0.007 | 0.005 | 0.0007 | 150 | 300 |
| 2003 | C1 | 0.070 | 0.007 | 0.005 | 0.0007 | 150 | 300 |
| 2004 | C1 | 0.070 | 0.007 | 0.005 | 0.0007 | 150 | 300 |
| 2005 | C1 | 0.070 | 0.007 | 0.003 | 0.0007 | 150 | 300 |
| 2006 | C1 | 0.070 | 0.007 | 0.003 | 0.0007 | 210 | 300 |
| 2007 | C1 | 0.020 | 0.040 | 0.010 | 0.010 | 210 | 300 |
| 2008 | C1 | 0.150 | 0.010 | 0.003 | 0.0007 | 150 | 300 |
| 2009 | C1 | 0.070 | 0.010 | 0.003 | 0.9007 | 210 | 300 |
| 2010 | C1 | 0.070 | 0.007 | 0.005 | 0.0007 | 210 | 300 |
| 2011 | C1 | 0.070 | 0.007 | 0003 | 0.0007 | 210 | 300 |
| 2012 | C1 | 0.070 | 0.007 | 0.005 | 0.0007 | 150 | 300 |
| 2013 | C1 | 0.020 | 0.007 | 0.005 | 0.0007 | 210 | 300 |
| 2014 | C1 | 0.030 | 0.007 | 0.005 | 0.0007 | 210 | 300 |
| 2015 | C1 | 0.070 | 0.007 | 0.005 | 0.0007 | 210 | 300 |
| 2016 | C1 | 0.070 | 0.010 | 0.003 | 0.0007 | 210 | 300 |
| 2017 | C1 | 0.070 | 0.010 | 0.003 | 0.001 | 210 | 300 |
| 2018 | C1 | 0.070 | 0.020 | 0.005 | 0.0007 | 210 | 300 |
| 2019 | C1 | 0.070 | 0.007 | 0.003 | 0.001 | 210 | 300 |
| 2020 | C1 | 0.070 | 0.007 | 0.003 | 0.003 | 210 | 300 |

TABLE B4

| | | PRODUCTION CONDITIONS | | | | | | | | | |
|---|---|---|---|---|---|---|---|---|---|---|---|
| | | HOT ROLLING | | | | HOT BAND ANNEALING | | COLD ROLLING | | DECARBURIZATION ANNEALING | |
| No. | STEEL TYPE | HEATING TEMPERATURE ° C. | TEMPERATURE OF FINAL ROLLING ° C. | COILING TEMPERATURE ° C. | SHEET THICKNESS mm | TEMPERATURE ° C. | TIME SECOND | SHEET THICKNESS mm | REDUCTION OF COLD ROLLING % | GRAIN SIZE OF PRIMARY RECRYSTALLIZED GRAIN μm | NITROGEN CONTENT AFTER NITRIDATION ppm |
| 2021 | C1 | 1150 | 900 | 550 | 2.8 | 1100 | 180 | 0.26 | 90.7 | 23 | 220 |
| 2022 | C1 | 1150 | 900 | 550 | 2.8 | 1100 | 180 | 0.26 | 90.7 | 23 | 300 |
| 2023 | C1 | 1150 | 900 | 550 | 2.8 | 1100 | 180 | 0.26 | 90.7 | 23 | 300 |
| 2024 | D1 | 1150 | 900 | 550 | 2.8 | 1100 | 180 | 0.26 | 90.7 | 22 | 220 |
| 2025 | D1 | 1150 | 900 | 550 | 2.8 | 1100 | 180 | 0.26 | 90.7 | 22 | 220 |
| 2026 | D1 | 1150 | 900 | 550 | 2.8 | 1100 | 180 | 0.26 | 90.7 | 22 | 220 |
| 2027 | D1 | 1150 | 900 | 550 | 2.8 | 1100 | 180 | 0.26 | 90.7 | 22 | 220 |
| 2028 | D1 | 1150 | 900 | 550 | 2.8 | 1100 | 180 | 0.26 | 90.7 | 22 | 220 |
| 2029 | D1 | 1150 | 900 | 550 | 2.8 | 1100 | 180 | 0.26 | 90.7 | 22 | 220 |
| 2030 | D1 | 1150 | 900 | 550 | 2.8 | 1100 | 180 | 0.26 | 90.7 | 22 | 220 |
| 2031 | D1 | 1150 | 900 | 550 | 2.8 | 1100 | 180 | 0.26 | 90.7 | 22 | 220 |
| 2032 | D1 | 1150 | 900 | 550 | 2.8 | 1100 | 180 | 0.26 | 90.7 | 22 | 220 |
| 2033 | D1 | 1150 | 900 | 550 | 2.8 | 1100 | 180 | 0.26 | 90.7 | 22 | 220 |
| 2034 | D1 | 1150 | 900 | 550 | 2.8 | 1100 | 180 | 0.26 | 90.7 | 22 | 220 |
| 2035 | D2 | 1150 | 900 | 550 | 2.8 | 1100 | 180 | 0.26 | 90.7 | 16 | 220 |
| 2036 | D2 | 1150 | 900 | 550 | 2.8 | 1100 | 180 | 0.26 | 90.7 | 16 | 220 |
| 2037 | D2 | 1150 | 900 | 550 | 2.8 | 1100 | 180 | 0.26 | 90.7 | 16 | 220 |
| 2038 | D2 | 1150 | 900 | 550 | 2.8 | 1100 | 180 | 0.26 | 90.7 | 16 | 220 |
| 2039 | D2 | 1150 | 900 | 550 | 2.8 | 1100 | 180 | 0.26 | 90.7 | 16 | 220 |
| 2040 | D2 | 1150 | 900 | 550 | 2.8 | 1100 | 180 | 0.26 | 90.7 | 16 | 220 |

TABLE B4-continued

| No. | STEEL TYPE | PRODUCTION CONDITIONS FINAL ANNEALING PA | PB | PC1 | PC2 | TE1 MINUTE | TF MINUTE |
|---|---|---|---|---|---|---|---|
| 2021 | C1 | 0.070 | 0.020 | 0.005 | 0.010 | 210 | 300 |
| 2022 | C1 | 0.070 | 0.007 | 0.005 | 0.0007 | 150 | 600 |
| 2023 | C1 | 0.070 | 0.007 | 0.005 | 0.0007 | 210 | 600 |
| 2024 | D1 | 0.020 | 0.007 | 0.005 | 0.0007 | 210 | 300 |
| 2025 | D1 | 0.070 | 0.007 | 0.005 | 0.0007 | 210 | 300 |
| 2026 | D1 | 0.150 | 0.007 | 0.005 | 0.0007 | 210 | 300 |
| 2027 | D1 | 0.300 | 0.007 | 0.005 | 0.0007 | 210 | 300 |
| 2028 | D1 | 0.450 | 0.007 | 0.005 | 0.0007 | 300 | 300 |
| 2029 | D1 | 0.450 | 0.007 | 0.005 | 0.0007 | 750 | 300 |
| 2030 | D1 | 0.450 | 0.007 | 0.005 | 0.0007 | 1500 | 300 |
| 2031 | D1 | 0.600 | 0.007 | 0.005 | 0.0007 | 300 | 300 |
| 2032 | D1 | 2.000 | 0.007 | 0.005 | 0.0007 | 210 | 300 |
| 2033 | D1 | 5.000 | 0.007 | 0.005 | 0.0007 | 210 | 300 |
| 2034 | D1 | 6.000 | 0.007 | 0.005 | 0.0007 | 210 | 300 |
| 2035 | D2 | 0.020 | 0.005 | 0.003 | 0.0007 | 150 | 300 |
| 2036 | D2 | 0.050 | 0.005 | 0.007 | 0.0007 | 150 | 300 |
| 2037 | D2 | 0.020 | 0.007 | 0.007 | 0.0007 | 150 | 300 |
| 2038 | D2 | 0.350 | 0.007 | 0.007 | 0.005 | 150 | 300 |
| 2039 | D2 | 0.350 | 0.007 | 0.007 | 0.005 | 300 | 300 |
| 2040 | D2 | 0.350 | 0.007 | 0.007 | 0.005 | 600 | 300 |

TABLE B5

| No. | STEEL TYPE | PRODUCTION CONDITIONS HOT ROLLING HEATING TEMPERATURE ° C. | TEMPERATURE OF FINAL ROLLING ° C. | COILING TEMPERATURE ° C. | SHEET THICKNESS mm | HOT BAND ANNEALING TEMPERATURE ° C. | TIME SECOND | COLD ROLLING SHEET THICKNESS mm | REDUCTION OF COLD ROLLING % |
|---|---|---|---|---|---|---|---|---|---|
| 2041 | D2 | 1150 | 900 | 550 | 2.8 | 1100 | 180 | 0.26 | 90.7 |
| 2042 | D2 | 1150 | 900 | 550 | 2.8 | 1100 | 180 | 0.26 | 90.7 |
| 2043 | D2 | 1150 | 900 | 550 | 2.8 | 1100 | 180 | 0.26 | 90.7 |
| 2044 | D2 | 1150 | 900 | 550 | 2.8 | 1100 | 180 | 0.26 | 90.7 |
| 2045 | D2 | 1150 | 900 | 550 | 2.8 | 1100 | 180 | 0.26 | 90.7 |
| 2046 | D2 | 1150 | 900 | 550 | 2.8 | 1100 | 180 | 0.26 | 90.7 |
| 2047 | D2 | 1150 | 900 | 550 | 2.8 | 1100 | 180 | 0.26 | 90.7 |
| 2048 | C1 | 1150 | 900 | 550 | 2.8 | 1100 | 180 | 0.26 | 90.7 |
| 2049 | C2 | 1150 | 900 | 550 | 2.8 | 1100 | 180 | 0.26 | 90.7 |
| 2050 | C3 | 1150 | 900 | 550 | 2.8 | 1100 | 180 | 0.26 | 90.7 |
| 2051 | C4 | 1150 | 900 | 550 | 2.8 | 1100 | 180 | 0.26 | 90.7 |
| 2052 | C5 | 1150 | 900 | 550 | 2.8 | 1100 | 180 | 0.26 | 90.7 |
| 2053 | C6 | 1150 | 900 | 550 | 2.8 | 1100 | 180 | 0.26 | 90.7 |
| 2054 | C7 | 1150 | 900 | 550 | 2.8 | 1100 | 180 | 0.26 | 90.7 |
| 2055 | C8 | 1150 | 900 | 550 | 2.8 | 1100 | 180 | 0.26 | 90.7 |
| 2056 | D1 | 1150 | 900 | 550 | 2.8 | 1100 | 180 | 0.26 | 90.7 |
| 2057 | D2 | 1150 | 900 | 550 | 2.8 | 1100 | 180 | 0.26 | 90.7 |
| 2058 | E | 1150 | 900 | 550 | 2.8 | 1100 | 180 | 0.26 | 90.7 |
| 2059 | F | 1150 | 900 | 550 | 2.8 | 1100 | 180 | 0.26 | 90.7 |
| 2060 | G | 1150 | 900 | 550 | 2.8 | 1100 | 180 | 0.26 | 90.7 |

| No. | PRODUCTION CONDITIONS DECARBURIZATION ANNEALING GRAIN SIZE OF PRIMARY RE-CRYSTALLIZED GRAIN μm | NITROGEN CONTENT AFTER NITRIDATION ppm | FINAL ANNEALING PA | PB | PC1 | PC2 | TE2 MINUTE | TF MINUTE |
|---|---|---|---|---|---|---|---|---|
| 2041 | 16 | 190 | 0.350 | 0.007 | 0.007 | 0.005 | 600 | 300 |
| 2042 | 16 | 160 | 0.350 | 0.007 | 0.007 | 0.005 | 600 | 300 |
| 2043 | 16 | 220 | 0.350 | 0.030 | 0.003 | 0.005 | 600 | 300 |
| 2044 | 16 | 220 | 0.250 | 0.030 | 0.003 | 0.005 | 600 | 300 |

TABLE B5-continued

| | | | | | | | | |
|---|---|---|---|---|---|---|---|---|
| 2045 | 16 | 180 | 0.450 | 0.040 | 0.003 | 0.010 | 600 | 300 |
| 2046 | 16 | 180 | 0.600 | 0.050 | 0.003 | 0.020 | 600 | 300 |
| 2047 | 16 | 210 | 1.500 | 0.010 | 0.005 | 0.0007 | 150 | 300 |
| 2048 | 23 | 210 | 0.250 | 0.010 | 0.003 | 0.0007 | 150 | 300 |
| 2049 | 24 | 210 | 0.250 | 0.010 | 0.003 | 0.0007 | 150 | 300 |
| 2050 | 20 | 210 | 0.250 | 0.010 | 0.003 | 0.0007 | 150 | 300 |
| 2051 | 18 | 210 | 0.250 | 0.010 | 0.003 | 0.0007 | 150 | 300 |
| 2052 | 17 | 210 | 0.250 | 0.010 | 0.003 | 0.0007 | 150 | 300 |
| 2053 | 16 | 210 | 0.250 | 0.010 | 0.003 | 0.0007 | 150 | 300 |
| 2054 | 13 | 210 | 0.250 | 0.010 | 0.003 | 0.0007 | 150 | 300 |
| 2055 | 13 | 210 | 0.250 | 0.010 | 0.003 | 0.0007 | 150 | 300 |
| 2056 | 23 | 220 | 0.050 | 0.005 | 0.003 | 0.002 | 150 | 300 |
| 2057 | 16 | 220 | 0.050 | 0.005 | 0.003 | 0.002 | 150 | 300 |
| 2058 | 21 | 220 | 0.050 | 0.005 | 0.003 | 0.002 | 150 | 300 |
| 2059 | 18 | 220 | 0.050 | 0.005 | 0.003 | 0.002 | 150 | 300 |
| 2060 | 15 | 220 | 0.050 | 0.005 | 0.003 | 0.002 | 150 | 300 |

TABLE B6

| | | PRODUCTION CONDITIONS | | | | | | | |
|---|---|---|---|---|---|---|---|---|---|
| | | HOT ROLLING | | | | | | COLD ROLLING | |
| | | | | | | HOT BAND ANNEALING | | | |
| No. | STEEL TYPE | HEATING TEMPERATURE ° C. | TEMPERATURE OF FINAL ROLLING ° C. | COILING TEMPERATURE ° C. | SHEET THICKNESS mm | TEMPERATURE ° C. | TIME SECOND | SHEET THICKNESS mm | REDUCTION OF COLD ROLLING % |
| 2061 | H | 1150 | 900 | 550 | 2.8 | 1100 | 180 | 0.26 | 90.7 |
| 2062 | I | 1150 | 900 | 550 | 2.8 | 1100 | 180 | 0.26 | 90.7 |
| 2063 | J | 1150 | 900 | 550 | 2.8 | 1100 | 180 | 0.26 | 90.7 |
| 2064 | K | 1150 | 900 | 550 | 2.8 | 1100 | 180 | 0.26 | 90.7 |
| 2065 | A1 | 1400 | 1100 | 500 | 2.8 | 1100 | 180 | 0.26 | 90.0 |
| 2066 | A1 | 1400 | 1100 | 500 | 2.6 | 1100 | 180 | 0.26 | 90.0 |
| 2067 | A1 | 1400 | 1100 | 500 | 2.6 | 1100 | 180 | 0.26 | 90.0 |
| 2068 | A1 | 1400 | 1100 | 500 | 2.6 | 1100 | 180 | 0.26 | 90.0 |
| 2069 | A1 | 1400 | 1100 | 500 | 2.6 | 1100 | 180 | 0.26 | 90.0 |
| 2070 | A1 | 1400 | 1100 | 500 | 2.6 | 1100 | 180 | 0.26 | 90.0 |
| 2071 | A1 | 1400 | 1100 | 500 | 2.6 | 1100 | 180 | 0.26 | 90.0 |
| 2072 | A1 | 1400 | 1100 | 500 | 2.6 | 1100 | 180 | 0.26 | 90.0 |
| 2073 | A1 | 1400 | 1100 | 500 | 2.6 | 1100 | 180 | 0.26 | 90.0 |
| 2074 | A2 | 1400 | 1100 | 500 | 2.6 | 1100 | 180 | 0.26 | 90.0 |
| 2075 | A2 | 1400 | 1100 | 500 | 2.6 | 1100 | 180 | 0.26 | 90.0 |
| 2076 | A2 | 1400 | 1100 | 500 | 2.6 | 1100 | 180 | 0.26 | 90.0 |
| 2077 | A2 | 1400 | 1100 | 500 | 2.6 | 1100 | 180 | 0.26 | 90.0 |
| 2078 | A2 | 1400 | 1100 | 500 | 2.6 | 1100 | 180 | 0.26 | 90.0 |
| 2079 | A2 | 1400 | 1100 | 500 | 2.6 | 1100 | 180 | 0.26 | 90.0 |
| 2080 | A2 | 1400 | 1100 | 500 | 2.6 | 1100 | 180 | 0.26 | 90.0 |

| | PRODUCTION CONDITIONS | | | | | | | |
|---|---|---|---|---|---|---|---|---|
| | DECARBURIZATION ANNEALING | | | | | | | |
| | GRAIN SIZE OF PRIMARY RE-CRYSTALLIZED | NITROGEN CONTENT AFTER | FINAL ANNEALING | | | | | |
| No. | GRAIN μm | NITRIDATION ppm | PA | PB | PC1 | PC2 | TE2 MINUTE | TF MINUTE |
| 2061 | 16 | 220 | 0.050 | 0.005 | 0.003 | 0.002 | 150 | 300 |
| 2062 | 22 | 220 | 0.050 | 0.005 | 0.003 | 0.002 | 150 | 300 |
| 2063 | 16 | 220 | 0.050 | 0.005 | 0.003 | 0.002 | 150 | 300 |
| 2064 | 15 | 220 | 0.050 | 0.005 | 0.003 | 0.002 | 150 | 300 |
| 2065 | 9 | — | 0.030 | 0.007 | 0.005 | 0.0007 | 150 | 300 |
| 2066 | 9 | — | 0.030 | 0.007 | 0.009 | 0.0007 | 150 | 300 |
| 2067 | 9 | — | 0.030 | 0.020 | 0.010 | 0.003 | 150 | 300 |
| 2068 | 9 | — | 0.350 | 0.005 | 0.003 | 0.0007 | 300 | 300 |
| 2069 | 9 | — | 0.350 | 0.009 | 0.005 | 0.0007 | 300 | 300 |
| 2070 | 9 | — | 0.030 | 0.009 | 0.009 | 0.0007 | 600 | 300 |
| 2071 | 9 | — | 0.030 | 0.020 | 0.010 | 0.003 | 300 | 300 |
| 2072 | 9 | — | 0.030 | 0.020 | 0.010 | 0.003 | 600 | 300 |
| 2073 | 9 | — | 0.030 | 0.020 | 0.010 | 0.003 | 900 | 300 |
| 2074 | 7 | — | 0.030 | 0.004 | 0.005 | 0.0007 | 150 | 300 |

TABLE B6-continued

| | | | | | | | | |
|---|---|---|---|---|---|---|---|---|
| 2075 | 7 | — | 0.030 | 0.004 | 0.009 | 0.0007 | 150 | 300 |
| 2076 | 7 | — | 0.030 | 0.020 | 0.010 | 0.003 | 150 | 300 |
| 2077 | 7 | — | 0.350 | 0.005 | 0.003 | 0.0007 | 300 | 300 |
| 2078 | 7 | — | 0.350 | 0.009 | 0.005 | 0.0007 | 300 | 300 |
| 2079 | 7 | — | 0.030 | 0.009 | 0.009 | 0.0007 | 600 | 300 |
| 2080 | 7 | — | 0.030 | 0.020 | 0.010 | 0.003 | 300 | 300 |

TABLE B7

| | | PRODUCTION CONDITIONS | | | | | | | |
|---|---|---|---|---|---|---|---|---|---|
| | | HOT ROLLING | | | | | | COLD ROLLING | |
| | | HEATING | TEMPERATURE OF FINAL | COILING | SHEET | HOT BAND ANNEALING | | SHEET | REDUCTION OF COLD |
| No. | STEEL TYPE | TEMPERATURE ° C. | ROLLING ° C. | TEMPERATURE ° C. | THICKNESS mm | TEMPERATURE ° C. | TIME SECOND | THICKNESS mm | ROLLING % |
| 2081 | A2 | 1400 | 900 | 550 | 2.6 | 1100 | 180 | 0.26 | 90.0 |
| 2082 | A2 | 1400 | 900 | 550 | 2.6 | 1100 | 180 | 0.26 | 90.0 |
| 2083 | B1 | 1350 | 900 | 550 | 2.6 | 1100 | 180 | 0.26 | 90.0 |
| 2084 | B1 | 1350 | 900 | 550 | 2.6 | 1100 | 180 | 0.26 | 90.0 |
| 2085 | B1 | 1350 | 900 | 550 | 2.6 | 1100 | 180 | 0.26 | 90.0 |
| 2086 | B1 | 1350 | 900 | 550 | 2.6 | 1100 | 180 | 0.26 | 90.0 |
| 2087 | B1 | 1350 | 900 | 550 | 2.6 | 1100 | 180 | 0.26 | 90.0 |
| 2088 | B1 | 1350 | 900 | 550 | 2.6 | 1100 | 180 | 0.26 | 90.0 |
| 2089 | B1 | 1350 | 900 | 550 | 2.6 | 1100 | 180 | 0.26 | 90.0 |
| 2090 | B1 | 1350 | 900 | 550 | 2.6 | 1100 | 180 | 0.26 | 90.0 |
| 2091 | B1 | 1350 | 900 | 550 | 2.6 | 1100 | 180 | 0.26 | 90.0 |
| 2092 | B1 | 1350 | 900 | 550 | 2.6 | 1100 | 180 | 0.26 | 90.0 |
| 2093 | B2 | 1350 | 900 | 550 | 2.6 | 1100 | 180 | 0.26 | 90.0 |
| 2094 | B2 | 1350 | 900 | 550 | 2.6 | 1100 | 180 | 0.26 | 90.0 |
| 2095 | B2 | 1350 | 900 | 550 | 2.6 | 1100 | 180 | 0.26 | 90.0 |
| 2096 | B2 | 1350 | 900 | 550 | 2.6 | 1100 | 180 | 0.26 | 90.0 |
| 2097 | B2 | 1350 | 900 | 550 | 2.6 | 1100 | 180 | 0.26 | 90.0 |
| 2098 | B2 | 1350 | 900 | 550 | 2.6 | 1100 | 180 | 0.26 | 90.0 |
| 2099 | B2 | 1350 | 900 | 550 | 2.6 | 1100 | 180 | 0.26 | 90.0 |
| 2100 | B2 | 1350 | 900 | 550 | 2.6 | 1100 | 180 | 0.26 | 90.0 |

| | PRODUCTION CONDITIONS | | | | | | | |
|---|---|---|---|---|---|---|---|---|
| | DECARBURIZATION ANNEALING | | | | | | | |
| | GRAIN SIZE OF PRIMARY RE-CRYSTALLIZED | NITROGEN CONTENT AFTER | FINAL ANNEALING | | | | | |
| No. | GRAIN μm | NITRIDATION ppm | PA | PB | PC1 | PC2 | TE2 MINUTE | TF MINUTE |
| 2081 | 7 | — | 0.030 | 0.020 | 0.010 | 0.003 | 600 | 300 |
| 2082 | 7 | — | 0.030 | 0.020 | 0.010 | 0.003 | 900 | 300 |
| 2083 | 10 | — | 0.250 | 0.020 | 0.005 | 0.003 | 300 | 300 |
| 2084 | 10 | — | 0.250 | 0.020 | 0.005 | 0.005 | 600 | 300 |
| 2085 | 10 | — | 1.500 | 0.020 | 0.005 | 0.005 | 300 | 300 |
| 2086 | 10 | — | 1.500 | 0.020 | 0.005 | 0.003 | 300 | 300 |
| 2087 | 10 | — | 0.500 | 0.040 | 0.040 | 0.003 | 900 | 300 |
| 2088 | 10 | — | 0.010 | 0.250 | 0.015 | 0.003 | 900 | 300 |
| 2089 | 10 | — | 3.000 | 0.250 | 0.150 | 0.003 | 90 | 300 |
| 2090 | 10 | — | 3.000 | 0.250 | 0.005 | 0.075 | 900 | 300 |
| 2091 | 10 | — | 0.020 | 0.007 | 0.005 | 0.0007 | 150 | 300 |
| 2092 | 10 | — | 10.000 | 0.007 | 0.005 | 0.0007 | 150 | 300 |
| 2093 | 8 | — | 0.250 | 0.020 | 0.005 | 0.003 | 300 | 300 |
| 2094 | 8 | — | 0.250 | 0.020 | 0.005 | 0.005 | 600 | 300 |
| 2095 | 8 | — | 1.500 | 0.020 | 0.005 | 0.005 | 300 | 300 |
| 2096 | 8 | — | 1.500 | 0.020 | 0.005 | 0.003 | 300 | 300 |
| 2097 | 8 | — | 0.500 | 0.040 | 0.040 | 0.003 | 900 | 300 |
| 2098 | 8 | — | 0.010 | 0.250 | 0.015 | 0.003 | 900 | 300 |
| 2099 | 8 | — | 3.000 | 0.250 | 0.015 | 0.003 | 90 | 300 |
| 2100 | 8 | — | 3.000 | 0.250 | 0.150 | 0.075 | 900 | 300 |

The insulation coating which was the same as those in the above Example 1 was formed on the surface of produced grain oriented electrical steel sheets (final annealed sheets).

The produced grain oriented electrical steel sheets had the intermediate layer which was arranged in contact with the grain oriented electrical steel sheet (silicon steel sheet) and the insulation coating which was arranged in contact with the intermediate layer, when viewing the cross section whose cutting direction is parallel to thickness direction. The intermediate layer was forsterite film whose average thickness was 1.5 μm, and the insulation coating was the coating which mainly included phosphate and colloidal silica and whose average thickness was 2 μm.

Various characteristics of the obtained grain oriented electrical steel sheet were evaluated. The evaluation methods were the same as those in the above Example 1. The evaluation results are shown in Table B8 to Table B12.

TABLE B8

| | | PRODUCTION RESULTS | | | | |
|---|---|---|---|---|---|---|
| | | BOUNDARY EXISTENCE OF SWITCHING BOUNDARY | AVERAGE GRAIN SIZE | | | DEVIATION |
| No. | STEEL TYPE | EXISTENCE NONE | $RB_C/RA_C$ | $RB_C$ mm | $RA_C$ mm | ANGLE σ (θ) |
| 2001 | C1 | NONE | 1.03 | 23.1 | 22.3 | 3.31 |
| 2002 | C1 | NONE | 1.02 | 29.7 | 29.0 | 2.94 |
| 2003 | C1 | NONE | 1.04 | 34.7 | 33.4 | 2.67 |
| 2004 | C1 | NONE | 1.03 | 20.4 | 19.7 | 3.48 |
| 2005 | C1 | NONE | 1.04 | 24.1 | 23.2 | 3.16 |
| 2006 | C1 | NONE | 1.01 | 24.9 | 24.5 | 3.18 |
| 2007 | C1 | NONE | 1.10 | 26.7 | 24.3 | 2.99 |
| 2008 | C1 | NONE | 1.04 | 26.7 | 25.6 | 3.08 |
| 2009 | C1 | EXISTENCE | 1.16 | 24.9 | 21.4 | 3.05 |
| 2010 | C1 | EXISTENCE | 1.18 | 20.0 | 16.9 | 3.38 |
| 2011 | C1 | NONE | 1.02 | 25.8 | 25.2 | 3.17 |
| 2012 | C1 | NONE | 1.04 | 25.3 | 24.3 | 3.17 |
| 2013 | C1 | NONE | 1.07 | 24.6 | 23.0 | 3.14 |
| 2014 | C1 | EXISTENCE | 1.16 | 24.0 | 20.7 | 3.04 |
| 2015 | C1 | EXISTENCE | 1.16 | 24.7 | 21.4 | 3.07 |
| 2016 | C1 | EXISTENCE | 1.17 | 23.8 | 20.3 | 3.04 |
| 2017 | C1 | EXISTENCE | 1.15 | 24.3 | 21.1 | 3.06 |
| 2018 | C1 | EXISTENCE | 1.22 | 25.2 | 20.6 | 2.94 |
| 2019 | C1 | EXISTENCE | 1.16 | 24.7 | 21.3 | 3.08 |
| 2020 | C1 | EXISTENCE | 1.23 | 25.3 | 20.6 | 2.93 |

| | EVALUATION RESULTS MAGNETIC CHARACTERISTICS | | | | |
|---|---|---|---|---|---|
| No. | B8 T | λp-p @ 1.7T | Δλ p-p | W17/50 W/kg | NOTE |
| 2001 | 1.906 | 0.707 | −0.018 | 0.871 | COMPARATIVE EXAMPLE |
| 2002 | 1.918 | 0.659 | 0.006 | 0.849 | COMPARATIVE EXAMPLE |
| 2003 | 1.926 | 0.615 | 0.008 | 0.832 | COMPARATIVE EXAMPLE |
| 2004 | 1.901 | 0.731 | −0.020 | 0.882 | COMPARATIVE EXAMPLE |
| 2005 | 1.910 | 0.681 | −0.018 | 0.861 | COMPARATIVE EXAMPLE |
| 2006 | 1.911 | 0.681 | −0.011 | 0.863 | COMPARATIVE EXAMPLE |
| 2007 | 1.916 | 0.663 | −0.002 | 0.851 | COMPARATIVE EXAMPLE |
| 2008 | 1.915 | 0.673 | 0.001 | 0.856 | COMPARATIVE EXAMPLE |
| 2009 | 1.915 | 0.644 | −0.027 | 0.854 | INVENTIVE EXAMPLE |
| 2010 | 1.906 | 0.693 | −0.033 | 0.875 | INVENTIVE EXAMPLE |
| 2011 | 1.911 | 0.693 | −0.001 | 0.862 | COMPARATIVE EXAMPLE |
| 2012 | 1.910 | 0.698 | −0.003 | 0.861 | COMPARATIVE EXAMPLE |
| 2013 | 1.911 | 0.690 | −0.003 | 0.862 | COMPARATIVE EXAMPLE |
| 2014 | 1.915 | 0.643 | −0.029 | 0.856 | INVENTIVE EXAMPLE |
| 2015 | 1.914 | 0.620 | −0.055 | 0.853 | INVENTIVE EXAMPLE |
| 2016 | 1.914 | 0.631 | −0.047 | 0.856 | INVENTIVE EXAMPLE |
| 2017 | 1.915 | 0.637 | −0.033 | 0.853 | INVENTIVE EXAMPLE |
| 2018 | 1.918 | 0.623 | −0.029 | 0.847 | INVENTIVE EXAMPLE |
| 2019 | 1.913 | 0.625 | −0.055 | 0.854 | INVENTIVE EXAMPLE |
| 2020 | 1.917 | 0.613 | −0.042 | 0.848 | INVENTIVE EXAMPLE |

TABLE B9

| | | PRODUCTION RESULTS | | | | |
|---|---|---|---|---|---|---|
| | | BOUNDARY EXISTENCE OF SWITCHING BOUNDARY | AVERAGE GRAIN SIZE | | | DEVIATION |
| No. | STEEL TYPE | EXISTENCE NONE | $RB_C/RA_C$ | $RB_C$ mm | $RA_C$ mm | ANGLE σ (θ) |
| 2021 | C1 | EXISTENCE | 1.28 | 25.8 | 20.2 | 2.88 |
| 2022 | C1 | NONE | 1.02 | 35.0 | 34.1 | 2.66 |
| 2023 | C1 | EXISTENCE | 1.17 | 33.7 | 28.8 | 2.56 |
| 2024 | D1 | NONE | 1.06 | 23.7 | 22.3 | 3.19 |
| 2025 | D1 | EXISTENCE | 1.18 | 24.3 | 20.6 | 3.08 |
| 2026 | D1 | EXISTENCE | 1.22 | 25.7 | 21.1 | 2.97 |
| 2027 | D1 | EXISTENCE | 1.24 | 25.7 | 20.8 | 2.85 |
| 2028 | D1 | EXISTENCE | 1.36 | 24.7 | 18.1 | 2.76 |
| 2029 | D1 | EXISTENCE | 1.42 | 25.3 | 17.8 | 2.67 |
| 2030 | D1 | EXISTENCE | 1.34 | 25.1 | 18.7 | 2.73 |
| 2031 | D1 | EXISTENCE | 1.35 | 25.1 | 18.6 | 2.77 |
| 2032 | D1 | EXISTENCE | 1.22 | 22.4 | 18.3 | 3.05 |
| 2033 | D1 | EXISTENCE | 1.27 | 23.2 | 18.3 | 3.04 |
| 2034 | D1 | NONE | 1.07 | 17.0 | 15.9 | 3.17 |
| 2035 | D2 | NONE | 1.13 | 21.0 | 18.6 | 4.92 |
| 2036 | D2 | EXISTENCE | 1.64 | 25.4 | 15.5 | 4.26 |
| 2037 | D2 | EXISTENCE | 1.64 | 25.0 | 15.2 | 4.26 |
| 2038 | D2 | EXISTENCE | 1.69 | 25.6 | 15.2 | 3.02 |
| 2039 | D2 | EXISTENCE | 2.06 | 25.1 | 12.2 | 2.25 |
| 2040 | D2 | EXISTENCE | 2.18 | 26.5 | 12.2 | 1.98 |

| | EVALUATION RESULTS MAGNETIC CHARACTERISTICS | | | | |
|---|---|---|---|---|---|
| No. | B8 T | λp-p @ 1.7T | Δλ p-p | W17/50 W/kg | NOTE |
| 2021 | 1.921 | 0.592 | −0.042 | 0.841 | INVENTIVE EXAMPLE |
| 2022 | 1.935 | 0.558 | 0.009 | 0.832 | COMPARATIVE EXAMPLE |
| 2023 | 1.984 | 0.235 | −0.023 | 0.823 | INVENTIVE EXAMPLE |
| 2024 | 1.916 | 0.679 | 0.017 | 0.879 | COMPARATIVE EXAMPLE |
| 2025 | 1.919 | 0.604 | −0.040 | 0.875 | INVENTIVE EXAMPLE |
| 2026 | 1.923 | 0.595 | −0.030 | 0.869 | INVENTIVE EXAMPLE |
| 2027 | 1.925 | 0.589 | −0.023 | 0.863 | INVENTIVE EXAMPLE |
| 2028 | 1.928 | 0.561 | −0.031 | 0.856 | INVENTIVE EXAMPLE |
| 2029 | 1.932 | 0.558 | −0.012 | 0.848 | INVENTIVE EXAMPLE |
| 2030 | 1.928 | 0.563 | −0.030 | 0.855 | INVENTIVE EXAMPLE |
| 2031 | 1.928 | 0.574 | −0.018 | 0.856 | INVENTIVE EXAMPLE |
| 2032 | 1.919 | 0.619 | −0.027 | 0.873 | INVENTIVE EXAMPLE |
| 2033 | 1.921 | 0.605 | −0.029 | 0.873 | INVENTIVE EXAMPLE |
| 2034 | 1.917 | 0.657 | 0.001 | 0.881 | COMPARATIVE EXAMPLE |
| 2035 | 1.934 | 0.577 | 0.018 | 0.847 | COMPARATIVE EXAMPLE |
| 2036 | 1.938 | 0.454 | −0.076 | 0.834 | INVENTIVE EXAMPLE |
| 2037 | 1.939 | 0.447 | −0.078 | 0.834 | INVENTIVE EXAMPLE |
| 2038 | 1.952 | 0.395 | −0.053 | 0.809 | INVENTIVE EXAMPLE |
| 2039 | 1.959 | 0.346 | −0.061 | 0.797 | INVENTIVE EXAMPLE |
| 2040 | 1.963 | 0.330 | −0.053 | 0.790 | INVENTIVE EXAMPLE |

TABLE B10

| | | PRODUCTION RESULTS | | | | |
|---|---|---|---|---|---|---|
| | | BOUNDARY EXISTENCE OF SWITCHING BOUNDARY | AVERAGE GRAIN SIZE | | | DEVIATION |
| No. | STEEL TYPE | EXISTENCE NONE | $RB_C/RA_C$ | $RB_C$ mm | $RA_C$ mm | ANGLE σ (θ) |
| 2041 | D2 | EXISTENCE | 2.18 | 25.4 | 11.6 | 2.49 |
| 2042 | D2 | EXISTENCE | 2.19 | 25.4 | 11.6 | 2.97 |
| 2043 | D2 | EXISTENCE | 1.98 | 25.3 | 12.8 | 2.50 |
| 2044 | D2 | EXISTENCE | 1.98 | 26.3 | 13.3 | 2.51 |

TABLE B10-continued

| | | | | | | |
|---|---|---|---|---|---|---|
| 2045 | D2 | EXISTENCE | 2.19 | 26.3 | 12.0 | 2.50 |
| 2046 | D2 | EXISTENCE | 2.18 | 25.3 | 11.6 | 2.46 |
| 2047 | D2 | EXISTENCE | 1.71 | 25.1 | 14.7 | 3.72 |
| 2048 | C1 | NONE | 1.03 | 15.9 | 15.4 | 3.09 |
| 2049 | C2 | NONE | 1.05 | 14.8 | 14.1 | 3.08 |
| 2050 | C3 | EXISTENCE | 1.44 | 24.0 | 16.7 | 4.75 |
| 2051 | C4 | EXISTENCE | 1.66 | 24.1 | 14.5 | 3.72 |
| 2052 | C5 | EXISTENCE | 1.65 | 25.4 | 15.4 | 3.72 |
| 2053 | C6 | EXISTENCE | 1.66 | 24.0 | 14.5 | 3.73 |
| 2054 | C7 | EXISTENCE | 1.45 | 25.1 | 17.3 | 4.73 |
| 2055 | C8 | NONE | 1.05 | 16.0 | 15.3 | 3.06 |
| 2056 | D1 | NONE | 1.02 | 14.2 | 14.0 | 3.08 |
| 2057 | D2 | EXISTENCE | 1.66 | 25.5 | 15.4 | 3.76 |
| 2058 | E | EXISTENCE | 1.42 | 23.7 | 16.7 | 4.77 |
| 2059 | F | EXISTENCE | 1.66 | 24.8 | 15.0 | 3.72 |
| 2060 | G | EXISTENCE | 1.66 | 24.0 | 14.4 | 3.74 |

| | EVALUATION RESULTS MAGNETIC CHARACTERISTICS | | | | |
|---|---|---|---|---|---|
| No. | B8 T | λp-p @ 1.7T | Δλ p-p | W17/50 W/kg | NOTE |
| 2041 | 1.957 | 0.378 | −0.037 | 0.799 | INVENTIVE EXAMPLE |
| 2042 | 1.952 | 0.392 | −0.059 | 0.811 | INVENTIVE EXAMPLE |
| 2043 | 1.957 | 0.370 | −0.047 | 0.801 | INVENTIVE EXAMPLE |
| 2044 | 1.956 | 0.362 | −0.062 | 0.800 | INVENTIVE EXAMPLE |
| 2045 | 1.957 | 0.361 | −0.057 | 0.800 | INVENTIVE EXAMPLE |
| 2046 | 1.956 | 0.355 | −0.067 | 0.799 | INVENTIVE EXAMPLE |
| 2047 | 1.945 | 0.436 | −0.052 | 0.824 | INVENTIVE EXAMPLE |
| 2048 | 1.913 | 0.721 | 0.042 | 0.856 | COMPARATIVE EXAMPLE |
| 2049 | 1.914 | 0.741 | 0.066 | 0.855 | COMPARATIVE EXAMPLE |
| 2050 | 1.924 | 0.599 | −0.014 | 0.839 | INVENTIVE EXAMPLE |
| 2051 | 1.940 | 0.480 | −0.039 | 0.815 | INVENTIVE EXAMPLE |
| 2052 | 1.939 | 0.473 | −0.053 | 0.814 | INVENTIVE EXAMPLE |
| 2053 | 1.938 | 0.481 | −0.049 | 0.813 | INVENTIVE EXAMPLE |
| 2054 | 1.929 | 0.527 | −0.059 | 0.848 | INVENTIVE EXAMPLE |
| 2055 | 1.921 | 0.636 | 0.001 | 0.867 | COMPARATIVE EXAMPLE |
| 2056 | 1.920 | 0.648 | 0.007 | 0.887 | COMPARATIVE EXAMPLE |
| 2057 | 1.948 | 0.398 | −0.072 | 0.834 | INVENTIVE EXAMPLE |
| 2058 | 1.925 | 0.595 | −0.016 | 0.853 | INVENTIVE EXAMPLE |
| 2059 | 1.941 | 0.473 | −0.044 | 0.835 | INVENTIVE EXAMPLE |
| 2060 | 1.946 | 0.392 | −0.091 | 0.833 | INVENTIVE EXAMPLE |

TABLE B11

| | | PRODUCTION RESULTS | | | | |
|---|---|---|---|---|---|---|
| | | BOUNDARY EXISTENCE OF SWITCHING BOUNDARY | AVERAGE GRAIN SIZE | | | DEVIATION |
| No. | STEEL TYPE | EXISTENCE NONE | $RB_C/RA_C$ | $RB_C$ mm | $RA_C$ mm | ANGLE σ (θ) |
| 2061 | H | EXISTENCE | 1.65 | 25.1 | 15.2 | 3.75 |
| 2062 | I | EXISTENCE | 1.41 | 25.5 | 18.0 | 4.75 |
| 2063 | J | EXISTENCE | 1.65 | 24.5 | 14.8 | 3.76 |
| 2064 | K | EXISTENCE | 1.66 | 25.6 | 15.4 | 3.76 |
| 2065 | A1 | NONE | 1.01 | 15.0 | 14.8 | 2.94 |
| 2066 | A1 | NONE | 1.01 | 13.7 | 13.5 | 2.95 |
| 2067 | A1 | NONE | 1.03 | 15.6 | 15.1 | 2.85 |
| 2068 | A1 | NONE | 1.04 | 16.6 | 15.9 | 2.67 |
| 2069 | A1 | EXISTENCE | 1.34 | 39.0 | 29.2 | 2.52 |
| 2070 | A1 | EXISTENCE | 1.28 | 32.7 | 25.6 | 2.65 |
| 2071 | A1 | EXISTENCE | 1.32 | 36.9 | 28.0 | 2.61 |
| 2072 | A1 | EXISTENCE | 1.37 | 41.0 | 29.9 | 2.49 |
| 2073 | A1 | EXISTENCE | 1.39 | 40.3 | 28.9 | 2.50 |
| 2074 | A2 | EXISTENCE | 1.63 | 25.1 | 15.4 | 3.30 |
| 2075 | A2 | EXISTENCE | 1.63 | 24.4 | 14.9 | 3.34 |
| 2076 | A2 | EXISTENCE | 1.66 | 24.9 | 15.0 | 3.02 |
| 2077 | A2 | NONE | 1.11 | 24.2 | 21.8 | 2.50 |
| 2078 | A2 | EXISTENCE | 1.86 | 25.4 | 13.6 | 2.18 |

TABLE B11-continued

| | | | | | | |
|---|---|---|---|---|---|---|
| 2079 | A2 | EXISTENCE | 1.80 | 24.9 | 13.8 | 2.50 |
| 2080 | A2 | EXISTENCE | 1.83 | 24.5 | 13.4 | 2.40 |

| | EVALUATION RESULTS MAGNETIC CHARACTERISTICS | | | | |
|---|---|---|---|---|---|
| No. | B8 T | λp-p @ 1.7T | Δλ p-p | W17/50 W/kg | NOTE |
| 2061 | 1.947 | 0.398 | −0.081 | 0.835 | INVENTIVE EXAMPLE |
| 2062 | 1.919 | 0.627 | −0.021 | 0.853 | INVENTIVE EXAMPLE |
| 2063 | 1.947 | 0.394 | −0.083 | 0.833 | INVENTIVE EXAMPLE |
| 2064 | 1.947 | 0.392 | −0.084 | 0.834 | INVENTIVE EXAMPLE |
| 2065 | 1.926 | 0.594 | −0.009 | 0.878 | COMPARATIVE EXAMPLE |
| 2066 | 1.926 | 0.595 | −0.011 | 0.878 | COMPARATIVE EXAMPLE |
| 2067 | 1.929 | 0.602 | 0.019 | 0.872 | COMPARATIVE EXAMPLE |
| 2068 | 1.935 | 0.559 | 0.006 | 0.862 | COMPARATIVE EXAMPLE |
| 2069 | 1.938 | 0.467 | −0.062 | 0.853 | INVENTIVE EXAMPLE |
| 2070 | 1.934 | 0.480 | −0.074 | 0.857 | INVENTIVE EXAMPLE |
| 2071 | 1.936 | 0.488 | −0.054 | 0.857 | INVENTIVE EXAMPLE |
| 2072 | 1.940 | 0.457 | −0.064 | 0.852 | INVENTIVE EXAMPLE |
| 2073 | 1.940 | 0.480 | −0.042 | 0.850 | INVENTIVE EXAMPLE |
| 2074 | 1.952 | 0.388 | −0.063 | 0.827 | INVENTIVE EXAMPLE |
| 2075 | 1.951 | 0.389 | −0.065 | 0.826 | INVENTIVE EXAMPLE |
| 2076 | 1.955 | 0.356 | −0.074 | 0.820 | INVENTIVE EXAMPLE |
| 2077 | 1.959 | 0.404 | −0.001 | 0.810 | COMPARATIVE EXAMPLE |
| 2078 | 1.962 | 0.323 | −0.064 | 0.803 | INVENTIVE EXAMPLE |
| 2079 | 1.959 | 0.349 | −0.054 | 0.811 | INVENTIVE EXAMPLE |
| 2080 | 1.960 | 0.344 | −0.055 | 0.809 | INVENTIVE EXAMPLE |

TABLE B12

| | | PRODUCTION RESULTS | | | | |
|---|---|---|---|---|---|---|
| | | BOUNDARY EXISTENCE OF SWITCHING BOUNDARY | AVERAGE GRAIN SIZE | | | DEVIATION |
| No. | STEEL TYPE | EXISTENCE NONE | $RB_C/RA_C$ | $RB_C$ mm | $RA_C$ mm | ANGLE σ (θ) |
| 2081 | A2 | EXISTENCE | 1.88 | 24.6 | 13.1 | 2.15 |
| 2082 | A2 | EXISTENCE | 1.90 | 25.3 | 13.3 | 2.12 |
| 2083 | B1 | EXISTENCE | 1.42 | 43.6 | 30.7 | 2.49 |
| 2084 | B1 | EXISTENCE | 1.61 | 57.6 | 35.7 | 2.27 |
| 2085 | B1 | EXISTENCE | 1.45 | 46.2 | 31.8 | 2.40 |
| 2086 | B1 | EXISTENCE | 1.37 | 40.6 | 29.6 | 2.48 |
| 2087 | B1 | EXISTENCE | 1.71 | 65.9 | 38.5 | 2.21 |
| 2088 | B1 | NONE | 1.13 | 23.1 | 20.4 | 2.65 |
| 2089 | B1 | NONE | 1.13 | 23.6 | 20.9 | 2.75 |
| 2090 | B1 | NONE | 1.06 | 17.7 | 16.8 | 2.67 |
| 2091 | B1 | NONE | 1.01 | 13.3 | 13.2 | 3.01 |
| 2092 | B1 | NONE | 1.08 | 17.8 | 16.5 | 3.00 |
| 2093 | B2 | EXISTENCE | 1.90 | 25.0 | 13.1 | 2.04 |
| 2094 | B2 | EXISTENCE | 2.08 | 26.4 | 12.7 | 1.49 |
| 2095 | B2 | EXISTENCE | 1.96 | 25.5 | 13.0 | 1.81 |
| 2096 | B2 | EXISTENCE | 1.88 | 24.7 | 13.1 | 2.08 |
| 2097 | B2 | EXISTENCE | 2.19 | 25.8 | 11.8 | 1.22 |
| 2098 | B2 | NONE | 1.12 | 25.7 | 23.0 | 2.46 |
| 2099 | B2 | NONE | 1.08 | 24.6 | 22.8 | 2.65 |
| 2100 | B2 | NONE | 1.10 | 25.6 | 23.3 | 2.44 |

| | EVALUATION RESULTS MAGNETIC CHARACTERISTICS | | | | |
|---|---|---|---|---|---|
| No. | B8 T | λp-p @ 1.7T | Δλ p-p | W17/50 W/kg | NOTE |
| 2081 | 1.962 | 0.329 | −0.058 | 0.803 | INVENTIVE EXAMPLE |
| 2082 | 1.962 | 0.320 | −0.069 | 0.805 | INVENTIVE EXAMPLE |
| 2083 | 1.940 | 0.470 | −0.051 | 0.850 | INVENTIVE EXAMPLE |
| 2084 | 1.945 | 0.438 | −0.052 | 0.837 | INVENTIVE EXAMPLE |
| 2085 | 1.943 | 0.444 | −0.058 | 0.844 | INVENTIVE EXAMPLE |

TABLE B12-continued

| | | | | | |
|---|---|---|---|---|---|
| 2086 | 1.939 | 0.473 | −0.055 | 0.850 | INVENTIVE EXAMPLE |
| 2087 | 1.948 | 0.411 | −0.060 | 0.833 | INVENTIVE EXAMPLE |
| 2088 | 1.934 | 0.566 | 0.009 | 0.860 | COMPARATIVE EXAMPLE |
| 2089 | 1.932 | 0.569 | 0.003 | 0.864 | COMPARATIVE EXAMPLE |
| 2090 | 1.934 | 0.562 | 0.009 | 0.860 | COMPARATIVE EXAMPLE |
| 2091 | 1.925 | 0.606 | −0.006 | 0.882 | COMPARATIVE EXAMPLE |
| 2092 | 1.924 | 0.601 | −0.015 | 0.882 | COMPARATIVE EXAMPLE |
| 2093 | 1.964 | 0.323 | −0.056 | 0.800 | INVENTIVE EXAMPLE |
| 2094 | 1.968 | 0.277 | −0.075 | 0.791 | INVENTIVE EXAMPLE |
| 2095 | 1.966 | 0.297 | −0.068 | 0.796 | INVENTIVE EXAMPLE |
| 2096 | 1.963 | 0.325 | −0.058 | 0.803 | INVENTIVE EXAMPLE |
| 2097 | 1.972 | 0.269 | −0.058 | 0.786 | INVENTIVE EXAMPLE |
| 2098 | 1.959 | 0.402 | −0.002 | 0.809 | COMPARATIVE EXAMPLE |
| 2099 | 1.958 | 0.415 | 0.001 | 0.814 | COMPARATIVE EXAMPLE |
| 2100 | 1.961 | 0.385 | −0.011 | 0.808 | COMPARATIVE EXAMPLE |

Hereinafter, as with the above Example 1, the evaluation results of characteristics are explained by classifying the grain oriented electrical steels under some features in regard to the chemical compositions and the producing methods.

In the Example 2, as the index for evaluating the magnetostriction, the following Δλp−p is used. The reason why the index for evaluating the magnetostriction is used is the same as that in the Example 1.

$$\Delta\lambda p\text{-}p=\lambda p\text{-}p@1.7T-(12.16-6.00\times B_8)$$

The "12.16-6.00×$B_8$" is based on the values of λp−p@1.7 T and $B_8$ of the comparative examples in the present Example. Moreover, for the "12.16-6.00×$B_8$", the relationship of λp−p@1.7 T=a−b×$B_8$ has been assumed, and the coefficients a and b have been determined by the multiple regression analysis. For instance, when the $B_8$ of the test piece is 1.9 T, it is possible to estimate that λp−p@1.7 T be approximately 0.760 (=12.16−6.00×1.9). As with the above Example 1, the present invention is not limited to the above index.

Examples Produced by Low Temperature Slab Heating Process

Nos. 2001 to 2064 were examples produced by a process in which slab heating temperature was decreased, nitridation was conducted after primary recrystallization, and thereby main inhibitor for secondary recrystallization was formed.

Examples of Nos. 2001 to 2023

Nos. 2001 to 2023 were examples in which the steel type without Nb was used and the conditions of PA, PB, PC1, PC2, and TE2 were mainly changed during final annealing.

In Nos. 2001 to 2023, when Δλp−p was −0.0210 or less (when the value varied toward negative from −0.0210 which is the standard), the magnetostriction characteristic was judged to be acceptable.

In Nos. 2001 to 2023, the inventive examples included the boundary which satisfied the boundary condition BA and which did not satisfy the boundary condition BB, and thus these examples exhibited excellent magnetostriction. Moreover, the inventive examples exhibited an acceptable iron loss. On the other hand, although the comparative examples had the crystal orientation which was slightly and continuously shifted in the secondary recrystallized grains, the comparative examples did not sufficiently include the boundary which satisfies the boundary condition BA and which does not satisfy the boundary condition BB, and thus these examples did not exhibit preferred magnetostriction.

Here, No. 2003 was the comparative example in which the inhibitor intensity was increased by controlling the N content after nitridation to be 300 ppm. In No. 2003, although $B_8$ was a high value, the conditions in final annealing were not preferable, and thus Δλp−p was insufficient. On the other hand, No. 2010 was the inventive example in which the N content after nitridation was controlled to be 160 ppm. In No. 2010, Δλp−p became a preferred low value. In other words, in No. 2010, the switching occurred during final annealing, and as a result, the magnetostriction was improved.

Nos. 2022 and 2023 were examples in which the secondary recrystallization was maintained up to higher temperature by increasing TF. In Nos. 2022 and 2023, Bs increased. However, in Nos. 2022 among the above, the conditions in final annealing were not preferable, and thus the magnetostriction was not improved as with No. 2003. On the other hand, in No. 2023, in addition to high value of Bs, the conditions in final annealing were preferable, and thus Δλp−p became a preferred low value.

Examples of Nos. 2024 to 2034

Nos. 2024 to 2034 were examples in which the steel type including 0.001% of Nb was used and the conditions of PA and TE2 were mainly changed during final annealing.

In Nos. 2024 to 2034, when Δλp−p was −0.010 or less (when the value varied toward negative from −0.010 which is the standard), the magnetostriction characteristic was judged to be acceptable.

In Nos. 2024 to 2034, the inventive examples included the boundary which satisfied the boundary condition BA and which did not satisfy the boundary condition BB, and thus these examples exhibited excellent magnetostriction. Moreover, the inventive examples exhibited an acceptable iron loss. On the other hand, although the comparative examples had the crystal orientation which was slightly and continuously shifted in the secondary recrystallized grains, the comparative examples did not sufficiently include the boundary which satisfies the boundary condition BA and which does not satisfy the boundary condition BB, and thus these examples did not exhibit preferred magnetostriction.

Examples of Nos. 2035 to 2047

Nos. 2035 to 2047 were examples in which the steel type including 0.007% of Nb was used.

In Nos. 2035 to 2047, when Δλp−p was −0.010 or less (when the value varied toward negative from −0.010 which is the standard), the magnetostriction characteristic was judged to be acceptable.

In Nos. 2035 to 2047, the inventive examples included the boundary which satisfied the boundary condition BA and which did not satisfy the boundary condition BB, and thus these examples exhibited excellent magnetostriction. Moreover, the inventive examples exhibited an acceptable iron loss. On the other hand, although the comparative examples had the crystal orientation which was slightly and continuously shifted in the secondary recrystallized grains, the comparative examples did not sufficiently include the boundary which satisfies the boundary condition BA and which does not satisfy the boundary condition BB, and thus these examples did not exhibit preferred magnetostriction.

Nos. 2035 to 2047 exhibited a preferred low value regarding $\Delta\lambda p-p$ as compared with Nos. 2001 to 2034 in which the Nb content is low.

Examples of Nos. 2048 to 2055

Nos. 2048 to 2055 were examples in which TE2 was controlled to be a short time of less than 200 minutes and the influence of Nb content was particularly confirmed.

In Nos. 2048 to 2055, when $\Delta\lambda p-p$ was −0.010 or less (when the value varied toward negative from −0.010 which is the standard), the magnetostriction characteristic was judged to be acceptable.

In Nos. 2048 to 2055, the inventive examples included the boundary which satisfied the boundary condition BA and which did not satisfy the boundary condition BB, and thus these examples exhibited excellent magnetostriction. Moreover, the inventive examples exhibited an acceptable iron loss. On the other hand, although the comparative examples had the crystal orientation which was slightly and continuously shifted in the secondary recrystallized grains, the comparative examples did not sufficiently include the boundary which satisfies the boundary condition BA and which does not satisfy the boundary condition BB, and thus these examples did not exhibit preferred magnetostriction.

As shown in Nos. 2048 to 2055, when Nb was favorably included, the switching occurred during final annealing, and thus the magnetostriction was improved even when TE2 was the short time.

Examples of Nos. 2056 to 2064

Nos. 2056 to 2064 were examples in which TE2 was controlled to be the short time of less than 200 minutes and the influence of the amount of Nb group element was confirmed.

In Nos. 2056 to 2064, when $\Delta\lambda p-p$ was −0.010 or less (when the value varied toward negative from −0.010 which is the standard), the magnetostriction characteristic was judged to be acceptable.

In Nos. 2056 to 2064, the inventive examples included the boundary which satisfied the boundary condition BA and which did not satisfy the boundary condition BB, and thus these examples exhibited excellent magnetostriction. Moreover, the inventive examples exhibited an acceptable iron loss. On the other hand, although the comparative examples had the crystal orientation which was slightly and continuously shifted in the secondary recrystallized grains, the comparative examples did not sufficiently include the boundary which satisfies the boundary condition BA and which does not satisfy the boundary condition BB, and thus these examples did not exhibit preferred magnetostriction.

As shown in Nos. 2056 to 2064, when the Nb group element except for Nb was favorably included, the switching occurred during final annealing, and thus the magnetostriction was improved even when TE2 was the short time.

Examples Produced by High Temperature Slab Heating Process

Nos. 2065 to 2100 were examples produced by a process in which slab heating temperature was increased, MnS was sufficiently soluted during slab heating and was reprecipited during post process, and the reprecipited MnS was utilized as main inhibitor.

In Nos. 2065 to 2100, when $\Delta\lambda p-p$ was −0.0210 or less (when the value varied toward negative from −0.0210 which is the standard), the magnetostriction characteristic was judged to be acceptable.

In Nos. 2065 to 2100, the inventive examples included the boundary which satisfied the boundary condition BA and which did not satisfy the boundary condition BB, and thus these examples exhibited excellent magnetostriction. Moreover, the inventive examples exhibited an acceptable iron loss. On the other hand, although the comparative examples had the crystal orientation which was slightly and continuously shifted in the secondary recrystallized grains, the comparative examples did not sufficiently include the boundary which satisfies the boundary condition BA and which does not satisfy the boundary condition BB, and thus these examples did not exhibit preferred magnetostriction.

Nos. 2083 to 2100 in the above Nos. 2065 to 2100 were examples in which Bi was included in the slab and thus $B_8$ increased.

As shown in Nos. 2065 to 2100, as long as the conditions in final annealing were appropriately controlled, the switching occurred during final annealing, and thus the magnetostriction was improved even by the high temperature slab heating process. Moreover, as with the low temperature slab heating process, when the slab including Nb was used and the conditions in final annealing were controlled, the magnetostriction was favorably improved by the high temperature slab heating process.

Example 3

Using slabs with chemical composition shown in Table C1 as materials, grain oriented electrical steel sheets with chemical composition shown in Table C2 were produced. The methods for measuring the chemical composition and the notation in the tables are the same as in the above Example 1.

TABLE C1

| STEEL | CHEMICAL COMPOSITION OF SLAB(STEEL PIECE) (UNIT:mass %, BALANCE CONSISIING OF Fe AND IMPURITIES) | | | | | | | | | | | | |
|---|---|---|---|---|---|---|---|---|---|---|---|---|---|
| TYPE | C | Si | Mn | S | Al | N | Cu | Bi | Nb | V | Mo | Ta | W |
| A | 0.070 | 3.26 | 0.07 | 0.025 | 0.026 | 0.008 | 0.07 | — | — | — | — | — | — |
| B1 | 0.060 | 3.35 | 0.10 | 0.006 | 0.026 | 0.008 | <0.03 | — | — | — | — | — | — |
| B2 | 0.060 | 3.35 | 0.10 | 0.006 | 0.026 | 0.008 | <0.03 | — | 0.001 | — | — | — | — |

TABLE C1-continued

| STEEL | CHEMICAL COMPOSITION OF SLAB(STEEL PIECE) (UNIT:mass %, BALANCE CONSISIING OF Fe AND IMPURITIES) | | | | | | | | | | | | |
|---|---|---|---|---|---|---|---|---|---|---|---|---|---|
| TYPE | C | Si | Mn | S | Al | N | Cu | Bi | Nb | V | Mo | Ta | W |
| B3 | 0.060 | 3.35 | 0.10 | 0.006 | 0.026 | 0.008 | <0.03 | — | 0.003 | — | — | — | — |
| B4 | 0.060 | 3.35 | 0.10 | 0.006 | 0.026 | 0.008 | <0.03 | — | 0.007 | — | — | — | — |
| B5 | 0.060 | 3.35 | 0.10 | 0.006 | 0.026 | 0.008 | <0.03 | — | 0.010 | — | — | — | — |
| B6 | 0.060 | 3.35 | 0.10 | 0.006 | 0.026 | 0.008 | <0.03 | — | 0.020 | — | — | — | — |
| B7 | 0.060 | 3.35 | 0.10 | 0.006 | 0.026 | 0.008 | <0.03 | — | 0.030 | — | — | — | — |
| C | 0.060 | 3.45 | 0.10 | 0.006 | 0.028 | 0.008 | 0.20 | — | 0.002 | — | — | — | — |
| D | 0.060 | 3.45 | 0.10 | 0.006 | 0.027 | 0.008 | 0.20 | — | 0.005 | — | — | — | — |
| E | 0.060 | 3.45 | 0.10 | 0.006 | 0.027 | 0.008 | 0.20 | — | — | 0.007 | — | — | — |
| F | 0.060 | 3.45 | 0.10 | 0.006 | 0.027 | 0.008 | 0.20 | — | — | — | 0.020 | — | — |
| G | 0.060 | 3.45 | 0.10 | 0.006 | 0.027 | 0.008 | 0.20 | — | 0.005 | — | — | 0.003 | — |
| H | 0.060 | 3.45 | 0.10 | 0.006 | 0.027 | 0.008 | 0.20 | — | — | — | — | 0.010 | — |
| I | 0.060 | 3.45 | 0.10 | 0.006 | 0.027 | 0.008 | 0.20 | — | — | — | — | — | 0.010 |
| J | 0.060 | 3.45 | 0.10 | 0.006 | 0.027 | 0.008 | 0.20 | — | 0.004 | — | 0.010 | — | — |
| K | 0.060 | 3.45 | 0.10 | 0.006 | 0.027 | 0.008 | 0.20 | — | 0.005 | 0.003 | — | 0.003 | — |
| L | 0.060 | 3.45 | 0.10 | 0.006 | 0.027 | 0.008 | 0.20 | — | — | 0.005 | — | 0.005 | — |

TABLE C2

| STEEL | CHEMICAL COMPOSITION OF GRAIN ORIENTED ELECTRICAL STEEL SHEET (UNIT:mass %, BALANCE CONSISTING OF Fe AND IMPURITIES) | | | | | | | | | | | | |
|---|---|---|---|---|---|---|---|---|---|---|---|---|---|
| TYPE | C | Si | Mn | S | Al | N | Cu | Bi | Nb | V | Mo | Ta | W |
| A | 0.001 | 3.15 | 0.07 | <0.002 | <0.004 | <0.002 | 0.07 | — | — | — | — | — | — |
| B1 | 0.001 | 3.30 | 0.10 | <0.002 | <0.004 | <0.002 | <0.03 | — | — | — | — | — | — |
| B2 | 0.001 | 3.30 | 0.10 | <0.002 | <0.004 | <0.002 | <0.03 | — | <0.001 | — | — | — | — |
| B3 | 0.001 | 3.30 | 0.10 | <0.002 | <0.004 | <0.002 | <0.03 | — | 0.002 | — | — | — | — |
| B4 | 0.001 | 3.30 | 0.10 | <0.002 | <0.004 | <0.002 | <0.03 | — | 0.006 | — | — | — | — |
| B5 | 0.001 | 3.30 | 0.10 | <0.002 | <0.004 | <0.002 | <0.03 | — | 0.007 | — | — | — | — |
| B6 | 0.001 | 3.30 | 0.10 | <0.002 | <0.004 | <0.002 | <0.03 | — | 0.018 | — | — | — | — |
| B7 | 0.001 | 3.30 | 0.10 | <0.002 | <0.004 | <0.002 | <0.03 | — | 0.028 | — | — | — | — |
| C | 0.001 | 3.34 | 0.10 | <0.002 | <0.004 | <0.002 | 0.20 | — | 0.002 | — | — | — | — |
| D | 0.001 | 3.34 | 0.10 | <0.002 | <0.004 | <0.002 | 0.20 | — | 0.004 | — | — | — | — |
| E | 0.001 | 3.34 | 0.10 | <0.002 | <0.004 | <0.002 | 0.20 | — | — | 0.006 | — | — | — |
| F | 0.001 | 3.34 | 0.10 | <0.002 | <0.004 | <0.002 | 0.20 | — | — | — | 0.020 | — | — |
| G | 0.001 | 3.34 | 0.10 | <0.002 | <0.004 | <0.002 | 0.20 | — | 0.004 | — | — | 0.001 | — |
| H | 0.001 | 3.34 | 0.10 | <0.002 | <0.004 | <0.002 | 0.20 | — | — | — | — | 0.010 | — |
| I | 0.001 | 3.34 | 0.10 | <0.002 | <0.004 | <0.002 | 0.20 | — | — | — | — | — | 0.010 |
| J | 0.001 | 3.34 | 0.10 | <0.002 | <0.004 | <0.002 | 0.20 | — | 0.003 | 0.001 | 0.030 | — | — |
| K | 0.001 | 3.34 | 0.10 | <0.002 | <0.004 | <0.002 | 0.20 | — | 0.003 | 0.001 | — | 0.002 | — |
| L | 0.001 | 3.34 | 0.10 | <0.002 | <0.004 | <0.002 | 0.20 | — | — | 0.003 | — | 0.004 | — |

The grain oriented electrical steel sheets were produced under production conditions shown in Table C3 to Table C6. In the final annealing, in order to control the anisotropy of the switching direction, the annealing was conducted with a thermal gradient in the transverse direction of steel sheet. The production conditions other than the thermal gradient and other than those shown in the tables were the same as those in the above Example 1.

TABLE C3

| | | PRODUCTION CONDITIONS | | | | | | |
|---|---|---|---|---|---|---|---|---|
| | | HOT ROLLING | | | | | | COLD |
| | | HEATING | TEMPERATURE OF FINAL | COILING | SHEET | HOT BAND ANNEALING | | ROLLING SHEET |
| No. | STEEL TYPE | TEMPERATURE ° C. | ROLLING ° C. | TEMPERATURE ° C. | THICKNESS mm | TEMPERATURE ° C. | TIME SECOND | THICKNESS mm |
| 3001 | B1 | 1150 | 900 | 550 | 2.6 | 1100 | 150 | 0.26 |
| 3002 | B1 | 1150 | 900 | 550 | 2.6 | 1100 | 150 | 0.26 |
| 3003 | B1 | 1150 | 900 | 550 | 2.6 | 1100 | 150 | 0.26 |
| 3004 | B1 | 1150 | 900 | 550 | 2.6 | 1100 | 150 | 0.26 |
| 3005 | B1 | 1150 | 900 | 550 | 2.6 | 1100 | 150 | 0.26 |
| 3006 | B1 | 1150 | 900 | 550 | 2.6 | 1100 | 150 | 0.26 |
| 3007 | B1 | 1150 | 900 | 550 | 2.6 | 1100 | 150 | 0.26 |
| 3008 | B1 | 1150 | 900 | 550 | 2.6 | 1100 | 150 | 0.26 |
| 3009 | B1 | 1150 | 900 | 550 | 2.6 | 1100 | 150 | 0.26 |

TABLE C3-continued

| | | | | | | | | |
|---|---|---|---|---|---|---|---|---|
| 3010 | B1 | 1150 | 900 | 550 | 2.6 | 1100 | 150 | 0.26 |
| 3011 | B1 | 1150 | 900 | 550 | 2.6 | 1100 | 150 | 0.26 |
| 3012 | B1 | 1150 | 900 | 550 | 2.6 | 1100 | 150 | 0.26 |
| 3013 | B1 | 1150 | 900 | 550 | 2.6 | 1100 | 150 | 0.26 |
| 3014 | B1 | 1150 | 900 | 550 | 2.6 | 1100 | 150 | 0.26 |
| 3015 | B1 | 1150 | 900 | 550 | 2.6 | 1100 | 150 | 0.26 |
| 3016 | B1 | 1150 | 900 | 550 | 2.6 | 1100 | 150 | 0.26 |
| 3017 | B1 | 1150 | 900 | 550 | 2.6 | 1100 | 150 | 0.26 |
| 3018 | B1 | 1150 | 900 | 550 | 2.6 | 1100 | 150 | 0.26 |
| 3019 | B1 | 1150 | 900 | 550 | 2.6 | 1100 | 150 | 0.26 |
| 3020 | B1 | 1150 | 900 | 550 | 2.6 | 1100 | 150 | 0.26 |

| | PRODUCTION CONDITIONS | | | | | | | |
|---|---|---|---|---|---|---|---|---|
| | | DECARBURIZATION ANNEALING | | | | | | |
| | COLD ROLLING REDUCTION | GRAIN SIZE OF PRIMARY RE- | NITROGEN CONTENT | FINAL ANNEALING | | | | |
| No. | OF COLD ROLLING % | CRYSTALLIZED GRAIN μm | AFTER NITRIDATION ppm | PA | PB | PC1 | PC2 | THERMAL GRADIENT ° C./cm |
| 3001 | 90.0 | 23 | 220 | 0.020 | 0.005 | 0.003 | 0.0007 | 0.5 |
| 3002 | 90.0 | 23 | 220 | 0.030 | 0.005 | 0.003 | 0.0007 | 0.5 |
| 3003 | 90.0 | 23 | 220 | 0.100 | 0.300 | 0.200 | 0.070 | 0.5 |
| 3004 | 90.0 | 23 | 220 | 0.030 | 0.005 | 0.003 | 0.001 | 0.5 |
| 3005 | 90.0 | 23 | 220 | 0.030 | 0.005 | 0.005 | 0.0007 | 0.5 |
| 3006 | 90.0 | 23 | 220 | 0.030 | 0.010 | 0.003 | 0.0007 | 0.5 |
| 3007 | 90.0 | 23 | 220 | 0.100 | 0.200 | 0.200 | 0.200 | 0.5 |
| 3008 | 90.0 | 23 | 220 | 0.100 | 0.300 | 0.100 | 0.070 | 0.5 |
| 3009 | 90.0 | 23 | 220 | 0.100 | 0.300 | 0.050 | 0.050 | 0.5 |
| 3010 | 90.0 | 23 | 220 | 0.100 | 0.020 | 0.010 | 0.002 | 0.5 |
| 3011 | 90.0 | 23 | 220 | 0.100 | 0.050 | 0.020 | 0.010 | 0.5 |
| 3012 | 90.0 | 23 | 220 | 0.100 | 0.100 | 0.070 | 0.030 | 0.5 |
| 3013 | 90.0 | 23 | 220 | 0.030 | 0.005 | 0.003 | 0.0007 | 3.0 |
| 3014 | 90.0 | 23 | 220 | 0.100 | 0.300 | 0.200 | 0.070 | 3.0 |
| 3015 | 90.0 | 23 | 220 | 0.030 | 0.005 | 0.003 | 0.001 | 3.0 |
| 3016 | 90.0 | 23 | 220 | 0.030 | 0.005 | 0.005 | 0.0007 | 3.0 |
| 3017 | 90.0 | 23 | 220 | 0.030 | 0.010 | 0.003 | 0.0007 | 3.0 |
| 3018 | 90.0 | 23 | 220 | 0.100 | 0.200 | 0.200 | 0.200 | 3.0 |
| 3019 | 90.0 | 23 | 220 | 0.100 | 0.300 | 0.100 | 0.070 | 3.0 |
| 3020 | 90.0 | 23 | 220 | 0.100 | 0.020 | 0.010 | 0.002 | 3.0 |

TABLE C4

| | | PRODUCTION CONDITIONS | | | | | | |
|---|---|---|---|---|---|---|---|---|
| | | HOT ROLLING | | | | | | COLD |
| | | HEATING | TEMPERATURE OF FINAL | COILING | SHEET | HOT BAND ANNEALING | | ROLLING SHEET |
| No. | STEEL TYPE | TEMPERATURE ° C. | ROLLING ° C. | TEMPERATURE ° C. | THICKNESS mm | TEMPERATURE ° C. | TIME SECOND | THICKNESS mm |
| 3021 | B1 | 1150 | 900 | 550 | 2.6 | 1100 | 150 | 0.26 |
| 3022 | B1 | 1150 | 900 | 550 | 2.6 | 1100 | 150 | 0.26 |
| 3023 | B1 | 1150 | 900 | 550 | 2.6 | 1100 | 150 | 0.26 |
| 3024 | B1 | 1150 | 900 | 550 | 2.6 | 1100 | 150 | 0.26 |
| 3025 | B1 | 1150 | 900 | 550 | 2.6 | 1100 | 150 | 0.26 |
| 3026 | B1 | 1150 | 900 | 550 | 2.6 | 1100 | 150 | 0.26 |
| 3027 | B1 | 1150 | 900 | 550 | 2.6 | 1100 | 150 | 0.26 |
| 3028 | B1 | 1150 | 900 | 550 | 2.6 | 1100 | 150 | 0.26 |
| 3029 | B1 | 1150 | 900 | 550 | 2.6 | 1100 | 150 | 0.26 |
| 3030 | B1 | 1150 | 900 | 550 | 2.6 | 1100 | 150 | 0.26 |
| 3031 | B1 | 1150 | 900 | 550 | 2.6 | 1100 | 150 | 0.26 |
| 3032 | B1 | 1150 | 900 | 550 | 2.6 | 1100 | 150 | 0.26 |
| 3033 | B1 | 1150 | 900 | 550 | 2.6 | 1100 | 150 | 0.26 |
| 3034 | B1 | 1150 | 900 | 550 | 2.6 | 1100 | 150 | 0.26 |
| 3035 | B1 | 1150 | 900 | 550 | 2.6 | 1100 | 150 | 0.26 |
| 3036 | B4 | 1150 | 900 | 550 | 2.6 | 1100 | 150 | 0.26 |
| 3037 | B4 | 1150 | 900 | 550 | 2.6 | 1100 | 150 | 0.26 |
| 3038 | B4 | 1150 | 900 | 550 | 2.6 | 1100 | 150 | 0.26 |

TABLE C4-continued

| | | | | | | | | |
|---|---|---|---|---|---|---|---|---|
| 3039 | B4 | 1150 | 900 | 550 | 2.6 | 1100 | 150 | 0.26 |
| 3040 | B4 | 1150 | 900 | 550 | 2.6 | 1100 | 150 | 0.26 |

| | PRODUCTION CONDITIONS | | | | | | | |
|---|---|---|---|---|---|---|---|---|
| | | DECARBURIZATION ANNEALING | | | | | | |
| | COLD ROLLING REDUCTION | GRAIN SIZE OF PRIMARY RE- | NITROGEN CONTENT | FINAL ANNEALING | | | | |
| No. | OF COLD ROLLING % | CRYSTALLIZED GRAIN μm | AFTER NITRIDATION ppm | PA | PB | PC1 | PC2 | THERMAL GRADIENT ° C./cm |
| 3021 | 90.0 | 23 | 220 | 0.100 | 0.050 | 0.020 | 0.010 | 3.0 |
| 3022 | 90.0 | 23 | 220 | 0.100 | 0.100 | 0.070 | 0.030 | 3.0 |
| 3023 | 90.0 | 23 | 220 | 0.100 | 0.030 | 0.010 | 0.003 | 0.3 |
| 3024 | 90.0 | 23 | 220 | 0.100 | 0.020 | 0.003 | 0.0007 | 0.5 |
| 3025 | 90.0 | 23 | 220 | 0.100 | 0.020 | 0.003 | 0.0007 | 0.7 |
| 3026 | 90.0 | 23 | 220 | 0.100 | 0.020 | 0.003 | 0.0007 | 1.0 |
| 3027 | 90.0 | 23 | 220 | 0.100 | 0.300 | 0.060 | 0.050 | 3.0 |
| 3028 | 90.0 | 23 | 220 | 0.500 | 0.050 | 0.030 | 0.010 | 0.3 |
| 3029 | 90.0 | 23 | 220 | 0.500 | 0.050 | 0.030 | 0.010 | 0.5 |
| 3030 | 90.0 | 23 | 220 | 0.500 | 0.050 | 0.030 | 0.010 | 0.7 |
| 3031 | 90.0 | 23 | 220 | 0.500 | 0.050 | 0.030 | 0.010 | 1.0 |
| 3032 | 90.0 | 23 | 220 | 0.500 | 0.050 | 0.030 | 0.010 | 2.0 |
| 3033 | 90.0 | 23 | 220 | 0.500 | 0.050 | 0.030 | 0.010 | 3.0 |
| 3034 | 90.0 | 23 | 220 | 0.500 | 0.050 | 0.030 | 0.010 | 5.0 |
| 3035 | 90.0 | 23 | 220 | 0.500 | 0.050 | 0.030 | 0.010 | 7.0 |
| 3036 | 90.0 | 17 | 250 | 0.200 | 0.005 | 0.003 | 0.0007 | 0.5 |
| 3037 | 90.0 | 17 | 250 | 0.200 | 0.005 | 0.003 | 0.0007 | 3.0 |
| 3038 | 90.0 | 17 | 300 | 0.020 | 0.005 | 0.005 | 0.001 | 3.0 |
| 3039 | 90.0 | 17 | 220 | 2.000 | 0.150 | 0.150 | 0.100 | 3.0 |
| 3040 | 90.0 | 17 | 220 | 2.000 | 0.300 | 0.200 | 0.100 | 3.0 |

TABLE C5

| | | PRODUCTION CONDITIONS | | | | | | |
|---|---|---|---|---|---|---|---|---|
| | | HOT ROLLING | | | | | | COLD |
| | | HEATING | TEMPERATURE OF FINAL | COILING | SHEET | HOT BAND ANNEALING | | ROLLING SHEET |
| No. | STEEL TYPE | TEMPERATURE ° C. | ROLLING ° C. | TEMPERATURE ° C. | THICKNESS mm | TEMPERATURE ° C. | TIME SECOND | THICKNESS mm |
| 3041 | B4 | 1150 | 900 | 550 | 2.6 | 1100 | 150 | 0.26 |
| 3042 | B4 | 1150 | 900 | 550 | 2.6 | 1100 | 150 | 0.26 |
| 3043 | B4 | 1150 | 900 | 550 | 2.6 | 1100 | 150 | 0.26 |
| 3044 | B4 | 1150 | 900 | 550 | 2.6 | 1100 | 150 | 0.26 |
| 3045 | B4 | 1150 | 900 | 550 | 2.6 | 1100 | 150 | 0.26 |
| 3046 | B4 | 1150 | 900 | 550 | 2.6 | 1100 | 150 | 0.26 |
| 3047 | B4 | 1150 | 900 | 550 | 2.6 | 1100 | 150 | 0.26 |
| 3048 | B4 | 1150 | 900 | 550 | 2.6 | 1100 | 150 | 0.26 |
| 3049 | B4 | 1150 | 900 | 550 | 2.6 | 1100 | 150 | 0.26 |
| 3050 | B4 | 1150 | 900 | 550 | 2.6 | 1100 | 150 | 0.26 |
| 3051 | B4 | 1150 | 900 | 550 | 2.6 | 1100 | 150 | 0.26 |
| 3052 | B4 | 1150 | 900 | 550 | 2.6 | 1100 | 150 | 0.26 |
| 3053 | B4 | 1150 | 900 | 550 | 2.6 | 1100 | 150 | 0.26 |
| 3054 | B4 | 1150 | 900 | 550 | 2.6 | 1100 | 150 | 0.26 |
| 3055 | B2 | 1200 | 900 | 550 | 2.6 | 1100 | 150 | 0.26 |
| 3056 | B3 | 1200 | 900 | 550 | 2.6 | 1100 | 150 | 0.26 |
| 3057 | B4 | 1200 | 900 | 550 | 2.6 | 1100 | 150 | 0.26 |
| 3058 | B5 | 1200 | 900 | 550 | 2.6 | 1100 | 150 | 0.26 |
| 3059 | B6 | 1200 | 900 | 550 | 2.6 | 1100 | 150 | 0.26 |
| 3060 | B7 | 1200 | 900 | 550 | 2.6 | 1100 | 150 | 0.26 |

TABLE C5-continued

| No. | PRODUCTION CONDITIONS COLD ROLLING REDUCTION OF COLD ROLLING % | DECARBURIZATION ANNEALING GRAIN SIZE OF PRIMARY RECRYSTALLIZED GRAIN µm | DECARBURIZATION ANNEALING NITROGEN CONTENT AFTER NITRIDATION ppm | FINAL ANNEALING PA | FINAL ANNEALING PB | FINAL ANNEALING PC1 | FINAL ANNEALING PC2 | FINAL ANNEALING THERMAL GRADIENT ° C./cm |
|---|---|---|---|---|---|---|---|---|
| 3041 | 90.0 | 17 | 220 | 6.000 | 0.100 | 0.060 | 0.030 | 3.0 |
| 3042 | 90.0 | 17 | 220 | 0.050 | 0.010 | 0.005 | 0.001 | 3.0 |
| 3043 | 90.0 | 17 | 220 | 0.050 | 0.010 | 0.005 | 0.001 | 3.0 |
| 3044 | 90.0 | 17 | 220 | 0.400 | 0.060 | 0.030 | 0.010 | 3.0 |
| 3045 | 90.0 | 17 | 220 | 0.400 | 0.060 | 0.030 | 0.010 | 3.0 |
| 3046 | 90.0 | 17 | 220 | 2.000 | 0.100 | 0.060 | 0.030 | 3.0 |
| 3047 | 90.0 | 17 | 220 | 0.200 | 0.030 | 0.003 | 0.0007 | 0.3 |
| 3048 | 90.0 | 17 | 220 | 0.200 | 0.030 | 0.003 | 0.0007 | 0.5 |
| 3049 | 90.0 | 17 | 220 | 0.200 | 0.030 | 0.003 | 0.0007 | 0.7 |
| 3050 | 90.0 | 17 | 220 | 0.200 | 0.030 | 0.003 | 0.0007 | 1.0 |
| 3051 | 90.0 | 17 | 220 | 0.400 | 0.030 | 0.020 | 0.010 | 2.0 |
| 3052 | 90.0 | 17 | 220 | 0.400 | 0.030 | 0.020 | 0.010 | 3.0 |
| 3053 | 90.0 | 17 | 220 | 0.400 | 0.030 | 0.020 | 0.010 | 5.0 |
| 3054 | 90.0 | 17 | 220 | 0.400 | 0.030 | 0.020 | 0.010 | 7.0 |
| 3055 | 90.0 | 23 | 220 | 0.500 | 0.040 | 0.020 | 0.003 | 3.0 |
| 3056 | 90.0 | 21 | 220 | 0.500 | 0.040 | 0.010 | 0.003 | 3.0 |
| 3057 | 90.0 | 18 | 220 | 0.500 | 0.040 | 0.010 | 0.003 | 3.0 |
| 3058 | 90.0 | 17 | 220 | 0.500 | 0.040 | 0.010 | 0.003 | 3.0 |
| 3059 | 90.0 | 15 | 220 | 0.500 | 0.040 | 0.010 | 0.003 | 3.0 |
| 3060 | 90.0 | 12 | 220 | 0.500 | 0.040 | 0.010 | 0.003 | 3.0 |

TABLE C6

| No. | STEEL TYPE | PRODUCTION CONDITIONS HOT ROLLING HEATING TEMPERATURE ° C. | HOT ROLLING TEMPERATURE OF FINAL ROLLING ° C. | HOT ROLLING COILING TEMPERATURE ° C. | HOT ROLLING SHEET THICKNESS mm | HOT BAND ANNEALING TEMPERATURE ° C. | HOT BAND ANNEALING TIME SECOND | COLD ROLLING SHEET THICKNESS mm |
|---|---|---|---|---|---|---|---|---|
| 3061 | C | 1100 | 900 | 550 | 2.6 | 1100 | 150 | 0.26 |
| 3062 | D | 1100 | 900 | 550 | 2.6 | 1100 | 150 | 0.26 |
| 3063 | E | 1100 | 900 | 550 | 2.6 | 1100 | 150 | 0.26 |
| 3064 | F | 1100 | 900 | 550 | 2.6 | 1100 | 150 | 0.26 |
| 3065 | G | 1100 | 900 | 550 | 2.6 | 1100 | 150 | 0.26 |
| 3066 | H | 1100 | 900 | 550 | 2.6 | 1100 | 150 | 0.26 |
| 3067 | I | 1100 | 900 | 550 | 2.6 | 1100 | 150 | 0.26 |
| 3068 | J | 1100 | 900 | 550 | 2.6 | 1100 | 150 | 0.26 |
| 3069 | K | 1100 | 900 | 550 | 2.6 | 1100 | 150 | 0.26 |
| 3070 | L | 1100 | 1100 | 500 | 2.6 | 1100 | 150 | 0.26 |
| 3071 | A | 1400 | 900 | 550 | 2.6 | 1100 | 150 | 0.26 |

| No. | PRODUCTION CONDITIONS COLD ROLLING REDUCTION OF COLD ROLLING % | DECARBURIZATION ANNEALING GRAIN SIZE OF PRIMARY RE-CRYSTALLIZED GRAIN µm | DECARBURIZATION ANNEALING NITROGEN CONTENT AFTER NITRIDATION ppm | FINAL ANNEALING PA | FINAL ANNEALING PB | FINAL ANNEALING PC1 | FINAL ANNEALING PC2 | FINAL ANNEALING THERMAL GRADIENT ° C./cm |
|---|---|---|---|---|---|---|---|---|
| 3061 | 90.0 | 23 | 220 | 0.500 | 0.040 | 0.010 | 0.003 | 3.0 |
| 3062 | 90.0 | 16 | 220 | 0.500 | 0.040 | 0.010 | 0.003 | 3.0 |
| 3063 | 90.0 | 21 | 220 | 0.500 | 0.040 | 0.010 | 0.003 | 3.0 |
| 3064 | 90.0 | 19 | 220 | 0.500 | 0.040 | 0.010 | 0.003 | 3.0 |
| 3065 | 90.0 | 14 | 220 | 0.500 | 0.040 | 0.010 | 0.003 | 3.0 |

TABLE C6-continued

| | | | | | | | | |
|---|---|---|---|---|---|---|---|---|
| 3066 | 90.0 | 16 | 220 | 0.500 | 0.040 | 0.010 | 0.003 | 3.0 |
| 3067 | 90.0 | 22 | 220 | 0.500 | 0.040 | 0.010 | 0.003 | 3.0 |
| 3068 | 90.0 | 18 | 220 | 0.500 | 0.040 | 0.010 | 0.003 | 3.0 |
| 3069 | 90.0 | 16 | 220 | 0.500 | 0.040 | 0.010 | 0.003 | 3.0 |
| 3070 | 90.0 | 16 | 220 | 0.500 | 0.040 | 0.010 | 0.003 | 3.0 |
| 3071 | 90.0 | 10 | — | 0.500 | 0.040 | 0.010 | 0.003 | 3.0 |

The insulation coating which was the same as those in the above Example 1 was formed on the surface of produced grain oriented electrical steel sheets (final annealed sheets).

The produced grain oriented electrical steel sheets had the intermediate layer which was arranged in contact with the grain oriented electrical steel sheet (silicon steel sheet) and the insulation coating which was arranged in contact with the intermediate layer, when viewing the cross section whose cutting direction is parallel to thickness direction. The intermediate layer was forsterite film whose average thickness was 3 μm, and the insulation coating was the coating which mainly included phosphate and colloidal silica and whose average thickness was 3 μm.

Various characteristics of the obtained grain oriented electrical steel sheet were evaluated. The evaluation methods were the same as those in the above Example 1. The evaluation results are shown in Table C7 to Table C10.

In most grain oriented electrical steel sheets, the grains stretched in the direction of the thermal gradient, and the grain size of subgrain also increased in the direction. In other words, the grains stretched in the transverse direction. However, in some grain oriented electrical steel sheets produced under conditions such that the thermal gradient was small, the subgrain had the grain size in which the size in transverse direction was smaller than that in rolling direction. When the grain size in transverse direction was smaller than that in rolling direction, the steel sheet was shown as "*" in the column "inconsistence as to thermal gradient direction" in Tables.

TABLE C7

| | | PRODUCTION RESULTS | | | | | | | |
|---|---|---|---|---|---|---|---|---|---|
| | | BOUNDARY EXISTENCE OF SWITCHING BOUNDARY | AVERAGE GRAIN SIZE | | | | | | |
| No | STEEL TYPE | EXISTENCE NON | $RA_C$ mm | $RB_C$ mm | $RA_L$ mm | $RB_L$ mm | $RA_C$/ $RA_L$ | $RB_L$/ $RA_L$ | $RB_C$/ $RA_C$ |
| 3001 | B1 | NONE | 29.8 | 29.2 | 28.7 | 29.3 | 1.04 | 1.02 | 0.98 |
| 3002 | B1 | NONE | 35.1 | 35.7 | 34.2 | 39.3 | 1.03 | 1.148 | 1.02 |
| 3003 | B1 | NONE | 36.6 | 37.0 | 36.0 | 41.0 | 1.02 | 1.14 | 1.01 |
| 3004 | B1 | EXISTENCE | 33.7 | 36.1 | 33.7 | 42.7 | 1.00 | 1.27 | 1.07 |
| 3005 | B1 | EXISTENCE | 33.8 | 35.8 | 34.0 | 43.1 | 0.99 | 1.27 | 1.06 |
| 3006 | B1 | EXISTENCE | 32.5 | 34.0 | 33.1 | 42.5 | 0.98 | 1.28 | 1.05 |
| 3007 | B1 | EXISTENCE | 35.9 | 37.1 | 36.1 | 43.7 | 1.00 | 1.21 | 1.03 |
| 3008 | B1 | EXISTENCE | 34.9 | 37.3 | 35.5 | 46.5 | 0.98 | 1.31 | 1.07 |
| 3009 | B1 | EXISTENCE | 33.4 | 35.3 | 34.4 | 45.4 | 0.97 | 1.32 | 1.06 |
| 3010 | B1 | EXISTENCE | 34.6 | 37.9 | 35.7 | 50.3 | 0.97 | 1.41 | 1.09 |
| 3011 | B1 | EXISTENCE | 34.6 | 38.3 | 36.3 | 53.0 | 0.95 | 1.46 | 1.11 |
| 3012 | B1 | EXISTENCE | 34.4 | 37.4 | 35.7 | 50.1 | 0.96 | 1.40 | 1.09 |
| 3013 | B1 | NONE | 224.2 | 227.3 | 33.7 | 38.7 | 6.66 | 1.149 | 1.01 |
| 3014 | B1 | NONE | 112.5 | 112.9 | 36.8 | 41.8 | 3.06 | 1.14 | 1.00 |
| 3015 | B1 | EXISTENCE | 22.4 | 193.1 | 13.5 | 42.0 | 1.66 | 3.12 | 8.63 |
| 3016 | B1 | EXISTENCE | 22.7 | 196.7 | 13.6 | 42.2 | 1.68 | 3.11 | 8.65 |
| 3017 | B1 | EXISTENCE | 22.8 | 197.6 | 13.5 | 42.3 | 1.68 | 3.12 | 8.66 |
| 3018 | B1 | EXISTENCE | 22.3 | 195.7 | 14.3 | 41.9 | 1.56 | 2.94 | 8.77 |
| 3019 | B1 | EXISTENCE | 22.7 | 199.2 | 14.4 | 42.3 | 1.58 | 2.94 | 8.79 |
| 3020 | B1 | EXISTENCE | 22.3 | 199.6 | 13.1 | 41.9 | 1.69 | 3.19 | 8.96 |

| | PRODUCTION RESULTS | | | | | | | |
|---|---|---|---|---|---|---|---|---|
| | AVERAGE GRAIN SIZE | | | EVALUATION | | | | |
| | | INCONSISTENCE AS TO THERMAL | $(RB_C/RA_L)/$ | DEVIATION | RESULTS MAGNETIC CHARACTERISTICS | | | |
| No | $RB_C$/ $RB_L$ | GRADIENT DIRECTION | $(RB_L/RA_C)$ | ANGLE σ (θ) | B8 T | λp-p @ 1.7T | W17/50 W/kg | NOTE |
| 3001 | 1.00 | | 0.96 | 3.01 | 1.922 | 0.672 | 0.890 | COMPARATIVE EXAMPLE |
| 3002 | 0.91 | | 0.89 | 2.67 | 1.933 | 0.428 | 0.864 | COMPARATIVE EXAMPLE |
| 3003 | 0.90 | | 0.89 | 2.57 | 1.938 | 0.424 | 0.860 | COMPARATIVE EXAMPLE |
| 3004 | 0.84 | | 0.84 | 3.81 | 1.937 | 0.378 | 0.857 | INVENTIVE EXAMPLE |
| 3005 | 0.83 | * | 0.84 | 3.85 | 1.937 | 0.377 | 0.858 | INVENTIVE EXAMPLE |
| 3006 | 0.89 | * | 0.82 | 3.83 | 1.936 | 0.375 | 0.859 | INVENTIVE EXAMPLE |

TABLE C7-continued

| | | | | | | | | |
|---|---|---|---|---|---|---|---|---|
| 3007 | 0.85 | * | 0.85 | 3.67 | 1.939 | 0.389 | 0.852 | INVENTIVE EXAMPLE |
| 3008 | 0.80 | * | 0.82 | 3.61 | 1.941 | 0.360 | 0.851 | INVENTIVE EXAMPLE |
| 3009 | 0.78 | * | 0.80 | 3.63 | 1.940 | 0.364 | 0.851 | INVENTIVE EXAMPLE |
| 3010 | 0.75 | * | 0.78 | 3.38 | 1.945 | 0.340 | 0.845 | INVENTIVE EXAMPLE |
| 3011 | 0.72 | * | 0.76 | 3.18 | 1.946 | 0.328 | 0.840 | INVENTIVE EXAMPLE |
| 3012 | 0.75 | * | 0.78 | 3.39 | 1.944 | 0.343 | 0.844 | INVENTIVE EXAMPLE |
| 3013 | 5.88 | | 0.88 | 2.64 | 1.950 | 0.427 | 0.827 | COMPARATIVE EXAMPLE |
| 3014 | 2.70 | | 0.88 | 2.60 | 1.953 | 0.421 | 0.821 | COMPARATIVE EXAMPLE |
| 3015 | 4.59 | | 2.76 | 3.09 | 1.948 | 0.219 | 0.837 | INVENTIVE EXAMPLE |
| 3016 | 4.66 | | 2.78 | 3.12 | 1.949 | 0.224 | 0.837 | INVENTIVE EXAMPLE |
| 3017 | 4.67 | | 2.77 | 3.10 | 1.948 | 0.219 | 0.837 | INVENTIVE EXAMPLE |
| 3018 | 4.67 | | 2.98 | 2.93 | 1.950 | 0.223 | 0.831 | INVENTIVE EXAMPLE |
| 3019 | 4.71 | | 2.99 | 2.95 | 1.951 | 0.223 | 0.833 | INVENTIVE EXAMPLE |
| 3020 | 4.76 | | 2.81 | 2.67 | 1.954 | 0.211 | 0.824 | INVENTIVE EXAMPLE |

TABLE C8

| | | PRODUCTION RESULTS | | | | | | | |
|---|---|---|---|---|---|---|---|---|---|
| | | BOUNDARY EXISTENCE OF SWITCHING BOUNDARY | AVERAGE GRAIN SIZE | | | | | | |
| No. | STEEL TYPE | EXISTENCE NON | $RA_C$ mm | $RB_C$ mm | $RA_C$ mm | $RB_L$ mm | $RA_C/RA_L$ | $RB_L/RA_L$ | $RB_C/RA_C$ |
| 3021 | B1 | EXISTENCE | 22.5 | 204.5 | 13.2 | 42.9 | 1.70 | 3.25 | 9.10 |
| 3022 | B1 | EXISTENCE | 22.8 | 204.5 | 13.5 | 43.0 | 1.70 | 3.19 | 8.96 |
| 3023 | B1 | EXISTENCE | 26.0 | 28.3 | 27.4 | 36.4 | 0.95 | 1.40 | 1.09 |
| 3024 | B1 | EXISTENCE | 26.4 | 29.0 | 27.3 | 36.4 | 0.97 | 1.41 | 1.10 |
| 3025 | B1 | EXISTENCE | 19.9 | 54.2 | 17.2 | 23.4 | 1.16 | 1.36 | 2.72 |
| 3026 | B1 | EXISTENCE | 19.7 | 101.0 | 15.5 | 25.2 | 1.19 | 1.52 | 5.12 |
| 3027 | B1 | EXISTENCE | 22.3 | 195.9 | 14.1 | 41.5 | 1.58 | 2.94 | 8.79 |
| 3028 | B1 | EXISTENCE | 13.6 | 15.2 | 14.6 | 22.5 | 0.93 | 1.54 | 1.12 |
| 3029 | B1 | EXISTENCE | 14.4 | 16.0 | 15.6 | 23.7 | 0.92 | 1.52 | 1.11 |
| 3030 | B1 | EXISTENCE | 20.1 | 60.2 | 17.4 | 24.7 | 1.16 | 1.43 | 3.00 |
| 3031 | B1 | EXISTENCE | 19.2 | 102.0 | 15.9 | 25.3 | 1.21 | 1.59 | 5.32 |
| 3032 | B1 | EXISTENCE | 21.1 | 141.9 | 15.3 | 33.4 | 1.38 | 2.18 | 6.74 |
| 3033 | B1 | EXISTENCE | 22.5 | 209.1 | 14.1 | 43.0 | 1.60 | 3.05 | 9.29 |
| 3034 | B1 | EXISTENCE | 30.3 | 450.0 | 12.4 | 75.6 | 2.43 | 6.07 | 14.85 |
| 3035 | B1 | EXISTENCE | 52.8 | 652.3 | 11.1 | 136.5 | 4.77 | 12.34 | 12.35 |
| 3036 | B4 | EXISTENCE | 48.2 | 111.5 | 47.2 | 66.8 | 1.02 | 1.42 | 2.31 |
| 3037 | B4 | EXISTENCE | 22.0 | 245.1 | 14.0 | 41.6 | 1.57 | 2.96 | 11.13 |
| 3038 | B4 | EXISTENCE | 22.1 | 246.0 | 14.4 | 42.6 | 1.54 | 2.96 | 11.14 |
| 3039 | B4 | EXISTENCE | 22.1 | 253.6 | 14.0 | 42.0 | 1.59 | 3.00 | 11.41 |
| 3040 | B4 | EXISTENCE | 22.0 | 244.8 | 14.5 | 42.6 | 1.52 | 2.95 | 11.11 |

| | PRODUCTION RESULTS | | | | EVALUATION | | | |
|---|---|---|---|---|---|---|---|---|
| | AVERAGE GRAIN SIZE | | | | RESULTS MAGNETIC CHARACTERISTICS | | | |
| No. | $RB_C/RB_L$ | INCONSISTENCE AS TO THERMAL GRADIENT DIRECTION | $(RB_C/RA_L)/(RB_L/RA_C)$ | DEVIATION ANGLE σ (θ) | B8 T | λp-p @ 1.7T | W17/50 W/kg | NOTE |
| 3021 | 4.77 | | 2.81 | 2.55 | 1.955 | 0.208 | 0.819 | INVENTIVE EXAMPLE |
| 3022 | 4.76 | | 2.81 | 2.71 | 1.953 | 0.212 | 0.825 | INVENTIVE EXAMPLE |
| 3023 | 0.74 | * | 0.78 | 4.18 | 1.932 | 0.355 | 0.868 | INVENTIVE EXAMPLE |
| 3024 | 0.76 | * | 0.78 | 4.20 | 1.931 | 0.354 | 0.869 | INVENTIVE EXAMPLE |
| 3025 | 2.32 | | 2.00 | 4.22 | 1.932 | 0.328 | 0.970 | INVENTIVE EXAMPLE |
| 3026 | 4.01 | | 3.37 | 4.14 | 1.932 | 0.312 | 0.967 | INVENTIVE EXAMPLE |
| 3027 | 4.72 | | 2.99 | 2.95 | 1.949 | 0.226 | 0.834 | INVENTIVE EXAMPLE |
| 3028 | 0.68 | * | 0.73 | 3.51 | 1.943 | 0.321 | 0.849 | INVENTIVE EXAMPLE |
| 3029 | 0.67 | * | 0.73 | 3.47 | 1.941 | 0.322 | 0.849 | INVENTIVE EXAMPLE |
| 3030 | 2.43 | | 2.10 | 3.56 | 1.941 | 0.310 | 0.850 | INVENTIVE EXAMPLE |
| 3031 | 4.03 | | 3.34 | 3.45 | 1.944 | 0.303 | 0.846 | INVENTIVE EXAMPLE |
| 3032 | 4.26 | | 3.09 | 3.19 | 1.948 | 0.252 | 0.840 | INVENTIVE EXAMPLE |
| 3033 | 4.86 | | 3.05 | 2.92 | 1.951 | 0.221 | 0.833 | INVENTIVE EXAMPLE |
| 3034 | 5.96 | | 2.45 | 2.38 | 1.950 | 0.163 | 0.815 | INVENTIVE EXAMPLE |

TABLE C8-continued

| | | | | | | | | |
|---|---|---|---|---|---|---|---|---|
| 3035 | 4.78 | | 1.00 | 1.77 | 1.967 | 0.125 | 0.798 | INVENTIVE EXAMPLE |
| 3036 | 1.67 | | 1.63 | 2.11 | 1.963 | 0.319 | 0.809 | INVENTIVE EXAMPLE |
| 3037 | 5.90 | | 3.76 | 1.52 | 1.970 | 0.203 | 0.792 | INVENTIVE EXAMPLE |
| 3038 | 5.78 | | 3.76 | 1.18 | 1.975 | 0.199 | 0.781 | INVENTIVE EXAMPLE |
| 3039 | 6.03 | | 3.80 | 2.03 | 1.965 | 0.210 | 0.805 | INVENTIVE EXAMPLE |
| 3040 | 5.74 | | 3.77 | 2.20 | 1.960 | 0.211 | 0.812 | INVENTIVE EXAMPLE |

TABLE C9

| | | PRODUCTION RESULTS | | | | | | | |
|---|---|---|---|---|---|---|---|---|---|
| | | BOUNDARY EXISTENCE OF SWITCHING BOUNDARY | AVERAGE GRAIN SIZE | | | | | | |
| No. | STEEL TYPE | EXISTENCE NON | $RA_C$ mm | $RB_C$ mm | $RA_L$ mm | $RB_L$ mm | $RA_C/RA_L$ | $RB_L/RA_L$ | $RB_C/RA_C$ |
| 3041 | B4 | EXISTENCE | 22.1 | 245.4 | 14.5 | 42.7 | 1.52 | 2.94 | 11.12 |
| 3042 | B4 | EXISTENCE | 22.2 | 439.1 | 14.2 | 42.6 | 1.56 | 3.00 | 19.75 |
| 3043 | B4 | EXISTENCE | 22.2 | 253.4 | 14.3 | 42.8 | 1.56 | 3.00 | 11.40 |
| 3044 | B4 | EXISTENCE | 23.0 | 290.0 | 14.4 | 45.6 | 1.60 | 3.17 | 12.61 |
| 3045 | B4 | EXISTENCE | 23.0 | 295.6 | 14.4 | 45.5 | 1.60 | 3.16 | 12.85 |
| 3046 | B4 | EXISTENCE | 21.9 | 820.2 | 14.4 | 41.9 | 1.53 | 2.92 | 37.40 |
| 3047 | B4 | EXISTENCE | 42.9 | 75.2 | 44.7 | 77.4 | 0.96 | 1.73 | 1.75 |
| 3048 | B4 | EXISTENCE | 43.9 | 78.8 | 44.3 | 77.3 | 0.99 | 1.75 | 1.80 |
| 3049 | B4 | EXISTENCE | 19.1 | 99.6 | 16.4 | 24.5 | 1.16 | 1.49 | 5.21 |
| 3050 | B4 | EXISTENCE | 20.4 | 109.5 | 17.0 | 27.9 | 1.20 | 1.64 | 5.37 |
| 3051 | B4 | EXISTENCE | 21.3 | 186.5 | 15.2 | 35.6 | 1.40 | 2.35 | 8.76 |
| 3052 | B4 | EXISTENCE | 23.3 | 312.5 | 14.1 | 45.5 | 1.65 | 3.22 | 13.41 |
| 3053 | B4 | EXISTENCE | 31.2 | 672.6 | 12.6 | 79.2 | 2.47 | 6.27 | 21.58 |
| 3054 | B4 | EXISTENCE | 53.5 | 722.5 | 10.9 | 137.1 | 4.90 | 12.55 | 13.50 |
| 3055 | B2 | EXISTENCE | 29.7 | 320.5 | 14.3 | 48.0 | 2.07 | 3.34 | 10.81 |
| 3056 | B3 | EXISTENCE | 30.6 | 352.0 | 14.2 | 49.4 | 2.15 | 3.47 | 11.50 |
| 3057 | B4 | EXISTENCE | 30.7 | 355.0 | 14.2 | 49.5 | 2.17 | 3.49 | 11.56 |
| 3058 | B5 | EXISTENCE | 30.7 | 354.3 | 14.5 | 50.2 | 2.12 | 3.47 | 11.53 |
| 3059 | B6 | EXISTENCE | 30.7 | 354.9 | 14.4 | 50.3 | 2.13 | 3.49 | 11.56 |
| 3060 | B7 | EXISTENCE | 30.6 | 351.9 | 14.4 | 50.1 | 2.12 | 3.47 | 11.50 |

| | PRODUCTION RESULTS | | | | | | | |
|---|---|---|---|---|---|---|---|---|
| | AVERAGE GRAIN SIZE | | | | EVALUATION | | | |
| | | INCONSISTENCE AS TO THERMAL | $(RB_C/RA_L)/$ | DEVIATION | RESULTS MAGNETIC CHARACTERISTICS | | | |
| No. | $RB_C/RB_L$ | GRADIENT DIRECTION | $(RB_L/RA_C)$ | ANGLE σ (θ) | B8 T | λp-p @ 1.7T | W17/50 W/kg | NOTE |
| 3041 | 5.75 | | 3.78 | 2.17 | 1.960 | 0.215 | 0.810 | INVENTIVE EXAMPLE |
| 3042 | 10.30 | | 6.59 | 2.03 | 1.964 | 0.207 | 0.807 | INVENTIVE EXAMPLE |
| 3043 | 5.92 | | 3.81 | 2.04 | 1.963 | 0.209 | 0.805 | INVENTIVE EXAMPLE |
| 3044 | 6.36 | | 3.98 | 1.32 | 1.973 | 0.193 | 0.785 | INVENTIVE EXAMPLE |
| 3045 | 6.50 | | 4.08 | 1.34 | 1.973 | 0.194 | 0.786 | INVENTIVE EXAMPLE |
| 3046 | 19.58 | | 12.82 | 2.04 | 1.964 | 0.214 | 0.807 | INVENTIVE EXAMPLE |
| 3047 | 0.97 | * | 1.01 | 1.96 | 1.965 | 0.275 | 0.804 | INVENTIVE EXAMPLE |
| 3048 | 1.02 | * | 1.03 | 1.97 | 1.965 | 0.274 | 0.802 | INVENTIVE EXAMPLE |
| 3049 | 4.07 | | 3.59 | 2.07 | 1.962 | 0.306 | 0.806 | INVENTIVE EXAMPLE |
| 3050 | 3.92 | | 3.27 | 2.00 | 1.965 | 0.289 | 0.804 | INVENTIVE EXAMPLE |
| 3051 | 5.23 | | 3.73 | 1.40 | 1.972 | 0.226 | 0.789 | INVENTIVE EXAMPLE |
| 3052 | 6.87 | | 4.17 | 1.16 | 1.977 | 0.192 | 0.780 | INVENTIVE EXAMPLE |
| 3053 | 6.49 | | 3.44 | 0.62 | 1.985 | 0.140 | 0.763 | INVENTIVE EXAMPLE |
| 3054 | 5.27 | | 1.08 | 0.05 | 1.992 | 0.080 | 0.749 | INVENTIVE EXAMPLE |
| 3055 | 6.68 | | 3.23 | 3.01 | 1.951 | 0.213 | 0.835 | INVENTIVE EXAMPLE |
| 3056 | 7.13 | | 3.31 | 1.97 | 1.964 | 0.195 | 0.805 | INVENTIVE EXAMPLE |
| 3057 | 7.16 | | 3.31 | 1.43 | 1.973 | 0.186 | 0.789 | INVENTIVE EXAMPLE |
| 3058 | 7.06 | | 3.32 | 1.44 | 1.973 | 0.189 | 0.790 | INVENTIVE EXAMPLE |
| 3059 | 7.05 | | 3.31 | 1.46 | 1.972 | 0.187 | 0.789 | INVENTIVE EXAMPLE |
| 3060 | 7.03 | | 3.32 | 1.98 | 1.964 | 0.197 | 0.804 | INVENTIVE EXAMPLE |

TABLE C10

| | | PRODUCTION RESULTS | | | | | | | |
|---|---|---|---|---|---|---|---|---|---|
| | | BOUNDARY EXISTENCE OF SWITCHING BOUNDARY | AVERAGE GRAIN SIZE | | | | | | |
| No. | STEEL TYPE | EXISTENCE NON | $RA_C$ mm | $RB_C$ mm | $RA_C$ mm | $RB_L$ mm | $RA_C$/ $RA_L$ | $RB_L$/ $RA_L$ | $RB_C$/ $RA_C$ |
| 3061 | C | EXISTENCE | 29.7 | 320.4 | 14.5 | 48.3 | 2.05 | 3.34 | 10.80 |
| 3062 | D | EXISTENCE | 30.7 | 354.7 | 14.2 | 49.5 | 2.16 | 3.49 | 11.55 |
| 3063 | E | EXISTENCE | 30.6 | 352.4 | 14.1 | 49.1 | 2.17 | 3.48 | 11.51 |
| 3064 | F | EXISTENCE | 30.7 | 354.1 | 14.6 | 50.6 | 2.10 | 3.47 | 11.53 |
| 3065 | G | EXISTENCE | 30.7 | 354.4 | 14.5 | 50.4 | 2.12 | 3.47 | 11.56 |
| 3066 | H | EXISTENCE | 30.7 | 354.4 | 14.2 | 49.3 | 2.17 | 3.47 | 11.56 |
| 3067 | I | EXISTENCE | 30.6 | 351.9 | 14.4 | 49.9 | 2.13 | 3.46 | 11.50 |
| 3068 | J | EXISTENCE | 30.7 | 354.4 | 14.5 | 50.5 | 2.11 | 3.47 | 11.54 |
| 3069 | K | EXISTENCE | 30.7 | 355.0 | 14.2 | 49.7 | 2.16 | 3.49 | 11.56 |
| 3070 | L | EXISTENCE | 30.7 | 354.0 | 14.5 | 50.8 | 2.11 | 3.49 | 11.55 |
| 3071 | A | EXISTENCE | 29.7 | 320.7 | 14.3 | 47.8 | 2.08 | 3.35 | 10.81 |

| | PRODUCTION RESULTS | | | | EVALUATION | | | |
|---|---|---|---|---|---|---|---|---|
| | AVERAGE GRAIN SIZE | | | | RESULTS MAGNETIC CHARACTERISTICS | | | |
| No. | $RB_C$/ $RB_L$ | INCONSISTENCE AS TO THERMAL GRADIENT DIRECTION | ($RB_C$/ $RA_L$)/ ($RB_L$/ $RA_C$) | DEVIATION ANGLE σ (θ) | B8 T | λp-p @ 1.7T | W17/50 W/kg | NOTE |
| 3061 | 6.63 | | 3.23 | 3.01 | 1.948 | 0.214 | 0.833 | INVENTIVE EXAMPLE |
| 3062 | 7.17 | | 3.31 | 1.45 | 1.972 | 0.187 | 0.789 | INVENTIVE EXAMPLE |
| 3063 | 7.18 | | 3.31 | 2.00 | 1.964 | 0.194 | 0.804 | INVENTIVE EXAMPLE |
| 3064 | 7.00 | | 3.33 | 1.43 | 1.973 | 0.186 | 0.790 | INVENTIVE EXAMPLE |
| 3065 | 7.03 | | 3.32 | 1.42 | 1.973 | 0.189 | 0.789 | INVENTIVE EXAMPLE |
| 3066 | 7.19 | | 3.32 | 1.44 | 1.972 | 0.186 | 0.788 | INVENTIVE EXAMPLE |
| 3067 | 7.07 | | 3.32 | 2.01 | 1.964 | 0.196 | 0.904 | INVENTIVE EXAMPLE |
| 3068 | 7.02 | | 3.32 | 1.45 | 1.973 | 0.189 | 0.789 | INVENTIVE EXAMPLE |
| 3069 | 7.15 | | 3.31 | 1.45 | 1.972 | 0.187 | 0.789 | INVENTIVE EXAMPLE |
| 3070 | 6.99 | | 3.31 | 1.45 | 1.973 | 0.190 | 0.789 | INVENTIVE EXAMPLE |
| 3071 | 6.71 | | 3.23 | 2.18 | 1.962 | 0.138 | 0.810 | INVENTIVE EXAMPLE |

Hereinafter, as with the above Example 1, the evaluation results of characteristics are explained by classifying the grain oriented electrical steels under some features in regard to the chemical compositions and the producing methods.

Examples Produced by Low Temperature Slab Heating Process

Nos. 3001 to 3070 were examples produced by a process in which slab heating temperature was decreased, nitridation was conducted after primary recrystallization, and thereby main inhibitor for secondary recrystallization was formed.

Examples of Nos. 3001 to 3035

Nos. 3001 to 3035 were examples in which the steel type without Nb was used and the conditions of PA, PB, PC1, PC2, and thermal gradient were mainly changed during final annealing.

In Nos. 3001 to 3035, when λp-p@1.7 T was 0.420 or less, the magnetostriction characteristic was judged to be acceptable.

In Nos. 3001 to 3035, the inventive examples included the boundary which satisfied the boundary condition BA and which did not satisfy the boundary condition BB, and thus these examples exhibited excellent magnetostriction. Moreover, the inventive examples exhibited an acceptable iron loss. On the other hand, although the comparative examples had the crystal orientation which was slightly and continuously shifted in the secondary recrystallized grains, the comparative examples did not sufficiently include the boundary which satisfies the boundary condition BA and which does not satisfy the boundary condition BB, and thus these examples did not exhibit preferred magnetostriction.

Examples of Nos. 3036 to 3070

Nos. 3036 to 3070 were examples in which the steel type including Nb as the slab was used and the conditions of PA, PB, PC1, PC2, and thermal gradient were mainly changed during final annealing.

In Nos. 3036 to 3070, when λp-p@1.7 T was 0.420 or less, the magnetostriction characteristic was judged to be acceptable.

In Nos. 3036 to 3070, the inventive examples included the boundary which satisfied the boundary condition BA and which did not satisfy the boundary condition BB, and thus these examples exhibited excellent magnetostriction. Moreover, the inventive examples exhibited an acceptable iron loss. On the other hand, although the comparative examples had the crystal orientation which was slightly and continuously shifted in the secondary recrystallized grains, the comparative examples did not sufficiently include the boundary which satisfies the boundary condition BA and which does not satisfy the boundary condition BB, and thus these examples did not exhibit preferred magnetostriction.

Example of No. 3071

No. 3071 was example produced by a process in which slab heating temperature was increased, MnS was sufficiently soluted during slab heating and was reprecipitated during post process, and the reprecipited MnS was utilized as main inhibitor.

In No. 3071, when λp-p@1.7 T was 0.420 or less, the magnetostriction characteristic was judged to be acceptable.

As shown in No. 3071, as long as the conditions in final annealing were appropriately controlled, the magnetostriction was favorably improved even by the high temperature slab heating process.

Example 4

Using slabs with chemical composition shown in Table D1 as materials, grain oriented electrical steel sheets with chemical composition shown in Table D2 were produced. The methods for measuring the chemical composition and the notation in the tables are the same as in the above Example 1.

TABLE D1

| STEEL | CHEMICAL COMPOSITION OF SLAB (STEEL PIECE) (UNIT:mass %, BALANCE CONSISTING OF Fe AND IMPURITIES) | | | | | | |
|---|---|---|---|---|---|---|---|
| TYPE | C | Si | Mn | S | Al | N | Cu |
| X1 | 0.070 | 3.26 | 0.07 | 0.005 | 0.026 | 0.008 | 0.07 |
| X2 | 0.060 | 3.35 | 0.10 | 0.006 | 0.026 | 0.008 | 0.02 |
| X3 | 0.060 | 3.35 | 0.10 | 0.006 | 0.026 | 0.008 | 0.02 |
| X4 | 0.060 | 3.35 | 0.10 | 0.006 | 0.026 | 0.008 | 0.02 |
| X5 | 0.060 | 3.35 | 0.10 | 0.006 | 0.026 | 0.008 | 0.02 |
| X6 | 0.060 | 3.35 | 0.10 | 0.006 | 0.026 | 0.008 | 0.02 |
| X7 | 0.060 | 3.35 | 0.10 | 0.006 | 0.026 | 0.008 | 0.02 |
| X8 | 0.060 | 3.35 | 0.10 | 0.006 | 0.026 | 0.008 | 0.02 |
| X9 | 0.060 | 3.35 | 0.10 | 0.006 | 0.026 | 0.008 | 0.02 |
| X10 | 0.060 | 3.45 | 0.10 | 0.006 | 0.026 | 0.008 | 0.20 |
| X11 | 0.060 | 3.35 | 0.10 | 0.006 | 0.026 | 0.008 | 0.02 |
| STEEL TYPE | Bi | Nb | V | Mo | Ta | W | OTHER |
| X1 | — | — | — | — | — | — | Se:0.017 |
| X2 | — | — | — | — | — | — | B:0.002 |
| X3 | — | — | — | — | — | — | P:0.01 |
| X4 | — | — | — | — | — | — | Ti:0.005 |
| X5 | — | — | — | — | — | — | Sn:0.05 |
| X6 | — | — | — | — | — | — | Sb:0.03 |
| X7 | — | — | — | — | — | — | Cr:0.1 |
| X8 | — | — | — | — | — | — | Ni:0.05 |
| X9 | — | — | — | — | — | — | — |
| X10 | — | 0.002 | — | — | — | — | — |
| X11 | — | 0.010 | — | — | — | — | — |

TABLE D2

| STEEL | CHEMICAL COMPOSITION OF GRAIN ORIENTED ELECTRICAL STEEL SHEET (UNIT:mass %, BALANCE CONSISTING OF Fe AND IMPURITIES) | | | | | | |
|---|---|---|---|---|---|---|---|
| TYPE | C | Si | Mn | S | Al | N | Cu |
| X1 | 0.001 | 3.15 | 0.07 | <0.002 | <0.004 | <0.002 | 0.07 |
| X2 | 0.001 | 3.30 | 0.10 | <0.002 | <0.004 | <0.002 | 0.02 |
| X3 | 0.001 | 3.30 | 0.10 | <0.002 | <0.004 | <0.002 | 0.02 |
| X4 | 0.001 | 3.30 | 0.10 | <0.002 | <0.004 | <0.002 | 0.02 |
| X5 | 0.001 | 3.30 | 0.10 | <0.002 | <0.004 | <0.002 | 0.02 |
| X6 | 0.001 | 3.30 | 0.10 | <0.002 | <0.004 | <0.002 | 0.02 |
| X7 | 0.001 | 3.30 | 0.10 | <0.002 | <0.004 | <0.002 | 0.02 |
| X8 | 0.001 | 3.30 | 0.10 | <0.002 | <0.004 | <0.002 | 0.02 |
| X9 | 0.001 | 3.30 | 0.10 | <0.002 | <0.004 | <0.002 | 0.02 |
| X10 | 0.001 | 3.34 | 0.10 | <0.002 | <0.004 | <0.002 | 0.20 |
| X11 | 0.001 | 3.30 | 0.10 | <0.002 | <0.004 | <0.002 | 0.02 |
| STEEL TYPE | Bi | Nb | V | Mo | Ta | W | OTHER |
| X1 | — | — | — | — | — | — | Se:<0.017 |
| X2 | — | — | — | — | — | — | B:0.002 |
| X3 | — | — | — | — | — | — | P:0.01 |
| X4 | — | — | — | — | — | — | Ti:0.005 |
| X5 | — | — | — | — | — | — | Sn:0.05 |

TABLE D2-continued

| | | | | | | | |
|---|---|---|---|---|---|---|---|
| X6 | — | — | — | — | — | — | Sb:0.03 |
| X7 | — | — | — | — | — | — | Cr:0.1 |
| X8 | — | — | — | — | — | — | Ni:0.05 |
| X9 | — | — | — | — | — | — | — |
| X10 | — | 0.002 | — | — | — | — | — |
| X11 | — | 0.007 | — | — | — | — | — |

The grain oriented electrical steel sheets were produced under production conditions shown in Table D3. The production conditions other than those shown in the tables were the same as those in the above Example 1.

In the examples except for No. 4009, the annealing separator which mainly included MgO was applied to the steel sheets, and then final annealing was conducted. On the other hand, in No. 4009, the annealing separator which mainly included alumina was applied to the steel sheets, and then final annealing was conducted.

TABLE D3

| | | PRODUCTION CONDITIONS | | | | | | | | |
|---|---|---|---|---|---|---|---|---|---|---|
| | | HOT ROLLING | | | | | | COLD ROLLING | |
| | | HEATING | TEMPERATURE OF FINAL | COILING | SHEET | HOT BAND ANNEALING | | SHEET | REDUCTION OF COLD |
| No. | STEEL TYPE | TEMPERATURE ° C. | ROLLING ° C. | TEMPERATURE ° C. | THICKNESS mm | TEMPERATURE ° C. | TIME SECOND | THICKNESS mm | ROLLING % |
| 4001 | X1 | 1400 | 1100 | 500 | 2.6 | 1100 | 180 | 0.26 | 90.0 |
| 4002 | X2 | 1150 | 900 | 550 | 2.8 | 1100 | 180 | 0.26 | 90.7 |
| 4003 | X3 | 1150 | 900 | 550 | 2.8 | 1100 | 180 | 0.26 | 90.7 |
| 4004 | X4 | 1150 | 900 | 550 | 2.8 | 1100 | 180 | 0.26 | 90.7 |
| 4005 | X5 | 1150 | 900 | 550 | 2.8 | 1100 | 180 | 0.26 | 90.7 |
| 4006 | X6 | 1150 | 900 | 550 | 2.8 | 1100 | 180 | 0.26 | 90.7 |
| 4007 | X7 | 1150 | 900 | 550 | 2.8 | 1100 | 180 | 0.26 | 90.7 |
| 4008 | X8 | 1150 | 900 | 550 | 2.8 | 1100 | 180 | 0.26 | 90.7 |
| 4009 | X9 | 1150 | 900 | 550 | 2.8 | 1100 | 180 | 0.26 | 90.7 |
| 4010 | X9 | 1150 | 900 | 550 | 2.8 | 1100 | 180 | 0.26 | 90.7 |
| 4011 | X9 | 1150 | 900 | 550 | 2.8 | 1100 | 180 | 0.26 | 90.7 |
| 4012 | X10 | 1150 | 900 | 550 | 2.8 | 1100 | 180 | 0.26 | 90.7 |
| 4013 | X11 | 1150 | 900 | 550 | 2.8 | 1100 | 180 | 0.26 | 90.7 |

| | PRODUCTION CONDITIONS | | | | | | | |
|---|---|---|---|---|---|---|---|---|
| | DECARBURIZATION ANNEALING | | | | | | | |
| | GRAIN SIZE OF PRIMARY RE-CRYSTALLIZED | NITROGEN CONTENT AFTER | FINAL ANNEALING | | | | | |
| No. | GRAIN μm | NITRIDATION ppm | PA | PB | PC1 | PC2 | TE1 MINUTE | TF MINUTE |
| 4001 | 9 | — | 0.050 | 0.025 | 0.015 | 0.0030 | 300 | 300 |
| 4002 | 22 | 220 | 0.050 | 0.010 | 0.003 | 0.0007 | 210 | 300 |
| 4003 | 22 | 220 | 0.050 | 0.010 | 0.003 | 0.0007 | 210 | 300 |
| 4004 | 22 | 220 | 0.050 | 0.010 | 0.003 | 0.0007 | 210 | 300 |
| 4005 | 22 | 220 | 0.050 | 0.010 | 0.003 | 0.0007 | 210 | 300 |
| 4006 | 22 | 220 | 0.050 | 0.010 | 0.003 | 0.0007 | 210 | 300 |
| 4007 | 22 | 220 | 0.050 | 0.010 | 0.003 | 0.00070 | 210 | 300 |
| 4008 | 22 | 220 | 0.050 | 0.010 | 0.003 | 0.0007 | 210 | 300 |
| 4009 | 22 | 220 | 0.050 | 0.010 | 0.003 | 0.0007 | 210 | 300 |
| 4010 | 25 | 220 | 0.050 | 0.010 | 0.003 | 0.0007 | 210 | 300 |
| 4011 | 23 | 220 | ※1 | 0.010 | 0.003 | 0.0007 | 210 | 300 |
| 4012 | 23 | 220 | 0.200 | 0.010 | 0.003 | 0.0007 | 210 | 300 |
| 4013 | 16 | 210 | 0.200 | 0.005 | 0.005 | 0.0007 | 210 | 300 |

IN THE ABOVE TABLE, "※1" INDICATES THAT "$PH_2O/PH_2$ IN 700 TD 750° C. WAS CONTROLLED TO BE 0.2, AND $PH_2O/PH_2$ IN 750 TO 800° C. WAS CONTROLLED TO BE 0.03".

The insulation coating which was the same as those in the above Example 1 was formed on the surface of produced grain oriented electrical steel sheets (final annealed sheets).

The produced grain oriented electrical steel sheets had the intermediate layer which was arranged in contact with the grain oriented electrical steel sheet (silicon steel sheet) and the insulation coating which was arranged in contact with the intermediate layer, when viewing the cross section whose cutting direction is parallel to thickness direction.

In the grain oriented electrical steel sheets except for No. 4009, the intermediate layer was forsterite film whose average thickness was 1.5 μm, and the insulation coating was the coating which mainly included phosphate and colloidal silica and whose average thickness was 2 μm. On the other hand, in the grain oriented electrical steel sheet of No. 4009, the intermediate layer was oxide layer (layer which mainly included $SiO_2$) whose average thickness was 20 nm, and the insulation coating was the coating which mainly included phosphate and colloidal silica and whose average thickness was 2 μm.

Moreover, in the grain oriented electrical steel sheets of No. 4012 and No. 4013, by laser irradiation after forming the insulation coating, linear minute strain was applied so as to extend in the direction intersecting the rolling direction on the rolled surface of steel sheet and so as to have the interval of 4 mm in the rolling direction. It was confirmed that the effect of reducing the iron loss was obtained by irradiating the laser.

Various characteristics of the obtained grain oriented electrical steel sheet were evaluated. The evaluation methods were the same as those in the above Example 1. The evaluation results are shown in Table D4.

In Nos. 4001 to 4013, when Δλp−p was 0 or less (when the value varied toward negative from zero which is the standard), the magnetostriction characteristic was judged to be acceptable.

In Nos. 4001 to 4013, the inventive examples included the boundary which satisfied the boundary condition BA and which did not satisfy the boundary condition BB, and thus these examples exhibited excellent magnetostriction. Moreover, the inventive examples exhibited an acceptable iron loss. On the other hand, although the comparative examples had the crystal orientation which was slightly and continuously shifted in the secondary recrystallized grains, the comparative examples did not sufficiently include the boundary which satisfies the boundary condition BA and which does not satisfy the boundary condition BB, and thus these examples did not exhibit preferred magnetostriction.

Example 5

Using slabs with chemical composition shown in Table E1 as materials, grain oriented electrical steel sheets (silicon steel sheets) with chemical composition shown in Table E2 were produced. The methods for measuring the chemical composition and the notation in the tables are the same as in the above Example 1.

TABLE D4

| | | PRODUCTION RESULTS | | | | | EVALUATION RESULTS | | | | |
|---|---|---|---|---|---|---|---|---|---|---|---|
| | | BOUNDARY EXISTENCE OF SWITCHING BOUNDARY | AVERAGE GRAIN SIZE | | | DEVIATION | MAGNETIC CHARACTERISTICS | | | | |
| No. | STEEL TYPE | EXISTENCE NONE | $RB_L$/ $RA_L$ | $RB_L$ mm | $RA_L$ mm | ANGLE σ (θ) | B8 T | λp-p @ 1.7T | Δλ p-p | W17/50 W/kg | NOTE |
| 4001 | X1 | EXISTENCE | 1.34 | 37.2 | 27.7 | 2.58 | 1.940 | 0.468 | −0.065 | 0.837 | INVENTIVE EXAMPLE |
| 4002 | X2 | EXISTENCE | 1.20 | 25.1 | 20.9 | 3.01 | 1.920 | 0.583 | −0.046 | 0.872 | INVENTIVE EXAMPLE |
| 4003 | X3 | EXISTENCE | 1.17 | 24.8 | 21.2 | 3.04 | 1.919 | 0.599 | −0.043 | 0.877 | INVENTIVE EXAMPLE |
| 4004 | X4 | EXISTENCE | 1.18 | 25.3 | 21.4 | 3.02 | 1.921 | 0.603 | −0.041 | 0.863 | INVENTIVE EXAMPLE |
| 4005 | X5 | EXISTENCE | 1.17 | 24.6 | 21.0 | 3.00 | 1.919 | 0.601 | −0.042 | 0.875 | INVENTIVE EXAMPLE |
| 4006 | X6 | EXISTENCE | 1.23 | 25.4 | 20.6 | 2.99 | 1.924 | 0.589 | −0.045 | 0.857 | INVENTIVE EXAMPLE |
| 4007 | X7 | EXISTENCE | 1.25 | 25.5 | 20.4 | 2.98 | 1.926 | 0.581 | −0.048 | 0.854 | INVENTIVE EXAMPLE |
| 4008 | X8 | EXISTENCE | 1.17 | 24.9 | 21.2 | 3.05 | 1.919 | 0.604 | −0.041 | 0.876 | INVENTIVE EXAMPLE |
| 4009 | X9 | EXISTENCE | 1.18 | 24.7 | 20.9 | 3.04 | 1.921 | 0.599 | −0.042 | 0.871 | INVENTIVE EXAMPLE |
| 4010 | X9 | NONE | 1.04 | 28.8 | 27.6 | 3.16 | 1.917 | 0.674 | 0.009 | 0.883 | COMPARATIVE EXAMPLE |
| 4011 | X9 | NONE | 1.05 | 29.5 | 28.2 | 3.18 | 1.916 | 0.676 | 0.005 | 0.882 | COMPARATIVE EXAMPLE |
| 4012 | X10 | EXISTENCE | 1.21 | 25.5 | 21.1 | 2.95 | 1.915 | 0.554 | −0.049 | 0.789 | INVENTIVE EXAMPLE |
| 4013 | X11 | EXISTENCE | 1.67 | 25.3 | 15.1 | 3.72 | 1.943 | 0.418 | −0.088 | 0.757 | INVENTIVE EXAMPLE |

TABLE E1

| STEEL TYPE | CHEMICAL COMPOSITION OF SLAB(STEEL PIECE) (UNIT:mass % BALANCE OONSSTNG OF Fe AND IMPURITIES) | | | | | | | | | | | |
|---|---|---|---|---|---|---|---|---|---|---|---|---|
| | C | Si | Mn | S | Al | N | Cu | Bi | Nb | V | Mo | Ta | W |
| A1 | 0.070 | 3.26 | 0.07 | 0.025 | 0.026 | 0.008 | 0.07 | — | — | — | — | — | — |
| A2 | 0.070 | 3.26 | 0.07 | 0.025 | 0.026 | 0.008 | 0.07 | — | 0.007 | — | — | — | — |
| B1 | 0.070 | 3.26 | 0.07 | 0.025 | 0.025 | 0.008 | 0.07 | 0.002 | — | — | — | — | — |
| B2 | 0.070 | 3.26 | 0.07 | 0.025 | 0.025 | 0.008 | 0.07 | 0.002 | 0.007 | — | — | — | — |
| C1 | 0.060 | 3.35 | 0.10 | 0.006 | 0.026 | 0.008 | <0.03 | — | — | — | — | — | — |
| C2 | 0.060 | 3.35 | 0.10 | 0.006 | 0.026 | 0.008 | <0.03 | — | 0.001 | — | — | — | — |
| C3 | 0.060 | 3.35 | 0.10 | 0.006 | 0.026 | 0.008 | <0.03 | — | 0.003 | — | — | — | — |
| C4 | 0.060 | 3.35 | 0.10 | 0.006 | 0.026 | 0.008 | <0.03 | — | 0.005 | — | — | — | — |
| C5 | 0.060 | 3.35 | 0.10 | 0.006 | 0.026 | 0.008 | <0.03 | — | 0.010 | — | — | — | — |
| C6 | 0.060 | 3.35 | 0.10 | 0.006 | 0.026 | 0.008 | <0.03 | — | 0.020 | — | — | — | — |
| C7 | 0.060 | 3.35 | 0.10 | 0.006 | 0.026 | 0.008 | <0.03 | — | 0.030 | — | — | — | — |
| C8 | 0.060 | 3.35 | 0.10 | 0.006 | 0.026 | 0.008 | <0.03 | — | 0.050 | — | — | — | — |
| D1 | 0.060 | 3.45 | 0.10 | 0.006 | 0.028 | 0.008 | 0.20 | — | 0.002 | — | — | — | — |
| D2 | 0.060 | 3.45 | 0.10 | 0.006 | 0.028 | 0.008 | 0.20 | — | 0.007 | — | — | — | — |
| D3 | 0.060 | 3.45 | 0.10 | 0.006 | 0.028 | 0.008 | 0.20 | — | 0.007 | — | — | — | — |
| E | 0.060 | 3.45 | 0.10 | 0.006 | 0.027 | 0.008 | 0.20 | — | — | 0.007 | — | — | — |
| F | 0.060 | 3.45 | 0.10 | 0.006 | 0.027 | 0.008 | 0.20 | — | — | — | 0.020 | — | — |
| G | 0.060 | 3.45 | 0.10 | 0.006 | 0.027 | 0.008 | 0.20 | — | 0.005 | — | — | 0.003 | — |
| H | 0.060 | 3.45 | 0.10 | 0.006 | 0.027 | 0.008 | 0.20 | — | — | — | — | 0.010 | — |
| I | 0.060 | 3.45 | 0.10 | 0.006 | 0.027 | 0.008 | 0.20 | — | — | — | — | — | 0.010 |
| J | 0.060 | 3.45 | 0.10 | 0.006 | 0.027 | 0.008 | 0.20 | — | 0.004 | — | 0.010 | — | — |
| K | 0.060 | 3.45 | 0.10 | 0.006 | 0.027 | 0.008 | 0.20 | — | 0.005 | 0.003 | — | 0.003 | — |
| L | 0.060 | 3.45 | 0.10 | 0.006 | 0.027 | 0.008 | 0.20 | — | — | 0.005 | — | 0.005 | — |

TABLE E2

| STEEL TYPE | CHEMICAL COMPOSITION OF GRAIN ORIENTED ELECTRICAL STEEL SHEET (UNIT:mass %, BALANCE CONSISTING OF Fe AND IMPURITIES) | | | | | | | | | | | | |
|---|---|---|---|---|---|---|---|---|---|---|---|---|---|
| | C | Si | Mn | S | Al | N | Cu | Bi | Nb | V | Mo | Ta | W |
| A1 | 0.001 | 3.15 | 0.07 | <0.002 | <0.004 | <0.002 | 0.07 | — | — | — | — | — | — |
| A2 | 0.001 | 3.15 | 0.07 | <0.002 | <0.004 | <0.002 | 0.07 | — | 0.005 | — | — | — | — |
| B1 | 0.001 | 3.15 | 0.07 | <0.002 | <0.004 | <0.002 | 0.07 | <0.001 | — | — | — | — | — |
| B2 | 0.001 | 3.15 | 0.07 | <0.002 | <0.004 | <0.002 | 0.07 | <0.001 | 0.005 | — | — | — | — |
| C1 | 0.001 | 3.30 | 0.10 | <0.002 | <0.004 | <0.002 | <0.03 | — | — | — | — | — | — |
| C2 | 0.001 | 3.30 | 0.10 | <0.002 | <0.004 | <0.002 | <0.03 | — | <0.001 | — | — | — | — |
| C3 | 0.001 | 3.30 | 0.10 | <0.002 | <0.004 | <0.002 | <0.03 | — | 0.002 | — | — | — | — |
| C4 | 0.001 | 3.30 | 0.10 | <0.002 | <0.004 | <0.002 | <0.03 | — | 0.003 | — | — | — | — |
| C5 | 0.001 | 3.30 | 0.10 | <0.002 | <0.004 | <0.002 | <0.03 | — | 0.007 | — | — | — | — |
| C6 | 0.002 | 3.30 | 0.10 | <0.002 | <0.004 | <0.002 | <0.03 | — | 0.018 | — | — | — | — |
| C7 | 0.004 | 3.30 | 0.10 | <0.002 | <0.004 | <0.002 | <0.03 | — | 0.028 | — | — | — | — |
| C8 | 0.006 | 3.30 | 0.10 | <0.002 | <0.004 | <0.002 | <0.03 | — | 0.048 | — | — | — | — |
| D1 | 0.001 | 3.34 | 0.10 | <0.002 | <0.004 | <0.002 | 0.20 | — | 0.002 | — | — | — | — |
| D2 | 0.001 | 3.34 | 0.10 | <0.002 | <0.004 | <0.002 | 0.20 | — | 0.006 | — | — | — | — |
| D3 | 0.001 | 3.34 | 0.10 | <0.002 | <0.004 | <0.002 | 0.20 | — | <0.001 | — | — | — | — |
| E | 0.001 | 3.30 | 0.10 | <0.002 | <0.004 | <0.002 | 0.20 | — | — | 0.006 | — | — | — |
| F | 0.001 | 3.34 | 0.10 | <0.002 | <0.004 | <0.002 | 0.20 | — | — | — | 0.020 | — | — |
| G | 0.001 | 3.34 | 0.10 | <0.002 | <0.004 | <0.002 | 0.20 | — | 0.004 | — | — | 0.001 | — |
| H | 0.001 | 3.34 | 0.10 | <0.002 | <0.004 | <0.002 | 0.20 | — | — | — | — | 0.010 | — |
| I | 0.001 | 3.34 | 0.10 | <0.002 | <0.004 | <0.002 | 0.20 | — | — | — | — | — | 0.010 |
| J | 0.001 | 3.34 | 0.10 | <0.002 | <0.004 | <0.002 | 0.20 | — | 0.003 | 0.001 | 0.003 | — | — |
| K | 0.001 | 3.34 | 0.10 | <0.002 | <0.004 | <0.002 | 0.20 | — | 0.003 | 0.001 | — | 0.002 | — |
| L | 0.001 | 3.34 | 0.10 | <0.002 | <0.004 | <0.002 | 0.20 | — | — | 0.003 | — | 0.004 | — |

The grain oriented electrical steel sheets were produced under production conditions shown in Table E3 to Table E7. The production conditions other than those shown in the tables were the same as those in the above Example 1.

TABLE E3

| | | PRODUCTION CONDITIONS | | | | | | |
|---|---|---|---|---|---|---|---|---|
| | | HOT ROLLING | | | | | | COLD |
| | | HEATING | TEMPERATURE OF FINAL | COILING | SHEET | HOT BAND ANNEALING | | ROLLING SHEET |
| No. | STEEL TYPE | TEMPERATURE ° C. | ROLLING ° C. | TEMPERATURE ° C. | THICKNESS mm | TEMPERATURE ° C. | TIME SECOND | THICKNESS mm |
| 5001 | C1 | 1150 | 900 | 550 | 2.8 | 1100 | 180 | 0.26 |
| 5002 | C1 | 1150 | 900 | 550 | 2.8 | 1100 | 180 | 0.26 |
| 5003 | C1 | 1150 | 900 | 550 | 2.8 | 1100 | 180 | 0.26 |
| 5004 | C1 | 1150 | 900 | 550 | 2.8 | 1100 | 180 | 0.26 |
| 5005 | C1 | 1150 | 900 | 550 | 2.8 | 1100 | 180 | 0.26 |
| 5006 | C1 | 1150 | 900 | 550 | 2.8 | 1100 | 180 | 0.26 |
| 5007 | C1 | 1150 | 900 | 550 | 2.8 | 1100 | 180 | 0.26 |
| 5008 | C1 | 1150 | 900 | 550 | 2.8 | 1100 | 180 | 0.26 |
| 5009 | C1 | 1150 | 900 | 550 | 2.8 | 1100 | 180 | 0.26 |
| 5010 | C1 | 1150 | 900 | 550 | 2.8 | 1100 | 180 | 0.26 |
| 5011 | C1 | 1150 | 900 | 550 | 2.8 | 1100 | 180 | 0.26 |
| 5012 | C1 | 1150 | 900 | 550 | 2.8 | 1100 | 180 | 0.26 |
| 5013 | C1 | 1150 | 900 | 550 | 2.8 | 1100 | 180 | 0.26 |
| 5014 | C1 | 1150 | 900 | 550 | 2.8 | 1100 | 180 | 0.26 |
| 5015 | C1 | 1150 | 900 | 550 | 2.8 | 1100 | 180 | 0.26 |
| 5016 | C1 | 1150 | 900 | 550 | 2.8 | 1100 | 180 | 0.26 |
| 5017 | C1 | 1150 | 900 | 550 | 2.8 | 1100 | 180 | 0.26 |
| 5018 | C1 | 1150 | 900 | 550 | 2.8 | 1100 | 180 | 0.26 |
| 5019 | C1 | 1150 | 900 | 550 | 2.8 | 1100 | 180 | 0.26 |
| 5020 | C1 | 1150 | 900 | 550 | 2.8 | 1100 | 180 | 0.26 |

| | PRODUCTION CONDITIONS | | | | | | | |
|---|---|---|---|---|---|---|---|---|
| | COLD | DECARBURIZATION ANNEALING | | | | | | |
| | ROLLING REDUCTION OF COLD | GRAIN SIZE OF PRIMARY RECRYSTALLIZED | NITROGEN CONTENT AFTER | FINAL ANNEALING | | | | |
| No. | ROLLING % | GRAIN μm | NITRIDATION ppm | PA' | PB' | TD MINUTE | TE1' MINUTE | TF MINUTE |
| 5001 | 90.7 | 22 | 220 | 0.020 | 0.005 | 900 | 180 | 300 |
| 5002 | 90.7 | 22 | 250 | 0.020 | 0.005 | 900 | 180 | 300 |
| 5003 | 90.7 | 22 | 300 | 0.020 | 0.005 | 900 | 180 | 300 |
| 5004 | 90.7 | 22 | 160 | 0.020 | 0.020 | 900 | 300 | 300 |
| 5005 | 90.7 | 22 | 220 | 0.100 | 0.020 | 900 | 300 | 300 |
| 5006 | 90.7 | 22 | 220 | 0.100 | 0.020 | 600 | 300 | 300 |
| 5007 | 90.7 | 22 | 220 | 0.100 | 0.020 | 480 | 300 | 300 |
| 5008 | 90.7 | 22 | 220 | 0.100 | 0.020 | 360 | 300 | 300 |
| 5009 | 90.7 | 22 | 220 | 0.100 | 0.020 | 240 | 300 | 300 |
| 5010 | 90.7 | 22 | 220 | 0.100 | 0.020 | 180 | 300 | 300 |
| 5011 | 90.7 | 22 | 220 | 0.100 | 0.020 | 120 | 300 | 300 |
| 5012 | 90.7 | 22 | 220 | 0.100 | 0.020 | 60 | 300 | 300 |
| 5013 | 90.7 | 22 | 220 | 0.100 | 0.040 | 480 | 300 | 300 |
| 5014 | 90.7 | 22 | 220 | 0.100 | 0.070 | 480 | 300 | 300 |
| 5015 | 90.7 | 22 | 220 | 0.200 | 0.100 | 480 | 300 | 300 |
| 5016 | 90.7 | 22 | 220 | 0.200 | 0.200 | 480 | 300 | 300 |
| 5017 | 90.7 | 22 | 220 | 0.300 | 0.100 | 480 | 300 | 600 |
| 5018 | 90.7 | 22 | 220 | 0.020 | 0.100 | 480 | 300 | 600 |
| 5019 | 90.7 | 22 | 220 | 0.600 | 0.100 | 480 | 300 | 600 |
| 5020 | 90.7 | 22 | 220 | 1.000 | 0.100 | 300 | 300 | 600 |

TABLE E4

| | | PRODUCTION CONDITIONS | | | | | | |
|---|---|---|---|---|---|---|---|---|
| | | HOT ROLLING | | | | | | COLD |
| | | HEATING | TEMPERATURE OF FINAL | COILING | SHEET | HOT BAND ANNEALING | | ROLLING SHEET |
| No. | STEEL TYPE | TEMPERATURE ° C. | ROLLING ° C. | TEMPERATURE ° C. | THICKNESS mm | TEMPERATURE ° C. | TIME SECOND | THICKNESS mm |
| 5021 | C1 | 1150 | 900 | 550 | 2.8 | 1100 | 180 | 0.26 |
| 5022 | C1 | 1150 | 900 | 550 | 2.8 | 1100 | 180 | 0.26 |
| 5023 | C1 | 1150 | 900 | 550 | 2.8 | 1100 | 180 | 0.26 |
| 5024 | D1 | 1150 | 900 | 550 | 2.8 | 1100 | 180 | 0.26 |
| 5025 | D1 | 1150 | 900 | 550 | 2.8 | 1100 | 180 | 0.26 |
| 5026 | D1 | 1150 | 900 | 550 | 2.8 | 1100 | 180 | 0.26 |
| 5027 | D1 | 1150 | 900 | 550 | 2.8 | 1100 | 180 | 0.26 |
| 5028 | D1 | 1150 | 900 | 550 | 2.8 | 1100 | 180 | 0.26 |
| 5029 | D1 | 1150 | 900 | 550 | 2.8 | 1100 | 180 | 0.26 |
| 5030 | D1 | 1150 | 900 | 550 | 2.8 | 1100 | 180 | 0.26 |
| 5031 | D1 | 1150 | 900 | 550 | 2.8 | 1100 | 180 | 0.26 |
| 5032 | D1 | 1150 | 900 | 550 | 2.8 | 1100 | 180 | 0.26 |
| 5033 | D1 | 1150 | 900 | 550 | 2.8 | 1100 | 180 | 0.26 |
| 5034 | D1 | 1150 | 900 | 550 | 2.8 | 1100 | 180 | 0.26 |
| 5035 | D2 | 1150 | 900 | 550 | 2.8 | 1100 | 180 | 0.26 |
| 5036 | D2 | 1150 | 900 | 550 | 2.8 | 1100 | 180 | 0.26 |
| 5037 | D2 | 1150 | 900 | 550 | 2.8 | 1100 | 180 | 0.26 |
| 5038 | D2 | 1150 | 900 | 550 | 2.8 | 1100 | 180 | 0.26 |
| 5039 | D2 | 1150 | 900 | 550 | 2.8 | 1100 | 180 | 0.26 |
| 5040 | D2 | 1150 | 900 | 550 | 2.8 | 1100 | 180 | 0.26 |

| | PRODUCTION CONDITIONS | | | | | | | |
|---|---|---|---|---|---|---|---|---|
| | COLD | DECARBURIZATION ANNEALING | | | | | | |
| | ROLLING REDUCTION OF COLD | GRAIN SIZE OF PRIMARY RECRYSTALLIZED | NITROGEN CONTENT AFTER | FINAL ANNEALING | | | | |
| No. | ROLLING % | GRAIN µm | NITRIDATION ppm | PA' | PB' | TD MINUTE | TE1' MINUTE | TF MINUTE |
| 5021 | 90.7 | 22 | 300 | 2.000 | 0.010 | 300 | 300 | 600 |
| 5022 | 90.7 | 22 | 300 | 0.050 | 0.010 | 300 | 150 | 600 |
| 5023 | 90.7 | 22 | 300 | 0.100 | 0.020 | 300 | 300 | 600 |
| 5024 | 90.7 | 23 | 220 | 0.050 | 0.010 | 300 | 150 | 300 |
| 5025 | 90.7 | 23 | 220 | 0.050 | 0.010 | 300 | 300 | 300 |
| 5026 | 90.7 | 23 | 220 | 0.200 | 0.010 | 300 | 300 | 300 |
| 5027 | 90.7 | 23 | 220 | 0.200 | 0.020 | 300 | 300 | 300 |
| 5028 | 90.7 | 23 | 220 | 0.200 | 0.020 | 300 | 150 | 300 |
| 5029 | 90.7 | 23 | 220 | 0.200 | 0.010 | 300 | 150 | 300 |
| 5030 | 90.7 | 23 | 220 | 0.200 | 0.020 | 300 | 150 | 300 |
| 5031 | 90.7 | 23 | 220 | 0.200 | 0.020 | 300 | 300 | 300 |
| 5032 | 90.7 | 23 | 220 | 0.200 | 0.020 | 300 | 600 | 300 |
| 5033 | 90.7 | 23 | 220 | 0.200 | 0.020 | 300 | 900 | 300 |
| 5034 | 90.7 | 23 | 220 | 0.200 | 0.020 | 300 | 1500 | 300 |
| 5035 | 90.7 | 17 | 220 | 0.020 | 0.005 | 720 | 150 | 300 |
| 5036 | 90.7 | 17 | 220 | 0.020 | 0.020 | 720 | 90 | 300 |
| 5037 | 90.7 | 17 | 220 | 0.100 | 0.005 | 720 | 90 | 300 |
| 5038 | 90.7 | 17 | 220 | 0.020 | 0.005 | 600 | 90 | 300 |
| 5039 | 90.7 | 17 | 190 | 0.100 | 0.020 | 420 | 300 | 300 |
| 5040 | 90.7 | 17 | 160 | 0.300 | 0.020 | 420 | 300 | 300 |

TABLE E5

| | | PRODUCTION CONDITIONS | | | | | | |
|---|---|---|---|---|---|---|---|---|
| | | HOT ROLLING | | | | | | COLD |
| | | HEATING | TEMPERATURE OF FINAL | COILING | SHEET | HOT BAND ANNEALING | | ROLLING SHEET |
| No. | STEEL TYPE | TEMPERATURE ° C. | ROLLING ° C. | TEMPERATURE ° C. | THICKNESS mm | TEMPERATURE ° C. | TIME SECOND | THICKNESS mm |
| 5041 | D2 | 1150 | 900 | 550 | 2.8 | 1100 | 180 | 0.26 |
| 5042 | D3 | 1150 | 900 | 550 | 2.8 | 1100 | 180 | 0.26 |

TABLE E5-continued

| | | | | | | | | |
|---|---|---|---|---|---|---|---|---|
| 5043 | D2 | 1150 | 900 | 550 | 2.8 | 1100 | 180 | 0.26 |
| 5044 | D2 | 1150 | 900 | 550 | 2.8 | 1100 | 180 | 0.26 |
| 5045 | D2 | 1150 | 900 | 550 | 2.8 | 1100 | 180 | 0.26 |
| 5046 | D2 | 1150 | 900 | 550 | 2.8 | 1100 | 180 | 0.26 |
| 5047 | C1 | 1150 | 900 | 550 | 2.8 | 1100 | 180 | 0.26 |
| 5048 | C2 | 1150 | 900 | 550 | 2.8 | 1100 | 180 | 0.26 |
| 5049 | C3 | 1150 | 900 | 550 | 2.8 | 1100 | 180 | 0.26 |
| 5050 | C4 | 1150 | 900 | 550 | 2.8 | 1100 | 180 | 0.26 |
| 5051 | C5 | 1150 | 900 | 550 | 2.8 | 1100 | 180 | 0.26 |
| 5052 | C6 | 1150 | 900 | 550 | 2.8 | 1100 | 180 | 0.26 |
| 5053 | C7 | 1150 | 900 | 550 | 2.8 | 1100 | 180 | 0.26 |
| 5054 | C8 | 1150 | 900 | 550 | 2.8 | 1100 | 180 | 0.26 |
| 5055 | D1 | 1150 | 900 | 550 | 2.8 | 1100 | 180 | 0.26 |
| 5056 | D2 | 1150 | 900 | 550 | 2.8 | 1100 | 180 | 0.26 |
| 5057 | E | 1150 | 900 | 550 | 2.8 | 1100 | 180 | 0.26 |
| 5058 | F | 1150 | 900 | 550 | 2.8 | 1100 | 180 | 0.26 |
| 5059 | G | 1150 | 900 | 550 | 2.8 | 1100 | 180 | 0.26 |
| 5060 | H | 1150 | 900 | 550 | 2.8 | 1100 | 180 | 0.26 |

| | PRODUCTION CONDITIONS | | | | | | | |
|---|---|---|---|---|---|---|---|---|
| | COLD | DECARBURIZATION ANNEALING | | FINAL ANNEALING | | | | |
| No. | ROLLING REDUCTION OF COLD ROLLING % | GRAIN SIZE OF PRIMARY RECRYSTALLIZED GRAIN μm | NITROGEN CONTENT AFTER NITRIDATION ppm | PA' | PB' | TD MINUTE | TE1' MINUTE | TF MINUTE |
| 5041 | 90.7 | 17 | 220 | 0.500 | 0.020 | 420 | 300 | 300 |
| 5042 | 90.7 | 17 | 220 | 0.500 | 0.050 | 300 | 600 | 300 |
| 5043 | 90.7 | 17 | 220 | 0.600 | 0.020 | 420 | 300 | 300 |
| 5044 | 90.7 | 17 | 180 | 1.000 | 0.020 | 420 | 600 | 300 |
| 5045 | 90.7 | 17 | 180 | 2.000 | 0.020 | 420 | 600 | 300 |
| 5046 | 90.7 | 17 | 220 | 2.000 | 0.020 | 420 | 600 | 300 |
| 5047 | 90.7 | 23 | 210 | 0.200 | 0.040 | 300 | 150 | 300 |
| 5048 | 90.7 | 24 | 210 | 0.200 | 0.040 | 300 | 150 | 300 |
| 5049 | 90.7 | 20 | 210 | 0.200 | 0.040 | 300 | 150 | 300 |
| 5050 | 90.7 | 17 | 210 | 0.200 | 0.040 | 300 | 150 | 300 |
| 5051 | 90.7 | 16 | 210 | 0.200 | 0.040 | 300 | 150 | 300 |
| 5052 | 90.7 | 15 | 210 | 0.200 | 0.040 | 300 | 150 | 300 |
| 5053 | 90.7 | 13 | 210 | 0.200 | 0.040 | 300 | 150 | 300 |
| 5054 | 90.7 | 12 | 210 | 0.200 | 0.040 | 300 | 150 | 300 |
| 5055 | 90.7 | 24 | 220 | 0.500 | 0.020 | 300 | 150 | 300 |
| 5056 | 90.7 | 17 | 220 | 0.500 | 0.020 | 300 | 150 | 300 |
| 5057 | 90.7 | 22 | 220 | 0.500 | 0.020 | 300 | 150 | 300 |
| 5058 | 90.7 | 19 | 220 | 0.500 | 0.020 | 300 | 150 | 300 |
| 5059 | 90.7 | 15 | 220 | 0.500 | 0.020 | 300 | 150 | 300 |
| 5060 | 90.7 | 16 | 220 | 0.500 | 0.020 | 300 | 150 | 300 |

TABLE E6

| | | PRODUCTION CONDITIONS | | | | | | |
|---|---|---|---|---|---|---|---|---|
| | | HOT ROLLING | | | | | | COLD |
| | | HEATING | TEMPERATURE OF FINAL | COILING | SHEET | HOT BAND ANNEALING | | ROLLING SHEET |
| No. | STEEL TYPE | TEMPERATURE ° C. | ROLLING ° C. | TEMPERATURE ° C. | THICKNESS mm | TEMPERATURE ° C. | TIME SECOND | THICKNESS mm |
| 5061 | I | 1150 | 900 | 550 | 2.8 | 1100 | 180 | 0.26 |
| 5062 | J | 1150 | 900 | 550 | 2.8 | 1100 | 180 | 0.26 |
| 5063 | K | 1150 | 900 | 550 | 2.8 | 1100 | 180 | 0.26 |
| 5064 | L | 1150 | 900 | 550 | 2.8 | 1100 | 180 | 0.26 |
| 5065 | A1 | 1400 | 900 | 550 | 2.8 | 1100 | 180 | 0.26 |
| 5066 | A1 | 1400 | 900 | 550 | 2.8 | 1100 | 180 | 0.26 |
| 5067 | A1 | 1400 | 900 | 550 | 2.8 | 1100 | 180 | 0.26 |
| 5068 | A1 | 1400 | 900 | 550 | 2.8 | 1100 | 180 | 0.26 |
| 5069 | A1 | 1400 | 900 | 550 | 2.8 | 1100 | 180 | 0.26 |
| 5070 | A1 | 1400 | 900 | 550 | 2.8 | 1100 | 180 | 0.26 |
| 5071 | A1 | 1400 | 900 | 550 | 2.8 | 1100 | 180 | 0.26 |
| 5072 | A1 | 1400 | 900 | 550 | 2.8 | 1100 | 180 | 0.26 |
| 5073 | A1 | 1400 | 900 | 550 | 2.8 | 1100 | 180 | 0.26 |
| 5074 | A2 | 1400 | 900 | 550 | 2.8 | 1100 | 180 | 0.26 |

TABLE E6-continued

| | | | | | | | | |
|---|---|---|---|---|---|---|---|---|
| 5075 | A2 | 1400 | 900 | 550 | 2.8 | 1100 | 180 | 0.26 |
| 5076 | A2 | 1400 | 900 | 550 | 2.8 | 1100 | 180 | 0.26 |
| 5077 | A2 | 1400 | 900 | 550 | 2.8 | 1100 | 180 | 0.26 |
| 5078 | A2 | 1400 | 900 | 550 | 2.8 | 1100 | 180 | 0.26 |
| 5079 | A2 | 1400 | 900 | 550 | 2.8 | 1100 | 180 | 0.26 |
| 5080 | A2 | 1400 | 900 | 550 | 2.8 | 1100 | 180 | 0.26 |

| | PRODUCTION CONDITIONS | | | | | | | |
|---|---|---|---|---|---|---|---|---|
| | COLD | DECARBURIZATION ANNEALING | | | | | | |
| | ROLLING REDUCTION OF COLD | GRAIN SIZE OF PRIMARY RECRYSTALLIZED | NITROGEN CONTENT AFTER | FINAL ANNEALING | | | | |
| No. | ROLLING % | GRAIN μm | NITRIDATION ppm | PA' | PB' | TD MINUTE | TE1' MINUTE | TF MINUTE |
| 5061 | 90.7 | 23 | 220 | 0.500 | 0.020 | 300 | 150 | 300 |
| 5062 | 90.7 | 17 | 220 | 0.500 | 0.020 | 300 | 150 | 300 |
| 5063 | 90.7 | 15 | 220 | 0.500 | 0.020 | 300 | 150 | 300 |
| 5064 | 90.7 | 15 | 220 | 0.500 | 0.020 | 300 | 150 | 300 |
| 5065 | 90.0 | 9 | — | 0.100 | 0.015 | 300 | 150 | 300 |
| 5066 | 90.0 | 9 | — | 0.100 | 0.025 | 300 | 150 | 300 |
| 5067 | 90.0 | 9 | — | 0.100 | 0.025 | 300 | 300 | 300 |
| 5068 | 90.0 | 9 | — | 0.100 | 0.015 | 300 | 300 | 300 |
| 5069 | 90.0 | 9 | — | 0.400 | 0.050 | 300 | 300 | 300 |
| 5070 | 90.0 | 9 | — | 0.400 | 0.025 | 300 | 900 | 300 |
| 5071 | 90.0 | 9 | — | 0.100 | 0.050 | 300 | 300 | 300 |
| 5072 | 90.0 | 9 | — | 0.100 | 0.025 | 300 | 900 | 300 |
| 5073 | 90.0 | 9 | — | 0.050 | 0.025 | 300 | 900 | 300 |
| 5074 | 90.0 | 7 | — | 0.100 | 0.015 | 300 | 150 | 300 |
| 5075 | 90.0 | 7 | — | 0.100 | 0.025 | 300 | 150 | 300 |
| 5076 | 90.0 | 7 | — | 0.100 | 0.025 | 300 | 150 | 300 |
| 5077 | 90.0 | 7 | — | 0.100 | 0.015 | 300 | 300 | 300 |
| 5078 | 90.0 | 7 | — | 0.400 | 0.050 | 300 | 300 | 300 |
| 5079 | 90.0 | 7 | — | 0.400 | 0.025 | 300 | 600 | 300 |
| 5080 | 90.0 | 7 | — | 0.100 | 0.050 | 300 | 300 | 300 |

TABLE E7

| | PRODUCTION CONDITIONS | | | | | | | |
|---|---|---|---|---|---|---|---|---|
| | | HOT ROLLING | | | | | | COLD |
| | | HEATING | TEMPERATURE OF FINAL | COILING | SHEET | HOT BAND ANNEALING | | ROLLING SHEET |
| No. | STEEL TYPE | TEMPERATURE ° C. | ROLLING ° C. | TEMPERATURE ° C. | THICKNESS mm | TEMPERATURE ° C. | TIME SECOND | THICKNESS mm |
| 5081 | A2 | 1400 | 900 | 550 | 2.8 | 1100 | 180 | 0.26 |
| 5082 | A2 | 1400 | 900 | 550 | 2.8 | 1100 | 180 | 0.26 |
| 5083 | B1 | 1350 | 900 | 550 | 2.8 | 1100 | 180 | 0.26 |
| 5084 | B1 | 1350 | 900 | 550 | 2.8 | 1100 | 180 | 0.26 |
| 5085 | B1 | 1350 | 900 | 550 | 2.8 | 1100 | 180 | 0.26 |
| 5086 | B1 | 1350 | 900 | 550 | 2.8 | 1100 | 180 | 0.26 |
| 5087 | B1 | 1350 | 900 | 550 | 2.8 | 1100 | 180 | 0.26 |
| 5088 | B1 | 1350 | 900 | 550 | 2.8 | 1100 | 180 | 0.26 |
| 5089 | B1 | 1350 | 900 | 550 | 2.8 | 1100 | 180 | 0.26 |
| 5090 | B1 | 1350 | 900 | 550 | 2.8 | 1100 | 180 | 0.26 |
| 5091 | B1 | 1350 | 900 | 550 | 2.8 | 1100 | 180 | 0.26 |
| 5092 | B1 | 1350 | 900 | 550 | 2.8 | 1100 | 180 | 0.26 |
| 5093 | B2 | 1350 | 900 | 550 | 2.8 | 1100 | 180 | 0.26 |
| 5094 | B2 | 1350 | 900 | 550 | 2.8 | 1100 | 180 | 0.26 |
| 5095 | B2 | 1350 | 900 | 550 | 2.8 | 1100 | 180 | 0.26 |
| 5096 | B2 | 1350 | 900 | 550 | 2.8 | 1100 | 180 | 0.26 |
| 5097 | B2 | 1350 | 900 | 550 | 2.8 | 1100 | 180 | 0.26 |
| 5098 | B2 | 1350 | 900 | 550 | 2.8 | 1100 | 180 | 0.26 |
| 5099 | B2 | 1350 | 900 | 550 | 2.8 | 1100 | 180 | 0.26 |
| 5100 | B2 | 1350 | 900 | 550 | 2.8 | 1100 | 180 | 0.26 |
| 5101 | B2 | 1350 | 900 | 550 | 2.8 | 1100 | 180 | 0.26 |

TABLE E7-continued

| | PRODUCTION CONDITIONS | | | | | | | |
|---|---|---|---|---|---|---|---|---|
| | COLD | DECARBURIZATION ANNEALING | | FINAL ANNEALING | | | | |
| No. | ROLLING REDUCTION OF COLD ROLLING % | GRAIN SIZE OF PRIMARY RECRYSTALLIZED GRAIN µm | NITROGEN CONTENT AFTER NITRIDATION ppm | PA' | PB' | TD MINUTE | TE1' MINUTE | TF MINUTE |
| 5081 | 90.0 | 7 | | 0.100 | 0.050 | 300 | 600 | 300 |
| 5082 | 90.0 | 7 | — | 0.050 | 0.025 | 300 | 900 | 300 |
| 5083 | 90.0 | 10 | — | 0.100 | 0.025 | 600 | 300 | 300 |
| 5084 | 90.0 | 10 | — | 0.100 | 0.050 | 600 | 600 | 300 |
| 5085 | 90.0 | 10 | — | 1.000 | 0.050 | 600 | 300 | 300 |
| 5086 | 90.0 | 10 | — | 1.000 | 0.025 | 600 | 300 | 300 |
| 5087 | 90.0 | 10 | — | 0.400 | 0.040 | 600 | 900 | 300 |
| 5088 | 90.0 | 10 | — | 0.010 | 0.025 | 600 | 900 | 300 |
| 5089 | 90.0 | 10 | — | 2.000 | 0.025 | 600 | 90 | 300 |
| 5090 | 90.0 | 10 | — | 2.000 | 0.250 | 600 | 900 | 300 |
| 5091 | 90.0 | 10 | — | 0.030 | 0.025 | 600 | 150 | 300 |
| 5092 | 90.0 | 10 | — | 2.000 | 0.025 | 600 | 150 | 300 |
| 5093 | 90.0 | 8 | — | 0.100 | 0.025 | 600 | 300 | 300 |
| 5094 | 90.0 | 8 | — | 0.100 | 0.050 | 600 | 600 | 300 |
| 5095 | 90.0 | 8 | — | 2.000 | 0.050 | 600 | 300 | 300 |
| 5096 | 90.0 | 8 | — | 2.000 | 0.025 | 600 | 300 | 300 |
| 5097 | 90.0 | 8 | — | 0.400 | 0.040 | 600 | 900 | 300 |
| 5098 | 90.0 | 8 | — | 0.010 | 0.025 | 600 | 900 | 300 |
| 5099 | 90.0 | 8 | — | 2.000 | 0.025 | 600 | 90 | 300 |
| 5100 | 90.0 | 8 | — | 0.020 | 0.025 | 600 | 150 | 300 |
| 5101 | 90.0 | 8 | — | 6.000 | 0.025 | 600 | 150 | 300 |

The insulation coating which was the same as those in the above Example 1 was formed on the surface of produced grain oriented electrical steel sheets (final annealed sheets).

The produced grain oriented electrical steel sheets had the intermediate layer which was arranged in contact with the grain oriented electrical steel sheet (silicon steel sheet) and the insulation coating which was arranged in contact with the intermediate layer, when viewing the cross section whose cutting direction is parallel to thickness direction. The intermediate layer was forsterite film whose average thickness was 2 µm, and the insulation coating was the coating which mainly included phosphate and colloidal silica and whose average thickness was 1 µm.

Various characteristics of the obtained grain oriented electrical steel sheet were evaluated.

Crystal orientation of grain oriented electrical steel sheet was measured by the above-mentioned method. Deviation angle was identified from the crystal orientation at each measurement point, and the boundary between two adjacent measurement points was identified based on the above deviation angles.

When the boundary condition is evaluated by using two measurement points whose interval is 1 mm and when the value obtained by dividing “the number of boundaries satisfying the boundary condition BA” by “the number of boundaries satisfying the boundary condition BB” is 1.15 or more, the steel sheet is judged to include “the boundary which satisfies the boundary condition BA and which does not satisfy the boundary condition BB”, and the steel sheet is represented such that “switching boundary (subboundary)” exists in the Tables. Here, “the number of boundaries satisfying the boundary condition BA” corresponds to the boundary of the case A and/or the case B in Table 1 as shown above, and “the number of boundaries satisfying the boundary condition BB” corresponds to the boundary of the case A.

In the same way, when the boundary condition is evaluated by using two measurement points whose interval is 1 mm and when the value obtained by dividing “the number of boundaries satisfying the boundary condition BC” by “the number of boundaries satisfying the boundary condition BB” is 1.10 or more, the steel sheet is judged to include “the boundary which satisfies the boundary condition BC and which does not satisfy the boundary condition BB”, and the steel sheet is represented such that “switching boundary (a subboundary)” exists in the Tables. Here, “the number of boundaries satisfying the boundary condition BC” corresponds to the boundary of the case 1 and/or the case 3 in Table 2 as shown above, and “the number of boundaries satisfying the boundary condition BB” corresponds to the boundary of the case 1 and/or the case 2. The average grain size was calculated based on the above identified boundaries. Moreover, $\sigma(|\alpha|)$ which was a standard deviation of an absolute value of the deviation angle $\alpha$ was measured by the above-mentioned method.

As the magnetic characteristics, the iron loss $W_{19/50}$ (W/kg) which was defined as the power loss per unit weight (1 kg) of the steel sheet was measured under the conditions of 50 Hz of AC frequency and 1.9 T of excited magnetic flux density. The evaluation methods other than the iron loss $W_{19/50}$ were the same as those in the above Example 1. The evaluation results are shown in Table E8 to Table E12.

TABLE E8

| No. | STEEL TYPE | PRODUCTION RESULTS BOUNDARY EXISTENCE OF SWITCHING BOUNDARY (SUB-BOUNDARY) EXISTENCE NON | EXISTENCE OF SWITCHING BOUNDARY (α SUB-BOUNDARY) EXISTENCE NON | AVERAGE GRAIN SIZE $RB_L$/$RC_L$ | $RB_L$ mm | $RC_L$ mm | DEVIATION ANGLE σ (\| α \|) | EVALUATION RESULTS MAGNETIC CHARACTERISTICS B8 T | W19/50 W/kg | W17/50 W/kg | NOTE |
|---|---|---|---|---|---|---|---|---|---|---|---|
| 5001 | C1 | NONE | NONE | 0.87 | 2.67 | 30.8 | 3.39 | 1.910 | 2.607 | 0.890 | COMPARATIVE EXAMPLE |
| 5002 | C1 | NONE | NONE | 0.88 | 29.2 | 33.0 | 3.13 | 1.916 | 2.607 | 0.876 | COMPARATIVE EXAMPLE |
| 5003 | C1 | NONE | NONE | 0.86 | 34.8 | 40.4 | 2.87 | 1.924 | 2.584 | 0.961 | COMPARATIVE EXAMPLE |
| 5004 | C1 | NONE | NONE | 0.92 | 21.3 | 23.3 | 3.57 | 1.904 | 2.083 | 0.801 | COMPARATIVE EXAMPLE |
| 5005 | C1 | EXISTENCE | NONE | 0.92 | 28.0 | 30.4 | 3.15 | 1.918 | 2.030 | 0.877 | INVENTIVE EXAMPLE |
| 5006 | C1 | EXISTENCE | EXISTENCE | 1.12 | 24.7 | 22.0 | 3.07 | 1.919 | 1.492 | 0.871 | INVENTIVE EXAMPLE |
| 5007 | C1 | EXISTENCE | EXISTENCE | 1.19 | 24.0 | 20.3 | 3.07 | 1.921 | 1.437 | 0.870 | INVENTIVE EXAMPLE |
| 5008 | C1 | EXISTENCE | EXISTENCE | 1.21 | 22.6 | 18.7 | 3.04 | 1.920 | 1.404 | 0.870 | INVENTIVE EXAMPLE |
| 5009 | C1 | EXISTENCE | EXISTENCE | 1.21 | 23.9 | 19.8 | 3.05 | 1.920 | 1.402 | 0.871 | INVENTIVE EXAMPLE |
| 5010 | C1 | EXISTENCE | EXISTENCE | 1.17 | 23.6 | 20.2 | 3.03 | 1.919 | 1.437 | 0.871 | INVENTIVE EXAMPLE |
| 5011 | C1 | EXISTENCE | EXISTENCE | 1.12 | 23.8 | 21.1 | 3.09 | 1.919 | 1.493 | 0.870 | INVENTIVE EXAMPLE |
| 5012 | C1 | EXISTENCE | NONE | 0.92 | 29.1 | 31.5 | 3.16 | 1.916 | 2.029 | 0.875 | INVENTIVE EXAMPLE |
| 5013 | C1 | EXISTENCE | EXISTENCE | 1.24 | 23.3 | 18.6 | 2.92 | 1.922 | 1.354 | 0.863 | INVENTIVE EXAMPLE |
| 5014 | C1 | EXISTENCE | EXISTENCE | 1.25 | 23.9 | 19.2 | 2.92 | 1.924 | 1.358 | 0.864 | INVENTIVE EXAMPLE |
| 5015 | C1 | EXISTENCE | EXISTENCE | 1.18 | 23.6 | 20.1 | 3.03 | 1.920 | 1.442 | 0.869 | INVENTIVE EXAMPLE |
| 5016 | C1 | EXISTENCE | NONE | 0.98 | 25.4 | 25.9 | 3.19 | 1.915 | 1.767 | 0.880 | INVENTIVE EXAMPLE |
| 5017 | C1 | EXISTENCE | EXISTENCE | 1.19 | 23.9 | 20.1 | 3.07 | 1.923 | 1.440 | 0.870 | INVENTIVE EXAMPLE |
| 5018 | C1 | EXISTENCE | EXISTENCE | 1.23 | 25.3 | 20.6 | 2.96 | 1.929 | 1.371 | 0.865 | INVENTIVE EXAMPLE |
| 5019 | C1 | EXISTENCE | EXISTENCE | 1.24 | 24.6 | 19.8 | 2.93 | 1.929 | 1.369 | 0.865 | INVENTIVE EXAMPLE |
| 5020 | C1 | EXISTENCE | EXISTENCE | 1.20 | 22.5 | 18.7 | 3.04 | 1.924 | 1.403 | 0.870 | INVENTIVE EXAMPLE |

TABLE E9

| No. | STEEL TYPE | PRODUCTION RESULTS BOUNDARY EXISTENCE OF SWITCHING BOUNDARY (SUBBOUNDARY) EXISTENCE NON | EXISTENCE OF SWITCHING BOUNDARY (α SUBBOUNDARY) EXISTENCE NON | AVERAGE GRAIN SIZE $RB_L$/$RC_L$ | $RB_L$ mm | $RC_L$ mm | DEVIATION ANGLE σ(\|α\|) | EVALUATION RESULTS MAGNETIC CHARACTERISTICS B8 T | W19/50 W/kg | W17/50 W/kg | NOTE |
|---|---|---|---|---|---|---|---|---|---|---|---|
| 5021 | C1 | EXISTENCE | NONE | 0.96 | 34.6 | 35.9 | 2.78 | 1.934 | 1.774 | 0.854 | INVENTIVE EXAMPLE |
| 5022 | C1 | NONE | NONE | 0.98 | 33.0 | 33.8 | 2.83 | 1.931 | 1.783 | 0.857 | COMPARATIVE EXAMPLE |
| 5023 | C1 | EXISTENCE | EXISTENCE | 1.19 | 31.9 | 26.7 | 2.55 | 1.939 | 1.158 | 0.839 | INVENTIVE EXAMPLE |
| 5024 | D1 | NONE | NONE | 0.97 | 23.2 | 23.9 | 3.33 | 1.907 | 1.824 | 0.866 | COMPARATIVE EXAMPLE |
| 5025 | D1 | EXISTENCE | NONE | 0.96 | 25.0 | 25.9 | 3.24 | 1.909 | 1.822 | 0.864 | INVENTIVE EXAMPLE |
| 5026 | D1 | EXISTENCE | NONE | 1.01 | 25.8 | 25.7 | 3.17 | 1.910 | 1.761 | 0.859 | INVENTIVE EXAMPLE |
| 5027 | D1 | EXISTENCE | EXISTENCE | 1.19 | 22.7 | 19.0 | 3.04 | 1.914 | 1.404 | 0.849 | INVENTIVE EXAMPLE |
| 5028 | D1 | NONE | NONE | 0.98 | 25.2 | 25.7 | 3.18 | 1.911 | 1.759 | 0.858 | COMPARATIVE EXAMPLE |
| 5029 | D1 | NONE | NONE | 0.99 | 24.9 | 25.1 | 3.24 | 1.909 | 1.798 | 0.863 | COMPARATIVE EXAMPLE |
| 5030 | D1 | NONE | NONE | 0.99 | 25.5 | 25.8 | 3.18 | 1.909 | 1.759 | 0.859 | COMPARATIVE EXAMPLE |
| 5031 | D1 | EXISTENCE | EXISTENCE | 1.22 | 24.3 | 19.9 | 3.05 | 1.916 | 1.406 | 0.850 | INVENTIVE EXAMPLE |
| 5032 | D1 | EXISTENCE | EXISTENCE | 1.29 | 23.6 | 18.3 | 2.93 | 1.919 | 1.321 | 0.843 | INVENTIVE EXAMPLE |
| 5033 | D1 | EXISTENCE | EXISTENCE | 1.30 | 23.6 | 18.2 | 2.92 | 1.919 | 1.318 | 0.842 | INVENTIVE EXAMPLE |
| 5034 | D1 | EXISTENCE | EXISTENCE | 1.20 | 23.9 | 19.9 | 3.07 | 1.915 | 1.403 | 0.849 | INVENTIVE EXAMPLE |
| 5035 | D2 | NONE | NONE | 0.89 | 25.8 | 28.9 | 4.54 | 1.931 | 2.202 | 0.850 | COMPARATIVE EXAMPLE |
| 5036 | D2 | NONE | NONE | 0.98 | 23.3 | 23.9 | 4.45 | 1.933 | 1.742 | 0.846 | COMPARATIVE EXAMPLE |
| 5037 | D2 | NONE | NONE | 0.98 | 24.1 | 24.6 | 4.46 | 1.935 | 1.741 | 0.847 | COMPARATIVE EXAMPLE |
| 5038 | D2 | NONE | NONE | 1.01 | 23.7 | 23.5 | 4.46 | 1.935 | 1.661 | 0.848 | COMPARATIVE EXAMPLE |
| 5039 | D2 | EXISTENCE | EXISTENCE | 1.40 | 24.7 | 17.6 | 3.68 | 1.942 | 1.168 | 0.830 | INVENTIVE EXAMPLE |
| 5040 | D2 | EXISTENCE | EXISTENCE | 1.49 | 25.0 | 16.8 | 3.82 | 1.941 | 1.144 | 0.835 | INVENTIVE EXAMPLE |

TABLE E10

| No. | STEEL TYPE | PRODUCTION RESULTS: BOUNDARY: EXISTENCE OF SWITCHING BOUNDARY (SUBBOUNDARY) EXISTENCE NON | EXISTENCE OF SWITCHING BOUNDARY (α SUBBOUNDARY) EXISTENCE NON | AVERAGE GRAIN SIZE $RB_L/RC_L$ | $RB_L$ mm | $RC_L$ mm | DEVIATION ANGLE σ(\|α\|) | EVALUATION RESULTS: MAGNETIC CHARACTERISTICS B8 T | W19/50 W/kg | W17/50 W/kg | NOTE |
|---|---|---|---|---|---|---|---|---|---|---|---|
| 5041 | D2 | EXISTENCE | EXISTENCE | 1.50 | 25.3 | 16.9 | 2.95 | 1.951 | 1.110 | 0.815 | INVENTIVE EXAMPLE |
| 5042 | D3 | EXISTENCE | EXISTENCE | 1.83 | 26.0 | 14.3 | 2.28 | 1.959 | 0.972 | 0.799 | INVENTIVE EXAMPLE |
| 5043 | D2 | EXISTENCE | EXISTENCE | 1.47 | 25.6 | 17.4 | 2.94 | 1.951 | 1.112 | 0.813 | INVENTIVE EXAMPLE |
| 5044 | D2 | EXISTENCE | EXISTENCE | 1.48 | 24.9 | 16.9 | 3.46 | 1.946 | 1.138 | 0.824 | INVENTIVE EXAMPLE |
| 5045 | D2 | EXISTENCE | EXISTENCE | 1.34 | 25.1 | 18.7 | 3.73 | 1.943 | 1.215 | 0.831 | INVENTIVE EXAMPLE |
| 5046 | D2 | EXISTENCE | EXISTENCE | 1.33 | 24.1 | 18.2 | 3.28 | 1.946 | 1.203 | 0.820 | INVENTIVE EXAMPLE |
| 5047 | C1 | NONE | NONE | 1.01 | 11.7 | 11.6 | 3.09 | 1.919 | 1.736 | 0.874 | COMPARATIVE EXAMPLE |
| 5048 | C2 | NONE | NONE | 1.00 | 13.1 | 13.2 | 3.12 | 1.919 | 1.736 | 0.873 | COMPARATIVE EXAMPLE |
| 5049 | C3 | EXISTENCE | EXISTENCE | 1.39 | 24.5 | 17.6 | 3.96 | 1.931 | 1.283 | 0.832 | INVENTIVE EXAMPLE |
| 5050 | C4 | EXISTENCE | EXISTENCE | 1.46 | 25.0 | 17.1 | 3.21 | 1.946 | 1.137 | 0.810 | INVENTIVE EXAMPLE |
| 5051 | C5 | EXISTENCE | EXISTENCE | 1.45 | 24.4 | 16.8 | 3.21 | 1.945 | 1.135 | 0.810 | INVENTIVE EXAMPLE |
| 5052 | C6 | EXISTENCE | EXISTENCE | 1.45 | 25.0 | 17.2 | 3.20 | 1.946 | 1.138 | 0.809 | INVENTIVE EXAMPLE |
| 5053 | C7 | EXISTENCE | EXISTENCE | 1.39 | 23.7 | 17.1 | 3.99 | 1.931 | 1.281 | 0.843 | INVENTIVE EXAMPLE |
| 5054 | C8 | NONE | NONE | 0.99 | 12.5 | 12.7 | 3.10 | 1.926 | 1.667 | 0.882 | COMPARATIVE EXAMPLE |
| 5055 | D1 | NONE | NONE | 1.01 | 11.7 | 11.6 | 3.09 | 1.919 | 1.738 | 0.883 | COMPARATIVE EXAMPLE |
| 5056 | D2 | EXISTENCE | EXISTENCE | 1.43 | 25.5 | 17.8 | 3.21 | 1.948 | 1.145 | 0.831 | INVENTIVE EXAMPLE |
| 5057 | E | EXISTENCE | EXISTENCE | 1.36 | 24.4 | 18.0 | 4.00 | 1.926 | 1.343 | 0.847 | INVENTIVE EXAMPLE |
| 5058 | F | EXISTENCE | EXISTENCE | 1.44 | 24.4 | 17.0 | 3.23 | 1.943 | 1.210 | 0.830 | INVENTIVE EXAMPLE |
| 5059 | G | EXISTENCE | EXISTENCE | 1.44 | 25.2 | 17.6 | 3.23 | 1.948 | 1.144 | 0.830 | INVENTIVE EXAMPLE |
| 5060 | H | EXISTENCE | EXISTENCE | 1.44 | 25.4 | 17.7 | 3.24 | 1.948 | 1.147 | 0.830 | INVENTIVE EXAMPLE |

TABLE E11

| No. | STEEL TYPE | PRODUCTION RESULTS: BOUNDARY: EXISTENCE OF SWITCHING BOUNDARY (SUBBOUNDARY) EXISTENCE NON | EXISTENCE OF SWITCHING BOUNDARY (α SUBBOUNDARY) EXISTENCE NON | AVERAGE GRAIN SIZE $RB_L/RC_L$ | $RB_L$ mm | $RC_L$ mm | DEVIATION ANGLE σ(\|α\|) | EVALUATION RESULTS: MAGNETIC CHARACTERISTICS B8 T | W19/50 W/kg | W17/50 W/kg | NOTE |
|---|---|---|---|---|---|---|---|---|---|---|---|
| 5061 | I | EXISTENCE | EXISTENCE | 1.38 | 24.5 | 17.8 | 3.98 | 1.920 | 1.392 | 0.848 | INVENTIVE EXAMPLE |
| 5062 | J | EXISTENCE | EXISTENCE | 1.44 | 24.5 | 17.0 | 3.21 | 1.948 | 1.146 | 0.829 | INVENTIVE EXAMPLE |
| 5063 | K | EXISTENCE | EXISTENCE | 1.44 | 24.6 | 17.1 | 3.20 | 1.949 | 1.146 | 0.829 | INVENTIVE EXAMPLE |
| 5064 | L | EXISTENCE | EXISTENCE | 1.45 | 23.9 | 16.5 | 3.21 | 1.948 | 1.145 | 0.830 | INVENTIVE EXAMPLE |
| 5065 | A1 | NONE | NONE | 0.99 | 10.3 | 10.4 | 3.05 | 1.922 | 1.747 | 0.880 | COMPARATIVE EXAMPLE |
| 5066 | A1 | NONE | NONE | 1.00 | 12.1 | 12.1 | 2.98 | 1.926 | 1.706 | 0.875 | COMPARATIVE EXAMPLE |
| 5067 | A1 | EXISTENCE | EXISTENCE | 1.20 | 28.0 | 23.3 | 2.81 | 1.930 | 1.354 | 0.867 | INVENTIVE EXAMPLE |
| 5068 | A1 | EXISTENCE | NONE | 1.00 | 11.7 | 11.7 | 2.97 | 1.927 | 1.706 | 0.875 | INVENTIVE EXAMPLE |
| 5069 | A1 | EXISTENCE | EXISTENCE | 1.42 | 41.7 | 29.4 | 2.59 | 1.936 | 1.191 | 0.851 | INVENTIVE EXAMPLE |
| 5070 | A1 | EXISTENCE | EXISTENCE | 1.40 | 43.3 | 30.9 | 2.59 | 1.938 | 1.193 | 0.852 | INVENTIVE EXAMPLE |
| 5071 | A1 | EXISTENCE | EXISTENCE | 1.29 | 35.4 | 27.5 | 2.71 | 1.934 | 1.267 | 0.860 | INVENTIVE EXAMPLE |
| 5072 | A1 | EXISTENCE | EXISTENCE | 1.29 | 35.9 | 27.7 | 2.71 | 1.933 | 1.269 | 0.859 | INVENTIVE EXAMPLE |
| 5073 | A1 | EXISTENCE | NONE | 1.05 | 16.5 | 15.8 | 2.84 | 1.928 | 1.561 | 0.867 | INVENTIVE EXAMPLE |
| 5074 | A2 | EXISTENCE | EXISTENCE | 1.27 | 23.8 | 18.8 | 3.18 | 1.948 | 1.248 | 0.829 | INVENTIVE EXAMPLE |
| 5075 | A2 | EXISTENCE | EXISTENCE | 1.38 | 24.2 | 17.5 | 2.89 | 1.952 | 1.164 | 0.821 | INVENTIVE EXAMPLE |
| 5076 | A2 | EXISTENCE | EXISTENCE | 1.37 | 24.1 | 17.6 | 2.89 | 1.951 | 1.165 | 0.824 | INVENTIVE EXAMPLE |
| 5077 | A2 | EXISTENCE | EXISTENCE | 1.26 | 25.0 | 19.9 | 2.88 | 1.952 | 1.237 | 0.822 | INVENTIVE EXAMPLE |
| 5078 | A2 | EXISTENCE | EXISTENCE | 1.70 | 25.9 | 15.2 | 1.87 | 1.961 | 0.996 | 0.799 | INVENTIVE EXAMPLE |
| 5079 | A2 | EXISTENCE | EXISTENCE | 1.63 | 25.9 | 15.8 | 1.98 | 1.961 | 1.026 | 0.804 | INVENTIVE EXAMPLE |
| 5080 | A2 | EXISTENCE | EXISTENCE | 1.58 | 23.9 | 15.2 | 2.24 | 1.959 | 1.053 | 0.808 | INVENTIVE EXAMPLE |

TABLE E12

| | | PRODUCTION RESULTS | | | | | | EVALUATION RESULTS | | | |
|---|---|---|---|---|---|---|---|---|---|---|---|
| | | BOUNDARY | | | | | | | | | |
| | | EXISTENCE OF SWITCHING BOUNDARY | EXISTENCE OF SWITCHING BOUNDARY | AVERAGE GRAIN SIZE | | | DEVIATION ANGLE | MAGNETIC CHARACTERISTICS | | | |
| No. | STEEL TYPE | (SUBBOUNDARY) EXISTENCE NON | (α SUBBOUNDARY) EXISTENCE NON | $RB_L/RC_L$ | $RB_L$ mm | $RC_L$ mm | σ(\|α\|) | B8 T | W19/50 W/kg | W17/50 W/kg | NOTE |
| 5081 | A2 | EXISTENCE | EXISTENCE | 1.67 | 25.0 | 15.0 | 1.96 | 1.962 | 1.013 | 0.803 | INVENTIVE EXAMPLE |
| 5082 | A2 | EXISTENCE | EXISTENCE | 1.34 | 24.3 | 18.2 | 2.67 | 1.954 | 1.181 | 0.818 | INVENTIVE EXAMPLE |
| 5083 | B1 | EXISTENCE | EXISTENCE | 1.14 | 22.6 | 19.8 | 2.82 | 1.930 | 1.438 | 0.868 | INVENTIVE EXAMPLE |
| 5084 | B1 | EXISTENCE | EXISTENCE | 1.28 | 33.9 | 26.4 | 2.63 | 1.937 | 1.277 | 0.853 | INVENTIVE EXAMPLE |
| 5085 | B1 | EXISTENCE | EXISTENCE | 1.20 | 26.8 | 22.4 | 2.72 | 1.932 | 1.360 | 0.860 | INVENTIVE EXAMPLE |
| 5086 | B1 | EXISTENCE | EXISTENCE | 1.12 | 22.7 | 20.4 | 2.85 | 1.928 | 1.439 | 0.869 | INVENTIVE EXAMPLE |
| 5087 | B1 | EXISTENCE | EXISTENCE | 1.38 | 40.4 | 29.3 | 2.48 | 1.939 | 1.205 | 0.846 | INVENTIVE EXAMPLE |
| 5088 | B1 | NONEz | NONE | 1.05 | 17.0 | 16.2 | 2.84 | 1.929 | 1.569 | 0.868 | COMPARATIVE EXAMPLE |
| 5089 | B1 | NONE | NONE | 0.98 | 10.6 | 10.8 | 3.06 | 1.922 | 1.764 | 0.879 | COMPARATIVE EXAMPLE |
| 5090 | B1 | NONE | NONE | 0.98 | 9.9 | 10.1 | 2.94 | 1.926 | 1.764 | 0.874 | COMPARATIVE EXAMPLE |
| 5091 | B1 | NONE | NONE | 0.97 | 10.1 | 10.3 | 3.06 | 1.922 | 1.763 | 0.878 | COMPARATIVE EXAMPLE |
| 5092 | B1 | NONE | NONE | 0.97 | 10.3 | 10.6 | 3.03 | 1.924 | 1.763 | 0.880 | COMPARATIVE EXAMPLE |
| 5093 | B2 | EXISTENCE | EXISTENCE | 1.36 | 25.2 | 18.5 | 2.63 | 1.953 | 1.159 | 0.818 | INVENTIVE EXAMPLE |
| 5094 | B2 | EXISTENCE | EXISTENCE | 1.52 | 25.3 | 16.7 | 2.09 | 1.960 | 1.080 | 0.804 | INVENTIVE EXAMPLE |
| 5095 | B2 | EXISTENCE | EXISTENCE | 1.34 | 24.7 | 18.5 | 2.59 | 1.955 | 1.170 | 0.816 | INVENTIVE EXAMPLE |
| 5096 | B2 | EXISTENCE | EXISTENCE | 1.31 | 23.9 | 18.2 | 2.87 | 1.953 | 1.201 | 0.822 | INVENTIVE EXAMPLE |
| 5097 | B2 | EXISTENCE | EXISTENCE | 1.60 | 25.2 | 15.8 | 1.78 | 1.964 | 1.031 | 0.799 | INVENTIVE EXAMPLE |
| 5098 | B2 | EXISTENCE | EXISTENCE | 1.33 | 25.1 | 18.9 | 2.64 | 1.953 | 1.184 | 0.819 | INVENTIVE EXAMPLE |
| 5099 | B2 | NONE | NONE | 1.07 | 23.8 | 22.2 | 3.75 | 1.943 | 1.479 | 0.840 | COMPARATIVE EXAMPLE |
| 5100 | B2 | EXISTENCE | EXISTENCE | 1.30 | 24.6 | 18.8 | 3.16 | 1.949 | 1.221 | 0.828 | INVENTIVE EXAMPLE |
| 5101 | B2 | EXISTENCE | EXISTENCE | 1.33 | 23.7 | 17.9 | 2.87 | 1.951 | 1.201 | 0.822 | INVENTIVE EXAMPLE |

Hereinafter, as with the above Example 1, the evaluation results of characteristics are explained by classifying the grain oriented electrical steels under some features in regard to the chemical compositions and the producing methods.

Examples Produced by Low Temperature Slab Heating Process

Nos. 5001 to 5064 were examples produced by a process in which slab heating temperature was decreased, nitridation was conducted after primary recrystallization, and thereby main inhibitor for secondary recrystallization was formed.

Examples of Nos. 5001 to 5023

Nos. 5001 to 5023 were examples in which the steel type without Nb was used and the conditions of PA', PB', TD, and TE1' were mainly changed during final annealing.

In Nos. 5001 to 5023, when the iron loss $W_{19/50}$ was 1.750 W/kg or less, the iron loss characteristic was judged to be acceptable.

In Nos. 5001 to 5023, the inventive examples included the boundary which satisfied the boundary condition BA and which did not satisfy the boundary condition BB, and thus these examples exhibited excellent magnetostriction in middle magnetic field range. In the above inventive examples, the inventive examples which further included the boundary which satisfied the boundary condition BC and which did not satisfy the boundary condition BB exhibited excellent the iron loss in high magnetic field range. On the other hand, although the comparative examples included the deviation angle α which was slightly and continuously shifted in the secondary recrystallized grains, the comparative examples did not sufficiently include the boundary which satisfied the boundary condition BC and which did not satisfy the boundary condition BB, and thus these examples did not exhibit preferred iron loss in high magnetic field range.

Here, No. 5003 was the comparative example in which the inhibitor intensity was increased by controlling the N content after nitridation to be 300 ppm. In general, although increasing the nitrogen content by nitridation causes a decrease in productivity, increasing the nitrogen content by nitridation results in an increase in the inhibitor intensity, and thereby $B_8$ increases. In No. 5003, $B_8$ increased. However, in No. 5003, the conditions in final annealing were not preferable, and thus $W_{19/50}$ was insufficient. In other words, in No. 5003, the switching did not occur during final annealing, and as a result, the iron loss in high magnetic field was not improved. On the other hand, in No. 5006, although $B_8$ was not a particularly high value, the conditions in final annealing were preferable, and thus $W_{19/50}$ became a preferred low value. In other words, in No. 5006, the switching occurred during final annealing, and as a result, the iron loss in high magnetic field was improved.

Nos. 5017 to 5023 were examples in which the secondary recrystallization was maintained up to higher temperature by increasing TF. In Nos. 5017 to 5023, Bs increased. However, in Nos. 5021 and 5022 among the above, the conditions in final annealing were not preferable, and thus the iron loss in high magnetic field was not improved as with No. 5003. On the other hand, in No. 5023 among the above, in addition to high value of Bs, the conditions in final annealing were preferable, and thus $W_{19/50}$ became a preferred low value.

Examples of Nos. 5024 to 5034

Nos. 5024 to 5034 were examples in which the steel type including 0.002% of Nb as the slab was used and the conditions of PA', PB', and TE1' were mainly changed during final annealing.

In Nos. 5024 to 5034, when the iron loss $W_{19/50}$ was 1.750 W/kg or less, the iron loss characteristic was judged to be acceptable.

In Nos. 5024 to 5034, the inventive examples included the boundary which satisfied the boundary condition BA and which did not satisfy the boundary condition BB, and thus these examples exhibited excellent magnetostriction in middle magnetic field range. In the above inventive examples, the inventive examples which further included the boundary which satisfied the boundary condition BC and which did not satisfy the boundary condition BB exhibited excellent the iron loss in high magnetic field range. On the other hand, although the comparative examples included the deviation angle α which was slightly and continuously shifted in the secondary recrystallized grains, the comparative examples did not sufficiently include the boundary which satisfied the boundary condition BC and which did not satisfy the boundary condition BB, and thus these examples did not exhibit preferred iron loss in high magnetic field range.

Examples of Nos. 5035 to 5046

Nos. 5035 to 5046 were examples in which the steel type including 0.007% of Nb as the slab was used.

In Nos. 5035 to 5046, when the iron loss $W_{19/50}$ was 1.650 W/kg or less, the iron loss characteristic was judged to be acceptable.

In Nos. 5035 to 5046, the inventive examples included the boundary which satisfied the boundary condition BA and which did not satisfy the boundary condition BB, and thus these examples exhibited excellent magnetostriction in middle magnetic field range. In the above inventive examples, the inventive examples which further included the boundary which satisfied the boundary condition BC and which did not satisfy the boundary condition BB exhibited excellent the iron loss in high magnetic field range. On the other hand, although the comparative examples included the deviation angle α which was slightly and continuously shifted in the secondary recrystallized grains, the comparative examples did not sufficiently include the boundary which satisfied the boundary condition BC and which did not satisfy the boundary condition BB, and thus these examples did not exhibit preferred iron loss in high magnetic field range.

Here, in Nos. 5035 to 5046, the Nb content of the slab was 0.007%, Nb was purified during final annealing, and then the Nb content of the grain oriented electrical steel sheet (final annealed sheet) was 0.006% or less. Nos. 5035 to 5046 included the preferred amount of Nb as the slab as compared with the above Nos. 5001 to 5034, and thus $W_{19/50}$ became a preferred low value. Moreover, $B_8$ increased. As described above, when the slab including Nb was used and the conditions in final annealing were controlled, $B_8$ and $W_{19/50}$ were favorably affected. In particular, No. 5042 was the inventive example in which the purification was elaborately performed in final annealing and the Nb content of the grain oriented electrical steel sheet (final annealed sheet) became less than detection limit. In No. 5042, although it was difficult to confirm that Nb group element was utilized from the grain oriented electrical steel sheet as the final product, the above effects were clearly obtained.

Examples of Nos. 5047 to 5054

Nos. 5047 to 5054 were examples in which TE1' was controlled to be a short time of less than 300 minutes and the influence of Nb content was particularly confirmed.

In Nos. 5047 to 5054, when the iron loss $W_{19/50}$ was 1.650 W/kg or less, the iron loss characteristic was judged to be acceptable.

In Nos. 5047 to 5054, the inventive examples included the boundary which satisfied the boundary condition BA and which did not satisfy the boundary condition BB, and thus these examples exhibited excellent magnetostriction in middle magnetic field range. In the above inventive examples, the inventive examples which further included the boundary which satisfied the boundary condition BC and which did not satisfy the boundary condition BB exhibited excellent the iron loss in high magnetic field range. On the other hand, although the comparative examples included the deviation angle α which was slightly and continuously shifted in the secondary recrystallized grains, the comparative examples did not sufficiently include the boundary which satisfied the boundary condition BC and which did not satisfy the boundary condition BB, and thus these examples did not exhibit preferred iron loss in high magnetic field range.

As shown in Nos. 5047 to 5054, as long as 0.0030 to 0.030 mass % of Nb was included in the slab, the switching occurred during final annealing, and thus the iron loss in high magnetic field was improved even when TE1' was the short time.

Examples of Nos. 5055 to 5064

Nos. 5055 to 5064 were examples in which TE1' was controlled to be the short time of less than 300 minutes and the influence of the amount of Nb group element was confirmed.

In Nos. 5055 to 5064, when the iron loss $W_{19/50}$ was 1.650 W/kg or less, the iron loss characteristic was judged to be acceptable.

In Nos. 5055 to 5064, the inventive examples included the boundary which satisfied the boundary condition BA and which did not satisfy the boundary condition BB, and thus these examples exhibited excellent magnetostriction in middle magnetic field range. In the above inventive examples, the inventive examples which further included the boundary which satisfied the boundary condition BC and which did not satisfy the boundary condition BB exhibited excellent the iron loss in high magnetic field range. On the other hand, although the comparative examples included the deviation angle α which was slightly and continuously shifted in the secondary recrystallized grains, the comparative examples did not sufficiently include the boundary which satisfied the boundary condition BC and which did not satisfy the boundary condition BB, and thus these examples did not exhibit preferred iron loss in high magnetic field range.

As shown in Nos. 5055 to 5064, as long as the predetermined amount of Nb group element except for Nb was included in the slab, the switching occurred during final annealing, and thus the iron loss in high magnetic field was improved even when TE1' was the short time.

Examples Produced by High Temperature Slab Heating Process

Nos. 5065 to 5101 were examples produced by a process in which slab heating temperature was increased, MnS was sufficiently soluted during slab heating and was reprecipitated during post process, and the reprecipited MnS was utilized as main inhibitor.

In Nos. 5065 to 5101, when the iron loss $W_{19/50}$ was 1.450 W/kg or less, the iron loss characteristic was judged to be acceptable.

In Nos. 5065 to 5101, the inventive examples included the boundary which satisfied the boundary condition BA and which did not satisfy the boundary condition BB, and thus these examples exhibited excellent magnetostriction in middle magnetic field range. In the above inventive examples, the inventive examples which further included the boundary which satisfied the boundary condition BC and which did not satisfy the boundary condition BB exhibited excellent the iron loss in high magnetic field range. On the other hand, although the comparative examples included the deviation angle α which was slightly and continuously shifted in the secondary recrystallized grains, the comparative examples did not sufficiently include the boundary which satisfied the boundary condition BC and which did not satisfy the boundary condition BB, and thus these examples did not exhibit preferred iron loss in high magnetic field range.

Nos. 5083 to 5101 in the above Nos. 5065 to 5101 were examples in which Bi was included in the slab and thus $B_8$ increased.

As shown in Nos. 5065 to 5101, as long as the conditions in final annealing were appropriately controlled, the switching occurred during final annealing, and thus the iron loss in high magnetic field was improved even by the high temperature slab heating process. Moreover, as with the low temperature slab heating process, when the slab including Nb was used and the conditions in final annealing were controlled, iron loss in high magnetic field was favorably affected by the high temperature slab heating process.

Example 6

Using slabs with chemical composition shown in Table F1 as materials, grain oriented electrical steel sheets with chemical composition shown in Table F2 were produced. The methods for measuring the chemical composition and the notation in the tables are the same as in the above Example 1.

TABLE F1

| STEEL | CHEMICAL COMPOSITION OF SLAB(STEEL PIECE)(UNIT: mass %, BALANCE CONSISTING OF Fe AND IMPURITIES) | | | | | | | | | | | | |
|---|---|---|---|---|---|---|---|---|---|---|---|---|---|
| TYPE | C | Si | Mn | S | Al | N | Cu | Bi | Nb | V | Mo | Ta | W |
| A1 | 0.070 | 3.26 | 0.07 | 0.025 | 0.026 | 0.008 | 0.07 | — | 0.001 | — | — | — | — |
| A2 | 0.070 | 3.26 | 0.07 | 0.025 | 0.026 | 0.008 | 0.07 | — | 0.005 | — | — | — | — |
| B1 | 0.070 | 3.26 | 0.07 | 0.025 | 0.025 | 0.008 | 0.07 | 0.002 | — | — | — | — | — |
| B2 | 0.070 | 3.26 | 0.07 | 0.025 | 0.025 | 0.008 | 0.07 | 0.002 | 0.008 | — | — | — | — |
| C1 | 0.060 | 3.45 | 0.10 | 0.006 | 0.026 | 0.008 | 0.20 | — | — | — | — | — | — |
| C2 | 0.060 | 3.45 | 0.10 | 0.006 | 0.026 | 0.008 | 0.20 | — | 0.002 | — | — | — | — |
| C3 | 0.060 | 3.45 | 0.10 | 0.006 | 0.026 | 0.008 | 0.20 | — | 0.003 | — | — | — | — |
| C4 | 0.060 | 3.45 | 0.10 | 0.006 | 0.026 | 0.008 | 0.20 | — | 0.005 | — | — | — | — |
| C5 | 0.060 | 3.45 | 0.10 | 0.006 | 0.026 | 0.008 | 0.20 | — | 0.010 | — | — | — | — |
| C6 | 0.060 | 3.45 | 0.10 | 0.006 | 0.026 | 0.008 | 0.20 | — | 0.020 | — | — | — | — |
| C7 | 0.060 | 3.45 | 0.10 | 0.006 | 0.026 | 0.008 | 0.20 | — | 0.030 | — | — | — | — |
| D1 | 0.060 | 3.35 | 0.10 | 0.006 | 0.028 | 0.008 | <0.03 | — | 0.001 | — | — | — | — |
| D2 | 0.060 | 3.35 | 0.10 | 0.006 | 0.028 | 0.008 | <0.03 | — | 0.009 | — | — | — | — |
| D3 | 0.060 | 3.45 | 0.10 | 0.006 | 0.028 | 0.008 | <0.03 | — | 0.009 | — | — | — | — |
| E | 0.060 | 3.35 | 0.10 | 0.006 | 0.027 | 0.008 | <0.03 | — | — | 0.005 | — | — | — |
| F | 0.060 | 3.35 | 0.10 | 0.006 | 0.027 | 0.008 | <0.03 | — | — | — | 0.015 | — | — |
| G | 0.060 | 3.35 | 0.10 | 0.006 | 0.027 | 0.003 | <0.03 | — | 0.005 | — | — | 0.005 | — |
| H | 0.060 | 3.35 | 0.10 | 0.006 | 0.027 | 0.008 | <0.03 | — | — | — | — | 0.007 | — |
| I | 0.060 | 3.35 | 0.10 | 0.006 | 0.027 | 0.008 | <0.03 | — | — | — | — | — | 0.015 |
| J | 0.060 | 3.35 | 0.10 | 0.006 | 0.027 | 0.008 | <0.03 | — | 0.010 | — | 0.010 | — | — |
| K | 0.060 | 3.35 | 0.10 | 0.006 | 0.027 | 0.008 | <0.03 | — | 0.002 | 0.004 | — | 0.004 | — |
| L | 0.060 | 3.35 | 0.10 | 0.006 | 0.027 | 0.008 | <0.03 | — | — | 0.006 | — | 0.004 | — |

TABLE F2

| STEEL | CHEMICAL COMPOSITION OF GRAIN ORIENTED ELECTRICAL STEEL SHEET(UNIT: mass %, BALANCE CONSISTING OF Fe AND IMPURITIES) | | | | | | | | | | | | |
|---|---|---|---|---|---|---|---|---|---|---|---|---|---|
| TYPE | C | Si | Mn | S | Al | N | Cu | Bi | Nb | V | Mo | Ta | W |
| A1 | 0.001 | 3.15 | 0.07 | <0.002 | <0.004 | <0.002 | 0.07 | — | — | — | — | — | — |
| A2 | 0.001 | 3.15 | 0.07 | <0.002 | <0.004 | <0.002 | 0.07 | — | 0.004 | — | — | — | — |
| B1 | 0.001 | 3.15 | 0.07 | <0.002 | <0.004 | <0.002 | 0.07 | <0.001 | — | — | — | — | — |
| B2 | 0.001 | 3.15 | 0.07 | <0.002 | <0.004 | <0.002 | 0.07 | <0.001 | 0.006 | — | — | — | — |
| C1 | 0.001 | 3.30 | 0.10 | <0.002 | <0.004 | <0.002 | 0.20 | — | — | — | — | — | — |
| C2 | 0.001 | 3.30 | 0.10 | <0.002 | <0.004 | <0.002 | 0.20 | — | 0.001 | — | — | — | — |
| C3 | 0.001 | 3.30 | 0.10 | <0.002 | <0.004 | <0.002 | 0.20 | — | 0.003 | — | — | — | — |
| C4 | 0.001 | 3.30 | 0.10 | <0.002 | <0.004 | <0.002 | 0.20 | — | 0.003 | — | — | — | — |
| C5 | 0.001 | 3.30 | 0.10 | <0.002 | <0.004 | <0.002 | 0.20 | — | 0.007 | — | — | — | — |
| C6 | 0.002 | 3.30 | 0.10 | <0.002 | <0.004 | <0.002 | 0.20 | — | 0.018 | — | — | — | — |
| C7 | 0.004 | 3.30 | 0.10 | <0.002 | <0.004 | <0.002 | 0.20 | — | 0.028 | — | — | — | — |
| D1 | 0.001 | 3.34 | 0.10 | <0.002 | <0.004 | <0.002 | <0.03 | — | 0.001 | — | — | — | — |
| D2 | 0.001 | 3.34 | 0.10 | <0.002 | <0.004 | <0.002 | <0.03 | — | 0.007 | — | — | — | — |
| D3 | 0.001 | 3.34 | 0.10 | <0.002 | <0.004 | <0.002 | <0.03 | — | <0.001 | — | — | — | — |

TABLE F2-continued

| STEEL TYPE | CHEMICAL COMPOSITION OF GRAIN ORIENTED ELECTRICAL STEEL SHEET(UNIT: mass %, BALANCE CONSISTING OF Fe AND IMPURITIES) | | | | | | | | | | | | |
|---|---|---|---|---|---|---|---|---|---|---|---|---|---|
| | C | Si | Mn | S | Al | N | Cu | Bi | Nb | V | Mo | Ta | W |
| A1 | 0.001 | 3.15 | 0.07 | <0.002 | <0.004 | <0.002 | 0.07 | — | — | — | — | — | — |
| A2 | 0.001 | 3.15 | 0.07 | <0.002 | <0.004 | <0.002 | 0.07 | — | 0.004 | — | — | — | — |
| B1 | 0.001 | 3.15 | 0.07 | <0.002 | <0.004 | <0.002 | 0.07 | <0.001 | — | — | — | — | — |
| B2 | 0.001 | 3.15 | 0.07 | <0.002 | <0.004 | <0.002 | 0.07 | <0.001 | 0.006 | — | — | — | — |
| C1 | 0.001 | 3.30 | 0.10 | <0.002 | <0.004 | <0.002 | 0.20 | — | — | — | — | — | — |
| C2 | 0.001 | 3.30 | 0.10 | <0.002 | <0.004 | <0.002 | 0.20 | — | 0.001 | — | — | — | — |
| C3 | 0.001 | 3.30 | 0.10 | <0.002 | <0.004 | <0.002 | 0.20 | — | 0.003 | — | — | — | — |
| E | 0.001 | 3.30 | 0.10 | <0.002 | <0.004 | <0.002 | <0.03 | — | — | 0.006 | — | — | — |
| F | 0.001 | 3.34 | 0.10 | <0.002 | <0.004 | <0.002 | <0.03 | — | — | — | 0.015 | — | — |
| G | 0.001 | 3.34 | 0.10 | <0.002 | <0.004 | <0.002 | <0.03 | — | 0.004 | — | — | 0.005 | — |
| H | 0.001 | 3.34 | 0.10 | <0.002 | <0.004 | <0.002 | <0.03 | — | — | — | — | 0.010 | — |
| I | 0.001 | 3.34 | 0.10 | <0.002 | <0.004 | <0.002 | <0.03 | — | — | — | — | — | 0.015 |
| J | 0.001 | 3.34 | 0.10 | <0.002 | <0.004 | <0.002 | <0.03 | — | 0.008 | — | 0.008 | — | — |
| K | 0.001 | 3.34 | 0.10 | <0.002 | <0.004 | <0.002 | <0.03 | — | 0.001 | 0.003 | — | 0.003 | — |
| L | 0.001 | 3.34 | 0.10 | <0.002 | <0.004 | <0.002 | <0.03 | — | — | 0.004 | — | 0.003 | — |

The grain oriented electrical steel sheets were produced under production conditions shown in Table F3 to Table F7. The production conditions other than those shown in the tables were the same as those in the above Example 1.

TABLE F3

| No. | STEEL TYPE | PRODUCTION CONDITIONS | | | | | | | |
|---|---|---|---|---|---|---|---|---|---|
| | | HOT ROLLING | | | | HOT BAND ANNEALING | | COLD ROLLING | |
| | | HEATING TEMPERATURE ° C. | TEMPERATURE OF FINAL ROLLING ° C. | COILING TEMPERATURE ° C. | SHEET THICKNESS mm | TEMPERATURE ° C. | TIME SECOND | SHEET THICKNESS mm | REDUCTION OF COLD ROLLING % |
| 6001 | C1 | 1170 | 900 | 550 | 2.8 | 1100 | 180 | 0.26 | 90.7 |
| 6002 | C1 | 1170 | 900 | 550 | 2.8 | 1100 | 180 | 0.26 | 90.7 |
| 6003 | C1 | 1170 | 900 | 550 | 2.8 | 1100 | 180 | 0.26 | 90.7 |
| 6004 | C1 | 1170 | 900 | 550 | 2.8 | 1100 | 180 | 0.26 | 90.7 |
| 6005 | C1 | 1170 | 900 | 550 | 2.8 | 1100 | 180 | 0.26 | 90.7 |
| 6006 | C1 | 1170 | 900 | 550 | 2.8 | 1100 | 180 | 0.26 | 90.7 |
| 6007 | C1 | 1170 | 900 | 550 | 2.8 | 1100 | 180 | 0.26 | 90.7 |
| 6008 | C1 | 1170 | 900 | 550 | 2.8 | 1100 | 180 | 0.26 | 90.7 |
| 6009 | C1 | 1170 | 900 | 550 | 2.8 | 1100 | 180 | 0.26 | 90.7 |
| 6010 | C1 | 1170 | 900 | 550 | 2.8 | 1100 | 180 | 0.26 | 90.7 |
| 6011 | C1 | 1170 | 900 | 550 | 2.8 | 1100 | 180 | 0.26 | 90.7 |
| 6012 | C1 | 1170 | 900 | 550 | 2.8 | 1100 | 180 | 0.26 | 90.7 |
| 6013 | C1 | 1170 | 900 | 550 | 2.8 | 1100 | 180 | 0.26 | 90.7 |
| 6014 | C1 | 1170 | 900 | 550 | 2.8 | 1100 | 180 | 0.26 | 90.7 |
| 6015 | C1 | 1170 | 900 | 550 | 2.8 | 1100 | 180 | 0.26 | 90.7 |
| 6016 | C1 | 1170 | 900 | 550 | 2.8 | 1100 | 180 | 0.26 | 90.7 |
| 6017 | C1 | 1170 | 900 | 550 | 2.8 | 1100 | 180 | 0.26 | 90.7 |
| 6018 | C1 | 1170 | 900 | 550 | 2.8 | 1100 | 180 | 0.26 | 90.7 |
| 6019 | C1 | 1170 | 900 | 550 | 2.8 | 1100 | 180 | 0.26 | 90.7 |
| 6020 | C1 | 1170 | 900 | 550 | 2.8 | 1100 | 180 | 0.26 | 90.7 |

| No. | PRODUCTION CONDITIONS | | | | | | |
|---|---|---|---|---|---|---|---|
| | DECARBURIZATION ANNEALING | | FINAL ANNEALING | | | | |
| | GRAIN SIZE OF PRIMARY RECRYSTALLIZED GRAIN µm | NITROGEN CONTENT AFTER NITRIDATION ppm | PA' | PB' | TD MINUTE | TE2' MINUTE | TF MINUTE |
| 6001 | 22 | 220 | 0.020 | 0.005 | 900 | 180 | 300 |
| 6002 | 22 | 250 | 0.020 | 0.005 | 900 | 180 | 300 |
| 6003 | 22 | 300 | 0.020 | 0.005 | 900 | 600 | 300 |
| 6004 | 22 | 160 | 0.100 | 0.005 | 900 | 600 | 300 |
| 6005 | 22 | 220 | 0.100 | 0.020 | 900 | 600 | 300 |
| 6006 | 22 | 220 | 0.100 | 0.020 | 600 | 600 | 300 |
| 6007 | 22 | 220 | 0.100 | 0.020 | 480 | 600 | 300 |
| 6008 | 22 | 220 | 0.100 | 0.020 | 360 | 600 | 300 |
| 6009 | 22 | 220 | 0.100 | 0.020 | 240 | 600 | 300 |

TABLE F3-continued

| | | | | | | | |
|---|---|---|---|---|---|---|---|
| 6010 | 22 | 220 | 0.100 | 0.020 | 180 | 600 | 300 |
| 6011 | 22 | 220 | 0.100 | 0.020 | 120 | 600 | 300 |
| 6012 | 22 | 220 | 0.100 | 0.020 | 60 | 600 | 300 |
| 6013 | 22 | 220 | 0.300 | 0.020 | 480 | 600 | 300 |
| 6014 | 22 | 220 | 0.600 | 0.020 | 480 | 600 | 300 |
| 6015 | 22 | 220 | 1.000 | 0.020 | 480 | 600 | 300 |
| 6016 | 22 | 220 | 2.000 | 0.020 | 480 | 600 | 300 |
| 6017 | 22 | 220 | 0.100 | 0.020 | 480 | 600 | 600 |
| 6018 | 22 | 220 | 0.100 | 0.040 | 480 | 600 | 600 |
| 6019 | 22 | 220 | 0.100 | 0.070 | 480 | 600 | 600 |
| 6020 | 22 | 220 | 0.100 | 0.100 | 300 | 600 | 600 |

TABLE F4

| | | PRODUCTION CONDITIONS | | | | | | | |
|---|---|---|---|---|---|---|---|---|---|
| | | HOT ROLLING | | | | | | COLD ROLLING | |
| | | HEATING | TEMPERATURE | COILING | SHEET | HOT BAND ANNEALING | | SHEET | REDUCTION |
| No. | STEEL TYPE | TEMPERATURE ° C. | OF FINAL ROLLING ° C. | TEMPERATURE ° C. | THICKNESS mm | TEMPERATURE ° C. | TIME SECOND | THICKNESS mm | OF COLD ROLLING % |
| 6021 | C1 | 1170 | 900 | 550 | 2.8 | 1100 | 180 | 0.26 | 90.7 |
| 6022 | C1 | 1170 | 900 | 550 | 2.8 | 1100 | 180 | 0.26 | 90.7 |
| 6023 | C1 | 1170 | 900 | 550 | 2.8 | 1100 | 180 | 0.26 | 90.7 |
| 6024 | D1 | 1100 | 900 | 550 | 2.8 | 1100 | 180 | 0.26 | 90.7 |
| 6025 | D1 | 1100 | 900 | 550 | 2.8 | 1100 | 180 | 0.26 | 90.7 |
| 6026 | D1 | 1100 | 900 | 550 | 2.8 | 1100 | 180 | 0.26 | 90.7 |
| 6027 | D1 | 1100 | 900 | 550 | 2.8 | 1100 | 180 | 0.26 | 90.7 |
| 6028 | D1 | 1100 | 900 | 550 | 2.8 | 1100 | 180 | 0.26 | 90.7 |
| 6029 | D1 | 1100 | 900 | 550 | 2.8 | 1100 | 180 | 0.26 | 90.7 |
| 6030 | D1 | 1100 | 900 | 550 | 2.8 | 1100 | 180 | 0.26 | 90.7 |
| 6031 | D1 | 1100 | 900 | 550 | 2.8 | 1100 | 180 | 0.26 | 90.7 |
| 6032 | D1 | 1100 | 900 | 550 | 2.8 | 1100 | 180 | 0.26 | 90.7 |
| 6033 | D1 | 1100 | 900 | 550 | 2.8 | 1100 | 180 | 0.26 | 90.7 |
| 6034 | D1 | 1100 | 900 | 550 | 2.8 | 1100 | 180 | 0.26 | 90.7 |
| 6035 | D2 | 1100 | 900 | 550 | 2.8 | 1100 | 180 | 0.26 | 90.7 |
| 6036 | D2 | 1100 | 900 | 550 | 2.8 | 1100 | 180 | 0.26 | 90.7 |
| 6037 | D2 | 1100 | 900 | 550 | 2.8 | 1100 | 180 | 0.26 | 90.7 |
| 6038 | D2 | 1100 | 900 | 550 | 2.8 | 1100 | 180 | 0.26 | 90.7 |
| 6039 | D2 | 1100 | 900 | 550 | 2.8 | 1100 | 180 | 0.26 | 90.7 |
| 6040 | D2 | 1100 | 900 | 550 | 2.8 | 1100 | 180 | 0.26 | 90.7 |

| | PRODUCTION CONDITIONS | | | | | | |
|---|---|---|---|---|---|---|---|
| | DECARBURIZATION ANNEALING | | | | | | |
| | GRAIN SIZE OF PRIMARY RECRYSTALLIZED | NITROGEN CONTENT AFTER | FINAL ANNEALING | | | | |
| No. | GRAIN µm | NITRIDATION ppm | PA' | PB' | TD MINUTE | TE2' MINUTE | TF MINUTE |
| 6021 | 22 | 300 | 0.100 | 0.200 | 300 | 600 | 600 |
| 6022 | 22 | 300 | 0.050 | 0.010 | 300 | 600 | 600 |
| 6023 | 22 | 300 | 0.100 | 0.020 | 300 | 600 | 600 |
| 6024 | 23 | 220 | 0.050 | 0.010 | 300 | 180 | 300 |
| 6025 | 23 | 220 | 0.050 | 0.010 | 300 | 300 | 300 |
| 6026 | 23 | 220 | 0.050 | 0.020 | 300 | 300 | 300 |
| 6027 | 23 | 220 | 0.200 | 0.020 | 300 | 300 | 300 |
| 6028 | 23 | 220 | 0.200 | 0.020 | 300 | 180 | 300 |
| 6029 | 23 | 220 | 0.050 | 0.020 | 300 | 180 | 300 |
| 6030 | 23 | 220 | 0.200 | 0.020 | 300 | 180 | 300 |
| 6031 | 23 | 220 | 0.200 | 0.020 | 300 | 300 | 300 |
| 6032 | 23 | 220 | 0.200 | 0.020 | 300 | 600 | 300 |
| 6033 | 23 | 220 | 0.200 | 0.020 | 300 | 900 | 300 |
| 6034 | 23 | 220 | 0.200 | 0.020 | 300 | 1500 | 300 |
| 6035 | 17 | 220 | 0.020 | 0.005 | 60 | 150 | 300 |
| 6036 | 17 | 220 | 0.100 | 0.005 | 60 | 90 | 300 |
| 6037 | 17 | 220 | 0.020 | 0.020 | 60 | 90 | 300 |
| 6038 | 17 | 220 | 0.020 | 0.005 | 120 | 90 | 300 |
| 6039 | 17 | 190 | 0.100 | 0.020 | 180 | 420 | 300 |
| 6040 | 17 | 180 | 0.300 | 0.020 | 180 | 420 | 300 |

TABLE F5

| No. | STEEL TYPE | PRODUCTION CONDITIONS: HOT ROLLING: HEATING TEMPERATURE ° C. | HOT ROLLING: TEMPERATURE OF FINAL ROLLING ° C. | HOT ROLLING: COILING TEMPERATURE ° C. | HOT ROLLING: SHEET THICKNESS mm | HOT BAND ANNEALING: TEMPERATURE ° C. | HOT BAND ANNEALING: TIME SECOND | COLD ROLLING: SHEET THICKNESS mm | COLD ROLLING: REDUCTION OF COLD ROLLING % |
|---|---|---|---|---|---|---|---|---|---|
| 6041 | D2 | 1100 | 900 | 550 | 2.8 | 1100 | 180 | 0.26 | 90.7 |
| 6042 | D3 | 1100 | 900 | 550 | 2.8 | 1100 | 180 | 0.26 | 90.7 |
| 6043 | D2 | 1100 | 900 | 550 | 2.8 | 1100 | 180 | 0.26 | 90.7 |
| 6044 | D2 | 1100 | 900 | 550 | 2.8 | 1100 | 180 | 0.26 | 90.7 |
| 6045 | D2 | 1100 | 900 | 550 | 2.8 | 1100 | 180 | 0.26 | 90.7 |
| 6046 | D2 | 1100 | 900 | 550 | 2.8 | 1100 | 180 | 0.26 | 90.7 |
| 6047 | C1 | 1170 | 900 | 550 | 2.8 | 1100 | 180 | 0.26 | 90.7 |
| 6048 | C2 | 1170 | 900 | 550 | 2.8 | 1100 | 180 | 0.26 | 90.7 |
| 6049 | C3 | 1170 | 900 | 550 | 2.8 | 1100 | 180 | 0.26 | 90.7 |
| 6050 | C4 | 1170 | 900 | 550 | 2.8 | 1100 | 180 | 0.26 | 90.7 |
| 6051 | C5 | 1170 | 900 | 550 | 2.8 | 1100 | 180 | 0.26 | 90.7 |
| 6052 | C6 | 1170 | 900 | 550 | 2.8 | 1100 | 180 | 0.26 | 90.7 |
| 6053 | C7 | 1170 | 900 | 550 | 2.8 | 1100 | 180 | 0.26 | 90.7 |
| 6054 | D1 | 1100 | 900 | 550 | 2.8 | 1100 | 180 | 0.26 | 90.7 |
| 6055 | D2 | 1100 | 900 | 550 | 2.8 | 1100 | 180 | 0.26 | 90.7 |
| 6056 | E | 1100 | 900 | 550 | 2.8 | 1100 | 180 | 0.26 | 90.7 |
| 6057 | F | 1100 | 900 | 550 | 2.8 | 1100 | 180 | 0.26 | 90.7 |
| 6058 | G | 1100 | 900 | 550 | 2.8 | 1100 | 180 | 0.26 | 90.7 |
| 6059 | H | 1100 | 900 | 550 | 2.8 | 1100 | 180 | 0.26 | 90.7 |
| 6060 | I | 1100 | 900 | 550 | 2.8 | 1100 | 180 | 0.26 | 90.7 |

| No. | PRODUCTION CONDITIONS: DECARBURIZATION ANNEALING: GRAIN SIZE OF PRIMARY RECRYSTALLIZED GRAIN μm | DECARBURIZATION ANNEALING: NITROGEN CONTENT AFTER NITRIDATION ppm | FINAL ANNEALING: PA' | FINAL ANNEALING: PB' | FINAL ANNEALING: TD MINUTE | FINAL ANNEALING: TE2' MINUTE | FINAL ANNEALING: TF MINUTE |
|---|---|---|---|---|---|---|---|
| 6041 | 17 | 220 | 0.500 | 0.020 | 180 | 420 | 300 |
| 6042 | 17 | 220 | 0.500 | 0.050 | 300 | 600 | 300 |
| 6043 | 17 | 220 | 0.500 | 0.020 | 180 | 420 | 300 |
| 6044 | 17 | 180 | 1.000 | 0.020 | 180 | 600 | 300 |
| 6045 | 17 | 180 | 2.000 | 0.020 | 180 | 600 | 300 |
| 6046 | 17 | 220 | 2.000 | 0.020 | 180 | 600 | 300 |
| 6047 | 23 | 210 | 0.300 | 0.030 | 300 | 210 | 300 |
| 6048 | 24 | 210 | 0.300 | 0.030 | 300 | 210 | 300 |
| 6049 | 20 | 210 | 0.300 | 0.030 | 300 | 210 | 300 |
| 6050 | 17 | 210 | 0.300 | 0.030 | 300 | 210 | 300 |
| 6051 | 16 | 210 | 0.300 | 0.030 | 300 | 210 | 300 |
| 6052 | 15 | 210 | 0.300 | 0.030 | 300 | 210 | 300 |
| 6053 | 13 | 210 | 0.300 | 0.030 | 300 | 210 | 300 |
| 6054 | 24 | 220 | 0.100 | 0.050 | 300 | 150 | 300 |
| 6055 | 17 | 220 | 0.100 | 0.050 | 300 | 150 | 300 |
| 6056 | 22 | 220 | 0.100 | 0.050 | 300 | 150 | 300 |
| 6057 | 19 | 220 | 0.100 | 0.050 | 300 | 150 | 300 |
| 6058 | 15 | 220 | 0.100 | 0.050 | 300 | 150 | 300 |
| 6059 | 15 | 220 | 0.100 | 0.050 | 300 | 150 | 300 |
| 6060 | 23 | 220 | 0.100 | 0.050 | 300 | 150 | 300 |

TABLE F6

| No. | STEEL TYPE | PRODUCTION CONDITIONS: HOT ROLLING: HEATING TEMPERATURE ° C. | HOT ROLLING: TEMPERATURE OF FINAL ROLLING ° C. | HOT ROLLING: COILING TEMPERATURE ° C. | HOT ROLLING: SHEET THICKNESS mm | HOT BAND ANNEALING: TEMPERATURE ° C. | HOT BAND ANNEALING: TIME SECOND | COLD ROLLING: SHEET THICKNESS mm | COLD ROLLING: REDUCTION OF COLD ROLLING % |
|---|---|---|---|---|---|---|---|---|---|
| 6061 | J | 1100 | 900 | 550 | 2.8 | 1100 | 180 | 0.26 | 90.7 |
| 6062 | K | 1100 | 900 | 550 | 2.8 | 1100 | 180 | 0.26 | 90.7 |

TABLE F6-continued

| | | | | | | | | | |
|---|---|---|---|---|---|---|---|---|---|
| 6063 | L | 1100 | 900 | 550 | 2.8 | 1100 | 180 | 0.26 | 90.7 |
| 6064 | A1 | 1350 | 1100 | 500 | 2.6 | 1100 | 180 | 0.26 | 90.0 |
| 6065 | A1 | 1350 | 1100 | 500 | 2.6 | 1100 | 180 | 0.26 | 90.0 |
| 6066 | A1 | 1350 | 1100 | 500 | 2.6 | 1100 | 180 | 0.26 | 90.0 |
| 6067 | A1 | 1350 | 1100 | 500 | 2.6 | 1100 | 180 | 0.26 | 90.0 |
| 6068 | A1 | 1350 | 1100 | 500 | 2.6 | 1100 | 180 | 0.26 | 90.0 |
| 6069 | A1 | 1350 | 1100 | 500 | 2.6 | 1100 | 180 | 0.26 | 90.0 |
| 6070 | A1 | 1350 | 1100 | 500 | 2.6 | 1100 | 180 | 0.26 | 90.0 |
| 6071 | A1 | 1350 | 1100 | 500 | 2.6 | 1100 | 180 | 0.26 | 90.0 |
| 6072 | A1 | 1350 | 1100 | 500 | 2.6 | 1100 | 180 | 0.26 | 90.0 |
| 6073 | A2 | 1350 | 1100 | 500 | 2.6 | 1100 | 180 | 0.26 | 90.0 |
| 6074 | A2 | 1350 | 1100 | 500 | 2.6 | 1100 | 180 | 0.26 | 90.0 |
| 6075 | A2 | 1350 | 1100 | 500 | 2.6 | 1100 | 180 | 0.26 | 90.0 |
| 6076 | A2 | 1350 | 1100 | 500 | 2.6 | 1100 | 180 | 0.26 | 90.0 |
| 6077 | A2 | 1350 | 1100 | 500 | 2.6 | 1100 | 180 | 0.26 | 90.0 |
| 6078 | A2 | 1350 | 1100 | 500 | 2.6 | 1100 | 180 | 0.26 | 90.0 |
| 6079 | A2 | 1350 | 1100 | 500 | 2.6 | 1100 | 180 | 0.26 | 90.0 |
| 6080 | A2 | 1350 | 1100 | 500 | 2.6 | 1100 | 180 | 0.26 | 90.0 |

| | PRODUCTION CONDITIONS | | | | | | |
|---|---|---|---|---|---|---|---|
| | DECARBURIZATION ANNEALING | | FINAL ANNEALING | | | | |
| No. | GRAIN SIZE OF PRIMARY RECRYSTALLIZED GRAIN μm | NITROGEN CONTENT AFTER NITRIDATION ppm | PA' | PB' | TD MINUTE | TE2' MINUTE | TF MINUTE |
| 6061 | 17 | 220 | 0.100 | 0.050 | 300 | 150 | 300 |
| 6062 | 17 | 220 | 0.100 | 0.050 | 300 | 150 | 300 |
| 6063 | 15 | 220 | 0.100 | 0.050 | 300 | 150 | 300 |
| 6064 | 9 | — | 0.030 | 0.030 | 360 | 150 | 300 |
| 6065 | 9 | — | 0.100 | 0.030 | 360 | 150 | 300 |
| 6066 | 9 | — | 0.100 | 0.030 | 360 | 300 | 300 |
| 6067 | 9 | — | 0.030 | 0.030 | 360 | 300 | 300 |
| 6068 | 9 | — | 0.400 | 0.060 | 360 | 300 | 300 |
| 6069 | 9 | — | 0.400 | 0.060 | 360 | 900 | 300 |
| 6070 | 9 | — | 0.100 | 0.030 | 360 | 300 | 300 |
| 6071 | 9 | — | 0.100 | 0.030 | 360 | 900 | 300 |
| 6072 | 9 | — | 0.100 | 0.010 | 360 | 900 | 300 |
| 6073 | 7 | — | 0.030 | 0.030 | 360 | 150 | 300 |
| 6074 | 7 | — | 0.100 | 0.030 | 360 | 150 | 300 |
| 6075 | 7 | — | 0.100 | 0.030 | 360 | 150 | 300 |
| 6076 | 7 | — | 0.030 | 0.030 | 360 | 300 | 300 |
| 6077 | 7 | — | 0.400 | 0.060 | 360 | 300 | 300 |
| 6078 | 7 | — | 0.100 | 0.060 | 360 | 600 | 300 |
| 6079 | 7 | — | 0.400 | 0.030 | 360 | 300 | 300 |
| 6080 | 7 | — | 0.400 | 0.030 | 360 | 600 | 300 |

TABLE F7

| | | PRODUCTION CONDITIONS | | | | | | | |
|---|---|---|---|---|---|---|---|---|---|
| | | HOT ROLLING | | | | | | COLD ROLLING | |
| | | HEATING | TEMPERATURE | COILING | SHEET | HOT BAND ANNEALING | | SHEET | REDUCTION |
| No. | STEEL TYPE | TEMPER-ATURE ° C. | OF FINAL ROLLING ° C. | TEMPER-ATURE ° C. | THICK-NESS mm | TEMPER-ATURE ° C. | TIME SECOND | THICK-NESS mm | OF COLD ROLLING % |
| 6081 | A2 | 1350 | 1100 | 500 | 2.6 | 1100 | 180 | 0.26 | 90.0 |
| 6082 | B1 | 1400 | 1100 | 500 | 2.6 | 1100 | 180 | 0.26 | 90.0 |
| 6083 | B1 | 1400 | 1100 | 500 | 2.6 | 1100 | 180 | 0.26 | 90.0 |
| 6084 | B1 | 1400 | 1100 | 500 | 2.6 | 1100 | 180 | 0.26 | 90.0 |
| 6085 | B1 | 1400 | 1100 | 500 | 2.6 | 1100 | 180 | 0.26 | 90.0 |
| 6086 | B1 | 1400 | 1100 | 500 | 2.6 | 1100 | 180 | 0.26 | 90.0 |
| 6087 | B1 | 1400 | 1100 | 500 | 2.6 | 1100 | 180 | 0.26 | 90.0 |
| 6088 | B1 | 1400 | 1100 | 500 | 2.6 | 1100 | 180 | 0.26 | 90.0 |
| 6089 | B1 | 1400 | 1100 | 500 | 2.6 | 1100 | 180 | 0.26 | 90.0 |
| 6090 | B1 | 1400 | 1100 | 500 | 2.6 | 1100 | 180 | 0.26 | 90.0 |
| 6091 | B1 | 1400 | 1100 | 500 | 2.6 | 1100 | 180 | 0.26 | 90.0 |
| 6092 | B2 | 1400 | 1100 | 500 | 2.6 | 1100 | 180 | 0.26 | 90.0 |
| 6093 | B2 | 1400 | 1100 | 500 | 2.6 | 1100 | 180 | 0.26 | 90.0 |
| 6094 | B2 | 1400 | 1100 | 500 | 2.6 | 1100 | 180 | 0.26 | 90.0 |

TABLE F7-continued

| | | | | | | | | |
|---|---|---|---|---|---|---|---|---|
| 6095 B2 | 1400 | 1100 | 500 | 2.6 | 1100 | 180 | 0.26 | 90.0 |
| 6096 B2 | 1400 | 1100 | 500 | 2.6 | 1100 | 180 | 0.26 | 90.0 |
| 6097 B2 | 1400 | 1100 | 500 | 2.6 | 1100 | 180 | 0.26 | 90.0 |
| 6098 B2 | 1400 | 1100 | 500 | 2.6 | 1100 | 180 | 0.26 | 90.0 |
| 6099 B2 | 1400 | 1100 | 500 | 2.6 | 1100 | 180 | 0.26 | 90.0 |
| 6100 B2 | 1400 | 1100 | 500 | 2.6 | 1100 | 180 | 0.26 | 90.0 |

| | PRODUCTION CONDITIONS | | | | | | |
|---|---|---|---|---|---|---|---|
| | DECARBURIZATION ANNEALING | | | | | | |
| | GRAIN SIZE OF PRIMARY RECRYSTALLIZED | NITROGEN CONTENT AFTER | FINAL ANNEALING | | | | |
| No. | GRAIN μm | NITRIDATION ppm | PA' | PB' | TD MINUTE | TE2' MINUTE | TF MINUTE |
| 6081 | 7 | — | 0.100 | 0.010 | 360 | 900 | 300 |
| 6082 | 10 | — | 0.100 | 0.025 | 180 | 300 | 300 |
| 6083 | 10 | — | 0.100 | 0.050 | 180 | 600 | 300 |
| 6084 | 10 | — | 1.000 | 0.050 | 180 | 300 | 300 |
| 6085 | 10 | — | 1.000 | 0.025 | 180 | 300 | 300 |
| 6086 | 10 | — | 0.400 | 0.040 | 180 | 900 | 300 |
| 6087 | 10 | — | 0.010 | 0.025 | 180 | 900 | 300 |
| 6088 | 10 | — | 2.000 | 0.025 | 180 | 90 | 300 |
| 6089 | 10 | — | 2.000 | 0.250 | 180 | 900 | 300 |
| 6090 | 10 | — | 0.100 | 0.250 | 180 | 150 | 300 |
| 6091 | 10 | — | 2.000 | 0.025 | 180 | 150 | 300 |
| 6092 | 8 | — | 0.100 | 0.025 | 180 | 300 | 300 |
| 6093 | 8 | — | 0.100 | 0.050 | 180 | 600 | 300 |
| 6094 | 8 | — | 2.000 | 0.050 | 180 | 300 | 300 |
| 6095 | 8 | — | 2.000 | 0.025 | 180 | 300 | 300 |
| 6096 | 8 | — | 0.400 | 0.040 | 180 | 900 | 300 |
| 6097 | 8 | — | 0.010 | 0.025 | 180 | 900 | 300 |
| 6098 | 8 | — | 2.000 | 0.025 | 180 | 90 | 300 |
| 6099 | 8 | — | 0.100 | 0.250 | 180 | 150 | 300 |
| 6100 | 8 | — | 2.000 | 0.025 | 180 | 150 | 300 |

The insulation coating which was the same as those in the above Example 1 was formed on the surface of produced grain oriented electrical steel sheets (final annealed sheets).

The produced grain oriented electrical steel sheets had the intermediate layer which was arranged in contact with the grain oriented electrical steel sheet (silicon steel sheet) and the insulation coating which was arranged in contact with the intermediate layer, when viewing the cross section whose cutting direction is parallel to thickness direction. The intermediate layer was forsterite film whose average thickness was 1.5 μm, and the insulation coating was the coating which mainly included phosphate and colloidal silica and whose average thickness was 2 μm.

Various characteristics of the obtained grain oriented electrical steel sheet were evaluated. The evaluation methods were the same as those in the above Example 1 and Example 5. The evaluation results are shown in Table F8 to Table F12.

TABLE F8

| | | PRODUCTION RESULTS | | | | | | EVALUATION RESULTS | | | |
|---|---|---|---|---|---|---|---|---|---|---|---|
| | | BOUNDARY | | | | | | | | | |
| | | EXISTENCE OF SWITCHING BOUNDARY | EXISTENCE OF SWITCHING BOUNDARY | AVERAGE GRAIN SIZE | | | DEVIATION | MAGNETIC CHARACTERISTICS | | | |
| No. | STEEL TYPE | (SUBBOUNDARY) EXISTENCE NON | (α SUBBOUNDARY) EXISTENCE NON | $RB_C/RC_C$ | $RB_C$ mm | $RC_C$ mm | ANGLE σ(\|α\|) | B8 T | W19/50 W/kg | W17/50 W/kg | NOTE |
| 6001 | C1 | NONE | NONE | 0.87 | 25.4 | 29.2 | 3.39 | 1.910 | 2.611 | 0.891 | COMPARATIVE EXAMPLE |
| 6002 | C1 | NONE | NONE | 0.86 | 30.8 | 35.8 | 3.16 | 1.917 | 2.608 | 0.877 | COMPARATIVE EXAMPLE |
| 6003 | C1 | NONE | NONE | 0.89 | 38.8 | 43.7 | 2.71 | 1.929 | 2.570 | 0.849 | COMPARATIVE EXAMPLE |
| 6004 | C1 | NONE | NONE | 0.88 | 24.2 | 27.4 | 3.47 | 1.906 | 2.377 | 0.894 | COMPARATIVE EXAMPLE |
| 6005 | C1 | EXISTENCE | NONE | 0.93 | 29.1 | 31.2 | 3.05 | 1.921 | 1.911 | 0.868 | INVENTIVE EXAMPLE |
| 6006 | C1 | EXISTENCE | EXISTENCE | 1.20 | 26.0 | 21.7 | 2.95 | 1.921 | 1.410 | 0.865 | INVENTIVE EXAMPLE |
| 6007 | C1 | EXISTENCE | EXISTENCE | 1.27 | 24.3 | 19.2 | 2.95 | 1.923 | 1.357 | 0.864 | INVENTIVE EXAMPLE |
| 6008 | C1 | EXISTENCE | EXISTENCE | 1.29 | 24.4 | 19.0 | 2.94 | 1.923 | 1.320 | 0.863 | INVENTIVE EXAMPLE |
| 6009 | C1 | EXISTENCE | EXISTENCE | 1.31 | 23.1 | 17.6 | 2.90 | 1.924 | 1.317 | 0.862 | INVENTIVE EXAMPLE |
| 6010 | C1 | EXISTENCE | EXISTENCE | 1.26 | 23.3 | 18.5 | 2.93 | 1.924 | 1.356 | 0.862 | INVENTIVE EXAMPLE |
| 6011 | C1 | EXISTENCE | EXISTENCE | 1.19 | 24.7 | 20.7 | 2.97 | 1.922 | 1.413 | 0.865 | INVENTIVE EXAMPLE |
| 6012 | C1 | EXISTENCE | NONE | 0.94 | 28.6 | 30.3 | 3.06 | 1.919 | 1.909 | 0.869 | INVENTIVE EXAMPLE |
| 6013 | C1 | EXISTENCE | EXISTENCE | 1.34 | 24.0 | 17.9 | 2.84 | 1.927 | 1.285 | 0.857 | INVENTIVE EXAMPLE |

TABLE F8-continued

| | | PRODUCTION RESULTS | | | | | | EVALUATION RESULTS | | | |
|---|---|---|---|---|---|---|---|---|---|---|---|
| | | BOUNDARY | | AVERAGE GRAIN SIZE | | | | MAGNETIC CHARACTERISTICS | | | |
| No. | STEEL TYPE | EXISTENCE OF SWITCHING BOUNDARY (SUBBOUNDARY) EXISTENCE NON | EXISTENCE OF SWITCHING BOUNDARY (α SUBBOUNDARY) EXISTENCE NON | $RB_C/RC_C$ | $RB_C$ mm | $RC_C$ mm | DEVIATION ANGLE $\sigma(\lvert\alpha\rvert)$ | B8 T | W19/50 W/kg | W17/50 W/kg | NOTE |
| 6014 | C1 | EXISTENCE | EXISTENCE | 1.33 | 25.0 | 18.8 | 2.83 | 1.927 | 1.286 | 0.856 | INVENTIVE EXAMPLE |
| 6015 | C1 | EXISTENCE | EXISTENCE | 1.26 | 24.2 | 19.2 | 2.92 | 1.924 | 1.358 | 0.863 | INVENTIVE EXAMPLE |
| 6016 | C1 | EXISTENCE | NONE | 1.04 | 26.5 | 25.5 | 3.10 | 1.918 | 1.616 | 0.873 | INVENTIVE EXAMPLE |
| 6017 | C1 | EXISTENCE | EXISTENCE | 1.24 | 25.1 | 20.2 | 2.94 | 1.928 | 1.358 | 0.863 | INVENTIVE EXAMPLE |
| 6018 | C1 | EXISTENCE | EXISTENCE | 1.36 | 23.3 | 17.2 | 2.83 | 1.932 | 1.268 | 0.854 | INVENTIVE EXAMPLE |
| 6019 | C1 | EXISTENCE | EXISTENCE | 1.37 | 23.2 | 16.9 | 2.83 | 1.933 | 1.269 | 0.856 | INVENTIVE EXAMPLE |
| 6020 | C1 | EXISTENCE | EXISTENCE | 1.31 | 23.9 | 18.2 | 2.94 | 1.929 | 1.317 | 0.861 | INVENTIVE EXAMPLE |

TABLE F9

| | | PRODUCTION RESULTS | | | | | | EVALUATION RESULTS | | | |
|---|---|---|---|---|---|---|---|---|---|---|---|
| | | BOUNDARY | | AVERAGE GRAIN SIZE | | | | MAGNETIC CHARACTERISTICS | | | |
| No. | STEEL TYPE | EXISTENCE OF SWITCHING BOUNDARY (SUBBOUNDARY) EXISTENCE NON | EXISTENCE OF SWITCHING BOUNDARY (α SUBBOUNDARY) EXISTENCE NON | $RB_C/RC_C$ | $RB_C$ mm | $RC_C$ mm | DEVIATION ANGLE $\sigma(\lvert\alpha\rvert)$ | B8 T | W19/50 W/kg | W17/50 W/kg | NOTE |
| 6021 | C1 | EXISTENCE | NONE | 0.99 | 36.7 | 37.1 | 2.61 | 1.939 | 1.694 | 0.844 | INVENTIVE EXAMPLE |
| 6022 | C1 | EXISTENCE | NONE | 0.97 | 37.3 | 38.3 | 2.67 | 1.935 | 1.767 | 0.848 | INVENTIVE EXAMPLE |
| 6023 | C1 | EXISTENCE | EXISTENCE | 1.30 | 31.8 | 24.4 | 2.41 | 1.943 | 1.072 | 0.832 | INVENTIVE EXAMPLE |
| 6024 | D1 | NONE | NONE | 0.98 | 23.1 | 23.7 | 3.33 | 1.905 | 1.826 | 0.867 | COMPARATIVE EXAMPLE |
| 6025 | D1 | EXISTENCE | NONE | 0.98 | 23.9 | 24.5 | 3.28 | 1.908 | 1.820 | 0.863 | INVENTIVE EXAMPLE |
| 6026 | D1 | EXISTENCE | NONE | 1.03 | 25.5 | 24.8 | 3.18 | 1.911 | 1.663 | 0.857 | INVENTIVE EXAMPLE |
| 6027 | D1 | EXISTENCE | EXISTENCE | 1.21 | 24.3 | 20.0 | 3.06 | 1.914 | 1.403 | 0.849 | INVENTIVE EXAMPLE |
| 6028 | D1 | NONE | NONE | 0.99 | 25.8 | 26.1 | 3.17 | 1.911 | 1.760 | 0.859 | COMPARATIVE EXAMPLE |
| 6029 | D1 | NONE | NONE | 0.97 | 24.3 | 25.0 | 3.28 | 1.909 | 1.799 | 0.862 | COMPARATIVE EXAMPLE |
| 6030 | D1 | NONE | NONE | 1.00 | 24.9 | 25.0 | 3.20 | 1.909 | 1.761 | 0.860 | COMPARATIVE EXAMPLE |
| 6031 | D1 | EXISTENCE | EXISTENCE | 1.21 | 24.1 | 19.8 | 3.05 | 1.914 | 1.403 | 0.849 | INVENTIVE EXAMPLE |
| 6032 | D1 | EXISTENCE | EXISTENCE | 1.30 | 23.1 | 17.7 | 2.94 | 1.919 | 1.319 | 0.843 | INVENTIVE EXAMPLE |
| 6033 | D1 | EXISTENCE | EXISTENCE | 1.30 | 22.9 | 17.6 | 2.90 | 1.920 | 1.317 | 0.842 | INVENTIVE EXAMPLE |
| 6034 | D1 | EXISTENCE | EXISTENCE | 1.21 | 24.1 | 19.6 | 3.04 | 1.916 | 1.406 | 0.851 | INVENTIVE EXAMPLE |
| 6035 | D2 | NONE | NONE | 0.91 | 26.5 | 29.0 | 4.57 | 1.929 | 2.201 | 0.850 | COMPARATIVE EXAMPLE |
| 6036 | D2 | NONE | NONE | 0.96 | 23.5 | 24.4 | 4.46 | 1.934 | 1.741 | 0.848 | COMPARATIVE EXAMPLE |
| 6037 | D2 | NONE | NONE | 0.96 | 22.8 | 23.7 | 4.45 | 1.935 | 1.740 | 0.848 | COMPARATIVE EXAMPLE |
| 6038 | D2 | NONE | NONE | 1.00 | 24.1 | 24.1 | 4.45 | 1.934 | 1.664 | 0.846 | COMPARATIVE EXAMPLE |
| 6039 | D2 | EXISTENCE | EXISTENCE | 1.42 | 23.8 | 16.8 | 3.68 | 1.943 | 1.168 | 0.830 | INVENTIVE EXAMPLE |
| 6040 | D2 | EXISTENCE | EXISTENCE | 1.48 | 23.8 | 16.0 | 3.82 | 1.940 | 1.139 | 0.832 | INVENTIVE EXAMPLE |

TABLE F10

| | | PRODUCTION RESULTS | | | | | | EVALUATION RESULTS | | | |
|---|---|---|---|---|---|---|---|---|---|---|---|
| | | BOUNDARY | | AVERAGE GRAIN SIZE | | | | MAGNETIC CHARACTERISTICS | | | |
| No. | STEEL TYPE | EXISTENCE OF SWITCHING BOUNDARY (SUBBOUNDARY) EXISTENCE NON | EXISTENCE OF SWITCHING BOUNDARY (α SUBBOUNDARY) EXISTENCE NON | $RB_C/RC_C$ | $RB_C$ mm | $RC_C$ mm | DEVIATION ANGLE $\sigma(\lvert\alpha\rvert)$ | B8 T | W19/50 W/kg | W17/50 W/kg | NOTE |
| 6041 | D2 | EXISTENCE | EXISTENCE | 1.48 | 23.8 | 16.0 | 2.91 | 1.951 | 1.112 | 0.814 | INVENTIVE EXAMPLE |
| 6042 | D3 | EXISTENCE | EXISTENCE | 1.84 | 25.8 | 14.0 | 2.24 | 1.959 | 0.974 | 0.799 | INVENTIVE EXAMPLE |

TABLE F10-continued

| No. | STEEL TYPE | PRODUCTION RESULTS: BOUNDARY: EXISTENCE OF SWITCHING BOUNDARY (SUBBOUNDARY) EXISTENCE NON | EXISTENCE OF SWITCHING BOUNDARY (α SUBBOUNDARY) EXISTENCE NON | AVERAGE GRAIN SIZE: $RB_C/RC_C$ | $RB_C$ mm | $RC_C$ mm | DEVIATION ANGLE σ(\|α\|) | EVALUATION RESULTS: MAGNETIC CHARACTERISTICS: B8 T | W19/50 W/kg | W17/50 W/kg | NOTE |
|---|---|---|---|---|---|---|---|---|---|---|---|
| 6043 | D2 | EXISTENCE | EXISTENCE | 1.47 | 24.7 | 16.8 | 2.94 | 1.951 | 1.109 | 0.813 | INVENTIVE EXAMPLE |
| 6044 | D2 | EXISTENCE | EXISTENCE | 1.47 | 23.6 | 16.0 | 3.44 | 1.945 | 1.137 | 0.825 | INVENTIVE EXAMPLE |
| 6045 | D2 | EXISTENCE | EXISTENCE | 1.33 | 24.2 | 18.2 | 3.75 | 1.943 | 1.215 | 0.831 | INVENTIVE EXAMPLE |
| 6046 | D2 | EXISTENCE | EXISTENCE | 1.34 | 24.9 | 18.5 | 3.32 | 1.948 | 1.203 | 0.820 | INVENTIVE EXAMPLE |
| 6047 | C1 | EXISTENCE | NONE | 1.01 | 12.9 | 12.8 | 3.12 | 1.919 | 1.737 | 0.872 | INVENTIVE EXAMPLE |
| 6048 | C2 | EXISTENCE | NONE | 0.99 | 11.7 | 11.9 | 3.11 | 1.918 | 1.737 | 0.872 | INVENTIVE EXAMPLE |
| 6049 | C3 | EXISTENCE | EXISTENCE | 1.37 | 24.7 | 18.0 | 4.02 | 1.931 | 1.290 | 0.833 | INVENTIVE EXAMPLE |
| 6050 | C4 | EXISTENCE | EXISTENCE | 1.43 | 24.5 | 17.2 | 3.22 | 1.945 | 1.144 | 0.811 | INVENTIVE EXAMPLE |
| 6051 | C5 | EXISTENCE | EXISTENCE | 1.45 | 23.6 | 16.3 | 3.24 | 1.944 | 1.143 | 0.809 | INVENTIVE EXAMPLE |
| 6052 | C6 | EXISTENCE | EXISTENCE | 1.44 | 25.3 | 17.6 | 3.23 | 1.945 | 1.144 | 0.803 | INVENTIVE EXAMPLE |
| 6053 | C7 | EXISTENCE | EXISTENCE | 1.37 | 24.4 | 17.8 | 4.00 | 1.931 | 1.291 | 0.841 | INVENTIVE EXAMPLE |
| 6054 | D1 | NONE | NONE | 1.00 | 11.8 | 11.9 | 3.07 | 1.918 | 1.739 | 0.881 | COMPARATIVE EXAMPLE |
| 6055 | D2 | EXISTENCE | EXISTENCE | 1.47 | 24.9 | 17.0 | 3.22 | 1.948 | 1.135 | 0.829 | INVENTIVE EXAMPLE |
| 6056 | E | EXISTENCE | EXISTENCE | 1.39 | 23.8 | 17.2 | 3.99 | 1.927 | 1.331 | 0.846 | INVENTIVE EXAMPLE |
| 6057 | F | EXISTENCE | EXISTENCE | 1.44 | 25.5 | 17.7 | 3.23 | 1.941 | 1.198 | 0.828 | INVENTIVE EXAMPLE |
| 6058 | G | EXISTENCE | EXISTENCE | 1.44 | 24.3 | 16.9 | 3.21 | 1.947 | 1.134 | 0.830 | INVENTIVE EXAMPLE |
| 6059 | H | EXISTENCE | EXISTENCE | 1.46 | 24.8 | 17.0 | 3.22 | 1.949 | 1.138 | 0.828 | INVENTIVE EXAMPLE |
| 6060 | I | EXISTENCE | EXISTENCE | 1.38 | 24.7 | 18.0 | 3.98 | 1.921 | 1.382 | 0.847 | INVENTIVE EXAMPLE |

TABLE F11

| No. | STEEL TYPE | PRODUCTION RESULTS: BOUNDARY: EXISTENCE OF SWITCHING BOUNDARY (SUBBOUNDARY) EXISTENCE NON | EXISTENCE OF SWITCHING BOUNDARY (α SUBBOUNDARY) EXISTENCE NON | AVERAGE GRAIN SIZE: $RB_C/RC_C$ | $RB_C$ mm | $RC_C$ mm | DEVIATION ANGLE σ(\|α\|) | EVALUATION RESULTS: MAGNETIC CHARACTERISTICS: B8 T | W19/50 W/kg | W17/50 W/kg | NOTE |
|---|---|---|---|---|---|---|---|---|---|---|---|
| 6061 | J | EXISTENCE | EXISTENCE | 1.47 | 24.2 | 16.5 | 3.21 | 1.947 | 1.136 | 0.830 | INVENTIVE EXAMPLE |
| 6062 | K | EXISTENCE | EXISTENCE | 1.47 | 25.2 | 17.2 | 3.19 | 1.947 | 1.136 | 0.830 | INVENTIVE EXAMPLE |
| 6063 | L | EXISTENCE | EXISTENCE | 1.46 | 23.6 | 16.2 | 3.20 | 1.949 | 1.137 | 0.830 | INVENTIVE EXAMPLE |
| 6064 | A1 | NONE | NONE | 0.98 | 10.4 | 10.5 | 3.03 | 1.924 | 1.750 | 0.879 | COMPARATIVE EXAMPLE |
| 6065 | A1 | NONE | NONE | 0.99 | 11.2 | 11.2 | 2.98 | 1.925 | 1.708 | 0.875 | COMPARATIVE EXAMPLE |
| 6066 | A1 | EXISTENCE | EXISTENCE | 1.22 | 27.1 | 22.3 | 2.80 | 1.930 | 1.351 | 0.855 | INVENTIVE EXAMPLE |
| 6067 | A1 | EXISTENCE | NONE | 1.02 | 15.0 | 14.8 | 2.95 | 1.925 | 1.611 | 0.874 | INVENTIVE EXAMPLE |
| 6068 | A1 | EXISTENCE | EXISTENCE | 1.41 | 42.6 | 30.3 | 2.58 | 1.938 | 1.193 | 0.852 | INVENTIVE EXAMPLE |
| 6069 | A1 | EXISTENCE | EXISTENCE | 1.58 | 54.8 | 34.7 | 2.43 | 1.941 | 1.102 | 0.843 | INVENTIVE EXAMPLE |
| 6070 | A1 | EXISTENCE | EXISTENCE | 1.21 | 28.0 | 23.1 | 2.83 | 1.930 | 1.352 | 0.864 | INVENTIVE EXAMPLE |
| 6071 | A1 | EXISTENCE | EXISTENCE | 1.31 | 35.8 | 27.3 | 2.70 | 1.932 | 1.267 | 0.857 | INVENTIVE EXAMPLE |
| 6072 | A1 | EXISTENCE | NONE | 1.01 | 13.0 | 12.9 | 2.86 | 1.928 | 1.686 | 0.869 | INVENTIVE EXAMPLE |
| 6073 | A2 | EXISTENCE | EXISTENCE | 1.31 | 25.0 | 19.1 | 3.12 | 1.950 | 1.219 | 0.827 | INVENTIVE EXAMPLE |
| 6074 | A2 | EXISTENCE | EXISTENCE | 1.39 | 23.5 | 16.9 | 2.90 | 1.952 | 1.162 | 0.823 | INVENTIVE EXAMPLE |
| 6075 | A2 | EXISTENCE | EXISTENCE | 1.37 | 25.0 | 18.3 | 2.89 | 1.953 | 1.166 | 0.823 | INVENTIVE EXAMPLE |
| 6076 | A2 | EXISTENCE | EXISTENCE | 1.33 | 23.3 | 17.5 | 2.88 | 1.952 | 1.196 | 0.822 | INVENTIVE EXAMPLE |
| 6077 | A2 | EXISTENCE | EXISTENCE | 1.71 | 25.5 | 14.9 | 1.91 | 1.963 | 0.996 | 0.800 | INVENTIVE EXAMPLE |
| 6078 | A2 | EXISTENCE | EXISTENCE | 1.65 | 24.2 | 14.7 | 1.99 | 1.961 | 1.014 | 0.802 | INVENTIVE EXAMPLE |
| 6079 | A2 | EXISTENCE | EXISTENCE | 1.55 | 24.6 | 15.8 | 2.23 | 1.959 | 1.066 | 0.810 | INVENTIVE EXAMPLE |
| 6080 | A2 | EXISTENCE | EXISTENCE | 1.64 | 25.3 | 15.4 | 2.02 | 1.960 | 1.023 | 0.803 | INVENTIVE EXAMPLE |

TABLE F12

| | | PRODUCTION RESULTS | | | | | | | | | |
|---|---|---|---|---|---|---|---|---|---|---|---|
| | | BOUNDARY | | | | | | | | | |
| | | EXISTENCE OF SWITCHING BOUNDARY (SUBBOUNDARY) | EXISTENCE OF SWITCHING BOUNDARY (α SUBBOUNDARY) | AVERAGE GRAIN SIZE | | | DEVIATION | EVALUATION RESULTS MAGNETIC CHARACTERISTICS | | | |
| No. | STEEL TYPE | EXISTENCE NON | EXISTENCE NON | $RB_C/RC_C$ | $RB_C$ mm | $RC_C$ mm | ANGLE σ(\|α\|) | B8 T | W19/50 W/kg | W17/50 W/kg | NOTE |
| 6081 | A2 | EXISTENCE | EXISTENCE | 1.28 | 24.1 | 18.8 | 2.71 | 1.952 | 1.226 | 0.820 | INVENTIVE EXAMPLE |
| 6082 | B1 | EXISTENCE | EXISTENCE | 1.17 | 25.7 | 22.0 | 2.84 | 1.928 | 1.387 | 0.865 | INVENTIVE EXAMPLE |
| 6083 | B1 | EXISTENCE | EXISTENCE | 1.38 | 40.3 | 29.3 | 2.61 | 1.937 | 1.214 | 0.851 | INVENTIVE EXAMPLE |
| 6084 | B1 | EXISTENCE | EXISTENCE | 1.26 | 31.1 | 24.7 | 2.70 | 1.933 | 1.308 | 0.860 | INVENTIVE EXAMPLE |
| 6085 | B1 | EXISTENCE | EXISTENCE | 1.17 | 25.0 | 21.4 | 2.82 | 1.929 | 1.389 | 0.866 | INVENTIVE EXAMPLE |
| 6086 | B1 | EXISTENCE | EXISTENCE | 1.48 | 48.0 | 32.5 | 2.48 | 1.940 | 1.141 | 0.843 | INVENTIVE EXAMPLE |
| 6087 | B1 | NONE | NONE | 1.04 | 16.3 | 15.6 | 2.83 | 1.928 | 1.565 | 0.868 | COMPARATIVE EXAMPLE |
| 6088 | B1 | NONE | NONE | 0.97 | 11.5 | 11.9 | 3.01 | 1.923 | 1.758 | 0.879 | COMPARATIVE EXAMPLE |
| 6089 | B1 | NONE | NONE | 0.98 | 11.2 | 11.4 | 2.95 | 1.926 | 1.764 | 0.874 | COMPARATIVE EXAMPLE |
| 6090 | Bl | NONE | NONE | 0.98 | 11.4 | 11.6 | 3.05 | 1.924 | 1.758 | 0.880 | COMPARATIVE EXAMPLE |
| 6091 | B1 | NONE | NONE | 0.98 | 10.4 | 10.7 | 3.05 | 1.923 | 1.758 | 0.878 | COMPARATIVE EXAMPLE |
| 6092 | B2 | EXISTENCE | EXISTENCE | 1.42 | 24.2 | 17.1 | 2.58 | 1.953 | 1.134 | 0.815 | INVENTIVE EXAMPLE |
| 6093 | B2 | EXISTENCE | EXISTENCE | 1.60 | 24.1 | 15.1 | 2.04 | 1.961 | 1.038 | 0.805 | INVENTIVE EXAMPLE |
| 6094 | B2 | EXISTENCE | EXISTENCE | 1.37 | 24.3 | 17.8 | 2.58 | 1.954 | 1.171 | 0.816 | INVENTIVE EXAMPLE |
| 6095 | B2 | EXISTENCE | EXISTENCE | 1.32 | 24.9 | 18.9 | 2.85 | 1.951 | 1.199 | 0.821 | INVENTIVE EXAMPLE |
| 6096 | B2 | EXISTENCE | EXISTENCE | 1.73 | 24.7 | 14.3 | 1.69 | 1.965 | 0.986 | 0.797 | INVENTIVE EXAMPLE |
| 6097 | B2 | EXISTENCE | EXISTENCE | 1.35 | 23.6 | 17.5 | 2.67 | 1.954 | 1.178 | 0.817 | INVENTIVE EXAMPLE |
| 6098 | B2 | NONE | NONE | 1.07 | 24.0 | 22.4 | 3.74 | 1.943 | 1.473 | 0.842 | COMPARATIVE EXAMPLE |
| 6099 | B2 | EXISTENCE | EXISTENCE | 1.26 | 23.8 | 18.8 | 3.14 | 1.947 | 1.248 | 0.829 | INVENTIVE EXAMPLE |
| 6100 | B2 | EXISTENCE | EXISTENCE | 1.34 | 25.2 | 18.8 | 2.85 | 1.951 | 1.200 | 0.823 | INVENTIVE EXAMPLE |

Hereinafter, as with the above Example 1, the evaluation results of characteristics are explained by classifying the grain oriented electrical steels under some features in regard to the chemical compositions and the producing methods.

Examples Produced by Low Temperature Slab Heating Process

Nos. 6001 to 6063 were examples produced by a process in which slab heating temperature was decreased, nitridation was conducted after primary recrystallization, and thereby main inhibitor for secondary recrystallization was formed.

Examples of Nos. 6001 to 6023

Nos. 6001 to 6023 were examples in which the steel type without Nb was used and the conditions of PA', PB', TD, and TE2' were mainly changed during final annealing.

In Nos. 6001 to 6023, when the iron loss $W_{19/50}$ was 1.610 W/kg or less, the iron loss characteristic was judged to be acceptable.

In Nos. 6001 to 6023, the inventive examples included the boundary which satisfied the boundary condition BA and which did not satisfy the boundary condition BB, and thus these examples exhibited excellent magnetostriction in middle magnetic field range. In the above inventive examples, the inventive examples which further included the boundary which satisfied the boundary condition BC and which did not satisfy the boundary condition BB exhibited excellent the iron loss in high magnetic field range. On the other hand, although the comparative examples included the deviation angle α which was slightly and continuously shifted in the secondary recrystallized grains, the comparative examples did not sufficiently include the boundary which satisfied the boundary condition BC and which did not satisfy the boundary condition BB, and thus these examples did not exhibit preferred iron loss in high magnetic field range.

Here, No. 6003 was the comparative example in which the inhibitor intensity was increased by controlling the N content after nitridation to be 300 ppm. In general, although increasing the nitrogen content by nitridation causes a decrease in productivity, increasing the nitrogen content by nitridation results in an increase in the inhibitor intensity, and thereby $B_8$ increases. In No. 6003, $B_8$ increased. However, in No. 6003, the conditions in final annealing were not preferable, and thus $W_{19/50}$ was insufficient. In other words, in No. 6003, the switching did not occur during final annealing, and as a result, the iron loss in high magnetic field was not improved. On the other hand, in No. 6006, although $B_8$ was not a particularly high value, the conditions in final annealing were preferable, and thus $W_{19/50}$ became a preferred low value. In other words, in No. 6006, the switching occurred during final annealing, and as a result, the iron loss in high magnetic field was improved.

Nos. 6017 to 6023 were examples in which the secondary recrystallization was maintained up to higher temperature by increasing TF. In Nos. 6017 to 6023, Bs increased. However, in Nos. 6021 and 6022 among the above, the conditions in final annealing were not preferable, and thus the iron loss in high magnetic field was not improved as with No. 6003. On the other hand, in Nos. 6017 to 6020 and No. 6023 among the above, in addition to high value of Bs, the conditions in final annealing were preferable, and thus $W_{19/50}$ became a preferred low value.

Examples of Nos. 6024 to 6034

Nos. 6024 to 6034 were examples in which the steel type including 0.001% of Nb as the slab was used and the conditions of PA', PB', and TE2' were mainly changed during final annealing.

In Nos. 6024 to 6034, when the iron loss $W_{19/50}$ was 1.610 W/kg or less, the iron loss characteristic was judged to be acceptable.

In Nos. 6024 to 6034, the inventive examples included the boundary which satisfied the boundary condition BA and which did not satisfy the boundary condition BB, and thus these examples exhibited excellent magnetostriction in middle magnetic field range. In the above inventive examples, the inventive examples which further included the boundary which satisfied the boundary condition BC and which did not satisfy the boundary condition BB exhibited excellent the iron loss in high magnetic field range. On the other hand, although the comparative examples included the deviation angle α which was slightly and continuously shifted in the secondary recrystallized grains, the comparative examples did not sufficiently include the boundary which satisfied the boundary condition BC and which did not satisfy the boundary condition BB, and thus these examples did not exhibit preferred iron loss in high magnetic field range.

Examples of Nos. 6035 to 6046

Nos. 6035 to 6046 were examples in which the steel type including 0.009% of Nb as the slab was used.

In Nos. 6035 to 6046, when the iron loss $W_{19/50}$ was 1.610 W/kg or less, the iron loss characteristic was judged to be acceptable.

In Nos. 6035 to 6046, the inventive examples included the boundary which satisfied the boundary condition BA and which did not satisfy the boundary condition BB, and thus these examples exhibited excellent magnetostriction in middle magnetic field range. In the above inventive examples, the inventive examples which further included the boundary which satisfied the boundary condition BC and which did not satisfy the boundary condition BB exhibited excellent the iron loss in high magnetic field range. On the other hand, although the comparative examples included the deviation angle α which was slightly and continuously shifted in the secondary recrystallized grains, the comparative examples did not sufficiently include the boundary which satisfied the boundary condition BC and which did not satisfy the boundary condition BB, and thus these examples did not exhibit preferred iron loss in high magnetic field range.

Here, in Nos. 6035 to 6046, the Nb content of the slab was 0.009%, Nb was purified during final annealing, and then the Nb content of the grain oriented electrical steel sheet (final annealed sheet) was 0.007% or less. Nos. 6035 to 6046 included the preferred amount of Nb as the slab as compared with the above Nos. 6001 to 6034, and thus $W_{19/50}$ became a preferred low value. Moreover, $B_8$ increased. As described above, when the slab including Nb was used and the conditions in final annealing were controlled, $B_8$ and $W_{19/50}$ were favorably affected. In particular, No. 6042 was the inventive example in which the purification was elaborately performed in final annealing and the Nb content of the grain oriented electrical steel sheet (final annealed sheet) became less than detection limit. In No. 6042, although it was difficult to confirm that Nb group element was utilized from the grain oriented electrical steel sheet as the final product, the above effects were clearly obtained.

Examples of Nos. 6047 to 6053

Nos. 6047 to 6053 were examples in which TE2' was controlled to be a short time of less than 300 minutes and the influence of Nb content was particularly confirmed.

In Nos. 6047 to 6053, when the iron loss $W_{19/50}$ was 1.610 W/kg or less, the iron loss characteristic was judged to be acceptable.

In Nos. 6047 to 6053, the inventive examples included the boundary which satisfied the boundary condition BA and which did not satisfy the boundary condition BB, and thus these examples exhibited excellent magnetostriction in middle magnetic field range. In the above inventive examples, the inventive examples which further included the boundary which satisfied the boundary condition BC and which did not satisfy the boundary condition BB exhibited excellent the iron loss in high magnetic field range. On the other hand, although the comparative examples included the deviation angle α which was slightly and continuously shifted in the secondary recrystallized grains, the comparative examples did not sufficiently include the boundary which satisfied the boundary condition BC and which did not satisfy the boundary condition BB, and thus these examples did not exhibit preferred iron loss in high magnetic field range.

As shown in Nos. 6047 to 6053, as long as 0.0030 to 0.030 mass % of Nb was included in the slab, the switching occurred during final annealing, and thus the iron loss in high magnetic field was improved even when TE2' was the short time.

Examples of Nos. 6054 to 6063

Nos. 6054 to 6063 were examples in which TE2' was controlled to be the short time of less than 300 minutes and the influence of the amount of Nb group element was confirmed.

In Nos. 6054 to 6063, when the iron loss $W_{19/50}$ was 1.610 W/kg or less, the iron loss characteristic was judged to be acceptable.

In Nos. 6054 to 6063, the inventive examples included the boundary which satisfied the boundary condition BA and which did not satisfy the boundary condition BB, and thus these examples exhibited excellent magnetostriction in middle magnetic field range. In the above inventive examples, the inventive examples which further included the boundary which satisfied the boundary condition BC and which did not satisfy the boundary condition BB exhibited excellent the iron loss in high magnetic field range. On the other hand, although the comparative examples included the deviation angle α which was slightly and continuously shifted in the secondary recrystallized grains, the comparative examples did not sufficiently include the boundary which satisfied the boundary condition BC and which did not satisfy the boundary condition BB, and thus these examples did not exhibit preferred iron loss in high magnetic field range.

As shown in Nos. 6054 to 6063, as long as the predetermined amount of Nb group element except for Nb was included in the slab, the switching occurred during final annealing, and thus the iron loss in high magnetic field was improved even when TE2' was the short time.

Examples Produced by High Temperature Slab Heating Process

Nos. 6064 to 6100 were examples produced by a process in which slab heating temperature was increased, MnS was sufficiently soluted during slab heating and was reprecipited during post process, and the reprecipited MnS was utilized as main inhibitor.

In Nos. 6064 to 6100, when the iron loss $W_{19/50}$ was 1.450 W/kg or less, the iron loss characteristic was judged to be acceptable.

In Nos. 6064 to 6100, the inventive examples included the boundary which satisfied the boundary condition BA and which did not satisfy the boundary condition BB, and thus these examples exhibited excellent magnetostriction in middle magnetic field range. In the above inventive examples, the inventive examples which further included the boundary which satisfied the boundary condition BC and which did not satisfy the boundary condition BB exhibited excellent the iron loss in high magnetic field range. On the other hand, although the comparative examples included the deviation angle α which was slightly and continuously shifted in the secondary recrystallized grains, the comparative examples did not sufficiently include the boundary which satisfied the boundary condition BC and which did not satisfy the boundary condition BB, and thus these examples did not exhibit preferred iron loss in high magnetic field range.

Nos. 6082 to 6100 in the above Nos. 6064 to 6100 were examples in which Bi was included in the slab and thus $B_8$ increased.

As shown in Nos. 6064 to 6100, as long as the conditions in final annealing were appropriately controlled, the switching occurred during final annealing, and thus the iron loss in high magnetic field was improved even by the high temperature slab heating process. Moreover, as with the low temperature slab heating process, when the slab including Nb was used and the conditions in final annealing were controlled, iron loss in high magnetic field was favorably affected by the high temperature slab heating process.

Example 7

Using slabs with chemical composition shown in Table G1 as materials, grain oriented electrical steel sheets with chemical composition shown in Table G2 were produced. The methods for measuring the chemical composition and the notation in the tables are the same as in the above Example 1.

TABLE G1

| STEEL | CHEMICAL COMPOSITION OF SLAB(STEEL PIECE) (UNIT: mass %, BALANCE CONSISTING OF Fe AND IMPURITIES) | | | | | | | | | | | | |
|---|---|---|---|---|---|---|---|---|---|---|---|---|---|
| TYPE | C | Si | Mn | S | Al | N | Cu | Bi | Nb | V | Mo | Ta | W |
| A | 0.070 | 3.26 | 0.07 | 0.026 | 0.025 | 0.008 | 0.07 | — | — | — | — | — | — |
| B1 | 0.060 | 3.35 | 0.10 | 0.006 | 0.026 | 0.008 | <0.03 | — | — | — | — | — | — |
| B2 | 0.060 | 3.35 | 0.10 | 0.006 | 0.026 | 0.008 | <0.03 | — | 0.001 | — | — | — | — |
| B3 | 0.060 | 3.35 | 0.10 | 0.006 | 0.026 | 0.008 | <0.03 | — | 0.003 | — | — | — | — |
| B4 | 0.060 | 3.35 | 0.10 | 0.006 | 0.026 | 0.008 | <0.03 | — | 0.007 | — | — | — | — |
| B5 | 0.060 | 3.35 | 0.10 | 0.006 | 0.026 | 0.008 | <0.03 | — | 0.010 | — | — | — | — |
| B6 | 0.060 | 3.35 | 0.10 | 0.006 | 0.026 | 0.008 | <0.03 | — | 0.020 | — | — | — | — |
| B7 | 0.060 | 3.35 | 0.10 | 0.006 | 0.026 | 0.008 | <0.03 | — | 0.030 | — | — | — | — |
| C | 0.060 | 3.45 | 0.10 | 0.006 | 0.028 | 0.008 | 0.20 | — | 0.002 | — | — | — | — |
| D | 0.060 | 3.45 | 0.10 | 0.006 | 0.027 | 0.008 | 0.20 | — | 0.005 | — | — | — | — |
| E | 0.060 | 3.45 | 0.10 | 0.006 | 0.027 | 0.008 | 0.20 | — | — | 0.007 | — | — | — |
| F | 0.060 | 3.45 | 0.10 | 0.006 | 0.027 | 0.008 | 0.20 | — | — | — | 0.020 | — | — |
| G | 0.060 | 3.45 | 0.10 | 0.006 | 0.027 | 0.008 | 0.20 | — | 0.005 | — | — | 0.003 | — |
| H | 0.060 | 3.45 | 0.10 | 0.006 | 0.027 | 0.008 | 0.20 | — | — | — | — | 0.010 | — |
| I | 0.060 | 3.45 | 0.10 | 0.006 | 0.027 | 0.008 | 0.20 | — | — | — | — | — | 0.010 |
| J | 0.060 | 3.45 | 0.10 | 0.006 | 0.027 | 0.008 | 0.20 | — | 0.004 | — | 0.010 | — | — |
| K | 0.060 | 3.45 | 0.10 | 0.006 | 0.027 | 0.008 | 0.20 | — | 0.005 | 0.003 | — | 0.003 | — |
| L | 0.060 | 3.45 | 0.10 | 0.006 | 0.027 | 0.008 | 0.20 | — | — | 0.005 | — | 0.005 | — |

TABLE G2

| STEEL | CHEMICAL COMPOSITION OF GRAIN ORIENTED ELECTRICAL STEEL SHEET (UNIT: mass %, BALANCE CONSISTING OF Fe AND IMPURITIES) | | | | | | | | | | | | |
|---|---|---|---|---|---|---|---|---|---|---|---|---|---|
| TYPE | C | Si | Mn | S | Al | N | Cu | Bi | Nb | V | Mo | Ta | W |
| A | 0.001 | 3.15 | 0.07 | <0.002 | <0.004 | <0.002 | 0.07 | — | — | — | — | — | — |
| B1 | 0.001 | 3.30 | 0.10 | <0.002 | <0.004 | <0.002 | <0.03 | — | — | — | — | — | — |
| B2 | 0.001 | 3.30 | 0.10 | <0.002 | <0.004 | <0.002 | <0.03 | — | <0.001 | — | — | — | — |
| B3 | 0.001 | 3.30 | 0.10 | <0.002 | <0.004 | <0.002 | <0.03 | — | 0.002 | — | — | — | — |
| B4 | 0.001 | 3.30 | 0.10 | <0.002 | <0,004 | <0.002 | <0.03 | — | 0.006 | — | — | — | — |
| B5 | 0.001 | 3.30 | 0.10 | <0.002 | <0.004 | <0.002 | <0.03 | — | 0.007 | — | — | — | — |
| B6 | 0.002 | 3.30 | 0.10 | <0.002 | <0.004 | <0.002 | <0.03 | — | 0.018 | — | — | — | — |
| B7 | 0.004 | 3.30 | 0.10 | <0.002 | <0.004 | <0.002 | <0.03 | — | 0.030 | — | — | — | — |
| C | 0.001 | 3.34 | 0.10 | <0.002 | <0.004 | <0.002 | 0.20 | — | 0.002 | — | — | — | — |
| D | 0.001 | 3.34 | 0.10 | <0.002 | <0.004 | <0.002 | 0.20 | — | 0.004 | — | — | — | — |
| E | 0.001 | 3.34 | 0.10 | <0.002 | <0.004 | <0.002 | 0.20 | — | — | 0.006 | — | — | — |
| F | 0.001 | 3.34 | 0.10 | <0.002 | <0.004 | <0.002 | 0.20 | — | — | — | 0.020 | — | — |
| G | 0.001 | 3.34 | 0.10 | <0.002 | <0.004 | <0.002 | 0.20 | — | 0.004 | — | — | 0.001 | — |
| H | 0.001 | 3.34 | 0.10 | <0.002 | <0.004 | <0.002 | 0.20 | — | — | — | — | 0.010 | — |
| I | 0.001 | 3.34 | 0.10 | <0.002 | <0.004 | <0.002 | 0.20 | — | — | — | — | — | 0.010 |
| J | 0.001 | 3.34 | 0.10 | <0.002 | <0.004 | <0.002 | 0.20 | — | 0.003 | 0.001 | 0.003 | — | — |
| K | 0.001 | 3.34 | 0.10 | <0.002 | <0.004 | <0.002 | 0.20 | — | 0.003 | 0.001 | — | 0.002 | — |
| L | 0.001 | 3.34 | 0.10 | <0.002 | <0.004 | <0.002 | 0.20 | — | — | 0.003 | — | 0.004 | — |

The grain oriented electrical steel sheets were produced under production conditions shown in Table G3 to Table G6. In the final annealing, in order to control the anisotropy of the switching direction, the annealing was conducted with a thermal gradient in the transverse direction of steel sheet. The production conditions other than the thermal gradient and other than those shown in the tables were the same as those in the above Example 1.

TABLE G3

| | | PRODUCTION CONDITIONS | | | | | | | | | | | | | |
|---|---|---|---|---|---|---|---|---|---|---|---|---|---|---|---|
| | | HOT ROLLING | | | | HOT BAND ANNEALING | | COLD ROLLING | | DECARBURIZATION ANNEALING | | FINAL ANNEALING | | | |
| No. | STEEL TYPE | HEATING TEMPERATURE ° C. | TEMPERATURE OF FINAL ROLLING ° C. | COILING TEMPERATURE ° C. | SHEET THICKNESS mm | TEMPERATURE ° C. | TIME SECOND | SHEET THICKNESS mm | REDUCTION OF COLD ROLLING % | GRAIN SIZE OF PRIMARY RECRYSTALLIZED GRAIN μM | NITROGEN CONTENT AFTER NITRIDATION ppm | PA' | PB' | TD MINUTE | THERMAL GRADIENT ° C./cm |
| 7001 | B1 | 1150 | 900 | 550 | 2.8 | 1100 | 180 | 0.26 | 90.7 | 24 | 220 | 0.020 | 0.010 | 720 | 0.5 |
| 7002 | B1 | 1150 | 900 | 550 | 2.8 | 1100 | 180 | 0.26 | 90.7 | 24 | 220 | 0.100 | 0.010 | 600 | 0.5 |
| 7003 | B1 | 1150 | 900 | 550 | 2.8 | 1100 | 180 | 0.26 | 90.7 | 24 | 220 | 0.020 | 0.020 | 600 | 0.5 |
| 7004 | B1 | 1150 | 900 | 550 | 2.8 | 1100 | 180 | 0.26 | 90.7 | 24 | 220 | 0.100 | 0.020 | 720 | 0.5 |
| 7005 | B1 | 1150 | 900 | 550 | 2.8 | 1100 | 180 | 0.26 | 90.7 | 24 | 220 | 1.000 | 0.100 | 60 | 0.5 |
| 7006 | B1 | 1150 | 900 | 550 | 2.8 | 1100 | 180 | 0.26 | 90.7 | 24 | 220 | 1.000 | 0.200 | 120 | 0.5 |
| 7007 | B1 | 1150 | 900 | 550 | 2.8 | 1100 | 180 | 0.26 | 90.7 | 24 | 220 | 2.000 | 0.100 | 120 | 0.5 |
| 7008 | B1 | 1150 | 900 | 550 | 2.8 | 1100 | 180 | 0.26 | 90.7 | 24 | 220 | 0.100 | 0.020 | 60 | 0.5 |
| 7009 | B1 | 1150 | 900 | 550 | 2.8 | 1100 | 180 | 0.26 | 90.7 | 24 | 220 | 0.100 | 0.020 | 600 | 0.5 |
| 7010 | B1 | 1150 | 900 | 550 | 2.8 | 1100 | 180 | 0.26 | 90.7 | 24 | 220 | 0.500 | 0.040 | 480 | 0.5 |
| 7011 | B1 | 1150 | 900 | 550 | 2.8 | 1100 | 180 | 0.26 | 90.7 | 24 | 220 | 0.500 | 0.070 | 300 | 0.5 |
| 7012 | B1 | 1150 | 800 | 550 | 2.8 | 1100 | 180 | 0.26 | 90.7 | 24 | 220 | 1.000 | 0.100 | 120 | 0.5 |
| 7013 | B1 | 1150 | 900 | 550 | 2.8 | 1100 | 180 | 0.26 | 90.7 | 24 | 220 | 0.100 | 0.020 | 60 | 3.0 |
| 7014 | B1 | 1150 | 900 | 550 | 2.8 | 1100 | 180 | 0.26 | 90.7 | 24 | 220 | 1.000 | 0.100 | 60 | 3.0 |
| 7015 | B1 | 1150 | 900 | 550 | 2.8 | 1100 | 180 | 0.26 | 90.7 | 24 | 220 | 0.100 | 0.020 | 720 | 3.0 |
| 7016 | B1 | 1150 | 900 | 550 | 2.8 | 1100 | 180 | 0.26 | 90.7 | 24 | 220 | 0.100 | 0.010 | 600 | 3.0 |
| 7017 | B1 | 1150 | 900 | 550 | 2.8 | 1100 | 180 | 0.26 | 90.7 | 24 | 220 | 1.000 | 0.200 | 120 | 3.0 |
| 7018 | B1 | 1150 | 900 | 550 | 2.8 | 1100 | 180 | 0.26 | 90.7 | 24 | 220 | 2.000 | 0.100 | 120 | 3.0 |
| 7019 | B1 | 1150 | 900 | 550 | 2.8 | 1100 | 180 | 0.26 | 90.7 | 24 | 220 | 0.500 | 0.040 | 480 | 3.0 |
| 7020 | B1 | 1150 | 900 | 550 | 2.8 | 1100 | 180 | 0.26 | 90.7 | 24 | 220 | 0.500 | 0.070 | 300 | 3.0 |

TABLE G4

| No. | STEEL TYPE | PRODUCTION CONDITIONS: HOT ROLLING: HEATING TEMPERATURE ° C. | HOT ROLLING: TEMPERATURE OF FINAL ROLLING ° C. | HOT ROLLING: COILING TEMPERATURE ° C. | HOT ROLLING: SHEET THICKNESS mm | HOT BAND ANNEALING: TEMPERATURE ° C. | HOT BAND ANNEALING: TIME SECOND | COLD ROLLING: SHEET THICKNESS mm | COLD ROLLING: REDUCTION OF COLD ROLLING % | DECARBURIZATION ANNEALING: GRAIN SIZE OF PRIMARY RECRYSTALLIZED GRAIN μM | NITROGEN CONTENT AFTER NITRIDATION ppm | FINAL ANNEALING: PA' | FINAL ANNEALING: PB' | FINAL ANNEALING: TD MINUTE | FINAL ANNEALING: THERMAL GRADIENT ° C./cm |
|---|---|---|---|---|---|---|---|---|---|---|---|---|---|---|---|
| 7021 | B1 | 1150 | 900 | 550 | 2.8 | 1100 | 180 | 0.26 | 90.7 | 24 | 220 | 1.000 | 0.100 | 120 | 3.0 |
| 7022 | B1 | 1150 | 900 | 550 | 2.8 | 1100 | 180 | 0.26 | 90.7 | 24 | 220 | 0.100 | 0.020 | 600 | 0.3 |
| 7023 | B1 | 1150 | 900 | 550 | 2.8 | 1100 | 180 | 0.26 | 90.7 | 24 | 220 | 0.100 | 0.020 | 600 | 0.5 |
| 7024 | B1 | 1150 | 900 | 550 | 2.8 | 1100 | 180 | 0.26 | 90.7 | 24 | 220 | 0.100 | 0.020 | 600 | 0.7 |
| 7025 | B1 | 1150 | 900 | 550 | 2.8 | 1100 | 180 | 0.26 | 90.7 | 24 | 220 | 0.100 | 0.020 | 600 | 1.0 |
| 7026 | B1 | 1150 | 900 | 550 | 2.8 | 1100 | 180 | 0.26 | 90.7 | 24 | 220 | 0.100 | 0.020 | 600 | 3.0 |
| 7027 | B1 | 1150 | 900 | 550 | 2.8 | 1100 | 180 | 0.26 | 90.7 | 24 | 220 | 0.500 | 0.060 | 300 | 0.3 |
| 7028 | B1 | 1150 | 900 | 550 | 2.8 | 1100 | 180 | 0.26 | 90.7 | 24 | 220 | 0.500 | 0.060 | 300 | 0.5 |
| 7029 | B1 | 1150 | 900 | 550 | 2.8 | 1100 | 180 | 0.26 | 90.7 | 24 | 220 | 0.500 | 0.060 | 300 | 0.7 |
| 7030 | B1 | 1150 | 900 | 550 | 2.8 | 1100 | 180 | 0.26 | 90.7 | 24 | 220 | 0.500 | 0.060 | 300 | 1.0 |
| 7031 | B1 | 1150 | 900 | 550 | 2.8 | 1100 | 180 | 0.26 | 90.7 | 24 | 220 | 0.500 | 0.060 | 300 | 2.0 |
| 7032 | B1 | 1150 | 900 | 550 | 2.8 | 1100 | 180 | 0.26 | 90.7 | 24 | 220 | 0.500 | 0.060 | 300 | 3.0 |
| 7033 | B1 | 1150 | 900 | 550 | 2.8 | 1100 | 180 | 0.26 | 90.7 | 24 | 220 | 0.500 | 0.060 | 300 | 5.0 |
| 7034 | B1 | 1150 | 900 | 550 | 2.8 | 1100 | 180 | 0.26 | 90.7 | 24 | 220 | 0.500 | 0.060 | 300 | 7.0 |
| 7035 | B4 | 1150 | 900 | 550 | 2.8 | 1100 | 180 | 0.26 | 90.7 | 16 | 250 | 0.100 | 0.015 | 600 | 0.5 |
| 7036 | B4 | 1150 | 900 | 550 | 2.8 | 1100 | 180 | 0.26 | 90.7 | 16 | 220 | 1.000 | 0.100 | 60 | 3.0 |
| 7037 | B4 | 1150 | 900 | 550 | 2.8 | 1100 | 180 | 0.26 | 90.7 | 16 | 220 | 0.100 | 0.020 | 720 | 3.0 |
| 7038 | B4 | 1150 | 900 | 550 | 2.8 | 1100 | 180 | 0.26 | 90.7 | 16 | 250 | 0.100 | 0.015 | 600 | 3.0 |
| 7039 | B4 | 1150 | 900 | 550 | 2.8 | 1100 | 180 | 0.26 | 90.7 | 16 | 300 | 0.020 | 0.020 | 600 | 3.0 |
| 7040 | B4 | 1150 | 900 | 550 | 2.8 | 1100 | 180 | 0.26 | 90.7 | 16 | 220 | 1.000 | 0.200 | 180 | 3.0 |

TABLE G5

| No. | STEEL TYPE | PRODUCTION CONDITIONS: HOT ROLLING: HEATING TEMPERATURE ° C. | HOT ROLLING: TEMPERATURE OF FINAL ROLLING ° C. | HOT ROLLING: COILING TEMPERATURE ° C. | HOT ROLLING: SHEET THICKNESS mm | HOT BAND ANNEALING: TEMPERATURE ° C. | HOT BAND ANNEALING: TIME SECOND | COLD ROLLING: SHEET THICKNESS mm | COLD ROLLING: REDUCTION OF COLD ROLLING % | DECARBURIZATION ANNEALING: GRAIN SIZE OF PRIMARY RECRYSTALLIZED GRAIN μM | NITROGEN CONTENT AFTER NITRIDATION ppm | FINAL ANNEALING: PA' | FINAL ANNEALING: PB' | FINAL ANNEALING: TD MINUTE | FINAL ANNEALING: THERMAL GRADIENT ° C./cm |
|---|---|---|---|---|---|---|---|---|---|---|---|---|---|---|---|
| 7041 | B4 | 1150 | 900 | 550 | 2.8 | 1100 | 180 | 0.26 | 90.7 | 16 | 220 | 2.000 | 0.100 | 180 | 3.0 |
| 7042 | B4 | 1150 | 900 | 550 | 2.8 | 1100 | 180 | 0.26 | 90.7 | 16 | 220 | 0.100 | 0.020 | 600 | 3.0 |
| 7043 | B4 | 1150 | 900 | 550 | 2.8 | 1100 | 180 | 0.26 | 90.7 | 16 | 220 | 0.500 | 0.050 | 480 | 3.0 |
| 7044 | B4 | 1150 | 900 | 550 | 2.8 | 1100 | 180 | 0.26 | 90.7 | 16 | 220 | 0.500 | 0.050 | 360 | 3.0 |
| 7045 | B4 | 1150 | 900 | 550 | 2.8 | 1100 | 180 | 0.26 | 90.7 | 16 | 220 | 1.000 | 0.100 | 180 | 3.0 |
| 7046 | B4 | 1150 | 900 | 550 | 2.8 | 1100 | 180 | 0.26 | 90.7 | 16 | 220 | 0.100 | 0.020 | 600 | 0.3 |
| 7047 | B4 | 1150 | 900 | 550 | 2.8 | 1100 | 180 | 0.26 | 90.7 | 16 | 220 | 0.100 | 0.020 | 600 | 0.5 |
| 7048 | B4 | 1150 | 900 | 550 | 2.8 | 1100 | 180 | 0.26 | 90.7 | 16 | 220 | 0.100 | 0.020 | 600 | 0.7 |
| 7049 | B4 | 1150 | 900 | 550 | 2.8 | 1100 | 180 | 0.26 | 90.7 | 16 | 220 | 0.100 | 0.020 | 600 | 1.0 |
| 7050 | B4 | 1150 | 900 | 550 | 2.8 | 1100 | 180 | 0.26 | 90.7 | 16 | 220 | 0.500 | 0.050 | 360 | 2.0 |
| 7051 | B4 | 1150 | 900 | 550 | 2.8 | 1100 | 180 | 0.26 | 90.7 | 16 | 220 | 0.500 | 0.050 | 360 | 3.0 |
| 7052 | B4 | 1150 | 900 | 550 | 2.8 | 1100 | 180 | 0.26 | 90.7 | 16 | 220 | 0.500 | 0.050 | 360 | 5.0 |
| 7053 | B4 | 1150 | 900 | 550 | 2.8 | 1100 | 180 | 0.26 | 90.7 | 16 | 220 | 0.500 | 0.050 | 360 | 7.0 |
| 7054 | B2 | 1200 | 900 | 550 | 2.8 | 1100 | 180 | 0.26 | 90.7 | 24 | 210 | 0.300 | 0.060 | 300 | 3.0 |

TABLE G5-continued

| No. | STEEL TYPE | PRODUCTION CONDITIONS: HOT ROLLING: HEATING TEMPERATURE ° C. | HOT ROLLING: TEMPERATURE OF FINAL ROLLING ° C. | HOT ROLLING: COILING TEMPERATURE ° C. | HOT ROLLING: SHEET THICKNESS mm | HOT BAND ANNEALING: TEMPERATURE ° C. | HOT BAND ANNEALING: TIME SECOND | COLD ROLLING: SHEET THICKNESS mm | COLD ROLLING: REDUCTION OF COLD ROLLING % | DECARBURIZATION ANNEALING: GRAIN SIZE OF PRIMARY RECRYSTALLIZED GRAIN µM | NITROGEN CONTENT AFTER NITRIDATION ppm | FINAL ANNEALING: PA' | FINAL ANNEALING: PB' | FINAL ANNEALING: TD MINUTE | FINAL ANNEALING: THERMAL GRADIENT ° C./cm |
|---|---|---|---|---|---|---|---|---|---|---|---|---|---|---|---|
| 7055 | B3 | 1200 | 900 | 550 | 2.8 | 1100 | 180 | 0.26 | 90.7 | 20 | 210 | 0.300 | 0.060 | 300 | 3.0 |
| 7056 | B4 | 1200 | 900 | 550 | 2.8 | 1100 | 180 | 0.26 | 90.7 | 17 | 210 | 0.300 | 0.060 | 300 | 3.0 |
| 7057 | B5 | 1200 | 900 | 550 | 2.8 | 1100 | 180 | 0.26 | 90.7 | 16 | 210 | 0.300 | 0.060 | 300 | 3.0 |
| 7058 | B6 | 1200 | 900 | 550 | 2.8 | 1100 | 180 | 0.26 | 90.7 | 15 | 210 | 0.300 | 0.060 | 300 | 3.0 |
| 7059 | B7 | 1200 | 900 | 550 | 2.8 | 1100 | 180 | 0.26 | 90.7 | 13 | 210 | 0.300 | 0.060 | 300 | 3.0 |
| 7060 | C | 1100 | 900 | 550 | 2.8 | 1100 | 180 | 0.26 | 90.7 | 24 | 220 | 0.300 | 0.060 | 300 | 3.0 |

TABLE G6

| No. | STEEL TYPE | PRODUCTION CONDITIONS: HOT ROLLING: HEATING TEMPERATURE ° C. | HOT ROLLING: TEMPERATURE OF FINAL ROLLING ° C. | HOT ROLLING: COILING TEMPERATURE ° C. | HOT ROLLING: SHEET THICKNESS mm | HOT BAND ANNEALING: TEMPERATURE ° C. | HOT BAND ANNEALING: TIME SECOND | COLD ROLLING: SHEET THICKNESS mm | COLD ROLLING: REDUCTION OF COLD ROLLING % | DECARBURIZATION ANNEALING: GRAIN SIZE OF PRIMARY RECRYSTALLIZED GRAIN µM | NITROGEN CONTENT AFTER NITRIDATION ppm | FINAL ANNEALING: PA' | FINAL ANNEALING: PB' | FINAL ANNEALING: TD MINUTE | FINAL ANNEALING: THERMAL GRADIENT ° C./cm |
|---|---|---|---|---|---|---|---|---|---|---|---|---|---|---|---|
| 7061 | D | 1100 | 900 | 550 | 2.8 | 1100 | 180 | 0.26 | 90.7 | 17 | 220 | 0.300 | 0.060 | 300 | 3.0 |
| 7062 | E | 1100 | 900 | 550 | 2.8 | 1100 | 180 | 0.26 | 90.7 | 22 | 220 | 0.300 | 0.060 | 300 | 3.0 |
| 7063 | F | 1100 | 900 | 550 | 2.8 | 1100 | 180 | 0.26 | 90.7 | 19 | 220 | 0.300 | 0.060 | 300 | 3.0 |
| 7064 | G | 1100 | 900 | 550 | 2.8 | 1100 | 180 | 0.26 | 90.7 | 15 | 220 | 0.300 | 0.060 | 300 | 3.0 |
| 7065 | H | 1100 | 900 | 550 | 2.8 | 1100 | 180 | 0.26 | 90.7 | 15 | 220 | 0.300 | 0.060 | 300 | 3.0 |
| 7066 | I | 1100 | 900 | 550 | 2.8 | 1100 | 180 | 0.26 | 90.7 | 23 | 220 | 0.300 | 0.060 | 300 | 3.0 |
| 7067 | J | 1100 | 900 | 550 | 2.8 | 1100 | 180 | 0.26 | 90.7 | 17 | 220 | 0.300 | 0.060 | 300 | 3.0 |
| 7068 | K | 1100 | 900 | 550 | 2.8 | 1100 | 180 | 0.26 | 90.7 | 15 | 220 | 0.300 | 0.060 | 300 | 3.0 |
| 7069 | L | 1100 | 1100 | 500 | 2.8 | 1100 | 180 | 0.26 | 90.7 | 15 | 220 | 0.300 | 0.060 | 300 | 3.0 |
| 7070 | A | 1400 | 900 | 550 | 2.8 | 1100 | 180 | 0.26 | 90.7 | 9 | — | 0.300 | 0.060 | 300 | 3.0 |

The insulation coating which was the same as those in the above Example 1 was formed on the surface of produced grain oriented electrical steel sheets (final annealed sheets).

The produced grain oriented electrical steel sheets had the intermediate layer which was arranged in contact with the grain oriented electrical steel sheet (silicon steel sheet) and the insulation coating which was arranged in contact with the intermediate layer, when viewing the cross section whose cutting direction is parallel to thickness direction. The intermediate layer was forsterite film whose average thickness was 3 µm, and the insulation coating was the coating which mainly included phosphate and colloidal silica and whose average thickness was 3 µm.

Various characteristics of the obtained grain oriented electrical steel sheet were evaluated. The evaluation methods were the same as those in the above Example 1 and Example 5. The evaluation results are shown in Table G7 to Table G10.

In most grain oriented electrical steel sheets, the grains stretched in the direction of the thermal gradient, and the grain size of a subgrain also increased in the direction. In other words, the grains stretched in the transverse direction. However, in some grain oriented electrical steel sheets produced under conditions such that the thermal gradient was small, a subgrain had the grain size in which the size in transverse direction was smaller than that in rolling direction. When the grain size in transverse direction was smaller than that in rolling direction, the steel sheet was shown as "*" in the column "inconsistence as to thermal gradient direction" in Tables.

TABLE G7

| No. | STEEL TYPE | PRODUCTION RESULTS<br>BOUNDARY<br>EXISTENCE OF SWITCHING BOUNDARY (SUB-BOUNDARY)<br>EXISTENCE NON | EXISTENCE OF SWITCHING BOUNDARY (α SUB-BOUNDARY)<br>EXISTENCE NON | AVERAGE GRAIN SIZE<br>$RC_C$ mm | $RB_C$ mm | $RC_L$ mm | $RB_L$ mm | $RC_C/RC_L$ | $RB_L/RC_L$ | $RB_C/RC_C$ | $RB_C/RB_L$ |
|---|---|---|---|---|---|---|---|---|---|---|---|
| 7001 | B1 | NONE | NONE | 19.7 | 20.0 | 27.6 | 23.8 | 0.71 | 0.86 | 1.01 | 0.84 |
| 7002 | B1 | EXISTENCE | NONE | 25.1 | 26.6 | 27.8 | 27.6 | 0.90 | 1.00 | 1.06 | 0.96 |
| 7003 | B1 | NONE | NONE | 24.1 | 25.8 | 27.1 | 27.8 | 0.89 | 1.02 | 1.07 | 0.93 |
| 7004 | B1 | EXISTENCE | NONE | 28.1 | 29.7 | 29.1 | 26.7 | 0.97 | 0.92 | 1.06 | 1.11 |
| 7005 | B1 | EXISTENCE | NONE | 28.1 | 29.7 | 30.7 | 27.4 | 0.92 | 0.89 | 1.06 | 1.08 |
| 7006 | B1 | EXISTENCE | NONE | 25.1 | 26.6 | 27.3 | 27.0 | 0.92 | 0.99 | 1.06 | 0.98 |
| 7007 | B1 | EXISTENCE | NONE | 24.1 | 26.4 | 27.3 | 28.1 | 0.88 | 1.03 | 1.10 | 0.94 |
| 7008 | B1 | EXISTENCE | NONE | 28.1 | 29.3 | 30.8 | 27.6 | 0.91 | 0.90 | 1.04 | 1.06 |
| 7009 | B1 | EXISTENCE | EXISTENCE | 22.3 | 25.2 | 25.6 | 30.4 | 0.87 | 1.19 | 1.13 | 0.83 |
| 7010 | B1 | EXISTENCE | EXISTENCE | 20.1 | 25.5 | 22.3 | 37.2 | 0.90 | 1.67 | 1.27 | 0.68 |
| 7011 | B1 | EXISTENCE | EXISTENCE | 19.0 | 24.5 | 21.7 | 39.6 | 0.88 | 1.83 | 1.29 | 0.62 |
| 7012 | B1 | EXISTENCE | EXISTENCE | 22.3 | 25.2 | 24.7 | 31.6 | 0.90 | 1.28 | 1.13 | 0.80 |
| 7013 | B1 | EXISTENCE | NONE | 40.1 | 42.8 | 29.2 | 28.2 | 1.37 | 0.96 | 1.07 | 1.52 |
| 7014 | B1 | EXISTENCE | NONE | 40.1 | 42.2 | 29.4 | 27.7 | 1.36 | 0.94 | 1.05 | 1.52 |
| 7015 | B1 | EXISTENCE | NONE | 40.1 | 42.4 | 29.2 | 27.9 | 1.37 | 0.95 | 1.06 | 1.52 |
| 7016 | B1 | EXISTENCE | NONE | 58.0 | 63.8 | 32.1 | 32.4 | 1.81 | 1.01 | 1.10 | 1.07 |
| 7017 | B1 | EXISTENCE | NONE | 40.9 | 43.7 | 29.0 | 28.4 | 1.41 | 0.98 | 1.07 | 1.54 |
| 7018 | B1 | EXISTENCE | NONE | 41.8 | 45.1 | 26.9 | 27.3 | 1.55 | 1.02 | 1.08 | 1.65 |
| 7019 | B1 | EXISTENCE | EXISTENCE | 40.2 | 152.6 | 18.5 | 43.8 | 2.17 | 2.36 | 3.80 | 3.49 |
| 7020 | B1 | EXISTENCE | EXISTENCE | 40.9 | 159.3 | 18.7 | 44.0 | 2.19 | 2.36 | 3.89 | 3.52 |

| No. | INCONSISTENCE AS TO THERMAL GRADIENT DIRECTION | $(RB_C/RC_L)/(RB_L/RC_C)$ | DEVIATION ANGLE σ (\|α\|) | EVALUATION RESULTS<br>MAGNETIC CHARACTERISTICS<br>B8 T | W19/50 W/kg | W17/50 W/kg | NOTE |
|---|---|---|---|---|---|---|---|
| 7001 | * | 1.17 | 3.26 | 1.913 | 2.912 | 0.890 | COMPARATIVE EXAMPLE |
| 7002 | * | 1.06 | 3.07 | 1.918 | 2.068 | 0.879 | INVENTIVE EXAMPLE |
| 7003 | * | 1.05 | 3.10 | 1.919 | 1.961 | 0.877 | COMPARATIVE EXAMPLE |
| 7004 | * | 1.15 | 3.05 | 1.919 | 2.318 | 0.877 | INVENTIVE EXAMPLE |
| 7005 | * | 1.18 | 3.04 | 1.919 | 2.323 | 0.877 | INVENTIVE EXAMPLE |
| 7006 | * | 1.07 | 3.07 | 1.918 | 2.064 | 0.880 | INVENTIVE EXAMPLE |
| 7007 | * | 1.07 | 3.06 | 1.920 | 1.965 | 0.878 | INVENTIVE EXAMPLE |
| 7008 | * | 1.16 | 3.03 | 1.919 | 2.322 | 0.875 | INVENTIVE EXAMPLE |
| 7009 | * | 0.95 | 2.97 | 1.921 | 1.783 | 0.873 | INVENTIVE EXAMPLE |
| 7010 | * | 0.76 | 2.73 | 1.930 | 1.577 | 0.857 | INVENTIVE EXAMPLE |
| 7011 | * | 0.71 | 2.72 | 1.930 | 1.536 | 0.855 | INVENTIVE EXAMPLE |
| 7012 | * | 0.88 | 3.00 | 1.922 | 1.782 | 0.871 | INVENTIVE EXAMPLE |
| 7013 | | 1.10 | 3.05 | 1.920 | 2.322 | 0.877 | INVENTIVE EXAMPLE |
| 7014 | | 1.12 | 3.04 | 1.919 | 2.322 | 0.877 | INVENTIVE EXAMPLE |
| 7015 | | 1.11 | 3.04 | 1.920 | 2.320 | 0.875 | INVENTIVE EXAMPLE |
| 7056 | | 1.09 | 2.88 | 1.926 | 2.046 | 0.866 | INVENTIVE EXAMPLE |
| 7017 | | 1.09 | 3.11 | 1.919 | 2.067 | 0.878 | INVENTIVE EXAMPLE |
| 7018 | | 1.06 | 3.10 | 1.919 | 1.964 | 0.879 | INVENTIVE EXAMPLE |

TABLE G7-continued

| No. | INCONSISTENCE AS TO THERMAL GRADIENT DIRECTION | $(RB_C/RC_L)/(RB_L/RC_C)$ | DEVIATION ANGLE σ (\|α\|) | B8 T | W19/50 W/kg | W17/50 W/kg | NOTE |
|---|---|---|---|---|---|---|---|
| 7019 | | 1.61 | 2.50 | 1.938 | 1.276 | 0.840 | INVENTIVE EXAMPLE |
| 7020 | | 1.65 | 2.49 | 1.936 | 1.233 | 0.841 | INVENTIVE EXAMPLE |

TABLE G8

| | | PRODUCTION RESULTS | | | | | | | | | | |
|---|---|---|---|---|---|---|---|---|---|---|---|---|
| | | BOUNDARY | | AVERAGE GRAIN SIZE | | | | | | | | |
| No. | STEEL TYPE | EXISTENCE OF SWITCHING BOUNDARY (SUB-BOUNDARY) EXISTENCE NON | EXISTENCE OF SWITCHING BOUNDARY (α SUB-BOUNDARY) EXISTENCE NON | $RC_C$ mm | $RB_C$ mm | $RC_L$ mm | $RB_L$ mm | $RC_C/RC_L$ | $RB_L/RC_L$ | $RB_C/RC_C$ | $RB_C/RB_L$ |
| 7021 | B1 | EXISTENCE | EXISTENCE | 38.2 | 135.4 | 18.2 | 40.9 | 2.10 | 2.25 | 3.54 | 3.31 |
| 7022 | B1 | EXISTENCE | EXISTENCE | 20.3 | 25.6 | 17.8 | 21.8 | 1.14 | 1.22 | 1.26 | 1.17 |
| 7023 | B1 | EXISTENCE | EXISTENCE | 20.3 | 25.3 | 18.4 | 22.6 | 1.11 | 1.23 | 1.24 | 1.12 |
| 7024 | B1 | EXISTENCE | EXISTENCE | 22.1 | 44.6 | 18.4 | 23.4 | 1.20 | 1.27 | 2.02 | 1.91 |
| 7025 | B1 | EXISTENCE | EXISTENCE | 23.3 | 49.6 | 18.5 | 24.5 | 1.26 | 1.33 | 2.13 | 2.02 |
| 7026 | B1 | EXISTENCE | EXISTENCE | 38.2 | 135.5 | 18.6 | 40.8 | 2.06 | 2.20 | 3.55 | 3.32 |
| 7027 | B1 | EXISTENCE | EXISTENCE | 19.0 | 24.7 | 19.1 | 23.8 | 0.09 | 1.25 | 1.30 | 1.04 |
| 7028 | B1 | EXISTENCE | EXISTENCE | 20.0 | 24.2 | 18.1 | 24.5 | 1.10 | 1.37 | 1.21 | 0.98 |
| 7029 | B1 | EXISTENCE | EXISTENCE | 23.7 | 53.5 | 18.5 | 25.3 | 1.28 | 1.37 | 2.26 | 2.12 |
| 7030 | B1 | EXISTENCE | EXISTENCE | 25.0 | 58.7 | 18.3 | 27.6 | 1.36 | 1.50 | 2.35 | 2.13 |
| 7031 | B1 | EXISTENCE | EXISTENCE | 30.8 | 90.1 | 18.1 | 34.0 | 1.70 | 1.88 | 2.92 | 2.65 |
| 7032 | B1 | EXISTENCE | EXISTENCE | 40.9 | 159.2 | 17.5 | 45.2 | 2.34 | 2.59 | 3.89 | 3.52 |
| 7033 | B1 | EXISTENCE | EXISTENCE | 101.4 | 411.0 | 16.9 | 75.6 | 6.00 | 4.49 | 4.05 | 5.42 |
| 7034 | B1 | EXISTENCE | EXISTENCE | 335.7 | 321.0 | 16.6 | 135.6 | 20.22 | 8.17 | 0.96 | 2.37 |
| 7035 | B4 | EXISTENCE | NONE | 36.2 | 37.2 | 39.8 | 50.4 | 0.91 | 1.27 | 1.03 | 0.74 |
| 7036 | B4 | EXISTENCE | NONE | 114.3 | 113.2 | 35.0 | 37.2 | 3.26 | 1.06 | 0.99 | 3.05 |
| 7037 | B4 | EXISTENCE | EXISTENCE | 114.3 | 111.6 | 37.0 | 38.8 | 3.08 | 1.05 | 0.98 | 2.88 |
| 7038 | B4 | EXISTENCE | EXISTENCE | 27.5 | 67.1 | 17.7 | 43.1 | 1.56 | 2.44 | 2.44 | 1.56 |
| 7039 | B4 | EXISTENCE | EXISTENCE | 27.6 | 68.1 | 17.6 | 43.0 | 1.57 | 2.45 | 2.47 | 1.58 |
| 7040 | B4 | EXISTENCE | EXISTENCE | 27.5 | 67.5 | 17.6 | 43.0 | 1.57 | 2.45 | 2.45 | 1.57 |

| | | | | EVALUATION RESULTS MAGNETIC CHARACTERISTICS | | | |
|---|---|---|---|---|---|---|---|
| No. | INCONSISTENCE AS TO THERMAL GRADIENT DIRECTION | $(RB_C/RC_L)/(RB_L/RC_C)$ | DEVIATION ANGLE σ (\|α\|) | B8 T | W19/50 W/kg | W17/50 W/kg | NOTE |
| 7021 | | 1.58 | 2.66 | 1.931 | 1.485 | 0.854 | INVENTIVE EXAMPLE |
| 7022 | | 1.03 | 2.98 | 1.922 | 1.784 | 0.872 | INVENTIVE EXAMPLE |
| 7023 | | 1.01 | 2.95 | 1.921 | 1.781 | 0.870 | INVENTIVE EXAMPLE |
| 7024 | | 1.59 | 2.93 | 1.922 | 1.484 | 0.869 | INVENTIVE EXAMPLE |
| 7025 | | 1.60 | 2.91 | 1.925 | 1.481 | 0.868 | INVENTIVE EXAMPLE |
| 7026 | | 1.62 | 2.68 | 1.931 | 1.484 | 0.854 | INVENTIVE EXAMPLE |
| 7027 | * | 1.04 | 2.71 | 1.930 | 1.537 | 0.854 | INVENTIVE EXAMPLE |
| 7028 | | 0.89 | 2.69 | 1.930 | 1.533 | 0.854 | INVENTIVE EXAMPLE |
| 7029 | | 1.65 | 2.70 | 1.929 | 1.238 | 0.855 | INVENTIVE EXAMPLE |
| 7030 | | 1.56 | 2.66 | 1.930 | 1.238 | 0.853 | INVENTIVE EXAMPLE |
| 7031 | | 1.56 | 2.55 | 1.933 | 1.234 | 0.849 | INVENTIVE EXAMPLE |
| 7032 | | 1.50 | 2.47 | 1.938 | 1.233 | 0.841 | INVENTIVE EXAMPLE |
| 7033 | | 0.90 | 2.25 | 1.943 | 1.236 | 0.826 | INVENTIVE EXAMPLE |

TABLE G8-continued

| | | | | | | | |
|---|---|---|---|---|---|---|---|
| 7034 | | 0.12 | 2.03 | 1.951 | 1.234 | 0.812 | INVENTIVE EXAMPLE |
| 7035 | * | 0.81 | 2.64 | 1.951 | 1.563 | 0.813 | INVENTIVE EXAMPLE |
| 7036 | | 0.93 | 4.10 | 1.934 | 1.870 | 0.845 | INVENTIVE EXAMPLE |
| 7037 | | 0.93 | 4.12 | 1.935 | 1.872 | 0.846 | INVENTIVE EXAMPLE |
| 7058 | | 1.00 | 1.95 | 1.960 | 1.260 | 0.796 | INVENTIVE EXAMPLE |
| 7039 | | 1.01 | 1.18 | 1.967 | 1.196 | 0.780 | INVENTIVE EXAMPLE |
| 7040 | | 1.00 | 2.57 | 1.953 | 1.281 | 0.811 | INVENTIVE EXAMPLE |

TABLE G9

| | | PRODUCTION RESULTS | | | | | | | | | |
|---|---|---|---|---|---|---|---|---|---|---|---|
| | | BOUNDARY | | | | | | | | | |
| | | EXISTENCE OF SWITCHING BOUNDARY (SUB-BOUNDARY) | EXISTENCE OF SWITCHING BOUNDARY (α SUB-BOUNDARY) | AVERAGE GRAIN SIZE | | | | | | | |
| No. | STEEL TYPE | EXISTENCE NON | EXISTENCE NON | $RC_C$ mm | $RB_C$ mm | $RC_L$ mm | $RB_L$ mm | $RC_C$/ $RC_L$ | $RB_L$/ $RC_L$ | $RB_C$/ $RC_C$ | $RB_C$/ $RB_L$ |
| 7041 | B4 | EXISTENCE | EXISTENCE | 27.6 | 68.4 | 17.2 | 42.0 | 1.61 | 2.45 | 2.48 | 1.63 |
| 7042 | B4 | EXISTENCE | EXISTENCE | 27.9 | 70.3 | 17.2 | 42.5 | 1.63 | 2.48 | 2.52 | 1.65 |
| 7043 | B4 | EXISTENCE | EXISTENCE | 29.4 | 78.0 | 17.5 | 45.3 | 1.68 | 2.59 | 2.65 | 1.72 |
| 7044 | B4 | EXISTENCE | EXISTENCE | 30.0 | 81.5 | 17.4 | 46.1 | 1.72 | 2.65 | 2.72 | 1.77 |
| 7045 | B4 | EXISTENCE | EXISTENCE | 27.9 | 70.6 | 17.1 | 42.6 | 1.63 | 2.49 | 2.53 | 1.66 |
| 7046 | B4 | EXISTENCE | EXISTENCE | 22.9 | 43.0 | 24.3 | 28.2 | 0.94 | 1.16 | 1.88 | 1.52 |
| 7047 | B4 | EXISTENCE | EXISTENCE | 23.4 | 48.3 | 21.0 | 26.0 | 1.11 | 1.24 | 2.06 | 1.86 |
| 7048 | B4 | EXISTENCE | EXISTENCE | 24.5 | 53.2 | 18.7 | 25.4 | 1.31 | 1.36 | 2.18 | 2.09 |
| 7049 | B4 | EXISTENCE | EXISTENCE | 25.7 | 59.3 | 17.7 | 30.2 | 1.45 | 1.70 | 2.31 | 1.96 |
| 7050 | B4 | EXISTENCE | EXISTENCE | 35.1 | 115.6 | 17.5 | 36.8 | 2.00 | 2.10 | 3.29 | 3.14 |
| 7051 | B4 | EXISTENCE | EXISTENCE | 46.1 | 199.7 | 17.8 | 47.9 | 2.59 | 2.69 | 4.33 | 4.17 |
| 7052 | B4 | EXISTENCE | EXISTENCE | 111.4 | 457.0 | 17.1 | 79.2 | 6.52 | 4.64 | 4.10 | 5.77 |
| 7053 | B4 | EXISTENCE | EXISTENCE | 491.0 | 489.0 | 16.5 | 139.4 | 29.70 | 8.43 | 1.00 | 3.51 |
| 7054 | B2 | EXISTENCE | EXISTENCE | 29.7 | 121.3 | 17.9 | 46.6 | 1.66 | 2.60 | 4.09 | 2.61 |
| 7055 | B3 | EXISTENCE | EXISTENCE | 30.6 | 131.6 | 17.5 | 46.8 | 1.75 | 2.66 | 4.30 | 2.81 |
| 7056 | B4 | EXISTENCE | EXISTENCE | 30.7 | 133.6 | 17.7 | 47.7 | 1.74 | 2.70 | 4.35 | 2.80 |
| 7057 | B5 | EXISTENCE | EXISTENCE | 30.7 | 133.4 | 17.4 | 46.9 | 1.77 | 2.70 | 4.34 | 2.84 |
| 7058 | B6 | EXISTENCE | EXISTENCE | 30.7 | 133.0 | 17.7 | 47.5 | 1.74 | 2.68 | 4.33 | 2.80 |
| 7059 | B7 | EXISTENCE | EXISTENCE | 30.6 | 132.2 | 17.4 | 46.9 | 1.76 | 2.70 | 4.32 | 2.82 |
| 7060 | C | EXISTENCE | EXISTENCE | 29.7 | 121.9 | 17.8 | 46.6 | 1.07 | 2.62 | 4.11 | 2.62 |

| | INCONSISTENCE AS TO THERMAL | | DEVIATION | EVALUATION RESULTS MAGNETIC CHARACTERISTICS | | | |
|---|---|---|---|---|---|---|---|
| No. | GRADIENT DIRECTION | ($RB_C$/$RC_L$)/ ($RB_L$/$RC_C$) | ANGLE σ (\|α\|) | B8 T | W19/50 W/kg | W17/50 W/kg | NOTE |
| 7041 | | 1.01 | 2.56 | 1.951 | 1.237 | 0.812 | INVENTIVE EXAMPLE |
| 7042 | | 1.02 | 2.38 | 1.953 | 1.203 | 0.808 | INVENTIVE EXAMPLE |
| 7043 | | 1.02 | 1.79 | 1.961 | 1.071 | 0.795 | INVENTIVE EXAMPLE |
| 7044 | | 1.03 | 1.79 | 1.961 | 1.040 | 0.793 | INVENTIVE EXAMPLE |
| 7045 | | 1.02 | 2.34 | 1.955 | 1.175 | 0.806 | INVENTIVE EXAMPLE |
| 7046 | * | 1.62 | 2.76 | 1.951 | 1.475 | 0.816 | INVENTIVE EXAMPLE |
| 7047 | | 1.67 | 2.79 | 1.949 | 1.471 | 0.817 | INVENTIVE EXAMPLE |
| 7048 | | 1.60 | 2.85 | 1.949 | 1.175 | 0.818 | INVENTIVE EXAMPLE |

TABLE G9-continued

| | | | | | | | |
|---|---|---|---|---|---|---|---|
| 7049 | | 1.36 | 2.77 | 1.949 | 1.174 | 0.816 | INVENTIVE EXAMPLE |
| 7050 | | 1.57 | 1.84 | 1.961 | 0.994 | 0.795 | INVENTIVE EXAMPLE |
| 7051 | | 1.61 | 1.59 | 1.963 | 0.995 | 0.789 | INVENTIVE EXAMPLE |
| 7052 | | 0.88 | 0.94 | 1.971 | 0.991 | 0.777 | INVENTIVE EXAMPLE |
| 7053 | | 0.12 | 0.35 | 1.976 | 0.995 | 0.762 | INVENTIVE EXAMPLE |
| 7054 | | 1.57 | 2.39 | 1.940 | 1.144 | 0.834 | INVENTIVE EXAMPLE |
| 7055 | | 1.61 | 2.30 | 1.954 | 1.034 | 0.807 | INVENTIVE EXAMPLE |
| 7056 | | 1.61 | 1.56 | 1.963 | 0.995 | 0.789 | INVENTIVE EXAMPLE |
| 7057 | | 1.61 | 1.56 | 1.963 | 0.996 | 0.790 | INVENTIVE EXAMPLE |
| 7058 | | 1.61 | 1.56 | 1.963 | 0.996 | 0.788 | INVENTIVE EXAMPLE |
| 7059 | | 1.60 | 2.30 | 1.954 | 1.034 | 0.807 | INVENTIVE EXAMPLE |
| 7060 | | 1.57 | 2.34 | 1.939 | 1.145 | 0.836 | INVENTIVE EXAMPLE |

TABLE G10

| | | PRODUCTION RESULTS | | | | | | | | | |
|---|---|---|---|---|---|---|---|---|---|---|---|
| | | BOUNDARY | | | | | | | | | |
| | | EXISTENCE OF SWITCHING BOUNDARY (SUB-BOUNDARY) | EXISTENCE OF SWITCHING BOUNDARY (α SUB-BOUNDARY) | AVERAGE GRAIN SIZE | | | | | | | |
| No. | STEEL TYPE | EXISTENCE NON | EXISTENCE NON | $RC_C$ mm | $RB_C$ mm | $RC_L$ mm | $RB_L$ mm | $RC_C/RC_L$ | $RB_L/RC_L$ | $RB_C/RC_C$ | $RB_C/RB_L$ |
| 7061 | D | EXISTENCE | EXISTENCE | 30.7 | 132.9 | 17.8 | 47.8 | 1.73 | 2.68 | 4.33 | 2.79 |
| 7062 | E | EXISTENCE | EXISTENCE | 30.6 | 131.6 | 17.4 | 46.5 | 1.76 | 2.68 | 4.30 | 2.83 |
| 7063 | F | EXISTENCE | EXISTENCE | 30.7 | 133.6 | 17.7 | 48.0 | 1.73 | 2.71 | 4.35 | 2.75 |
| 7064 | G | EXISTENCE | EXISTENCE | 30.7 | 133.1 | 17.3 | 46.4 | 1.78 | 2.69 | 4.33 | 2.86 |
| 7065 | H | EXISTENCE | EXISTENCE | 30.7 | 133.0 | 17.8 | 47.7 | 1.73 | 2.68 | 4.33 | 2.79 |
| 7066 | I | EXISTENCE | EXISTENCE | 30.6 | 131.6 | 17.6 | 47.1 | 1.74 | 2.68 | 4.30 | 2.80 |
| 7067 | J | EXISTENCE | EXISTENCE | 30.7 | 133.1 | 17.5 | 47.2 | 1.75 | 2.69 | 4.33 | 2.82 |
| 7068 | K | EXISTENCE | EXISTENCE | 30.7 | 133.2 | 17.5 | 47.1 | 1.76 | 2.69 | 4.34 | 2.83 |
| 7069 | L | EXISTENCE | EXISTENCE | 30.7 | 133.1 | 17.7 | 47.5 | 1.74 | 2.69 | 4.33 | 2.80 |
| 7070 | A | EXISTENCE | EXISTENCE | 29.7 | 122.0 | 17.6 | 46.3 | 1.68 | 2.63 | 4.11 | 2.84 |

| No. | INCONSISTENCE AS TO THERMAL GRADIENT DIRECTION | $(RB_C/RC_L)/(RB_L/RC_C)$ | DEVIATION ANGLE σ (\|α\|) | EVALUATION RESULTS MAGNETIC CHARACTERISTICS B8 T | W19/50 W/kg | W17/50 W/kg | NOTE |
|---|---|---|---|---|---|---|---|
| 7061 | | 1.61 | 1.54 | 1.953 | 0.996 | 0.791 | INVENTIVE EXAMPLE |
| 7062 | | 1.61 | 2.30 | 1.956 | 1.036 | 0.806 | INVENTIVE EXAMPLE |
| 7063 | | 1.61 | 1.56 | 1.962 | 0.992 | 0.798 | INVENTIVE EXAMPLE |
| 7064 | | 1.61 | 1.58 | 1.964 | 0.993 | 0.798 | INVENTIVE EXAMPLE |
| 7065 | | 1.61 | 1.54 | 1.964 | 0.994 | 0.790 | INVENTIVE EXAMPLE |
| 7066 | | 1.61 | 2.28 | 1.955 | 1.034 | 0.806 | INVENTIVE EXAMPLE |
| 7067 | | 1.61 | 1.56 | 1.962 | 0.993 | 0.789 | INVENTIVE EXAMPLE |
| 7068 | | 1.61 | 1.58 | 1.964 | 0.994 | 0.788 | INVENTIVE EXAMPLE |

TABLE G10-continued

| | | | | | | |
|---|---|---|---|---|---|---|
| 7069 | 1.61 | 1.57 | 1.962 | 0.994 | 0.789 | INVENTIVE EXAMPLE |
| 7070 | 1.57 | 2.07 | 1.949 | 1.134 | 0.815 | INVENTIVE EXAMPLE |

Hereinafter, as with the above Example 1, the evaluation results of characteristics are explained by classifying the grain oriented electrical steels under some features in regard to the chemical compositions and the producing methods.

Examples Produced by Low Temperature Slab Heating Process

Nos. 7001 to 7069 were examples produced by a process in which slab heating temperature was decreased, nitridation was conducted after primary recrystallization, and thereby main inhibitor for secondary recrystallization was formed.

Examples of Nos. 7001 to 7034

Nos. 7001 to 7034 were examples in which the steel type without Nb was used and the conditions of PA', PB', TD, and thermal gradient were mainly changed during final annealing.

In Nos. 7001 to 7034, when the iron loss $W_{19/50}$ was 1.950 W/kg or less, the iron loss characteristic was judged to be acceptable.

In Nos. 7001 to 7034, the inventive examples included the boundary which satisfied the boundary condition BA and which did not satisfy the boundary condition BB, and thus these examples exhibited excellent magnetostriction in middle magnetic field range. In the above inventive examples, the inventive examples which further included the boundary which satisfied the boundary condition BC and which did not satisfy the boundary condition BB exhibited excellent the iron loss in high magnetic field range. On the other hand, although the comparative examples included the deviation angle α which was slightly and continuously shifted in the secondary recrystallized grains, the comparative examples did not sufficiently include the boundary which satisfied the boundary condition BC and which did not satisfy the boundary condition BB, and thus these examples did not exhibit preferred iron loss in high magnetic field range.

Examples of Nos. 7035 to 7069

Nos. 7035 to 7069 were examples in which the steel type including Nb as the slab was used and the conditions of PA', PB', TD, and thermal gradient were mainly changed during final annealing.

In Nos. 7035 to 7069, when the iron loss $W_{19/50}$ was 1.850 W/kg or less, the iron loss characteristic was judged to be acceptable.

In Nos. 7035 to 7069, the inventive examples included the boundary which satisfied the boundary condition BA and which did not satisfy the boundary condition BB, and thus these examples exhibited excellent magnetostriction in middle magnetic field range. In the above inventive examples, the inventive examples which further included the boundary which satisfied the boundary condition BC and which did not satisfy the boundary condition BB exhibited excellent the iron loss in high magnetic field range. On the other hand, although the comparative examples included the deviation angle α which was slightly and continuously shifted in the secondary recrystallized grains, the comparative examples did not sufficiently include the boundary which satisfied the boundary condition BC and which did not satisfy the boundary condition BB, and thus these examples did not exhibit preferred iron loss in high magnetic field range.

Example of No. 7070

No. 7070 was example produced by a process in which slab heating temperature was increased, MnS was sufficiently soluted during slab heating and was reprecipitated during post process, and the reprecipitated MnS was utilized as main inhibitor.

In No. 7070, when the iron loss $W_{19/50}$ was 1.850 W/kg or less, the iron loss characteristic was judged to be acceptable.

As shown in No. 7070, as long as the conditions in final annealing were appropriately controlled, the iron loss in high magnetic field was improved even by the high temperature slab heating process.

Example 8

Using slabs with chemical composition shown in Table H1 as materials, grain oriented electrical steel sheets with chemical composition shown in Table H2 were produced. The methods for measuring the chemical composition and the notation in the tables are the same as in the above Example 1.

TABLE H1

| STEEL | CHEMICAL COMPOSITION OF SLAB(STEEL PIECE) (UNIT: mass %, BALANCE CONSISTING OF Fe AND IMPURITIES) | | | | | | | | | | | | | |
|---|---|---|---|---|---|---|---|---|---|---|---|---|---|---|
| TYPE | C | Si | Mn | S | Al | N | Cu | Bi | Nb | V | Mo | Ta | W | OTHER |
| X1 | 0.070 | 3.26 | 0.07 | 0.005 | 0.026 | 0.008 | 0.07 | — | — | — | — | — | — | Se: 0.017 |
| X2 | 0.060 | 3.35 | 0.10 | 0.006 | 0.026 | 0.008 | <0.03 | — | — | — | — | — | — | B: 0.002 |
| X3 | 0.060 | 3.35 | 0.10 | 0.006 | 0.026 | 0.008 | <0.03 | — | — | — | — | — | — | P: 0.01 |
| X4 | 0.060 | 3.35 | 0.10 | 0.006 | 0.026 | 0.008 | <0.03 | — | — | — | — | — | — | Ti: 0.005 |
| X5 | 0.060 | 3.35 | 0.10 | 0.006 | 0.026 | 0.008 | <0.03 | — | — | — | — | — | — | Sn: 0.05 |
| X6 | 0.060 | 3.35 | 0.10 | 0.006 | 0.026 | 0.008 | <0.03 | — | — | — | — | — | — | Sb: 0.03 |
| X7 | 0.060 | 3.35 | 0.10 | 0.006 | 0.026 | 0.008 | <0.03 | — | — | — | — | — | — | Cr: 0.1 |
| X8 | 0.060 | 3.35 | 0.10 | 0.006 | 0.026 | 0.008 | <0.03 | — | — | — | — | — | — | Ni: 0.05 |
| X9 | 0.060 | 3.35 | 0.10 | 0.006 | 0.026 | 0.008 | <0.03 | — | — | — | — | — | — | — |

TABLE H1-continued

| STEEL TYPE | CHEMICAL COMPOSITION OF SLAB(STEEL PIECE) (UNIT: mass %, BALANCE CONSISTING OF Fe AND IMPURITIES) C | Si | Mn | S | Al | N | Cu | Bi | Nb | V | Mo | Ta | W | OTHER |
|---|---|---|---|---|---|---|---|---|---|---|---|---|---|---|
| X10 | 0.060 | 3.45 | 0.10 | 0.006 | 0.028 | 0.008 | 0.20 | — | 0.002 | — | — | — | — | — |
| X11 | 0.060 | 3.35 | 0.10 | 0.006 | 0.026 | 0.008 | <0.03 | — | 0.010 | — | — | — | — | — |

TABLE H2

| STEEL TYPE | CHEMICAL COMPOSITION OF GRAIN ELECTRICAL STEEL SHEET (UNIT: mass %, BALANCE CONSISTING OF Fe AND IMPURITIES) C | Si | Mn | S | Al | N | Cu | Bi | Nb | V | Mo | Ta | W | OTHER |
|---|---|---|---|---|---|---|---|---|---|---|---|---|---|---|
| X1 | 0.001 | 3.15 | 0.07 | <0.002 | <0.004 | <0.002 | 0.07 | — | — | — | — | — | — | Se: <0.002 |
| X2 | 0.001 | 3.30 | 0.10 | <0.002 | <0.004 | <0.002 | <0.03 | — | — | — | — | — | — | B: 0.002 |
| X3 | 0.001 | 3.30 | 0.10 | <0.002 | <0.004 | <0.002 | <0.03 | — | — | — | — | — | — | P: 0.01 |
| X4 | 0.001 | 3.30 | 0.10 | <0.002 | <0.004 | <0.002 | <0.03 | — | — | — | — | — | — | Ti: 0.005 |
| X5 | 0.001 | 3.30 | 0.10 | <0.002 | <0.004 | <0.002 | <0.03 | — | — | — | — | — | — | Sn: 0.05 |
| X6 | 0.001 | 3.30 | 0.10 | <0.002 | <0.004 | <0.002 | <0.03 | — | — | — | — | — | — | Sb: 0.03 |
| X7 | 0.001 | 3.30 | 0.10 | <0.002 | <0.004 | <0.002 | <0.03 | — | — | — | — | — | — | Cr: 0.1 |
| X8 | 0.001 | 3.30 | 0.10 | <0.002 | <0.004 | <0.002 | <0.03 | — | — | — | — | — | — | Ni: 0.05 |
| X9 | 0.001 | 3.30 | 0.10 | <0.002 | <0.004 | <0.002 | <0.03 | — | — | — | — | — | — | — |
| X10 | 0.001 | 3.34 | 0.10 | <0.002 | <0.004 | <0.002 | 0.20 | — | 0.002 | — | — | — | — | — |
| X11 | 0.001 | 3.30 | 0.10 | <0.002 | <0.004 | <0.002 | <0.03 | — | 0.007 | — | — | — | — | — |

The grain oriented electrical steel sheets were produced under production conditions shown in Table H3. The production conditions other than those shown in the tables were the same as those in the above Example 1.

In the examples except for No. 8009, the annealing separator which mainly included MgO was applied to the steel sheets, and then final annealing was conducted. On the other hand, in No. 8009, the annealing separator which mainly included alumina was applied to the steel sheets, and then final annealing was conducted.

TABLE H3

| | | PRODUCTION CONDITIONS | | | | | | | | | | | | | | |
|---|---|---|---|---|---|---|---|---|---|---|---|---|---|---|---|---|
| | | HOT ROLLING | | | | HOT BAND ANNEALING | | COLD ROLLING | | DECARBURIZATION ANNEALING | | FINAL ANNEALING | | | | |
| No. | STEEL TYPE | HEATING TEMPERATURE ° C. | TEMPERATURE OF FINAL ROLLING ° C. | COILING TEMPERATURE ° C. | SHEET THICKNESS mm | TEMPERATURE ° C. | TIME SECOND | SHEET THICKNESS mm | REDUCTION OF COLD ROLLING % | GRAIN SIZE OF PRIMARY RECRYSTALLIZED GRAIN μM | NITROGEN CONTENT AFTER NITRIDATION ppm | PA' | PB' | TD | TE1 | TF MINUTE |
| 8001 | X1 | 1400 | 900 | 550 | 2.8 | 1100 | 180 | 0.26 | 90.0 | 9 | — | 0.100 | 0.025 | 300 | 300 | 300 |
| 8002 | X2 | 1150 | 900 | 550 | 2.8 | 1100 | 180 | 0.26 | 90.7 | 22 | 220 | 0.100 | 0.020 | 600 | 300 | 300 |
| 8003 | X3 | 1150 | 900 | 550 | 2.8 | 1100 | 180 | 0.26 | 90.7 | 22 | 220 | 0.100 | 0.020 | 600 | 300 | 300 |
| 8004 | X4 | 1150 | 900 | 550 | 2.8 | 1100 | 180 | 0.26 | 90.7 | 22 | 220 | 0.100 | 0.020 | 600 | 300 | 300 |
| 8005 | X5 | 1150 | 900 | 550 | 2.8 | 1100 | 180 | 0.26 | 90.7 | 22 | 220 | 0.100 | 0.020 | 600 | 300 | 300 |
| 8006 | X6 | 1150 | 900 | 550 | 2.8 | 1100 | 180 | 0.26 | 90.7 | 22 | 220 | 0.100 | 0.020 | 600 | 300 | 300 |
| 8007 | X7 | 1150 | 900 | 550 | 2.8 | 1100 | 180 | 0.26 | 90.7 | 22 | 220 | 0.100 | 0.020 | 600 | 300 | 300 |
| 8008 | X8 | 1150 | 900 | 550 | 2.8 | 1100 | 180 | 0.26 | 90.7 | 22 | 220 | 0.100 | 0.020 | 600 | 300 | 300 |
| 8009 | X9 | 1150 | 900 | 550 | 2.8 | 1100 | 180 | 0.26 | 90.7 | 22 | 220 | 0.100 | 0.020 | 600 | 300 | 300 |
| 8010 | X9 | 1150 | 900 | 550 | 2.8 | 1100 | 180 | 0.26 | 90.7 | 25 | 220 | 0.100 | 0.020 | 600 | 300 | 300 |
| 8011 | X9 | 1150 | 900 | 550 | 2.8 | 1100 | 180 | 0.26 | 90.7 | 23 | 220 | ※1 | 0.020 | 400 | 300 | 300 |
| 8012 | X10 | 1150 | 900 | 550 | 2.8 | 1100 | 180 | 0.26 | 90.7 | 23 | 220 | 0.200 | 0.020 | 300 | 300 | 300 |
| 8013 | X11 | 1150 | 900 | 550 | 2.8 | 1100 | 180 | 0.26 | 90.7 | 16 | 210 | 0.200 | 0.040 | 300 | 150 | 300 |

IN THE ABOVE TABLE "※1" INDICATES THAT "$PH_2O/PH_2$ IN 700 TO 750° C. WAS CONTROLLED TO BE 0.2. AND $PH_2O/PH_2$ IN 750 TO 800° C. WAS CONTROLLED TO BE 0.03".

The insulation coating which was the same as those in the above Example 1 was formed on the surface of produced grain oriented electrical steel sheets (final annealed sheets).

The produced grain oriented electrical steel sheets had the intermediate layer which was arranged in contact with the grain oriented electrical steel sheet (silicon steel sheet) and the insulation coating which was arranged in contact with the intermediate layer, when viewing the cross section whose cutting direction is parallel to thickness direction.

In the grain oriented electrical steel sheets except for No. 8009, the intermediate layer was forsterite film whose average thickness was 1.5 μm, and the insulation coating was the coating which mainly included phosphate and colloidal silica and whose average thickness was 2 μm. On the other hand, in the grain oriented electrical steel sheet of No. 8009, the intermediate layer was oxide layer (layer which mainly included $SiO_2$) whose average thickness was 20 nm, and the insulation coating was the coating which mainly included phosphate and colloidal silica and whose average thickness was 2 μm.

Moreover, in the grain oriented electrical steel sheets of No. 8012 and No. 8013, by laser irradiation after forming the insulation coating, linear minute strain was applied so as to extend in the direction intersecting the rolling direction on the rolled surface of steel sheet and so as to have the interval of 4 mm in the rolling direction. It was confirmed that the effect of reducing the iron loss was obtained by irradiating the laser.

Various characteristics of the obtained grain oriented electrical steel sheet were evaluated. The evaluation methods were the same as those in the above Example 1 and Example 5. The evaluation results are shown in Table H4.

TABLE H4

| | | PRODUCTION RESULTS | | | | | | EVALUATION | | | |
|---|---|---|---|---|---|---|---|---|---|---|---|
| | | BOUNDARY | | AVERAGE GRAIN SIZE | | | DEVIATION ANGLE | RESULTS MAGNETIC CHARACTERISTICS | | | |
| | | EXISTENCE OF SWITCHING BOUNDARY (SUBBOUNDARY) | EXISTENCE OF SWITCHING BOUNDARY (α SUBBOUNDARY) | | | | | | | | |
| No. | STEEL TYPE | EXISTENCE NON | EXISTENCE NON | $RB_L$/$RC_L$ | $RB_L$ mm | $RC_L$ mm | σ(\|α\|) | B8 T | W19/50 W/kg | W17/50 W/kg | NOTE |
| 8001 | X1 | EXISTENCE | EXISTENCE | 1.22 | 28.2 | 23.1 | 2.79 | 1.932 | 1.324 | 0.847 | INVENTIVE EXAMPLE |
| 8002 | X2 | EXISTENCE | EXISTENCE | 1.16 | 25.3 | 21.8 | 3.03 | 1.920 | 1.489 | 0.869 | INVENTIVE EXAMPLE |
| 8003 | X3 | EXISTENCE | EXISTENCE | 1.13 | 25.0 | 22.1 | 3.06 | 1.919 | 1.496 | 0.874 | INVENTIVE EXAMPLE |
| 8004 | X4 | EXISTENCE | EXISTENCE | 1.14 | 25.5 | 22.3 | 3.04 | 1.921 | 1.475 | 0.860 | INVENTIVE EXAMPLE |
| 8005 | X5 | EXISTENCE | EXISTENCE | 1.13 | 24.8 | 21.9 | 3.02 | 1.919 | 1.493 | 0.872 | INVENTIVE EXAMPLE |
| 8006 | X6 | EXISTENCE | EXISTENCE | 1.19 | 25.6 | 21.5 | 3.01 | 1.924 | 1.466 | 0.854 | INVENTIVE EXAMPLE |
| 8007 | X7 | EXISTENCE | EXISTENCE | 1.21 | 25.7 | 21.3 | 3.00 | 1.926 | 1.462 | 0.851 | INVENTIVE EXAMPLE |
| 8008 | X8 | EXISTENCE | EXISTENCE | 1.14 | 25.1 | 22.1 | 3.07 | 1.919 | 1.495 | 0.873 | INVENTIVE EXAMPLE |
| 8009 | X9 | EXISTENCE | EXISTENCE | 1.14 | 24.9 | 21.8 | 3.06 | 1.921 | 1.487 | 0.868 | INVENTIVE EXAMPLE |
| 8010 | X9 | NONE | NONE | 0.97 | 24.7 | 28.5 | 3.25 | 1.913 | 1.767 | 0.876 | COMPARATIVE EXAMPLE |
| 8011 | X9 | NONE | NONE | 0.96 | 27.9 | 29.1 | 3.31 | 1.913 | 1.765 | 0.875 | COMPARATIVE EXAMPLE |
| 8012 | X10 | EXISTENCE | EXISTENCE | 1.19 | 22.7 | 19.0 | 3.04 | 1.912 | 1.317 | 0.791 | INVENTIVE EXAMPLE |
| 8013 | X11 | EXISTENCE | EXISTENCE | 1.45 | 24.4 | 16.8 | 3.21 | 1.943 | 1.046 | 0.751 | INVENTIVE EXAMPLE |

In Nos. 8001 to 8013, when the iron loss $W_{19/50}$ was 1.760 W/kg or less, the iron loss characteristic was judged to be acceptable.

In Nos. 8001 to 8013, the inventive examples included the boundary which satisfied the boundary condition BA and which did not satisfy the boundary condition BB, and thus these examples exhibited excellent magnetostriction in middle magnetic field range. In the above inventive examples, the inventive examples which further included the boundary which satisfied the boundary condition BC and which did not satisfy the boundary condition BB exhibited excellent the iron loss in high magnetic field range. On the other hand, although the comparative examples included the deviation angle α which was slightly and continuously shifted in the secondary recrystallized grains, the comparative examples did not sufficiently include the boundary which satisfied the boundary condition BC and which did not satisfy the boundary condition BB, and thus these examples did not exhibit preferred iron loss in high magnetic field range.

INDUSTRIAL APPLICABILITY

According to the above aspects of the present invention, it is possible to provide the grain oriented electrical steel sheet in which both of the magnetostriction and the iron loss in middle magnetic field range (especially in magnetic field where excited so as to be approximately 1.7 T) are improved. Accordingly, the present invention has significant industrial applicability.

REFERENCE SIGNS LIST

10 Grain oriented electrical steel sheet (silicon steel sheet)
20 Intermediate layer
30 Insulation coating

What is claimed is:

1. A grain oriented electrical steel sheet comprising, as a chemical composition, by mass %, 2.0 to 7.0% of Si,
0 to 0.030% of Nb,
0 to 0.030% of V,
0 to 0.030% of Mo,
0 to 0.030% of Ta,
0 to 0.030% of W,
0 to 0.0050% of C,
0 to 1.0% of Mn,
0 to 0.0150% of S, 0 to 0.0150% of Se,
0 to 0.0650% of Al,
0 to 0.0050% of N,
0 to 0.40% of Cu,
0 to 0.010% of Bi,
0 to 0.080% of B,
0 to 0.50% of P,
0 to 0.0150% of Ti,
0 to 0.10% of Sn,
0 to 0.10% of Sb,
0 to 0.30% of Cr,
0 to 1.0% of Ni, and
a balance consisting of Fe and impurities, and
comprising a texture aligned with Goss orientation, wherein when $\alpha_1$ and $\alpha_2$ represent deviation angles from an ideal Goss orientation based on a rotation axis parallel to a normal direction Z, measured at one measurement point and measured at an other measurement point, respectively, wherein the one measurement point and the other measurement point are adjacent on a sheet surface of the grain oriented electrical steel sheet with an interval of 1 mm among at least 500 measurement points;

$\beta_1$ and $\beta_2$ represent deviation angles from the ideal Goss orientation based on a rotation axis parallel to a transverse direction C, measured at the one measurement point and at the other measurement point, respectively; and $\gamma_1$ and $\gamma_2$ represent deviation angles from the ideal Goss orientation based on a rotation axis parallel to a rolling direction L, measured at the one measurement point and at the other measurement point, respectively, a boundary condition BA is defined as $[(\alpha_2-\alpha_1)^2+(\beta_2-\beta_1)^2+(\gamma_2-\gamma_1)^2]^{1/2}\geq 0.5°$, and a boundary condition BB is defined as $[(\alpha_2-\alpha_1)^2+(\beta_2-\beta_1)^2+(\gamma_2-\gamma_1)^2]^{1/2}\geq 2.0°$, wherein a boundary which satisfies the boundary condition BA and which does not satisfy the boundary condition BB is included and a value of dividing a number of the grain boundary which satisfies the boundary condition BA by a number of the grain boundary which satisfies the boundary condition BB is 1.15 or more.

2. The grain oriented electrical steel sheet according to claim 1, wherein when a grain size $RA_L$ is defined as an average grain size obtained based on the boundary condition BA in the rolling direction L and a grain size $RB_L$ is defined as an average grain size obtained based on the boundary condition BB in the rolling direction L, the grain size $RA_L$ and the grain size $RB_L$ satisfy $1.15\leq RB_L\div RA_L$.

3. The grain oriented electrical steel sheet according to claim 1, wherein when a grain size $RA_C$ is defined as an average grain size obtained based on the boundary condition BA in the transverse direction C and a grain size $RB_C$ is defined as an average grain size obtained based on the boundary condition BB in the transverse direction C, the grain size $RA_C$ and the grain size $RB_C$ satisfy $1.15\leq RB_C\div RA_C$.

4. The grain oriented electrical steel sheet according to claim 1, wherein when a grain size $RA_L$ is defined as an average grain size obtained based on the boundary condition BA in the rolling direction L and a grain size $RA_C$ is defined as an average grain size obtained based on the boundary condition BA in the transverse direction C, the grain size $RA_L$ and the grain size $RA_C$ satisfy $1.15\leq RA_C\div RA_L$.

5. The grain oriented electrical steel sheet according to claim 4, wherein when a grain size $RB_L$ is defined as an average grain size obtained based on the boundary condition BB in the rolling direction L and a grain size $RB_C$ is defined as an average grain size obtained based on the boundary condition BB in the transverse direction C, the grain size $RB_L$ and the grain size $RB_C$ satisfy $1.50\leq RB_C\div RB_L$.

6. The grain oriented electrical steel sheet according to claim 4, wherein when a grain size $RA_L$ is defined as an average grain size obtained based on the boundary condition BA in the rolling direction L, a grain size $RB_L$ is defined as an average grain size obtained based on the boundary condition BB in the rolling direction L, a grain size $RA_C$ is defined as an average grain size obtained based on the boundary condition BA in the transverse direction C, and a grain size $RB_C$ is defined as an average grain size obtained based on the boundary condition BB in the transverse direction C, the grain size $RA_L$, the grain size $RA_C$, the grain size $RB_L$, and the grain size $RB_C$ satisfy $(RB_C\times RA_L)\div(RB_L\times RA_C)<1.0$.

7. The grain oriented electrical steel sheet according to claim 5, wherein when a grain size $RA_L$ is defined as an average grain size obtained based on the boundary condition BA in the rolling direction L, a grain size $RB_L$ is defined as an average grain size obtained based on the boundary condition BB in the rolling direction L, a grain size $RA_C$ is defined as an average grain size obtained based on the boundary condition BA in the transverse direction C, and a grain size $RB_C$ is defined as an average grain size obtained based on the boundary condition BB in the transverse direction C, the grain size $RA_L$, the grain size $RA_C$, the grain size $RB_L$, and the grain size $RB_C$ satisfy $(RB_C\times RA_L)\div(RB_L\times RA_C)<1.0$.

8. The grain oriented electrical steel sheet according to claim 1, wherein when ($\alpha$, $\beta$, and $\gamma$) are defined as deviation angles from the ideal Goss orientation based on the rotation axis, parallel to the normal direction Z, parallel to the transverse direction C and parallel to the rolling direction L, respectively, of the crystal orientation measured at each measurement point among the at least 500 measurement points on the sheet surface, and $\theta=[\alpha^2+\beta^2+^2]^{1/2}$ is defined as a deviation angle at each measurement point, $\sigma(\theta)$ which is a standard deviation of an absolute value of the deviation angle $\theta$ is 0° to 3.0°.

9. The grain oriented electrical steel sheet according to claim 1, wherein when a boundary condition BC is defined as $|\alpha_2-\alpha_1|\geq 0.5°$, a boundary which satisfies the boundary condition BC and which does not satisfy the boundary condition BB is included.

10. The grain oriented electrical steel sheet according to claim 9, wherein when a grain size $RC_L$ is defined as an average grain size obtained based on the boundary condition BC in the rolling direction L and a grain size $RB_L$ is defined as an average grain size obtained based on the boundary condition BB in the rolling direction L, the grain size $RC_L$ and the grain size $RB_L$ satisfy $1.10\leq RB_L\div RC_L$.

11. The grain oriented electrical steel sheet according to claim 9, wherein when a grain size $RC_C$ is defined as an average grain size obtained based on the boundary condition BC in the transverse direction C and a grain size $RB_C$ is defined as an average grain size obtained based on the boundary condition BB in the transverse direction C, the grain size $RC_C$ and the grain size $RB_C$ satisfy $1.10\leq RB_C\div RC_C$.

12. The grain oriented electrical steel sheet according to claim 9, wherein when a grain size $RC_L$ is defined as an average grain size obtained based on the boundary condition BC in the rolling direction L and a grain size $RC_C$ is defined as an average grain size obtained based on the boundary condition BC in the transverse direction C, the grain size $RC_L$ and the grain size $RC_C$ satisfy $1.15\leq RC_C\div RC_L$.

13. The grain oriented electrical steel sheet according to claim 12, wherein when a grain size $RC_L$ is defined as an average grain size obtained based on the boundary condition BC in the rolling direction L, a grain size $RB_L$ is defined as an average grain size obtained based on the boundary condition BB in the rolling direction L, a grain size $RC_C$ is defined as an average grain size obtained based on the boundary condition BC in the transverse direction C, and a grain size $RB_C$ is defined as an average grain size obtained based on the boundary condition BB in the transverse direction C, the grain size $RC_L$, the grain size $RC_C$, the grain size $RB_L$, and the grain size $RB_C$ satisfy $(RB_C\times RC_L)\div(RB_L\times RC_C)<1.0$.

14. The grain oriented electrical steel sheet according to claim 9, wherein $\sigma(|\alpha|)$ which is a standard deviation of an absolute value of the deviation angle $\alpha$ is 0° to 3.50°.

15. The grain oriented electrical steel sheet according to claim 1, wherein a magnetic domain is refined by at least one of applying a local minute strain and forming a local groove.

16. The grain oriented electrical steel sheet according to claim 1, wherein an intermediate layer is arranged in contact with the grain oriented electrical steel sheet and an insulation coating is arranged in contact with the intermediate layer.

17. The grain oriented electrical steel sheet according to claim 16, wherein the intermediate layer is a forsterite film with an average thickness of 1 to 3 μm.

18. The grain oriented electrical steel sheet according to claim 16, wherein the intermediate layer is an oxide layer with an average thickness of 2 to 500 nm.

19. The grain oriented electrical steel sheet according to claim 1, wherein the grain oriented electrical steel sheet has, as the chemical composition, at least one of Nb, V, Mo, Ta, and W, and an amount thereof is 0.0030 to 0.030 mass % in total.

20. The grain oriented electrical steel sheet according to claim 2, wherein the grain oriented electrical steel sheet has, as the chemical composition, at least one of Nb, V, Mo, Ta, and W, and an amount thereof is 0.0030 to 0.030 mass % in total.

21. The grain oriented electrical steel sheet according to claim 3, wherein the grain oriented electrical steel sheet has, as the chemical composition, at least one of Nb, V, Mo, Ta, and W, and an amount thereof is 0.0030 to 0.030 mass % in total.

22. The grain oriented electrical steel sheet according to claim 4, wherein the grain oriented electrical steel sheet has, as the chemical composition, at least one of Nb, V, Mo, Ta, and W, and an amount thereof is 0.0030 to 0.030 mass % in total.

23. The grain oriented electrical steel sheet according to claim 5, wherein the grain oriented electrical steel sheet has, as the chemical composition, at least one of Nb, V, Mo, Ta, and W, and an amount thereof is 0.0030 to 0.030 mass % in total.

24. The grain oriented electrical steel sheet according to claim 6, wherein the grain oriented electrical steel sheet has, as the chemical composition, at least one of Nb, V, Mo, Ta, and W, and an amount thereof is 0.0030 to 0.030 mass % in total.

25. The grain oriented electrical steel sheet according to claim 7, wherein the grain oriented electrical steel sheet has, as the chemical composition, at least one of Nb, V, Mo, Ta, and W, and an amount thereof is 0.0030 to 0.030 mass % in total.

26. The grain oriented electrical steel sheet according to claim 8, wherein the grain oriented electrical steel sheet has, as the chemical composition, at least one of Nb, V, Mo, Ta, and W, and an amount thereof is 0.0030 to 0.030 mass % in total.

27. The grain oriented electrical steel sheet according to claim 9, wherein the grain oriented electrical steel sheet has, as the chemical composition, at least one of Nb, V, Mo, Ta, and W, and an amount thereof is 0.0030 to 0.030 mass % in total.

28. The grain oriented electrical steel sheet according to claim 10, wherein the grain oriented electrical steel sheet has, as the chemical composition, at least one of Nb, V, Mo, Ta, and W, and an amount thereof is 0.0030 to 0.030 mass % in total.

29. The grain oriented electrical steel sheet according to claim 11, wherein the grain oriented electrical steel sheet has, as the chemical composition, at least one of Nb, V, Mo, Ta, and W, and an amount thereof is 0.0030 to 0.030 mass % in total.

30. The grain oriented electrical steel sheet according to claim 12, wherein the grain oriented electrical steel sheet has, as the chemical composition, at least one of Nb, V, Mo, Ta, and W, and an amount thereof is 0.0030 to 0.030 mass % in total.

31. The grain oriented electrical steel sheet according to claim 13, wherein the grain oriented electrical steel sheet has, as the chemical composition, at least one of Nb, V, Mo, Ta, and W, and an amount thereof is 0.0030 to 0.030 mass % in total.

32. The grain oriented electrical steel sheet according to claim 14, wherein the grain oriented electrical steel sheet has, as the chemical composition, at least one of Nb, V, Mo, Ta, and W, and an amount thereof is 0.0030 to 0.030 mass % in total.

33. The grain oriented electrical steel sheet according to claim 15, wherein the grain oriented electrical steel sheet has, as the chemical composition, at least one of Nb, V, Mo, Ta, and W, and an amount thereof is 0.0030 to 0.030 mass % in total.

34. The grain oriented electrical steel sheet according to claim 16, wherein the grain oriented electrical steel sheet has, as the chemical composition, at least one of Nb, V, Mo, Ta, and W, and an amount thereof is 0.0030 to 0.030 mass % in total.

35. The grain oriented electrical steel sheet according to claim 17, wherein the grain oriented electrical steel sheet has, as the chemical composition, at least one of Nb, V, Mo, Ta, and W, and an amount thereof is 0.0030 to 0.030 mass % in total.

36. The grain oriented electrical steel sheet according to claim 18, wherein the grain oriented electrical steel sheet has, as the chemical composition, at least one of Nb, V, Mo, Ta, and W, and an amount thereof is 0.0030 to 0.030 mass % in total.

* * * * *